US012618984B2

(12) United States Patent
Neish et al.

(10) Patent No.: US 12,618,984 B2
(45) Date of Patent: May 5, 2026

(54) TRANSMITTING SECURE NAVIGATION SIGNALS VIA APPLYING ENCRYPTION

(71) Applicant: Xona Space Systems Inc., Burlingame, CA (US)

(72) Inventors: Andrew Michael Neish, Sunnyvale, CA (US); Robert Martin Grayson, Los Alamitos, CA (US); Joshua Earl McGhee, Tucson, AZ (US)

(73) Assignee: Xona Space Systems Inc., Burlingame, CA (US)

( * ) Notice: Subject to any disclaimer, the term of this patent is extended or adjusted under 35 U.S.C. 154(b) by 163 days.

(21) Appl. No.: 18/394,214

(22) Filed: Dec. 22, 2023

(65) Prior Publication Data

US 2024/0255653 A1     Aug. 1, 2024

Related U.S. Application Data

(63) Continuation of application No. 17/364,060, filed on Jun. 30, 2021, now Pat. No. 11,899,120.

(51) Int. Cl.
G01S 19/01          (2010.01)
G01S 19/25          (2010.01)
(Continued)

(52) U.S. Cl.
CPC .......... G01S 19/423 (2013.01); G01S 19/258 (2013.01); G01S 19/44 (2013.01)

(58) Field of Classification Search
CPC ...... G01S 19/423; G01S 19/258; G01S 19/44; G01S 19/03; G01S 19/05; G01S 19/07; G01S 19/01
See application file for complete search history.

(56) References Cited

U.S. PATENT DOCUMENTS

| | | |
|---|---|---|
| 6,329,950 B1 | 12/2001 | Harrell et al. |
| 7,292,654 B2 | 11/2007 | Simon |

(Continued)

FOREIGN PATENT DOCUMENTS

| | | |
|---|---|---|
| CN | 108919312 B | 11/2018 |
| CN | 109001763 A | 12/2018 |
| WO | 20141211967 A2 | 8/2014 |

OTHER PUBLICATIONS

Albulet (Dec. 20, 2016. Spacex Non-Geostationary Satellite System Attachment a Technical in Formation to Supplement Schedule S. GeekWire. http:l/web.archive.org/web/20161115000000*/https:// cdn.geekwire.com/wp-content/uploads/2016/11/Technicai-Attachment. pdf) (Year: 2016).

(Continued)

*Primary Examiner* — Kenneth T Lam

(74) *Attorney, Agent, or Firm* — Katz Ruby & Carle LLP; Katherine C. Stuckman

(57)          ABSTRACT

A satellite is operable to generate a navigation message. Encrypted navigation message data is generated from the navigation message by applying an encryption scheme to the navigation message. An encrypted ranging signal is generated by applying the encryption scheme to a spreading code of the satellite. A secure navigation signal is generated based on modulating the encrypted navigation message data upon the encrypted ranging signal. The secure navigation signal is broadcast for receipt by at least one client device. The secure navigation signal facilitates the at least one client device to determine state data of the at least one client device by utilizing key data associated with the encryption scheme.

17 Claims, 100 Drawing Sheets

(51) Int. Cl.

| | |
|---|---|
| *G01S 19/42* | (2010.01) |
| *G01S 19/44* | (2010.01) |

(56) References Cited

U.S. PATENT DOCUMENTS

| | | | |
|---|---|---|---|
| 8,130,141 B2 | 3/2012 | Pattabiraman | |
| 10,048,382 B2 | 8/2018 | Yunck | |
| 10,627,524 B2 | 4/2020 | Bennett et al. | |
| 10,875,668 B2 | 12/2020 | Bigras et al. | |
| 10,903,900 B2 | 1/2021 | Heiman | |
| 10,979,403 B1* | 4/2021 | Mutescu | H04L 9/0631 |
| 11,178,546 B2* | 11/2021 | Syrjarinne | H04L 9/0869 |
| 11,391,850 B1 | 7/2022 | Xie | |
| 2002/0177403 A1 | 11/2002 | LaPrade | |
| 2006/0208941 A1 | 9/2006 | Ring et al. | |
| 2007/0049195 A1* | 3/2007 | Chun | H04B 7/18519 |
| | | | 455/3.02 |
| 2007/0072603 A1 | 3/2007 | Wang | |
| 2008/0001818 A1 | 1/2008 | Cohen | |
| 2008/0002981 A1 | 1/2008 | Valley | |
| 2010/0312531 A1 | 12/2010 | Korb | |
| 2013/0065514 A1 | 3/2013 | Whelan et al. | |
| 2013/0332072 A1 | 12/2013 | Janky et al. | |
| 2014/0266880 A1 | 9/2014 | Farrokhi | |
| 2015/0084766 A1 | 3/2015 | Cordaro et al. | |
| 2015/0192696 A1 | 7/2015 | Platzer | |
| 2015/0204982 A1 | 7/2015 | Farrokhi | |
| 2016/0011318 A1 | 1/2016 | Cohen | |
| 2016/0252623 A1 | 9/2016 | Zuber | |
| 2017/0245185 A1 | 8/2017 | Chuberre et al. | |
| 2018/0120442 A1 | 5/2018 | Powe | |
| 2018/0210090 A1 | 7/2018 | Soualle | |
| 2018/0376392 A1 | 12/2018 | Wu | |
| 2019/0181946 A1 | 6/2019 | Wendling | |
| 2019/0271782 A1 | 9/2019 | Liu et al. | |
| 2020/0014460 A1 | 1/2020 | Tong et al. | |
| 2020/0204340 A1* | 6/2020 | Curran | H04L 9/0852 |
| 2020/0218202 A1 | 7/2020 | Nozawa | |
| 2020/0379118 A1* | 12/2020 | Reid | G01S 19/10 |
| 2020/0379121 A1* | 12/2020 | Farmer | G01S 19/08 |
| 2021/0132237 A1 | 5/2021 | Molina | |
| 2021/0223406 A1 | 7/2021 | Mu | |
| 2021/0239855 A1 | 8/2021 | Mu | |
| 2021/0247519 A1 | 8/2021 | Reid et al. | |
| 2021/0278549 A1 | 9/2021 | Kassas | |
| 2021/0405211 A1 | 12/2021 | Ilie | |
| 2022/0081132 A1 | 3/2022 | Mukae | |
| 2022/0191691 A1* | 6/2022 | Mikhaylov | H04L 9/0631 |
| 2022/0350032 A1 | 11/2022 | Gick | |
| 2023/0020255 A1* | 1/2023 | Wilkinson | G06F 21/53 |

OTHER PUBLICATIONS

Anderson, et al.; "Low Earth Orbit Navigation Systems (LEONS): Scalable GNSS-Independent Time Transfer and Positioning for Space Users"; Proceedings of the 2023 International Technical Meeting, ION ITM 2023, Jan. 24-26, 2023; https://doi.org/10.330128/2023.18591.

Divis, D. A. (Jun. 15, 2016). Iridium-based system, proposed GPS backup, incorporates crypto protections. Inside GNSS—Global Navigation Satellite Systems Engineering, Policy, and Design (Year: 2016).

Elliott Kaplan; Christopher Hegarty; "Understanding GPS Principles and Applications," Second Edition, Artech, 2005 (Year: 2005).

European Patent Office; Communication pursuant to Rule 114(2) EPC; Application No. 20822220.8; Dec. 19, 2022; 4 pgs.

Hauschild, Andre, Tegedor, Javier, Montenbruck, Oliver, Visser, Hans, Markgraf, Markus, "Innovation: Orbit determination of LEO satellites with real-time corrections" (Apr. 24, 2017) (Year: 2017).

International Searching Authority; International Search Report and Written Opinion; International Application No. PCT/US2020/021687; Jan. 4, 2021; 13 pgs.

International Searching Authority; International Search Report and Written Opinion; International Application No. PCT/US2022/026492; Sep. 1, 2022; 13 pgs.

International Searching Authority; International Search Report and Written Opinion; International Application No. PCT/US2022/071656; Aug. 1, 2022; 10 pgs.

Japan Patent Office; Office Action; Mar. 14, 2023; 10 pgs.

Meng, et al.; A Global Navigation Augmentation System Based on LEO Communication Constellation; 2018; pp. 65-71; IEEE European Navigation Conference (ENC).

Simon, et al.; Performance Evaluation and Interpretation of Unfiltered Feher-Patented Quadrature-PHase-Shift Keying (FQPSK); TMO Progress Report 42-137; 29 pages; May 15, 1999.

Stephen Clark ("FCC approves SpaceX's plan to operate Starlink satellites at lower altitude," Spaceflight Now, Apr. 30, 2019) (Year: 2019), https://spaceflightnow.com/2019/04/30/fcc-approves-spacexs-plan-to-operate-starlink-satellites-at-lower-altitude/.

* cited by examiner

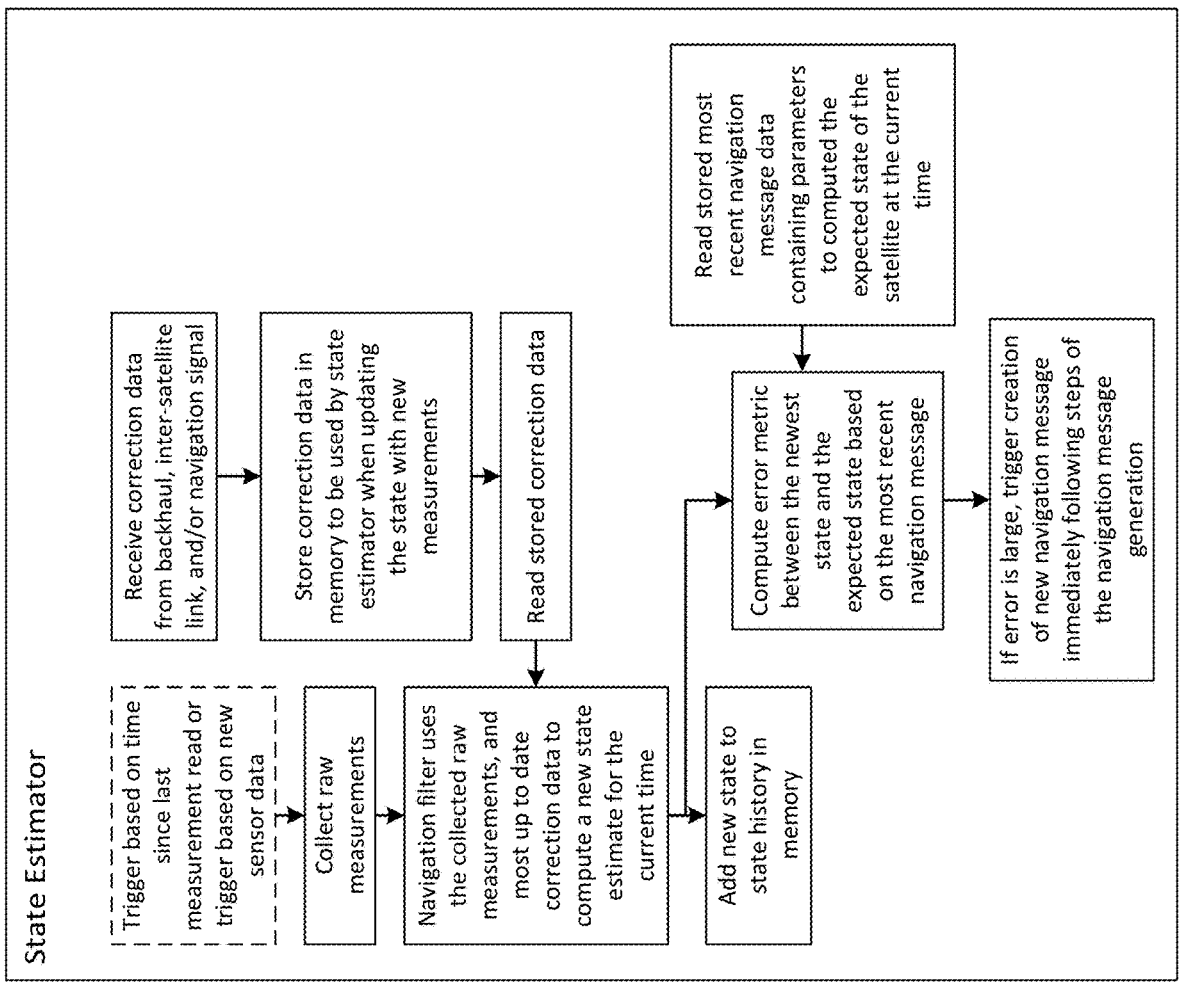

State Estimator

Trigger based on time since last measurement read or trigger based on new sensor data Collect raw measurements Navigation filter uses the collected raw measurements, and most up to date correction data to compute a new state estimate for the current time Receive correction data from backhaul, inter-satellite link, and/or navigation signal Store correction data in memory to be used by state estimator when updating the state with new measurements Read stored correction data Add new state to state history in memory Read stored most recent navigation message data containing parameters to computed the expected state of the satellite at the current time Compute error metric between the newest state and the expected state based on the most recent navigation message If error is large, trigger creation of new navigation message immediately following steps of the navigation message generation

FIG. 5A

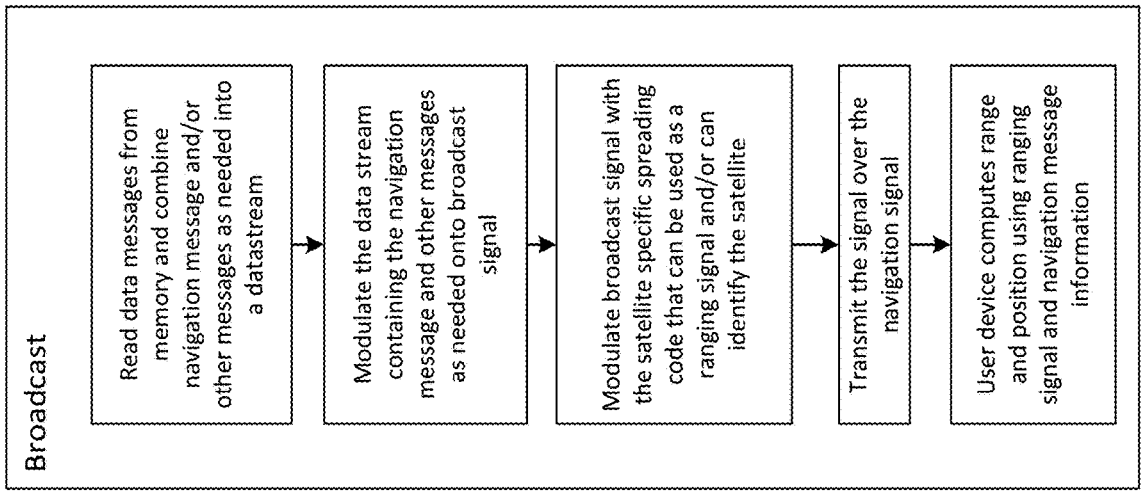

FIG. 5C

Broadcast

Read data messages from memory and combine navigation message and/or other messages as needed into a datastream Modulate the data stream containing the navigation message and other messages as needed onto broadcast signal Modulate broadcast signal with the satellite specific spreading code that can be used as a ranging signal and/or can identify the satellite Transmit the signal over the navigation signal User device computes range and position using ranging signal and navigation message information

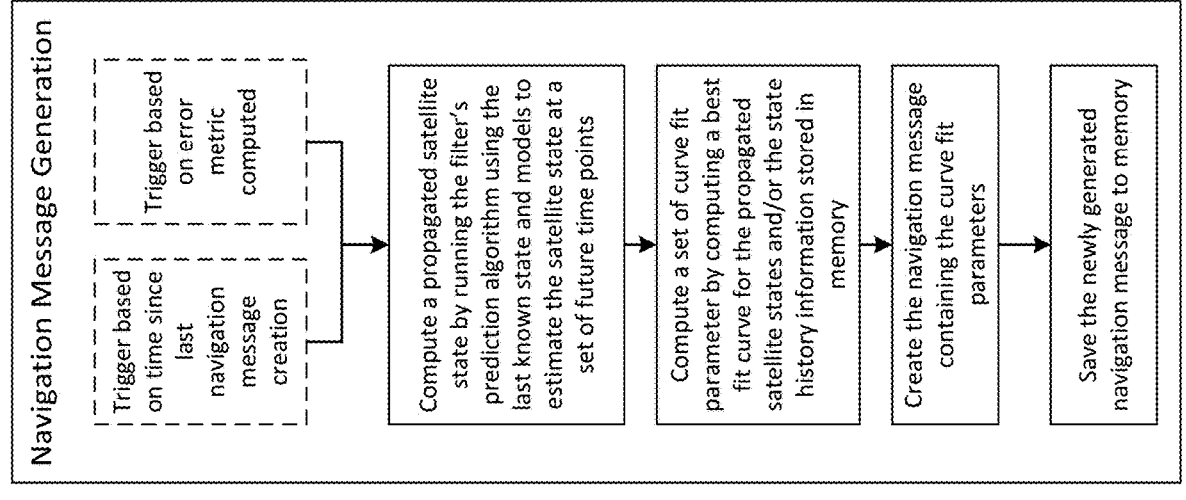

FIG. 5B

Navigation Message Generation

Trigger based on time since last navigation message creation

Trigger based on error metric computed

Compute a propagated satellite state by running the filter's prediction algorithm using the last known state and models to estimate the satellite state at a set of future time points Compute a set of curve fit parameter by computing a best fit curve for the propagated satellite states and/or the state history information stored in memory Create the navigation message containing the curve fit parameters Save the newly generated navigation message to memory Time-transfer satellite 850

110

852

120

132

240

240'

240'

240'

160

160-1

160-2

160-3

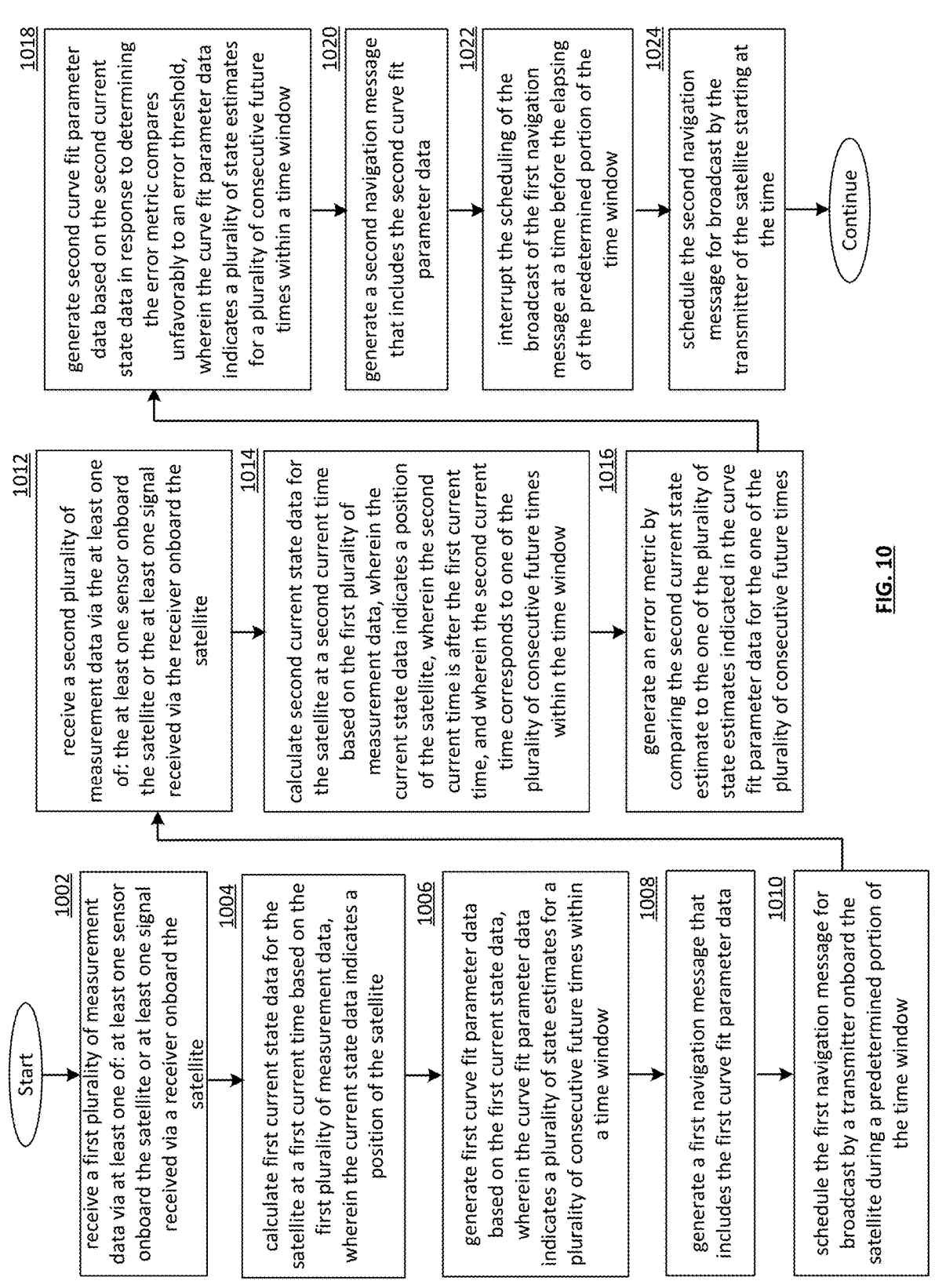

FIG. 10

1002 receive a first plurality of measurement data via at least one of: at least one sensor onboard the satellite or at least one signal received via a receiver onboard the satellite 1004 calculate first current state data for the satellite at a first current time based on the first plurality of measurement data, wherein the current state data indicates a position of the satellite 1006 generate first curve fit parameter data based on the first current state data, wherein the curve fit parameter data indicates a plurality of state estimates for a plurality of consecutive future times within a time window 1008 generate a first navigation message that includes the first curve fit parameter data 1010 schedule the first navigation message for broadcast by a transmitter onboard the satellite during a predetermined portion of the time window 1012 receive a second plurality of measurement data via the at least one of: the at least one sensor onboard the satellite or the at least one signal received via the receiver onboard the satellite 1014 calculate second current state data for the satellite at a second current time based on the first plurality of measurement data, wherein the second current state data indicates a position of the satellite, wherein the second current time is after the first current time, and wherein the second current time corresponds to one of the plurality of consecutive future times within the time window 1016 generate an error metric by comparing the second current state estimate to the one of the plurality of state estimates indicated in the curve fit parameter data for the one of the plurality of consecutive future times 1018 generate second curve fit parameter data based on the second current state data in response to determining the error metric compares unfavorably to an error threshold, wherein the curve fit parameter data indicates a plurality of state estimates for a plurality of consecutive future times within a time window 1020 generate a second navigation message that includes the second curve fit parameter data 1022 interrupt the scheduling of the broadcast of the first navigation message at a time before the elapsing of the predetermined portion of the time window 1024 schedule the second navigation message for broadcast by the transmitter of the satellite starting at the time Start Continue

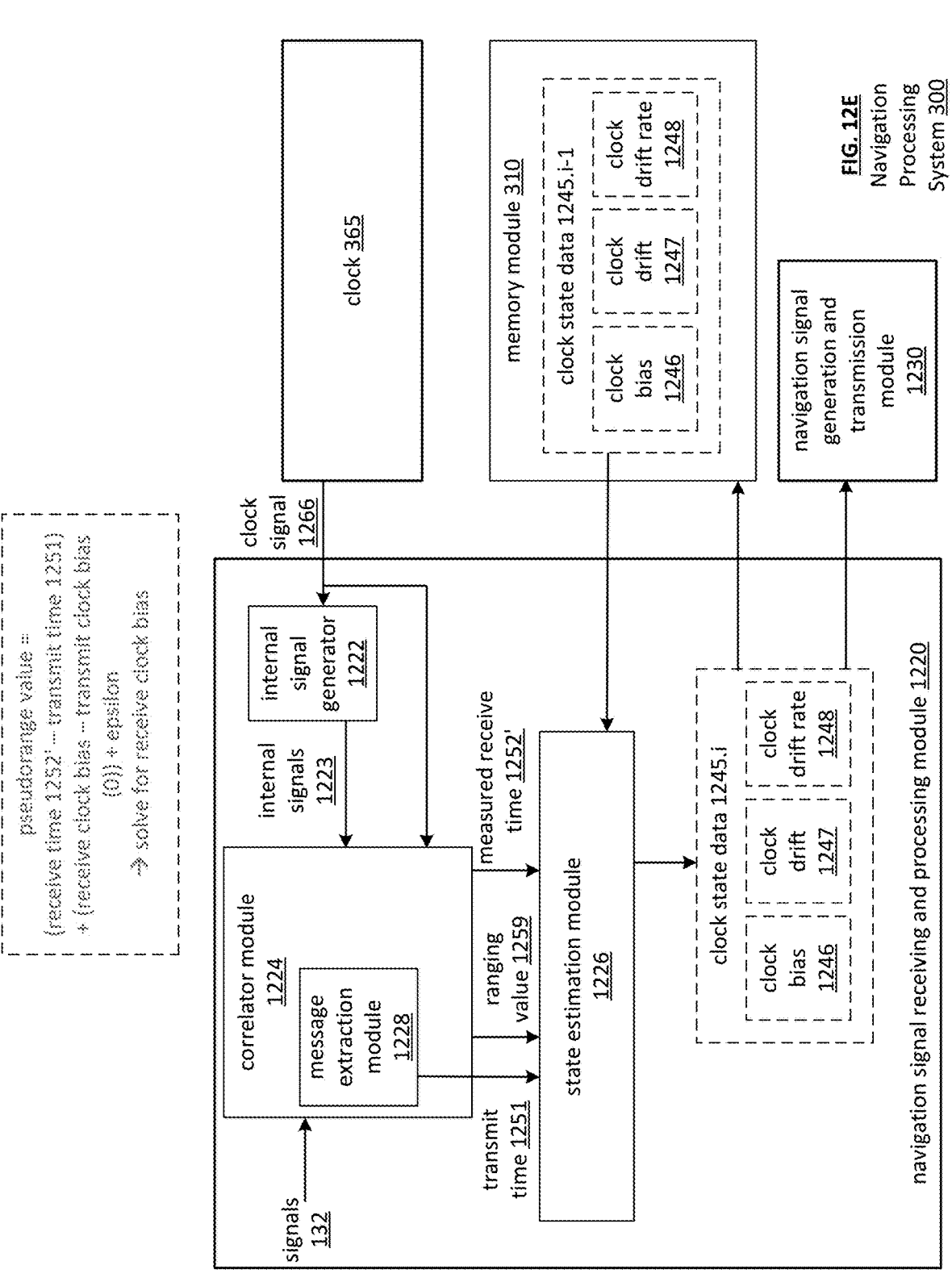

pseudorange value =
(receive time 1252' – transmit time 1251)
+ (receive clock bias – transmit clock bias
(0)) + epsilon
→ solve for receive clock bias clock 365 clock signal 1266 memory module 310 clock state data 1245.i-1 clock bias 1246 clock drift 1247 clock drift rate 1248 internal signal generator 1222 internal signals 1223 measured receive time 1252' correlator module 1224 message extraction module 1228 ranging value 1259 transmit time 1251 state estimation module 1226 clock state data 1245.i clock bias 1246 clock drift 1247 clock drift rate 1248 signals 132 navigation signal generation and transmission module 1230 navigation signal receiving and processing module 1220

FIG. 12E
Navigation Processing System 300

Client device 160 navigation processing system 300 navigation processing system 300 navigation processing system 300 navigation
processing system
300 modulation module 1238 modulation module 1238 modulation module 1238 navigation processing system 300 low band modulation module 1238.A low band modulation module 1238.A navigation signal 240.A

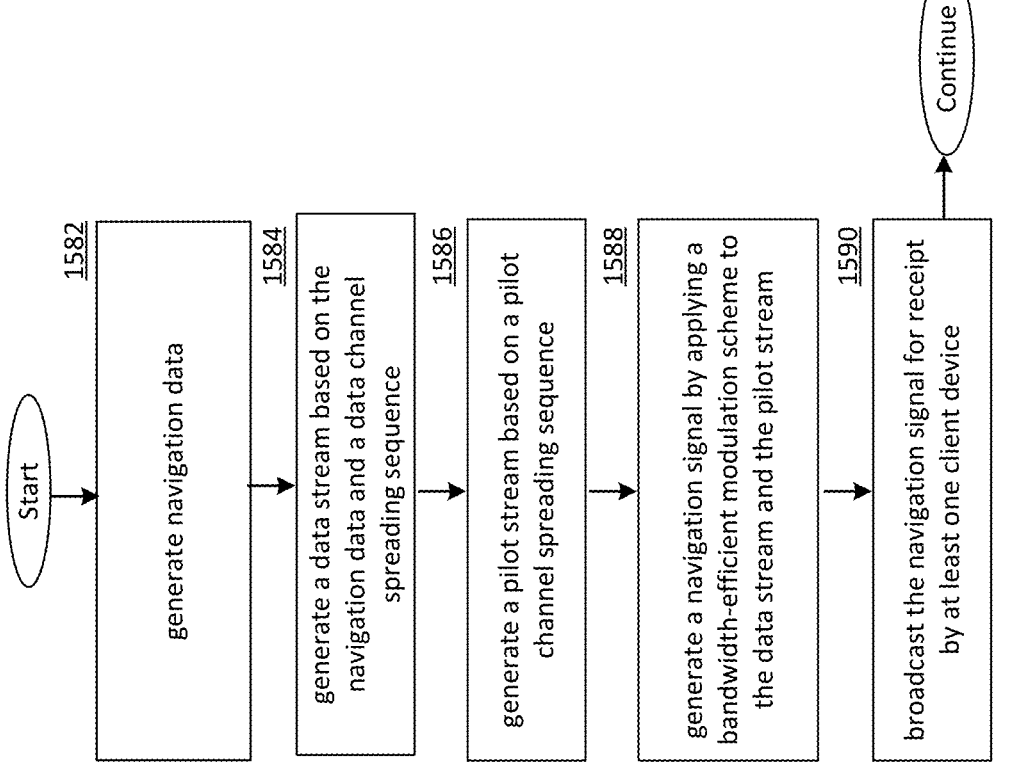

1582 generate navigation data 1584 generate a data stream based on the navigation data and a data channel spreading sequence 1586 generate a pilot stream based on a pilot channel spreading sequence 1588 generate a navigation signal by applying a bandwidth-efficient modulation scheme to the data stream and the pilot stream 1590 broadcast the navigation signal for receipt by at least one client device Continue

FIG. 15Q navigation
processing
system 300 modulation module 1238 bit group mapping 1620 modulation module 1238 modulation module 1238 modulation
module 1238 high band modulation module 1238.B high band modulation module 1238.B processing system 1920 processing system 1920 navigation processing system 300 navigation processing system 300 spreading code encryption module 1704 spreading code encryption module 1704 navigation message encryption module
1706 navigation message initialization vector generator module 1739 plaintext spreading code 1737 navigation message counter 1734 counter-based initialization vector 1712.1: F(plaintext spreading code 1737, counter 1734.j)

counter-based initialization vector 1712.V: F(plaintext spreading code 1737, counter 1734.j+V)

navigation message encryption module 1706 processing system 1920 processing system 1920 navigation message decryption module 1756

Navigation Processing System
300

Antennas 1802 & 1804 low band antenna array 1820 low band antenna array 1820 exterior bounding polygon 1818 slot 1825 interior bounding polygon 1819 segment 1824.2 segment 1824.1 segment 1824.20 vertex 1826.1.a (1826.20.b)

vertex 1826.20.a vertex 1826.2.b vertex 1826.1.b (1826.2.a)

low band antenna element 1822 length
dimension
1827 slot 1825 width
dimension
1828 thickness
dimension
1829 low band antenna element 1822 low band antenna element 1822 low band antenna element 1822

Low band antenna array 1820 high band antenna array 1840 high band antenna array 1840 low band antenna array 1820 high band antenna array 1840

Antennas 1802 & 1804 slot <u>1845</u> high band antenna element <u>1842</u> high band antenna element 1842 high band antenna element 1842 high band antenna element 1842 high band antenna array 1840 navigation
processing
system 300

1860

1846
1844 navigation processing system 300

1822

1842 satellite 110

TRANSMITTING SECURE NAVIGATION SIGNALS VIA APPLYING ENCRYPTION

CROSS REFERENCE TO RELATED APPLICATIONS

The present U.S. Utility Patent Application claims priority pursuant to 35 U.S.C. § 120 as a continuation of U.S. Utility application Ser. No. 17/364,060, entitled "GENERATION AND TRANSMISSION OF NAVIGATION SIGNALS", filed Jun. 30, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This disclosure relates generally to satellite systems and more particularly to global navigation satellite systems and radio occultation.

BRIEF DESCRIPTION OF THE SEVERAL VIEWS OF THE DRAWING(S)

FIG. 5A is a flowchart diagram illustrating an example of a state estimator flow performed by a navigation processing system in accordance with various embodiments;

FIG. 5B is a flowchart diagram illustrating an example of a navigation message generation flow performed by a navigation processing system in accordance with various embodiments;

FIG. 5C is a flowchart diagram illustrating an example of a broadcast flow performed by a navigation processing system in accordance with various embodiments;

FIG. 10 is a logic diagram of an example of a method of performing self-monitoring in accordance with various embodiments;

FIGS. 12B-12F are schematic block diagrams of a navigation processing system in accordance with various embodiments;

FIG. 15O illustrates example embodiments time domain plots of in-phase and quadrature components of a navigation signal in accordance with various embodiments;

FIG. 15Q is a logic diagram of an example of a method of generating a navigation signal in accordance with various embodiments;

FIGS. 17I-17J are schematic block diagrams of a processing system of a client device in accordance with various embodiments;

DETAILED DESCRIPTION OF THE INVENTION

Figure 1:
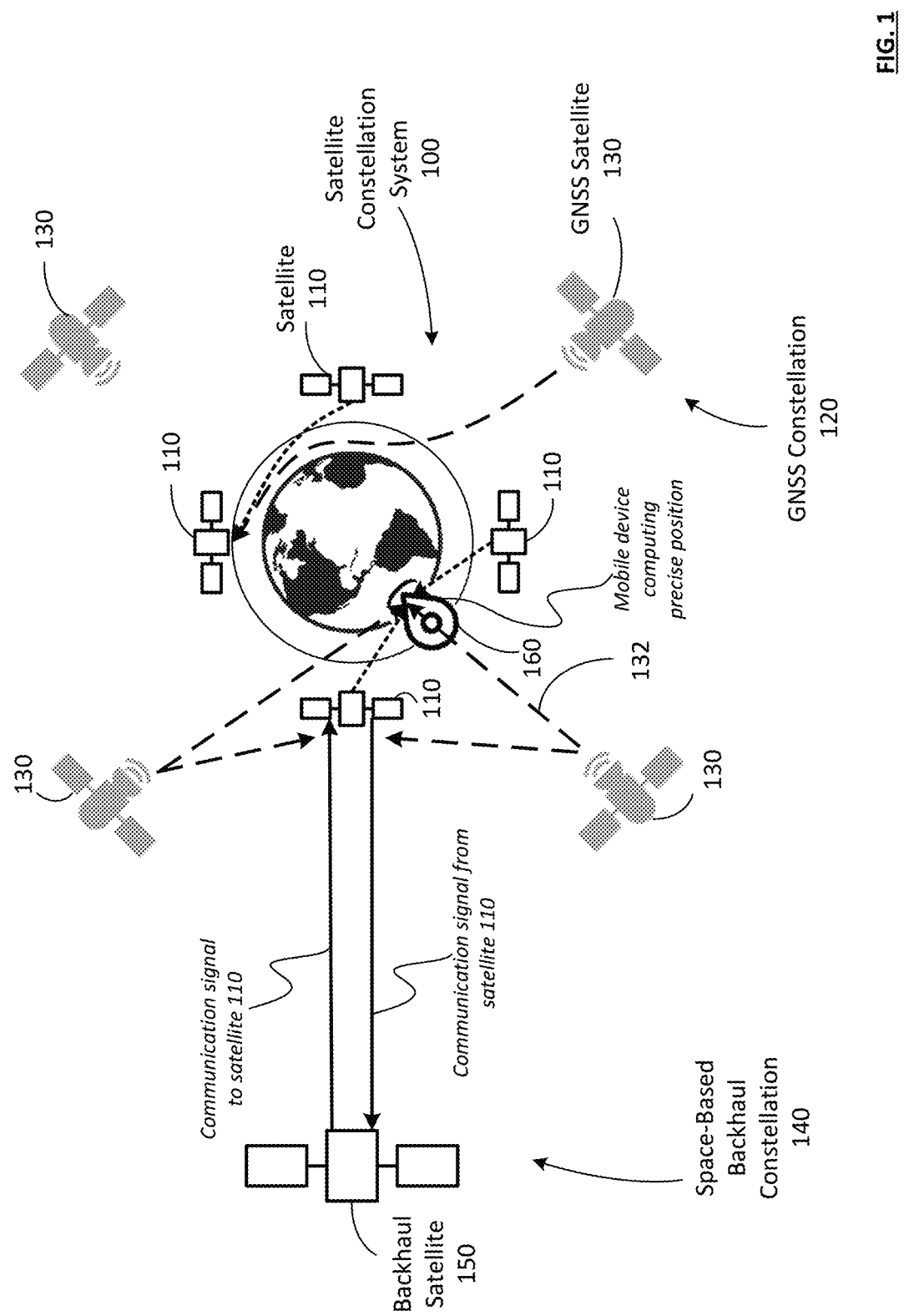
FIG. 1 is a schematic block diagram of an embodiment of a satellite constellation system in accordance with various embodiments.

FIG. 1 illustrates an embodiment of a satellite constellation system 100. Satellite constellation system 100 can include a plurality of satellites 110, which can be implemented via combination of devoted purpose-built satellites, purpose built payloads on a standard satellite bus, and/or hosted payloads or services part of another satellite network. These satellite bus and navigation components can make use of commercial-of-the-shelf (COTS) components and be compatible with CubeSat and other standard bus architectures. In some embodiments, some or all of the plurality of satellites 110 of satellite constellation system 100 orbit in accordance with low earth orbit (LEO), and can be referred to as "LEO satellites". Alternatively, some or all satellites of the first satellite constellation can orbit in accordance with medium earth orbit (MEO), and/or geostationary orbit (GEO). Satellite constellation system 100 is operable to provide secure precision location and time transfer services and/or monitoring atmospheric and environmental conditions.

Some or all of the satellites 110 can receive signals 132 from Global Navigation Satellite System (GNSS) satellites 130 of a GNSS constellation 120. The signals 132 include for example, a ranging signal containing clock information and almanac and ephemeris information that can be used for precision positioning, navigation and timing. The GNSS constellation 120 can be implemented by utilizing one or more of the Global Positioning System (GPS) satellite constellation, the Quasi-Zenith Satellite System, the BeiDou Navigation Satellite System, the Galileo positioning system, the Russian Global Navigation Satellite System (GLO-NASS) the Indian Regional Navigation Satellite System, any Radio Navigation Satellite Service (RNSS) system, and/or any other satellite constellation utilized for navigation services. In some embodiments, some or all of the plurality of GNSS satellites 130 of the GNSS constellation 120 can orbit in accordance with MEO, and/or some or all of the plurality of GNSS satellites 130 or otherwise can orbit in another outer orbit from the satellites 110 of the satellite constellation system 100. In either case, when the satellites 110 are LEO satellites, the GNSS satellites can be referred to as "non-LEO satellites".

Some or all of the satellites 110 can send signals to and/or receive signals from one or more backhaul satellites 150. Backhaul satellite 150 can be implemented by utilizing a satellite in any orbit, such as (LEO), (MEO), and/or (GEO), provided satellite 150 is capable of transmitting and/or receiving data from satellite 110. In some embodiments, a backhaul satellite constellation 140 can include a plurality of backhaul satellites 150 operable to bidirectionally communicate with satellites 110. In various embodiments, one or more backhaul satellites include an atomic clock for transmitting a timing reference in communications to the satellites 110.

In various embodiments, the one or more backhaul satellites 150 can be selectively implemented via one or more of the satellites 110 that have been assigned this functionality, on a dedicated basis, when for example, the navigation functionality of a satellite 110 has degraded to the point where it is no longer useful to provide secure precision location and time transfer services and/or monitoring atmospheric and environmental conditions. Furthermore, one or more satellites 110 can be assigned the role of backhaul satellite based on its status such as its position in orbit, current utilization, battery capacity and/or other state or condition of the satellite 110 or otherwise, as will be discussed later, for example, in conjunction with the resource allocation of FIG. 3B.

The satellite constellation system 100 can be operable to provide navigation services through a space-based broadcast of encrypted and/or unencrypted navigation messages, atmospheric and/or other signal(s) which can include timing data and overlaid data for satellite identification and precision positioning and navigation. This data can include, but is not limited to, (i) precision orbit and clock data of both the precision satellite system and of the GNSS constellation; (ii) atmospheric data, models and/or other atmospheric monitoring data used for determining a current weather state, for weather prediction, for control of the satellites 110 and/or for further orbit or clock data correction; (iii) cryptographic parameters including encryption key management; (iv) integrity information concerning the backhaul satellites 150, satellite constellation system 100, the GNSS satellites 130 and/or their constellations; and (v) general messages to pass information (such as state, conditions, health, and other command and control information) between satellites 110 and the ground and/or other types of data discussed herein. This data can be derived based on some combination of measurements from (i) terrestrial monitoring stations; and (ii) GNSS measurements taken by the satellite constellation system 100 in-situ. In case (ii), precision orbit data of the GNSS satellites can be uploaded to the satellite constellation system 100 via space-based backhaul communications, reducing the need for ground links, though ground links and intersatellite links can also be used. This enables autonomous orbital position and clock determination in orbit.

Alternatively or in addition, the satellite constellation system 100 can be operable to collect atmospheric data by means of radio occultation (RO) through some combination of GNSS and other signals of opportunity including some broadcast by satellites 110 of the satellite constellation system 100 themselves. Higher broadcast power than GNSS utilized by the satellite constellation system 100 allows for deeper penetration into the atmosphere that enable processing to yield higher fidelity ionospheric and tropospheric models both in terms of spatial and temporal updates. These high density models can serve multiple purposes such as (i) data for weather prediction models on the ground or in situ in the satellite 110; and (ii) the construction of local, regional and/or global ionospheric and tropospheric corrections for use in precision navigation both by the satellite constellation system 100 and by standard GNSS. The raw or processed data can be transmitted back from the ground to the satellite constellation system 100 by some combination of ground stations or space-based backhaul communications.

The GNSS satellites 130 can provide signals to satellites 110 for GNSS Radio Occultation for use in atmospheric monitoring, mapping and other atmospheric data generation. These measurements can, in turn, be sent to the ground through a combination of communication links, as discussed in further detail in conjunction with FIG. 2. Through this connection with the ground, precise orbits and clocks of the GNSS satellites 130 can be uploaded to the satellite constellation system 100. This orbit and clock data can be used along with measurements from GNSS, other correction data, sensors onboard, and/or other information to autonomously perform orbit and clock determination onboard satellite 110. Atmospheric models can be generated indicating signal delays in the ionosphere and troposphere and/or indicating weather data including a current weather state, a predictive weather model or other atmospheric data, can be broadcast along with precision orbit and clock data for use in precision navigation on Earth, included in backhaul and/or intersatellite communication and used by the satellites 110 to further enhance the determination of their orbital position. The atmospheric data can include corrections created on the ground as part of the data products produced as part of atmospheric monitoring. Alternatively or in addition, these atmospheric data and corrections can be created autonomously by one or more satellites in situ, where data is shared between satellites in the satellite constellation system 100, and where, for example, edge computing on board one or more satellites 110 is used to create local, regional or global atmospheric and/or weather models.

At least one client device 160 can include a receiver configured to receive the signals transmitted by at least one satellite 110. The receiver can be configured to receive the signals directly from the satellites 110, and/or can be configured to receive this information from ground stations, server systems, and/or via a wired and/or wireless network. The client device 160 can include at least one memory that stores operational instructions for execution by at least one processor of the client device 160, enabling the client device 160 to process signals transmitted by the satellites 110 to extract the atmospheric models, precision orbit data, clock data, and/or other data from the signals. The client device 160 can be operable to process the signals and/or this data to compute its precise position (i.e. an "enhanced position" with greater accurate when compared with ordinary positioning provided by the GNSS system) and/or a precise time. This precise position and/or precise time can be further processed by client device 160 and/or can be otherwise utilized by the client device 160 for positioning, navigation and/or timing and/or otherwise to perform its functionality in conjunction with one or more of a range of applications discussed herein. A client device 160 can be operable to display, via a display device of the client device some or all of the atmospheric models, precision orbit data, and/or clock data received from the least one satellite 110 for review by a user of the client device 160.

Alternatively or in addition, this precise position and/or other data generated utilizing the signals received from satellites 110 can be transmitted, via a transmitter of the client device 160, to a server system or other computing device, for example via network 250. For example, this server system and/or other computing device can be associated with an entity responsible for tracking of client device 160 and/or responsible for monitoring secure performance of client device 160. Thus, storing, processing, and/or display of this information received from one or multiple client devices 160 can be facilitated by the server system and/or another computing device, for example, via its own at least one processor and/or at least one memory.

Client devices 160 can include, can be implemented within, and/or can be otherwise utilized by devices on the ground, devices near the earth's surface, devices within the atmosphere, and/or other space-based systems. Client devices 160 can include, can be implemented within, and/or can be otherwise utilized by mobile devices, cellular devices, wearable devices, autonomous or highly automated vehicles or other vehicles such as cars, planes, helicopters, boats, unmanned aerial vehicles (UAVs), fixed devices installed upon or within infrastructure, and/or other computing devices operable to receive and/or utilize the atmospheric models, precision orbit data, and/or clock data.

The LEO satellite 110 provides a reduced distance to earth, which, combined with the greater signal power compared with GNSS, provides client devices 160 with much stronger signals. The reduced orbital period of the LEO further provides faster signal convergence. The LEO satellite 110 includes many additional technological improvements and advantages including many functions, features and combinations thereof as described further herein.

Figure 2:
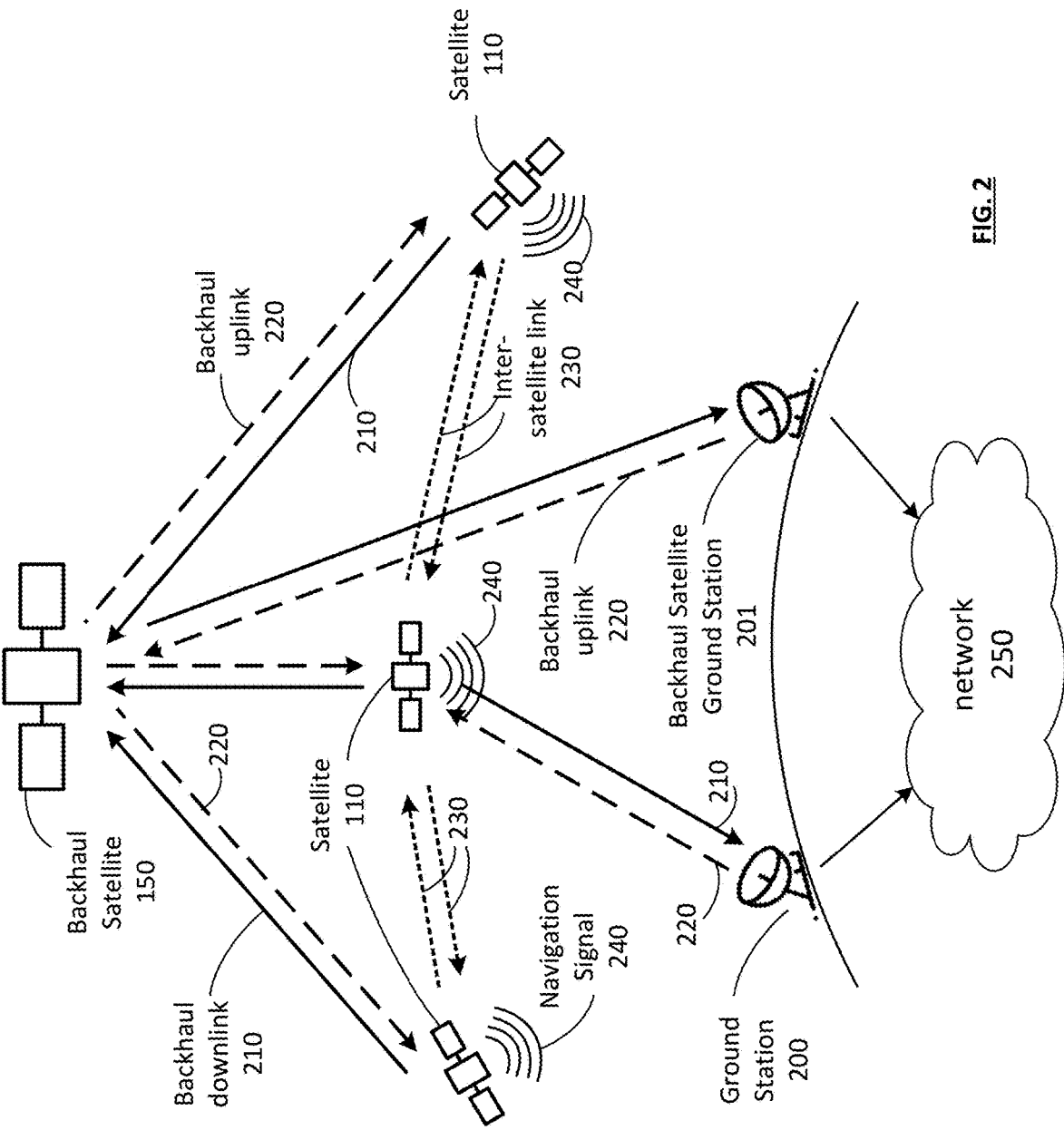
FIG. 2 is a schematic block diagram illustrating various communication links utilized by a satellite constellation system in accordance with various embodiments.

FIG. 2 illustrates embodiments of the communication of various data via satellite constellation system 100. As part of satellite constellation system 100's task of generating a precision navigation signal and/or environmental monitoring, data can be transferred between the ground stations 200 and/or 201 and the satellites 110, between satellites 110 in satellite constellation system 100 and other satellites in space, and/or between any combination of entities capable of receiving or transmitting data of interest to satellite 110 as part of satellite constellation system 100.

This transfer can be facilitated via a plurality of nodes of the satellite constellation system 100. As used herein, nodes of the satellite constellation system 100 can correspond to any devices that generates, receives, transmits, modifies, stores, and/or relays messages or other data communicated by satellite constellation system 100 as discussed herein. Nodes of satellite constellation system 100 can include one or more satellites 110; one or more ground stations 200 and/or 201; one or more backhaul satellites 150; and/or one or more client devices operable to utilize information included in messages in its operation and/or operable to display information included in messages to a user.

The data communicated between nodes of the satellite constellation system 100 can be comprised of many different message types, including, but not limited to: navigation messages containing data to enable the determination of a precise position by an end user device or end user system; precise point positioning (PPP) correction messages containing precise orbit and clock data of GNSS satellites and/or other satellites in satellite constellation system 100; atmospheric correction messages containing temperature, humidity, and/or other atmospheric parameters that affect the precision of the navigation signal that can be corrected for; command and control messages containing command and control information for the physical direction and/or attitude of the satellite, satellite state management, and/or enabling and/or disabling different transmissions of satellite 110; measurement messages containing ground based and/or external space-based measurements that can augment the navigation filter (as part of the orbit determination module); status messages containing information about satellite 110's signal health, battery usage, power generation, memory usage and/or other information providing status information; cryptographic messages containing information providing encryption key updates along with any general encryption scheme updates; constellation monitoring messages contain GNSS satellite and/or constellation health information, estimated performance of each satellite and/or each constellation, and/or other information related to other GNSS satellites and/or constellations; and/or other messages containing information that can be transmitted to and/or from satellite 110 intended for users, ground segment, other satellites in the constellation, or any other desired start and/or end point for the communication.

Some or all of these message types can be included in the data transmitted as illustrated in FIG. 2. Some or all of these message types can be transmitted by satellite 110 and/or received by satellite 110, and/or can be generated onboard satellite 110 and/or can be generated by another entity, for example on the ground and/or received by a ground station 200 and/or 201, for example, via network 250.

The data can be transmitted and/or received over any one of these links, or any combination of these links, in an encrypted and/or unencrypted manner, and/or in any combination of encrypted and/or unencrypted manner. The encryption can be performed at the message level, where one or more individual messages are encrypted, for example, separately. Alternatively or in addition, the encryption can be performed at the data stream level, where the data stream that includes one or more messages of the same or different type is encrypted. In some embodiments, all of the messages can be encrypted. Alternatively, some or all of the messages are not encrypted. A message can be transmitted and/or received over a combination of links (e.g. from an inter-satellite link to the backhaul) and can change encryption state as it goes from one node in the communication chain to another. Encrypting the data transmitted by the satellite constellation system 100 allows more control over who can receive the necessary data for making radio occultation (RO) measurements and precision navigation, enabling the licensing of the usage of the data. In addition to encrypting the data itself, the spreading code of the navigation signal that is used for ranging can also be encrypted. This further allows controlling access to the information transmitted by satellite constellation system 100.

The data, which can comprise of any combination of the various messages, can be transmitted along any combination of links, for example, as illustrated in FIG. 2, between any combination of nodes of the satellite constellation system 100. These links can include different types of links, such as backhauls, inter-satellite links 230, and/or navigation signals 240.

As used herein, backhaul communications correspond to a link between satellite 110 and backhaul satellite 150, and/or a link between satellite 110 and ground station 200. The backhaul communications can be comprised of a transmit and/or receive component on each of the nodes. Communication from satellite 110 intended to be received to satellite 150, to ground station 200, and/or to ground station 201 through satellite 150, shown through backhaul downlink 210, is termed the downlink portion of the backhaul. The uplink portion, depicted as backhaul uplink 220 in FIG. 2, is the communication originating from ground station 200, and/or from ground station 201 through satellite 150 intended to be received by at least one of satellite 110 within satellite constellation system 100.

Backhaul downlink 210 can be designated to communicate one or more particular types of messages. Backhaul downlink 210 can communicate information such as RO measurement data, navigation message information, status information about each of the satellites, requested command and control of other satellites in satellite constellation system 100, and/or other information to be sent from the satellite in satellite constellation system 100 to another satellite or to the ground.

Backhaul uplink 220 can be designated to communicate one or more particular types of messages. Backhaul uplink 220 can communicate information such as PPP correction data, atmospheric map data, ground base measurements for the on-board filtering, command and control data, navigation message data of other satellites in satellite constellation system 100, and/or other information to be sent to the satellites in satellite constellation system 100 either from the ground or from another satellite.

Inter-satellite link 230 corresponds to a link between two or more satellites 110 within satellite constellation system 100. These inter-satellite links can be omni-directional links such that the transmission is one-to-many, dedicated links between satellite pairs in different orbital planes, and/or dedicated links between satellites pairs within the same orbital plane. A single satellite 110 can be capable of transmitting and/or receiving from any combination of these types of inter-satellite links. These inter-satellite links can either be dedicated data links or can be the data that is modulated onto the ranging signal if the ranging signal is being broadcast by the satellite at the full 180+ degree beamwidth of the satellite 110.

The inter-satellite links can contain any information to be sent between satellites or from one satellite with a backhaul connection to another satellite without a backhaul connection or from one satellite without a backhaul connection to another satellite with a backhaul, or the same process through multiple satellites. This can either be on top of and/or combined with the ranging signal, or can be a dedicated signal sent, for example by dedicated transceivers operating at differing frequencies.

Navigation signal 240 is the signal transmitted from satellite 110 containing at least a ranging signal, but can also contain other data corresponding to one or more of the various types of messages or other data discussed herein. Navigation signal 240 can be a one-to-many broadcast transmission, and any satellite 110, ground station 200, ground station 201, and/or satellite 150 can be equipped to receive the navigation signal.

Any data transmitted and/or received by satellite 110 can travel through any single set of links (e.g. backhaul only)

and/or through any combination of links (e.g. backhaul to inter-satellite link). Any data can also be transmitted through any number of the nodes (station or satellite) in the communication chain for the purpose of being received by a specific node in the communication chain. In some embodiments, data such as correction messages can be sent from the ground to one or more satellite 110 via one or more of the following means:

Data can be transmitted from at least one ground station 200 directly to every satellite 110 on orbit.

Data can be transmitted from at least one ground station 200 to a subset of satellites (e.g. one in each orbital plane) and then across "along-links" through inter-satellite communication in the orbital plane with relatively low latency and without any stringent pointing requirements. "Along-links" inter-satellite links (either radio or optical) between a satellite and the satellite ahead and/or behind it in the orbital plane (an orientation where the angle between those satellites should remain fairly static). These "along-links" in orbit can be maintained through different flight procedures such as changes in the yaw angles needed in order to maintain solar panel orientation with respect to the sun by using omni-directional transceivers of the "along-link" data or steerable transceivers. In an example configuration where the orbital planes are polar orbits, the number of ground stations needed can be minimized by placing the ground stations at high latitudes, where it can "see" satellites from multiple planes simultaneously. Additionally, for this example configuration, the sequence of placing satellites in the orbital planes as satellite constellation system 100 is grown can be optimized to ensure that these "along-links" are used optimally.

Data can be transmitted from at least one ground station 200 and/or ground station 201 to at least one relay satellite 150 in orbits. These relay satellites 150 include communication satellites in GEO, in MEO, and/or in LEO. Satellites 110 can then receive the data from at least one satellite 150 that retransmits the data received from ground station 200 and/or ground station 201 to satellite 110.

For communication between satellites 110 in satellite constellation system 100, a dedicated inter-satellite link can be used with dedicated transceivers.

For communication between satellites 110, satellites 110 can add data messages to the data stream being modulated on the navigation signal in cases where satellite 110 are capable of receiving the navigation signal from another satellite 110 within satellite constellation system 100. A satellite can be in view if it is at a lower altitude than the broadcasting satellite or if it has line of sight to the satellite's transmission due to its orbital placement or if the broadcasting satellite beamwidth is large enough to reach the target satellite (e.g. 180+ degree beamwidth for neighboring satellites)

The ground stations 200 and/or 201 can be configured to communicate via a network 250, via at least one communication interface of the ground stations 200 and/or 201. The network 250 can be implemented by utilizing wired and/or wireless communication network and can include a cellular network, the Internet, and/or one or more local area networks (LAN) and/or wide area networks (WAN). Ground stations 200 and/or 201 can be operable to transmit and/or receive data from at least one server system. The at least one server system can include at least one processor and/or memory and can be operable to generate and/or store some or all of the data transmitted and/or received by ground stations 200 and/or 201. The at least one server system can be affiliated with an entity responsible for the satellite constellation system 100 and/or can be affiliated with a different entity, such as a weather service entity and/or navigation entity that generates and/or stores data transmitted and/or received by ground stations 200 and/or 201. Alternatively or in addition, client devices 160 can be operable to receive data via network 250.

Figures 3A, 3C, 3D:
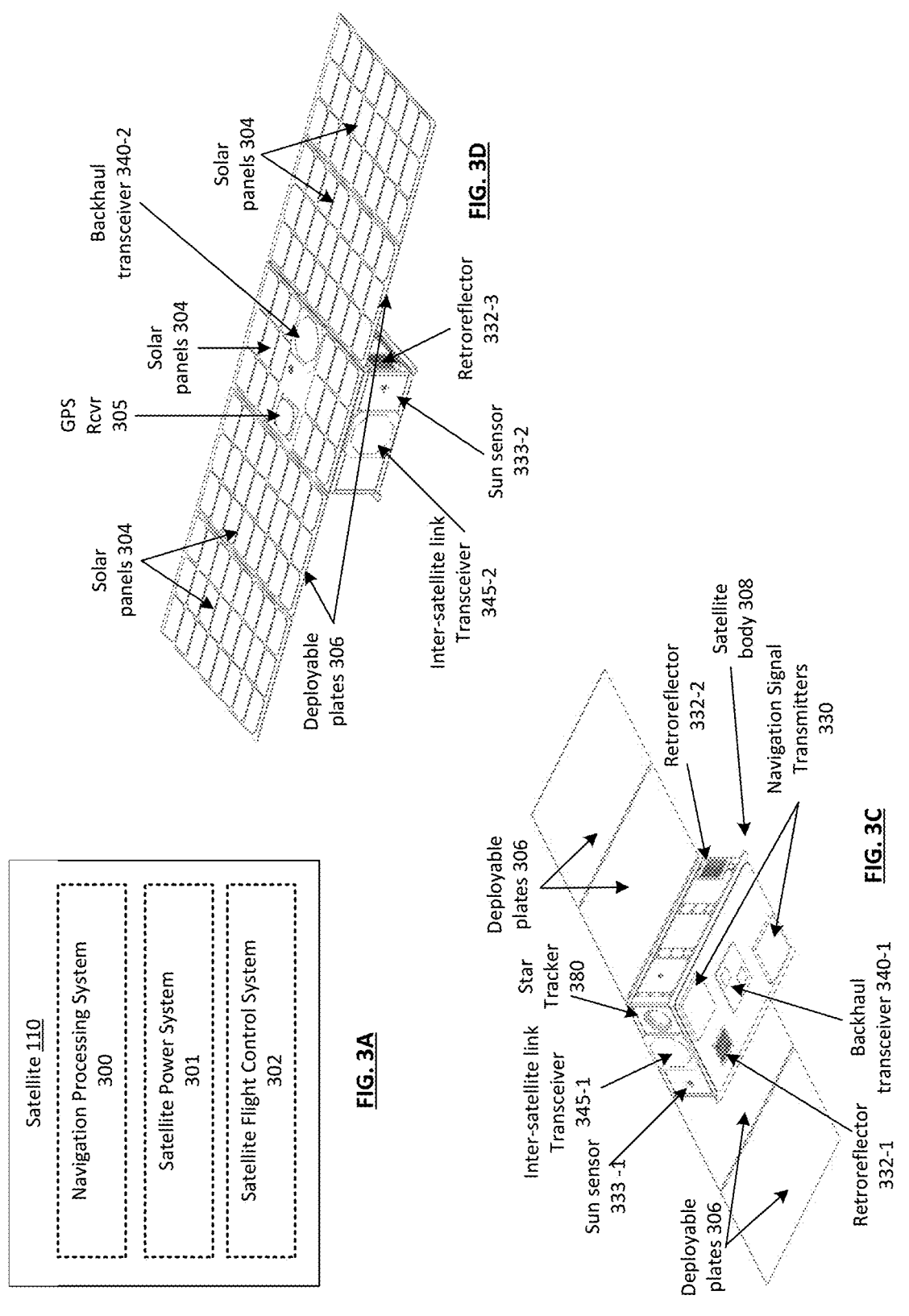
FIG. 3A is a schematic block diagram of a satellite in accordance with various embodiments.
FIG. 3C is a pictorial diagram of a satellite in accordance with various embodiments.
FIG. 3D is a pictorial diagram of a satellite in accordance with various embodiments.

FIG. 3A is a schematic block diagram of a satellite in accordance with various embodiments. In particular, an example of a satellite 110 is presented that includes a navigation processing system 300, a satellite power system 301 and a satellite flight control system 302.

In various embodiments, the satellite power system 301 includes an array of solar cells, a battery, a fuel cell or other chemical power generation system and/or a power management system that operates, for example, under control of the navigation processing system 300 to manage the production, storage and use of electrical power in conjunction with the operation of satellite 110. The satellite flight control system 302 includes one or more propulsion systems, an attitude controller, an inertial stabilizer and/or one or more other devices that operate under of the navigation processing system 300 to maintain, manage and otherwise adjust the orbital position and/or orientation of the satellite 110.

In various embodiments, the navigation processing system 300 includes memory that stores data, an operating system including several system utilities, and applications and/or other routines that include operational instructions. The navigation processing system 300 further includes one or more processors that are configured to execute the operational instructions to perform various the functions, features and other operations of the satellite 110 in conjunction with the satellite power system 301, the satellite flight control system 302, an on-board clock, one or more sensors, one or more transmitters, receivers and/or transceivers and one or more other devices.

Figure 3B:
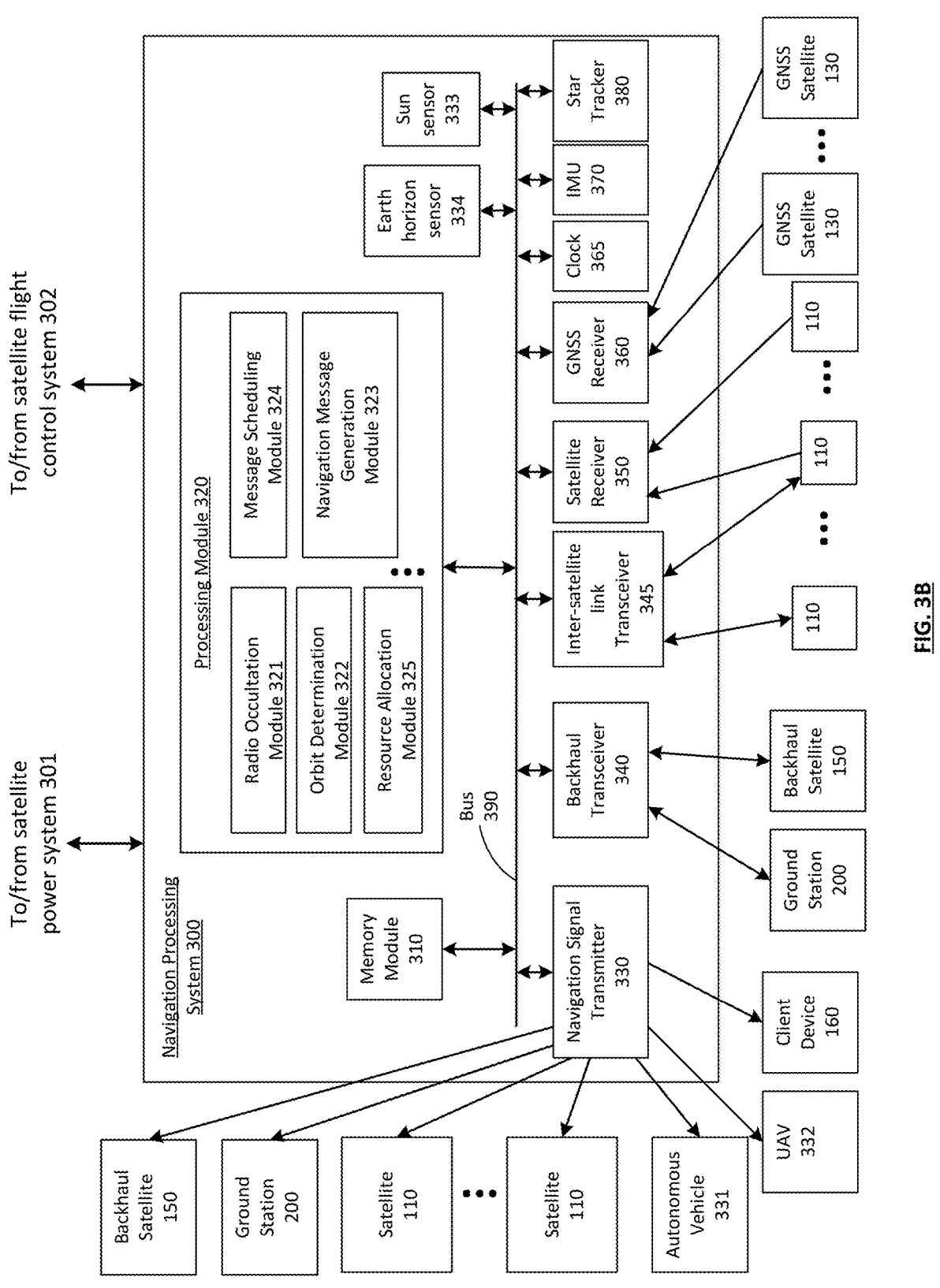
FIG. 3B is a schematic block diagram of a navigation processing system in accordance with various embodiments.

FIG. 3B presents an embodiment of a navigation processing system 300. The same or different navigation processing systems 300 can be onboard some or all of the satellites 110, and the functionality of some or all of the satellites 110 discussed herein can be enabled via navigation processing system 300. For example, the navigation processing system 300 operates as a satellite processing system onboard a satellite 110 to implement some or all functionality of satellite 110. A bus 390 can operably couple and/or facilitate communication between the various components of the navigation processing system 300. While a particular bus configuration is shown, other bus configurations can likewise be employed.

Navigation processing system 300 can include at least one memory module 310 which can be implemented by utilizing at least one memory. Navigation processing system 300 can include at least one processing module 320 which can be implemented utilizing one or more processors. The memory module 310 can store operational instructions that, when executed by the processing module 320, configure the navigation processing system 300 to execute some or all of the functionality of satellites 110 discussed herein.

In some embodiments, the processing module 320 is utilized to implement a radio occultation module 321 operable to perform some or all of the radio occultation functionality of satellite 110 discussed herein. Alternatively or in addition, the processing module 320 is utilized to implement an orbit determination module 322 operable to perform some or all of the radio occultation functionality of a satellite 110 as discussed herein. Alternatively or in addition, the processing module 320 is utilized to implement an orbit determination module 322 operable to perform some or all of the orbit determination functionality of a satellite 110 as discussed herein. Alternatively or in addition, the processing module 320 is utilized to implement a navigation message generation module 323 operable to perform some or all of the navigation message generating functionality of a satellite 110 as discussed herein. Alternatively or in addition, the processing module 320 is utilized to implement a message scheduling module 324 operable to perform some or all of the message scheduling functionality of a satellite 110 as discussed herein. Alternatively or in addition, the processing module 320 is utilized to implement a resource allocation module 325 operable to perform some or all of the resource allocation functionality of a satellite 110 as discussed herein. The memory can store operational instructions corresponding to the radio occultation module 321, the orbit determination module 322, the navigation message generation module 323, and/or the message scheduling module 324, and when these operational instructions are executed by the processing module 320, the navigation processing system 300 can perform the functionality of the radio occultation module 321, the orbit determination module 322, the navigation message generation module 323 the message scheduling module 324 and/or the resource allocation module 325 respectively.

Navigation processing system 300 can include one or more of sensors, which can include, but are not limited to: at least one star tracker 380; at least one inertial measurement unit (IMU) 370; at least one sun sensor 333; at least one earth horizon sensor 334, at least one GNSS receiver 360 operable to receive navigation signals transmitted by GNSS satellites 130; at least one clock 365, and/or at least one satellite receiver 350 operable to receive the navigation signal 240 transmitted by other navigation processing systems 300; and/or any other sensors operable to collect other types of measurement data and/or to receive signals transmitted by other entities. The measurements and/or signals collected by these sensors can be processed via processing module 320 and/or can be stored via memory module 310, for example, in a temporary cache.

In various embodiments, the clock 365 is implemented via a temperature compensated crystal oscillator (TCXO), oven-controlled crystal oscillator (OCXO) or other non-atomic clock that, for example, as adjusted and/or stabilized based on a timing signal from an atomic clock contained in the communications from a backhaul satellite, ground link or one or more of the GNSS satellites 130. In some embodiments, the same clock 365 is utilized by both GNSS receiver and the navigation signal transmitter. This allows the clock portion of the estimated state of the satellite using GNSS measurements to reflect the clock used to generate the navigation signal. Alternatively, one or more satellites 110 can implement the clock 365 via a stable atomic clock. In such a scenario, the non-atomic clock in other satellites 110 can be adjusted and/or stabilized based on a timing signal contained in inter-satellite communication from the satellite(s) 110 that contains the atomic clock.

Navigation processing system 300 can include at least one inter-satellite link transceiver 345 operable to transmit data to and/or receive data from one or more other navigation processing systems 300; a backhaul transceiver 340 operable to transmit data to and/or receive data from the backhaul satellites 150 and/or ground stations 200 and/or 201; and/or a navigation signal transmitter 330 operable to broadcast and/or otherwise transmit signals 240 including, for example, navigational signals including, a ranging signal, GNSS correction data, a navigation message and/or other navigational signal, radio occultation data, command and control data and/or data. Data transmitted by the navigation signal transmitter 330 can be received by one or more backhaul satellites 150, one or more ground stations 200 and/or 201, one or more navigation processing systems 300 onboard other satellites 110, and/or one or more client devices 160 which can include, for example, one or more automobiles, tablets, smartphones, smartwatches, laptop computers, desktop computers, other computers and computer systems, navigation devices, device location systems, weather systems, marine navigation systems, rail navigation systems, aircraft, agricultural vehicles, surveying systems, autonomous or highly automated vehicles 331, UAVs 332, and/or other client devices 160 as discussed herein.

While a configuration is shown having at least one inter-satellite link transceiver 345, in the alternative, the navigation signal transmitter 330 can be implemented via a transceiver having a fixed antenna beam pattern or an antenna beam pattern that can be dynamically adjusted to include both a main lobe that is directed toward the earth for the transmission of navigation signals 240 and one or more sidelobes in the direction of one or more other satellites. Such a configuration enables the inter-satellite communications to be integrated with or otherwise transmitted and received contemporaneously with the navigation signals 240.

In some embodiments, some or all ground stations 200 and/or 201 can include some or all of the components of navigation processing system 300, and/or can otherwise perform some or all of the functionality of the navigation processing system 300 as discussed herein. In such embodiments, the satellite constellation system 100 can include one or more ground stations 200 and/or 201 in addition to the plurality of satellites 110, where the ground stations 200 and/or 201 serve as additional nodes communicating in the satellite constellation system 100 in the same and/or similar fashion as the plurality of satellites 110 by generating, transmitting, receiving, and/or relaying some or all of the signals and/or data as discussed herein with regards to the satellites 110. In this fashion, some or all of ground stations 200 and/or 201 can effectively serve as a subset of the plurality of satellites 110, the only distinction being that these ground stations 200 and/or 201 that make up this subset of the plurality of satellites 110 are located on the ground and/or are located at a facility on the surface of the earth at a fixed position, while some or all of the remaining ones of the plurality of satellites 110 are orbiting in LEO.

Alternatively or in addition, at least one backhaul satellite 150 can similarly include some or all of the components of navigation processing system 300, and/or can otherwise perform some or all of the functionality of a navigation processing system 300 as discussed herein. In such embodiments, the satellite constellation system 100 can include one or more backhaul satellites 150 in addition to the plurality of satellites 110, where the backhaul satellites 150 serve as additional nodes communicating in the satellite constellation system 100 in the same and/or similar fashion as the plurality of satellites 110 by generating, transmitting, receiving, and/or relaying some or all of the signals and/or data as discussed herein with regards to the satellites 110. The at least one backhaul satellite 150 can be considered a subset of the plurality of satellites 110, with the only distinction being that the at least one backhaul satellite 150 is located in a more outer orbit than LEO and/or than the orbit of the other ones of the plurality of satellites 110.

Alternatively or in addition, at least one client device 160 that is operable to receive and utilize data transmitted by satellites 110 as discussed herein can similarly include some or all of the components of the navigation processing system 300, and/or can otherwise perform some or all of the functionality of a navigation processing system 300 as discussed herein. In such embodiments, the satellite constellation system 100 can include, in addition to the plurality of satellites 110, one or more mobile computing devices, cellular devices, vehicles, and/or other client devices 160 discussed herein. Thus, some or all of these types of devices can serve as additional nodes communicating in the satellite constellation system 100 in the same and/or similar fashion as the plurality of satellites 110 by utilizing their own processing module, memory module, receivers, transmitters, and/or sensors to generate, transmit, receive, and/or relay some or all of the signals and/or data as discussed herein with regards to the satellites 110. Some or all of these devices can be considered a subset of the plurality of satellites 110, with the only distinctions being that these devices are user devices that include a display and/or interface allowing a user to observe and/or interact with the data generated by and/or received from the satellites 110; that these devices are configured to further post-process received data in conjunction with the functioning of the client device 160 and/or in conjunction with one of the more of the applications discussed herein; that these devices are located on or near the surface of the earth; and/or that these devices are located at altitudes that are closer to the surface of the earth than LEO and/or the other orbit of the other ones of the plurality of satellites 110.

Alternatively or in addition, any navigation system component and/or other computing system located on earth and/or in space that is operable to transmit and/or process navigation data can similarly include some or all of the components of the navigation processing system 300, and/or can otherwise perform some or all of the functionality of a navigation processing system 300 as discussed herein. For example, a computing device and/or navigation system component can optionally include some or all of the components of the navigation processing system 300, and/or can otherwise perform some or all of the functionality of a navigation processing system 300 as discussed herein, even if the computing device and/or navigation system component is not associated with and/or does not communicate with a satellite system of satellites in LEO orbit; even if the computing device and/or navigation system component is not associated with and/or does not communicate with any satellites; and/or even if the computing device and/or navigation system component is not associated with and/or does not communicate with a non-GNSS navigation system implemented via the satellite constellation system 100.

In some embodiments, the ground stations 200 and/or 201, the backhaul satellite 150, and/or some or all of these client devices 160 can receive application data associated with the satellite constellation system 100 for download. For example, the application data can be downloaded from a server system associated with the satellite constellation system 100 via the network 250. Alternatively or in addition, the application data can be transmitted, via one or more of the links discussed in conjunction with FIG. 2, to some or all of these devices for download via other satellites 110 orbiting in LEO. The application data can thus be received for download by a device for download in a signal, received by a receiver of the device, that was broadcasted by a satellite 110. The application data can be installed and stored in the memory of the device and can include operational instructions that, when executed by the processing module of the device, cause ground stations 200 and/or 201, backhaul satellite 150, and/or client devices 160 to operate in the same or similar fashion as navigation processing system 300 and/or to otherwise perform some or all of the functionality or other operations of the satellites 110 as discussed herein. Alternatively or in addition, some or all ground stations 200 and/or 201, backhaul satellite 150, and/or client devices 160 can be equipped with additional hardware to implement some or all of the processing module 320, memory module 310, and/or some or all of the sensors, transmitters, receivers, and/or transceivers of navigation processing system 300 of FIG. 3B to enable the device to perform some or all of the functionality of the satellites 110 as discussed herein.

Consider the following example, the processing module 320 is configured to generate navigation signals 240, such as ranging signals modulated and coded with navigation messages that contain timing, ephemeris and almanac data. In addition, the navigation messages can include, for example, PPP data associated with the satellites 130, command and control data, integrity data associated with satellites 130 and other satellite 110, RO data, atmospheric or weather data including a current weather state, a weather map and/or a predictive weather model, secure clock data, encryption and security information, any of the other types of data produced or transmitted by the satellite 110 in the navigation signals 240. In various embodiments, the data of the navigation signal 240 can be formatted in frames and subframes with a data rates exceeding 1 kbits/sec, however other data rates can be used. Navigations signals can be generated in two or more frequency channels at a signal power of 50 W, 100 W or more or at some lower power.

The operations of the processing module 320 can further include, for example, locking-in on the timing of the ranging signals of the signals 132 via the associated pseudo random noise (PRN) codes associated with each satellite 130 (that is not excluded based on integrity monitoring), demodulating and decoding the ranging signals to generate and extract the associated navigation messages from the GNSS satellites 130 in range of the receiver, applying correction data received via backhaul and/or inter-satellite communications and atmospheric data generated locally and/or received via backhaul and/or inter-satellite communications to the position and timing information from the navigation messages from the GNSS satellites 130.

In various embodiments, first-order ionospheric delay is mitigated using the combinations of dual-frequency GNSS measurements. Otherwise, ionospheric and tropospheric delay can be corrected using atmospheric models generated based on the RO data. Furthermore, the processing module 320 can use a Kalman filter such as an extended Kalman filter or other estimation technique where orbital position, clock error, ionospheric delay, tropospheric delay and/or carrier-phase errors are estimated filter states. The precise orbital position of the satellite 110 can be generated by positioning calculations that employ navigation equations to the corrected orbital positions and timing for each of the satellites 130.

In various embodiments, the operations of the satellite 110 include, for example, orbital control, attitude control, power management and control, temperature control, radio occultation, generating and/or maintaining tropospheric models, ionospheric models, weather models, atmospheric data generation, weather data generation, orbit determination, navigation message scheduling, navigation message generation, GPS reflectometry, sensor data collection, sensor data processing, GNSS reception, backhaul transmission and reception, inter-satellite transmission and reception, GNSS satellite integrity monitoring, LEO satellite integrity monitoring, secure timing generation and transmission, memory clean-up, health status monitoring of the components and systems of the satellite 110, receiving updates, processing updates and/or other operations described herein. The resource allocation module 325 operates to control the various operations of the satellite 110 based on reception of command data from a ground station, an amount of memory usage, an amount of processor utilization, the distance between the satellite 110 and a backhaul satellite 150, other satellites 110 and/or a ground station 200, the battery level of the satellite 110, when the satellite 110 will be in an orbital position to generate additional power, a fuel status, a health status of the satellite 110, atmospheric data, weather data including a current weather state, a predictive weather model and or other status or conditions determined by the navigation processing system 300.

The resource allocation module 325 can also operate to control the various operations of the satellite 110 based on the orbital position of the satellite 110 relative to positions above the earth corresponding to high population density, low population density, an ocean, a rainforest, a mountain range, a desert or other terrestrial condition or feature. The resource allocation module 325 can also operate to control the various operations of the satellite 110 based on the orbital position of the satellite 110 relative to the orbital positions of one or more other satellites 110 in the satellite constellation system 100. The resource allocation module 325 can also operate to control the various operations of the satellite 110 based on the state of the satellite constellation system 100 including, for example the number of satellites 110, the number of orbital paths, the number of satellites in each orbital path, the number and positions of satellites 110 that are on-line, off-line, are not currently generating navigation signals and/or navigation messages and/or other status of the various satellites 110 of the satellite constellation system 100.

The control of various satellite operations by the resource allocation module 325 can include determining when to enable or initiate an operation, when to disable or cease an operation and/or the percentage of time allocated to each of the operations during a time period such as a second, a minute, an hour, an orbital period, or a day. The control of various satellite operations by the resource allocation module 325 can also include selecting and assigning memory resources, processing resources, sensor resources, transmitter, receiver and/or transceiver resources, to the various operations selected to be performed. The control of various satellite operations by the resource allocation module 325 can also include selecting memory parameters such as queue sizes, cache sizes, and other memory parameters. The control of various satellite operations by the resource allocation module 325 can also include selecting processing parameters such as one or more processing speeds, or other processing parameters. The control of various satellite operations by the resource allocation module 325 can also include selecting transmitter, receiver and transceiver parameters, for example, encryption parameters, data protocol parameters, transmit power, transmission beamwidth, reception beamwidth, beam steering parameters, frequencies, the number of channels in use, data rates, modulation techniques, multiple access techniques, and other transmit and receive parameters. The control of various satellite operations by the resource allocation module 325 can also include selecting other parameters used by the navigation processing system including various thresholds used to determine whether or not two quantities compare favorably to one another.

The operations of the satellite 110 can be described further in conjunction with the examples and embodiments that follow. In various embodiments, the satellite 110 is a LEO satellite of a constellation 100 of LEO navigation satellites in LEO around the earth. A global positioning receiver, such as GNSS receiver 360, is configured to receive first signaling, such as signaling 132 from a first plurality of non-LEO navigation satellites, such as satellites 130 of a constellation 120 of non-LEO navigation satellites in non-LEO around the earth. An inter-satellite transceiver, such as inter-satellite link transceiver 345, is configured to send and receive inter-satellite communications with other LEO navigation satellites 110 in the constellation of LEO navigation satellites. At least one processor of the processing module 320 is configured to execute operational instructions that cause the processor(s) to perform operations that include: determining an orbital position of the LEO satellite based on the first signaling; and generating a navigation message based on the orbital position. A navigation signal transmitter, such as navigation signal transmitter 330, is configured to broadcast the navigation message to at least one client device 160. The navigation message facilitates the determination by these client device(s) of an enhanced position of these client device(s) based on the navigation message and further based on second signaling 132 received from a second plurality of non-LEO navigation satellites of the constellation of non-LEO navigation satellites.

In various embodiments the LEO satellite also includes a backhaul transceiver, such as backhaul transceiver 340, configured to receive correction data associated with the constellation of non-LEO navigation satellites, wherein the determining the orbital position of the LEO satellite is further based on based the correction data. The backhaul transceiver can be configured to receive the correction data from either a backhaul communication satellite in geostationary orbit around the earth or a terrestrial transmitter. The operations of the processor(s) can further include:

generating radio occultation data based on the inter-satellite communications with at least one of the other LEO navigation satellites in the constellation of LEO navigation satellites; and transmitting the radio occultation data via the backhaul transceiver. The correction data can include orbital correction data and timing correction data associated with the constellation of non-LEO navigation satellites. The navigation message can include a timing signal and the orbital position associated with the LEO satellite. The navigation message can further include the orbital correction data and the timing correction data associated with the constellation of non-LEO navigation satellites.

In various embodiments, the LEO satellite further includes a non-atomic clock configured to generate a clock signal, wherein the timing signal is generated by adjusting the clock signal based on the first signaling and further based on the timing correction data. The constellation of non-LEO navigation satellites can be associated with at least one of: a Global Positioning System of satellites, a Quasi-Zenith Satellite System, a BeiDou Navigation Satellite System, a Galileo positioning system, a Russian Global Navigation Satellite System (GLONASS) or an Indian Regional Navigation Satellite System. The navigation message can include correction data associated with the constellation of non-LEO navigation satellites in non-LEO around the earth, wherein the at least one client device determines the enhanced position of the client device by applying the correction data to the second signaling. The navigation message can further include a timing signal and the orbital position associated with the LEO satellite, wherein the at least one client device determines the enhanced position of the at least one client device further based on the timing signal and the orbital position associated with the LEO satellite.

In various embodiments, the inter-satellite communications include correction data associated with the constellation of non-LEO navigation satellites received via at least one of the other LEO navigation satellites in the constellation of LEO navigation satellites, wherein determining the orbital position of the LEO satellite is further based on based the correction data.

The inter-satellite communications can include at least one of: navigation signal 240, the navigation message and/or other state data needed to do the state estimation of the satellite 110 sent to at least one of the other LEO navigation satellites in the constellation of LEO navigation satellites; radio occultation; atmospheric data generated based on radio occultation; control information associated with satellite direction; control information associated with satellite attitude; control information associated with satellite status; control information associated with satellite inter-satellite transmit/receive condition; command information associated with satellite inter-satellite transmit/receive status; command information associated with inter-satellite transmit power or frequency; control information associated with encryption; constellation integrity information relating to the health of one or more LEO navigation satellites in the constellation of LEO navigation satellites; or constellation integrity information relating to the health of one or more non-LEO navigation satellites in the constellation of non-LEO navigation satellites. Furthermore, the inter-satellite communications can include one-to-many transmissions between the LEO satellite and two or more of the other LEO navigation satellites in the constellation of LEO navigation satellites.

In various embodiments, the first plurality of non-LEO navigation satellites can include four or more non-LEO navigation satellites of the constellation of non-LEO navigation satellites that are in reception range of the global positioning receiver, however signals 132 from fewer non-LEO satellites can be used when navigation signals 240 are received from one or more LEO satellites via inter-satellite communications. The second plurality of non-LEO navigation satellites can include three or more non-LEO navigation satellites of the constellation of non-LEO navigation satellites that are in reception range of the at least one client device, however signals 132 from fewer non-LEO satellites can be used when navigation signals 240 are received from more than one LEO satellites in reception range of the at least one client device.

In various embodiments, at least one processor of the processing module 320 is configured to execute operational instructions that cause the processor(s) to perform operations that include: determining an orbital position of the LEO satellite 110 based on the first signaling 132 and the correction data received via either the backhaul transceiver 340 or the inter-satellite link transceiver 345 and generating a navigation message based on the orbital position. The navigation signal transmitter 330 configured to broadcast the navigation message to at least one client device 160, the navigation message facilitating the at least one client device to determine an enhanced position of the at least one client device based on the navigation message.

In various embodiments, at least one processor of the processing module 320 is configured to execute operational instructions that cause the processor(s) to perform operations that include: determining an orbital position of the LEO satellite based determining, based on the first signaling 132, an error condition associated with one of the non-LEO navigation satellites of the constellation of non-LEO navigation satellites; and generating a navigation message based on the orbital position, wherein the navigation message includes a timing signal and the orbital position associated with the LEO satellite, correction data associated with the constellation of non-LEO navigation satellites, and integrity monitoring data that includes an alert signal that indicates the error condition associated with the one of the non-LEO navigation satellites of the constellation of non-LEO navigation satellites. The navigation signal transmitter is configured to broadcast the navigation message to at least one client device, the navigation message facilitating the client device(s) to determine an enhanced position of the at least one client device, based on the navigation message and further based on second signaling received from a second plurality of non-LEO navigation satellites of the constellation of non-LEO navigation satellites in the non-LEO around the earth while excluding signals from the one of the non-LEO navigation satellites. Furthermore, the satellite 110 itself can exclude signals from the one of the non-LEO navigation satellites when calculating its orbital position.

The alert signal and/or integrity monitoring data that indicates the error condition associated with the one of the non-LEO navigation satellites of the constellation of non-LEO navigation satellites can also be shared with the other LEO satellites 110 and/or one or more ground stations via inter-satellite and/or backhaul communications. This allows the other satellites 110 to exclude signals from the one of the non-LEO navigation satellites when calculating their orbital position. This also allows the other satellites 110 to include integrity monitoring data indicating the faulty satellite in their own navigation messages.

In various embodiments, at least one processor of the processing module 320 is configured to execute operational instructions that cause the processor(s) to perform operations that include: determining an orbital position of the LEO satellite based on the first signaling; determining, based on the inter-satellite communications, an error condition associated with one of the other LEO navigation satellites of the constellation of LEO navigation satellites; and generating a navigation message based on the orbital position, wherein the navigation message includes a timing signal and the orbital position associated with the LEO satellite, correction data associated with the constellation of non-LEO navigation satellites, and an alert signal that indicates the error condition associated with one of the other LEO navigation satellites of the constellation of LEO navigation satellites. The navigation signal transmitter is configured to broadcast the navigation message to at least one client device, the navigation message facilitating the at least one client device to determine an enhanced position of the at least one client device, while excluding signals from the one of the other LEO navigation satellites, for example, based on the navigation message and further based on second signaling received from a second plurality of non-LEO navigation satellites of the constellation of non-LEO navigation satellites in the non-LEO around the earth.

The alert signal and/or integrity monitoring data that indicates the error condition associated with the one of the LEO satellites of the constellation of LEO satellites can also be shared with the other LEO satellites 110 and/or one or more ground stations via inter-satellite and/or backhaul communications. This allows the other satellites 110 to include integrity monitoring data indicating the faulty satellite in their own navigation messages. It should be noted that, while the foregoing integrity monitoring operation have been described as being performed by the satellite 110 in-situ, in other embodiments, integrity monitoring activities involving the detection of faulty LEO or non-LEO satellites can instead be performed by one or more ground stations and the resulting integrity monitoring data can be shared with the satellites 110 via a combination of backhaul and inter-satellite communication. Furthermore, the function of integrity monitoring involving the detection of faulty LEO or non-LEO satellites can be assigned to a particular satellite 110 on a dedicated basis that is not tasked with, configured for and/or capable of, the generation of navigation signals 240.

In various embodiments, at least one processor of the processing module 320 is configured to execute operational instructions that cause the processor(s) to perform operations that include: determining a first orbital position of the LEO satellite at a first current time based on the first signaling; generating a plurality of first orbital position estimates of the LEO satellite for a plurality of first subsequent times associated within a first time window from the first current time; generating, based on a curve fitting technique, a first navigation message indicating the first orbital position at the first current time and the first plurality of orbital position estimates of the LEO satellite for the first plurality of subsequent times; broadcasting, via the navigation signal transmitter, the first navigation message to at least one client device; determining a second orbital position of the LEO satellite at a second current time based on the first signaling, the second current time corresponding to one of the first plurality of subsequent times associated with the first time window and the second current time corresponding to one of the first plurality of orbital position estimates; generating an error metric based a difference between the first orbital position of the LEO satellite at the second current time and the corresponding one of the first plurality of orbital position estimates. When the error metric compares unfavorable to an error threshold: generating, based on the curve fitting technique, a second plurality of updated orbital position estimates of the LEO satellite for a second plurality of subsequent times associated from the second current time; generating a second navigation message indicating the second orbital position at the second current time and the second plurality of orbital position estimates of the LEO satellite for the second plurality of subsequent times; and broadcasting, via the navigation signal transmitter, the second navigation message to the at least one client device. When the first time window expires at a third current time without a second navigation message generated: determining a third orbital position of the LEO satellite at the third current time based on the first signaling; generating, based on the curve fitting technique, a third plurality of updated orbital position estimates of the LEO satellite for a third plurality of subsequent times associated within a second time window from the third current time; generating a third navigation message indicating the third orbital position at the third current time and the third plurality of orbital position estimates of the LEO satellite for the third plurality of subsequent times; and broadcasting, via the navigation signal transmitter, the third navigation message to the at least one client device.

In various embodiments, at least one processor of the processing module 320 is configured to execute operational instructions that cause the processor(s) to perform operations that include: determining an orbital position of the LEO satellite based on the first signaling; generating a second timing signal by adjusting the clock signal based on the first signaling and further based on correction data associated with the constellation of non-LEO navigation satellites; and generating a navigation message based on the orbital position, wherein the navigation message includes the second timing signal and the orbital position of the LEO satellite and correction data associated with the constellation of non-LEO navigation satellites.

In various embodiments, at least one processor of the processing module 320 is configured to execute operational instructions that cause the processor(s) to perform operations that include: generating radio occultation data based on the inter-satellite communications with at least one of the other LEO navigation satellites in the constellation of LEO navigation satellites, the radio occultation data indicating atmospheric conditions associated with the ionosphere and the troposphere; transmitting the radio occultation data via a backhaul transceiver; receiving correction data associated with the constellation of non-LEO navigation satellites, the correction data generated based in part on the radio occultation data; determining an orbital position of the LEO satellite based on the first signaling and the correction data; and generating a navigation message based on the orbital position.

In various embodiments, at least one processor of the processing module 320 is configured to execute operational instructions that cause the processor(s) to perform operations that include: determining the transmit/receive status for the inter-satellite communications between the LEO satellite and at least one other of the plurality of other LEO navigation satellites in the constellation of LEO navigation satellites. For example, the transmit/receive status for the inter-satellite communications between the LEO satellite and at least one other of the plurality of other LEO navigation satellites in the constellation of LEO navigation satellites can be determined based on at least one of: a memory usage of the LEO satellite; a memory usage of the at least one other of the plurality of other LEO navigation satellites; a distance between the LEO satellite and a backhaul receiver; a distance between the at least one other of the plurality of other LEO navigation satellites and the backhaul receiver; a battery level of the LEO satellite; a different between the battery level of the LEO satellite and a battery level of the at least one other of the plurality of other LEO navigation satellites; an estimated time that the LEO satellite can generate more power; an estimated time that the at least one other of the plurality of other LEO navigation satellites can generate more power; or atmospheric data that indicates atmospheric conditions generated based on radio occultation.

In various embodiments, the inter-satellite communications include at least one of: the navigation message sent to at least one of the other LEO navigation satellites in the constellation of LEO navigation satellites; radio occultation; atmospheric data generated based on radio occultation; control information associated with satellite direction; control information associated with satellite attitude; control information associated with satellite status; control information associated with satellite inter-satellite transmit/receive condition; command information associated with satellite inter-satellite transmit/receive status; command information associated with inter-satellite transmit power or frequency; control information associated with encryption; constellation integrity information relating to the health of one or more LEO navigation satellites in the constellation of LEO navigation satellites; or constellation integrity information relating to the health of one or more non-LEO navigation satellites in the constellation of non-LEO navigation satellites.

FIG. 3C is a pictorial diagram of a satellite in accordance with various embodiments. In particular, a lower perspective view of a satellite, such as satellite 110, is presented. The satellite body is constructed in a modular fashion of six commercial off-the-shelf units such as CubeSat units or other units that are interconnected. The front face of the satellite body 308 includes a first sun sensor 333-1, a first inter-satellite link transceiver 345-1 and a star tracker 380. The bottom side of the satellite body 308 includes a first retroreflector 332-1, a first backhaul transceiver 340-1 and two navigation signal transmitters 330, for example, corresponding to two different frequency channels. The side of the satellite body includes a second retroreflector 332-2. The top of the satellite body is fitted with deployable plates 306 that fold out for use in orbit (as shown) to support an array of solar cells for powering the satellite.

FIG. 3D is a pictorial diagram of a satellite in accordance with various embodiments. In particular, an upper perspective view of a satellite, such as satellite 110. The rear face of the satellite body 308 includes a second sun sensor 333-2 and a second inter-satellite link transceiver 345-2. The top side of the satellite body 308 includes a GPS receiver 305, a second backhaul transceiver 340-2 and solar panels 304. Solar panels 304 are also arranged on the top of the deployable plates 306. The side of the satellite body includes a third retroreflector 332-3.

As discussed herein, components of the navigation processing system 300 operate to generate a precise orbital position of the satellite 110. In addition to the use of this orbital position in the generation of navigation signals 240, this orbital position can be used to determine when the satellite 110 needs to be repositioned and to aid in such repositioning by use of the satellite flight control system 302.

In various embodiments, the precise orbital position of the satellite 110 at a given time is compared with its desired orbital position at that time to determine the amount of deviation. Furthermore, the predicted path of the satellite 110 can be compared with the predicted paths of numerous other space objects including other satellites, spacecraft, space junk and other near-earth objects to predict a potential future collision. Such determinations and predictions can be generated via a ground station in backhaul communication with the satellite 110 of via the satellite itself. In either case, the satellite 110 can be repositioned to a desired location and orientation using of the satellite flight control system 302.

In various embodiments, the satellite flight control system 302 includes a multi-axis propulsion system. In the alternative, the satellite flight control system 302 includes merely a three-axis attitude controller that is used reposition the satellite 110. Consider the example satellite configuration shown in FIGS. 3C and 3D. Roll, pitch and/or yaw axis variations in the satellites attitude can cause multi-axis drag force vectors acting on the satellite body 308 and the deployable plates 306, in particular, that can be used in the repositioning process to vary the orbital path of the satellite 110.

It should be noted that the example shown in FIGS. 3C and 3D present but one of the many possible implementations of the satellite 110.

Figure 4:
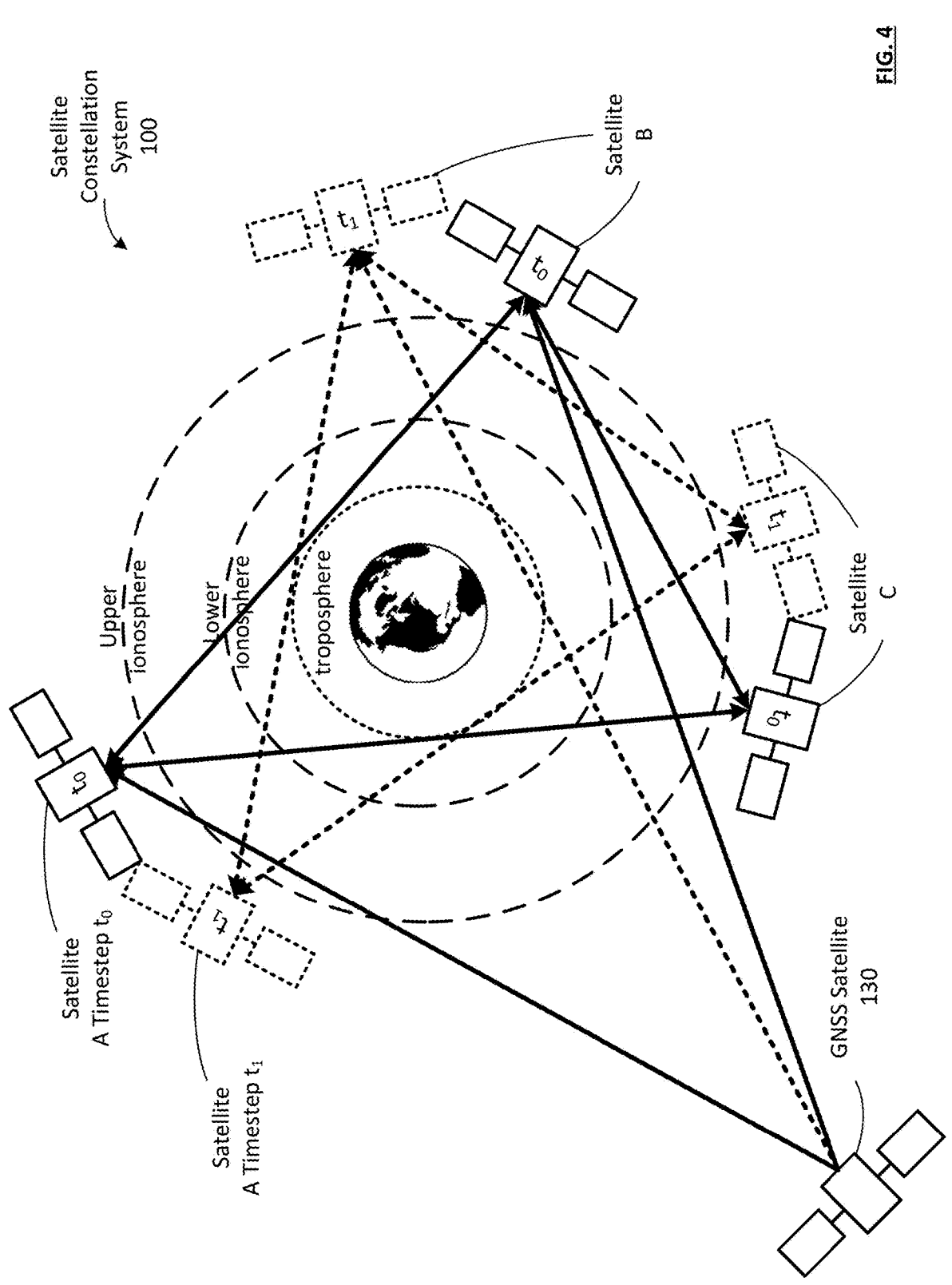
FIG. 4 is a schematic block diagram of a satellite constellation system utilized to perform radio occultation in accordance with various embodiments.

FIG. 4 presents an example embodiment of a satellite constellation system 100 that is implemented to perform atmospheric monitoring via radio occultation (RO). Radio occultation enables detailed monitoring of the Earth's atmosphere, which allows for more accurate weather forecasting. This is performed by characterizing elements of a transmitted signal as it passes through Earth's atmosphere. In particular, each satellite 110 can be operable to observe and/or generate RO data based on received signals transmitted by other satellites 110 and/or GNSS satellites 130, such as navigation signals 240 and/or GNSS signals. This RO data includes measurements and/or other data that characterizes a portion of the atmosphere that the received signal traversed in its transmission from the other satellite. A satellite 110's generation of RO data based on received signals, and/or a satellite 110's transmission of this generated RO data, can be accomplished by utilizing radio occultation module 321.

RO can be performed using Global Navigation Satellite System (GNSS) signals that are being transmitted from Medium Earth Orbit (MEO) and subsequently monitored from satellites in Low Earth Orbit (LEO). These GNSS signals provide RO information on the upper atmosphere, but due to their weak signal strength, these GNSS signals are unable to provide high quality measurements to the lower portions (altitudes) of the atmosphere. Furthermore, the GNSS signals come from a limited number of MEO satellites. This limitation on number and the relatively slow orbital period of these GNSS satellites 130 naturally constrains the rate of change of observation vectors and therefore the amount of atmosphere being observed. These factors limit both the spatial and temporal resolution of the atmosphere being monitored.

Satellite constellation system 100 presents improvements to current atmospheric monitoring techniques. In contrast to existing GNSS-based RO methods, satellite constellation system 100 can handle the transmission and/or reception of navigation signals 240 in addition to traditional GNSS signals received from GNSS satellites 130. The geometry of the line of sight vector, in this case a line of sight vector being a radio line of sight such that the receiving end can receive a transmission from the transmission end, between satellites 110 in a LEO orbit provides a unique geometry that gives rise to uncommon atmospheric cuts that are capable of providing a deeper understanding of the Earth's atmosphere, as depicted in FIG. 4. To further atmospheric modeling capabilities, navigation signal 240 is transmitted by satellites 110 in LEO, and can be delivered at higher power levels than those from MEO. This enables deeper penetration of the atmosphere down to the planetary boundary layer and/or to less than 5 km in altitude, even in heavy moisture conditions. This provides an unprecedented level of detailed information of all levels of the atmosphere.

Additionally, using LEO satellites for both transmission and reception in RO results in an unprecedented number of RO events due to the smaller LEO orbital period. This greatly increases the temporal and spatial resolution of atmospheric measurements, resulting in a higher fidelity model and in turn a better understanding of its dynamics. Furthermore, a LEO constellation with a high density of satellites, with groups spaced across different orbital planes will result in sections of the atmosphere between the orbital planes being observed with a very high frequency (e.g. 10 minutes between observations depending on the spacing in the orbital plane), providing near real time tomography of the atmosphere.

Furthermore, navigation signal 240 of satellite constellation system 100 can reside in one or more different frequency bands than GNSS signals used for RO today, enabling another dimension of atmospheric characterization than what is possible today.

The data links (Backhaul uplink 220, downlink 210, inter-satellite link 230, and/or navigation signal 240) permit the RO data obtained by the satellites to be transmitted down to the ground quickly for optimal use. The RO data can include the raw RO measurements observed by each satellite 110 and/or can include post-processed data that can, for example, contain already computed temperature and/or humidity profiles of the atmosphere. For example, satellites 110 can be operable to compute temperature and/or humidity profiles of the atmosphere based on the observed RO measurements.

In the example illustrated in FIG. 4, three satellites A, B, and C, are located in a LEO orbit, and a single GNSS satellite 130 is located in a MEO orbit. The satellites A, B, and C are each distinct satellites 110 of the satellite constellation system 100. The satellites A, B, and C and the single GNSS satellite 130 are depicted at two different time steps: $t_0$ and $t_1$.

At the first time step, $t_0$, all three satellites 110 can see, and/or can otherwise be operable to receive, each other's navigation signal 240. Since each satellite 110 is capable of transmitting and/or receiving navigation signal 240, each of the line of sight vectors, representing an ability to transmit and/or receive navigation signal 240, are shown as two-way vectors. Due to the placement of the satellites 110 in orbit and the properties of navigation signal 240 such as the broadcast power, each of these lines of sight traverse through different layers of the Earth's atmosphere, including layers that are close to the Earth's surface. The signal from GNSS satellite 130 can also be used by satellites A and B at the first time step, to, to get information through the uppermost part of the atmosphere. Note that while satellite C does have a line of sight to GNSS satellite 130, that signal does not traverse any layers of the atmosphere of interest for monitoring and is unable to produce RO measurements, and is therefore omitted from the figure.

At the second time step, $t_1$, which is shortly after the first time step, all three of satellites 110 have moved in their orbit. For this example, the time between $t_0$ and $t_1$ is such that GNSS satellite 130 has effectively not changed location due to the much longer orbital period of a MEO satellite compared to a LEO satellite. At time step $t_1$, once again all three of the satellites 110 are able to maintain their lines of sight, this time at slightly different locations in the atmosphere, providing new measurement data. Due to the placement of satellites 110 in their orbit in this example, only one of the satellites is able to use the signal from GNSS satellite 130 for RO purposes. The line of sight vector from GNSS satellite 130 and Satellite A no longer goes through the atmosphere to create observations and the line of sight vector from GNSS satellite 130 and Satellite C still does not go through the atmosphere. Note that while the line of sight vector from GNSS satellite 130 and Satellite B is maintained that measurement will be degraded due to how much atmosphere the signal must traverse. This exemplifies one of the drawbacks of RO systems today using existing GNSS signals unable to constantly provide information as there are some cases where the geometry is in such a way that does not allow high quality RO observations to be made.

Building from this example, considering a typical orbital period for a LEO satellite of 90 minutes, every 90 minutes a LEO satellite will complete a full sweep of its trajectory around Earth's atmosphere. Furthermore, with a dense constellation of satellites spread across a given number of orbital planes, the time between one pair of satellites passing through a part of the atmosphere and the following pair passing through nearly the same region of the atmosphere can be very short (e.g. tens of minutes). Thus, the satellites 110 of the satellite constellation system 100 allow for an unprecedented temporal revisit of regions of the atmosphere that can be used to better predict weather and improve models. When performing RO with MEO GNSS signals, the geometry change is much slower since a MEO satellite's orbital period is approximately 12 hours. Furthermore, the LEO and MEO satellite orbits are not in sync, which does not guarantee the ability to repeatedly pass through the same parts of the atmosphere and therefore cannot provide the spatially correlated temporal data that can be provided by this satellite system.

The raw RO measurements and/or processed data can be processed by one or more client devices 160 and/or other computing devices that receive the RO data from the satellites 110 and/or from ground station 200 and/or 201, for example, via network 250. The processing of this data can enable a range of applications, for example, by various other entities that benefit from improved characterizations and/or profiles of the atmospheric.

One example application of utilizing the received raw RO measurements and/or processed data includes generating weather forecasting data. For example, one or more client devices 160 can process the RO data to generate forecast models, to improve upon forecast models, and/or to generate other weather forecasting data.

As another example application, one or more client devices 160 can process the RO data to generate ionospheric data, such as ionospheric mappings and/or other data characterizing various portions of the ionosphere over time. This can include generating real-time and/or substantially close to real-time ionospheric mappings. This can include generating models that can be utilized to generate prediction data utilized predict and/or improve upon predictions of future states of the ionosphere. This can be utilized to improve performance of other systems that transmit through the ionosphere. For example, spaced-based communications systems can utilize the information from this real-time ionospheric mapping and/or other detailed ionospheric maps, and/or can utilize these models to better predict behavior of transmissions through the ionosphere and/or to improve performance and efficiency of their systems.

As another example application, one or more client devices 160 can process the RO data in conjunction with space measurement systems. In particular, the scientific measurement of stars and/or signals from space can be improved by utilizing ionospheric data generated based on the RO data. For example, the model can be utilized to predict ionospheric mappings at future times, to schedule the running of telescopes, and/or to otherwise facilitate scheduling and/or adjustment of measurements of stars and/or signals from space.

As another example application, one or more client devices 160 can process the RO data in conjunction with communication constellations, for example that rely on transmitting through the ionosphere. In particular, current ionosphere mappings or predicted future ionosphere mappings generated based on the received RO data can be utilized to aid in determining power levels that need to be broadcast based on current ionosphere mappings or predicted future ionosphere mappings. This can also be utilized to determine and/or predict current and/or future possible areas of outages, for example, enabling the communication constellations to adapt its transmissions accordingly.

As another example application, one or more client devices 160 can process the RO data in conjunction with space weather monitoring for early warning for high value space assets and/or ground infrastructure.

As another example application, one or more client devices 160 can process the RO data for improved GNSS, improved performance of satellite constellation system 100, and/or improvements for other third-party users interested in detailed real-time atmospheric models.

Some or all of these applications of received RO data can alternatively be facilitated via a processing module 320 of a navigation processing system 300 and/or via another processing system affiliated with the satellite constellation system 100. Models and/or other processed data in conjunction with these applications can be transmitted, for example via network 250 and/or directly from a satellite 110, to client devices 160 associated with end users of this data, for example, for display to the end users via a display device. Alternatively or in addition, the client devices 160 can download application data, for example via network 250, from a server system affiliated with the satellite constellation system 100. This application data, when executed by the client device, can cause the client device 160 to receive and/or process the RO data in conjunction with one or more of these applications.

The example demonstrated in FIG. 4 depicts each satellite 110 transmitting and receiving navigation signal 240. With these two-way links, each of the satellites in the link pair is capable of making RO observations for the same portion of the atmosphere and is capable of logging the necessary data, for example by generating and/or otherwise observing the RO data based on the received navigation signal 240, by temporarily storing the RO data in memory module 310 in a queue for transmission, and/or by transmitting the RO data via a backhaul link. Therefore, only one of the satellites need to be in view a ground station 200, and/or the backhaul satellite 150, or a backhaul node, such as one of the plurality of nodes of the satellite constellation system 100 in the transmission chain of backhaul links to the ground station 200 and/or the backhaul satellite 150. The satellite constellation system 100 can thus be configured such that only one of the satellites in a satellite pair transmit the RO data down to users on the ground, either directly or through a space-based satellite backhaul communication link, in real time. This allows the use of fewer resources, as only one of the two satellites needs to record the necessary measurements. To reduce power usage, the satellite system can be further configured in a such a way that optimizes a set of one way links such that only one satellite is transmitting navigation signal 240 and one is receiving the navigation signal 240 in a given pair.

As used herein, the satellite in a given pair that is designated to broadcast navigation signal 240 is designated the "transmitter satellite", and the other satellite in designated to receive navigation signal 240 is designated the "receiver satellite." The transmitter satellite can be configured to broadcast navigation signal 240. The transmitter satellite can be further configured to not receive navigation signal 240 from the other satellites 110, to not generate the RO data based on the navigation signal 240 received from the other satellites 110, and/or to not transmit the RO data via a backhaul link. The receiver satellite can be configured to receive navigation signal 240, to generate corresponding RO data and to transmit this RO data via a backhaul link. The receiver satellite can be configured to not transmit its own navigation signal 240. In some embodiments, the satellite in a given pair that is determined to be best placed for transmitting the data to ground users (either directly or through a space-based satellite backhaul communication link) can be selected as the receiver satellite, and the other satellite in the pair can be selected as the transmitter satellite. This optimization can further be performed across multiple sets of satellites where a single satellite is configured as the transmitter satellite to transmit to multiple satellites receiving and logging navigation signal 240.

Consider the pair of satellites A and B of FIG. 4. One of the satellites in the pair can be designated as the transmitter satellite at a particular time, while the other satellite in the pair is designated as the receiver satellite at the particular time. Which one of the satellites is designated as the transmitter satellite vs. the receiver satellite can be set and/or adjusted automatically via an adjustment process. The adjustment process can include determining the pair of satellites A and B should swap roles and/or determining the roles of the pair of satellites A and B to be reevaluated for potential swapping, in response to detection of a corresponding trigger condition. The adjustment process can be performed by utilizing processing module 320 of satellite A and/or satellite B, enabling the pair of satellites automatically determine roles amongst themselves. Alternatively, the adjustment process can be performed by another processing module 320 and/or other processing system of the satellite constellation system that is not included in the pair, where the roles are determined and received as instructions to satellite A and satellite B.

Performing the adjustment process can include determination of one or more trigger conditions that dictate the current roles should be swapped and/or otherwise be set. Example trigger conditions for automatic setting and/or adjustment of which satellite in the pair is designated as the transmitter satellite and which satellite in the pair is designated as the receiver satellite in a given pair of satellites 110 (Satellite A and Satellite B) include:

Determining satellite A's memory usage exceeds a given threshold such that it must stop recording RO measurements. As a result, satellite B is designated as the transmitter satellite and satellite A is designated as the receiver satellite.

Determining the distance between satellite A and a backhaul satellite 150 and/or a ground station 200 is greater than the distance between satellite B and backhaul satellite 150 and/or ground station 200 such that Satellite B is in a better position to record measurements. As a result, satellite B is designated as the receiver satellite and satellite A is designated as the transmitter satellite.

Determining the battery level of satellite A is below a given threshold such that it must stop transmitting a navigation signal. As a result, satellite B is designated as the transmitter satellite and satellite A is designated as the receiver satellite.

Determining the difference between battery level in satellite A and satellite B compares in such a way that Satellite A is determined to have more battery to use and/or is determined to have a more favorable battery level than satellite B. As a result, satellite A is designated as the transmitter satellite and satellite B is designated as the receiver satellite.

Determining that the difference between when satellite A will be able to generate power and when Satellite B will be able to generate power compares in such a way that satellite A is determined to be able to generate power sooner. As a result, satellite A is designated as the transmitter satellite and satellite B is designated as the receiver satellite.

Any other status changes, conditions or states of the individual satellites 110 or of the satellite constellation system 100 that may favor one satellite transmitting and/or receiving either in a paired configuration or in a one-to-many or many-to-one configuration.

While these trigger conditions illustrate examples between a specific pair of satellites, similar trigger conditions can be determined between any number of satellites when a one-to-many or many-to-one architecture is being used. In particular, consider a subset of three or more satellites 110. Similar trigger conditions can be utilized to determine a single one of the subset of three or more satellites 110 to be designated as the transmitter, and/or where a single one of the subset of three or more satellites 110 to be designated as the receiver. For example a single receiver in the subset can be selected in response to determining this satellite 110 is determined to have the least favorably battery level of the subset of satellites, in response to determining this satellite has a closest distance to backhaul satellite 150 and/or a ground station 200 of the subset of satellites, and/or a most favorable transmission path to backhaul satellite 150 and/or a ground station 200 of the subset of satellites. Alternatively, more than one of the subset of three or more satellites can be designated as transmitter satellites and/or receiver satellites. In some embodiments, all of the subset of three or more satellites 110 are designated as either a transmitter satellite or receiver satellite. Alternatively, at least one of the subset of three or more satellites can be designated to perform the functionality of both a transmitter satellite and a receiver satellite, and/or can be designated to not perform the functionality of either a transmitter satellite or a receiver satellite.

In performing the adjustment process, the automatic determination of which satellite in a pair of satellites and/or in a grouping of three or more satellites is designated as the receiver satellite requires communication between the satellites in the pair and/or grouping to relay status utilized to determine trigger conditions and/or to relay which satellite is designated to perform which role. Consider the following steps illustrating an example of performing the adjustment process between a pair of satellites A and B:

1. Satellite A's memory usage for storing RO measurements exceeds a given threshold and sends (through any link or combination of links in FIG. 2) a message to satellite B that it must stop receiving messages and that it is changing into transmission mode as a transmitter satellite.
2. Satellite A continues to log RO measurements and enables transmission of navigation signal (if not already enabled)
3. Satellite B can send (through any link or combination of links in FIG. 2) a status message to satellite A confirming that satellite B is in a mode corresponding to the receiver satellite and/or is otherwise logging measurements.
4. Satellite A can receive satellite B's status message and/or satellite A can detect that satellite B has changed state by receiving a navigation signal from satellite B (if it was not already receiving a navigation signal from satellite B)
5. Satellite A stops logging RO measurements.

A similar process can be performed in response to detection of another trigger condition described above. In particular, a satellite can determine to change its own state in response to detecting its battery level, memory capacity, other health status, distance from backhaul satellite and/or ground station, or other condition independent of other satellites compares favorably to a corresponding threshold dictating the satellite must change its state to be a transmitter satellite or a receiver satellite. In response to determining its own condition must change, the satellite can alert the other satellite in the pair and/or multiple satellites in the grouping of the change.

Alternatively or in addition, status information such as battery level, memory capacity, other health status, distance from backhaul satellite and/or ground station and/or other states and conditions can be exchanged between both satellites in a pair and/or between some or all satellites in a group, where a single satellite in the pair or grouping collects its own status information and the corresponding status information from the other one or more satellites in the pair or grouping, compares this status information and/or measures differences between statuses of the satellites and determines the optimal satellite to be selected as a transmitter satellite and/or the optimal satellite to be selected as a receiver satellite based on, for example, the corresponding trigger conditions. Once the selections have been made by the single satellite, this satellite can transmit one or more notifications indicating the assigned roles to the one or more other satellites in the pair or grouping. If one of the other satellites later determines its own condition must change based on monitoring its own status, the satellite can alert the other satellites in the grouping accordingly, and this process of collecting status data and reassigning roles by a single satellite can be triggered and repeated.

Alternatively or in addition, the decision for changing of the state can also be made by a ground monitor that is listening to all the status messages and send commands to the given satellites and/or can be made by another satellite that is not necessarily in the satellite pair but that can receive the status messages of the two satellites in the pair. This outside ground monitor and/or other satellite can generate and transmit notifications to the satellites in the pair or grouping indicating their newly assigned roles.

Alternatively or in addition, any of the changes to whether a satellite is a transmitter satellite and/or a receiver satellite can be performed in real time based on status messages or other command and control data and/or can be performed based on predetermined positions within the orbit based on known precomputed metrics that are a function of the satellite's placement within an orbit. For example, it can be precomputed that a satellite closer to a fixed ground station 200 should always be the receiver in a pair and therefore satellite 110 can be preconfigured to change to logging RO measurements when within a certain threshold distance of fixed ground station 200. This can correspond to a trigger condition that can be determined by a satellite monitoring its own status, where the change in role of the satellite can be relayed to the other satellites in the pair and/or grouping and can trigger the other satellites in the pair and/or grouping to change their roles accordingly.

In some embodiments, the broadcast signal from any satellite 110 in LEO can be used by any number of other satellites 110 in LEO. While lines of sight shown in FIG. 4 are representative of satellites 110 receiving each other's navigation signals, it's important to note that the signals transmitted are broadcast signals that can be received by any satellite.

Alternatively or in addition to dynamically and automatically being capable of changing role from transmitter satellite to receiver satellites, satellites 110 can be similarly operable to automatically adjust the transmission of navigation signal 240. Due to the fact that satellite constellation system 100 controls navigation signal 240 that can be used for RO measurements, the signal design can be dynamic to allow navigation signal 240 to change in cases where atmospheric conditions necessitate it (e.g. changes that make losses greater can result in a boost in the signal power, or changes that may require larger bandwidths can result in adjusting the bandwidth, or even frequency). When satellite constellation system 100 controls the broadcast, satellite constellation system 100 can have a feedback loop between the transmission and receiving ends to optimize the transmitted signal to get the best information possible. That optimization can change base signal characteristics such as frequency, bandwidth, power levels, waveform, and/or other signals characteristics.

The ability to control both the transmission and the receiving side allows satellite constellation system 100 to be a closed loop RO system in the sense that satellite constellation system 100 can adjust key transmit parameters, including but not limited to, frequency, power, and signal structure, to provide the best transmission for measuring atmospheric properties at the current moment. What is considered best transmission is a function of the receiving satellite's measurement performance which can be fed back to the transmitting satellite to adjust the signal parameters through any combination of the links in FIG. 2. Example signal characteristics of the navigation signal 240 that can be adjusted include frequency of the navigation signal; bandwidth of the navigation signal; waveform of the navigation signal; power of the navigation signal; and/or any other parameters that define the generation of a signal, the transmission of a signal, and/or other properties of the signal itself.

The feedback loop process that is utilized to determine when and/or how to adjust these parameters can be performed by utilizing the processing module 320 of one or more satellites. An example of this feedback loop process includes the following steps:

1. Satellite A receives signal from Satellite B and computes a raw measurement from the ranging signal (the raw measurement includes, but is not limited to, the range to the satellite, frequency and code offsets, carrier phase, signal receive power, etc.)

2. Satellite A evaluates performance metrics on the raw measurement (e.g. receive power compared to a desired threshold, ability to track the signal and compute carrier phase measurements, etc.) and decides if any threshold is not met.

3. If thresholds are not met (e.g. receive power is too low) Satellite A transmits a message, through any combination of links shown in FIG. 2, to request a signal characteristic change from Satellite B (e.g. if receive power is too low, then request a boost in the signal power)

a. Alternatively to sending a request for a signal characteristic change, Satellite A can transmit the performance metrics and Satellite B can make the decision for what to change.

b. Different performance metrics can be used to control different signal characteristics, but it does not have to be a one to one mapping between signal characteristic and performance metric.

As discussed, the satellite constellation system 100 is implemented as a LEO-LEO system due to the transmission and reception of signals between satellites 110 in LEO. Implementing satellite constellation system 100 as a LEO- LEO system can enable some or all of the functionality and/or improvements to existing systems listed below, for example, as a result of the fact that this system controls the broadcast and some due to the fact that various backhaul networks can be leveraged:

The geometry of satellite constellation system 100 results in line of sights between satellites 110 that traverse through a different portion of the atmosphere than a line of sight between a LEO satellite and a MEO satellite.

Faster motion on both the transmission and receiving sides means an increase in atmospheric measurement frequency and geometric diversity.

Leveraging a combination of the links in FIG. 2, the RO measurements can be transmitted from the satellites to users (Earth based and/or space based) in near real time.

Sufficient density of available tomography can allow for the creation of ionosphere and troposphere models derived for the creation of GNSS corrections without a need for ground infrastructure.

The above allows for not only the creation of corrections for GNSS satellites, but also for the precision satellite constellation itself, improving robustness and convergence times towards precision navigation.

With high spatial density ground monitoring stations and/or a LEO multifrequency satellite constellation, real-time, highly detailed maps of the ionosphere can be produced for both scientific, government, and industrial applications. Some applications include improved Earth weather prediction, GNSS corrections for improved stand-alone positioning and positioning augmented with this satellite system, protection of satellite assets from space weather events, and others. This unique approach would combine measurements from satellite constellation system 100 to the ground and/or from existing GNSS satellites to satellite constellation system 100. This allows for atmospheric model layer separation and finer granularity.

The RO tomography data generated through the RO measurements recorded by satellite constellation system 100 can be used to generate a map of the ionosphere and troposphere where appropriate navigation atmospheric correction messages are derivative products of this map. This data can be used in traditional GNSS Precise Point Positioning (PPP) approaches in addition to the navigation schemes presented here. The reduces the search space in carrier phase ambiguity resolution and can greatly accelerate convergence time.

Alternatively or in addition to providing atmospheric data, the satellite constellation system 100 can be implemented to provide precise navigation by giving users their precise position and time. One of the key elements to providing this information to users through a satellite based ranging signal includes performing precise orbit determination, or otherwise being able to precisely determine the location of the satellite in space. This information can then, along with a ranging signal, be broadcast down to users on the ground to enable precise positioning and/or timing. In addition to the complete solution, correction information can be provided to spatially "close" users, such as users in orbits near those of our satellites, to allow those users to get precision positioning and timing data. This enables this satellite system to be able to provide precise positioning to users at altitudes below this satellite system and users at altitudes at close (above) to this satellite system. The precision navigation section performed by satellites 110 includes orbit determination, autonomous constellational monitoring, and/or adjusting of signal characteristics for providing the best navigation signal.

Current methods for precision and high accuracy orbit determination require the use of ground monitoring stations to observe the location of satellites with specialized measuring equipment and perform heavy computation for determining orbits. Satellite constellation system 100 improves existing systems by performing autonomous in-situ distributed orbit determination, where processing is done onboard satellites 110 autonomously through edge computing. This significantly minimizes requirements on ground infrastructure. Autonomous orbit and clock estimation onboard the satellite in real-time allows for lower cost clocks as part of the satellite hardware. Temperature compensated crystal oscillators (TCXOs) and oven-controlled crystal oscillators (OCXOs) are lower cost than Chip Scale Atomic Clocks (CSACs) and other timekeeping technology, but are most stable over shorter periods of time. Real-time orbit determination and dissemination to the user makes the use of these clocks possible, whereas if orbit determination is done by the ground network, then longer periods between uploads would require higher performance clocks onboard.

Additionally, some embodiments of navigation processing system 300 use the same clock 365 in both the GNSS receiver and/or other elements that handle the analog to digital conversion of the signal and other elements within the receiver, and in the generation of the navigation signal carrier frequency. This usage of the same clock 365 results in the estimated clock state using GNSS measurements reflecting the state of the clock used to generate the navigation signal itself, which results in a more precise navigation signal and navigation message. In other embodiments, multiple clocks 365 may be present, where the clock generating the navigation signal carrier frequency is "disciplined" to the clock in the GNSS receiver or the clock in the GNSS receiver is "disciplined" to the clock generating the navigation signal carrier frequency.

The precise orbit determination, or the estimation of the satellite's precise state, which can contain information including, but not limited to: position, velocity, acceleration, clock bias, clock drift, clock drift rate, current time, attitude, attitude rates, carrier phase offsets, etc.), is performed onboard the satellite using a navigation filter that uses measurements from on-board and/or offboard sensors and/or correction data. This process is described below:

1. Raw data from a GNSS receiver, Inertial Measurement Unit (IMU), attitude determination instruments, and/or radio signals from neighboring satellites in this system are collected by and/or are otherwise available to each satellite 110. Measurements can also be ground based, where this data is transmitted to the satellite via a data link.

2. The raw GNSS measurements are fed into a tightly coupled navigation filter onboard the satellite 110. For example, the navigation filter can be implemented by utilizing orbit determination module 322. The filter uses GNSS orbit corrections and/or other correction data such as atmospheric corrections provided by any combination of the links in FIG. 2 to produce a tightly-coupled PPP carrier phase ambiguity-resolved navigation solution.

3. The navigation filter propagates the state estimate to the current epoch.

4. The navigation filter updates the position (of the satellite center of mass), attitude, clock, and/or other state estimates given the most recent measurements.

5. The position, attitude, and/or clock estimates are, using one or more models based on physics or other data driven models, propagated forward for a short period to produce predictions of the position of the broadcast antenna phase center.

6. This predicted path of the satellite orbit and clock (where the clock is the same clock generating the carrier for the navigation signal) are fit to a curve that will become the broadcast navigation message. This curve fit is packaged into a binary navigation message to be broadcast by the satellite to the users.

7. The broadcast orbit and clock message can be broadcast by the satellite 110 at regular intervals that meet the minimum time to first fix.

8. If the orbit and clock states computed by the physics-based propagation differ from the orbit and clock computed using the navigation message, a new navigation message will enter the broadcast queue, performing autonomous integrity monitoring.

9. The broadcast signal is received by users and/or user devices such as client devices 160, and the precise orbit data enables the user and/or client device 160 to compute a precise position and time solution.

10. The precise position and time solution can be displayed to the user (for example as a pin on a map with some bounds on the error that show that the user's position is very precise), for example, by utilizing a display device of client device 160. In the case of a robotic or autonomous or highly automated system, this position solution can be ingested natively, for example, to be used as a measurement for precision autonomy.

Each satellite 110 can perform process for the autonomous orbit determination via performance of a state estimation flow as illustrated in FIG. 5A, performance of a navigation flow as illustrated in 5B, and/or performance of a broadcast flow as illustrated in FIG. 5C. These separate depictions of the state estimation flow, navigation flow, and broadcast flow highlight the fact that process can be performed in several different loops triggered by different events. The navigation processing system 300 can be utilized to perform some or all of the steps illustrated in FIGS. 5A, 5B, and/or 5C, for example, by utilizing orbit determination module 322, navigation message generation module 323, and/or message scheduling module 324, respectively.

Figure 6:
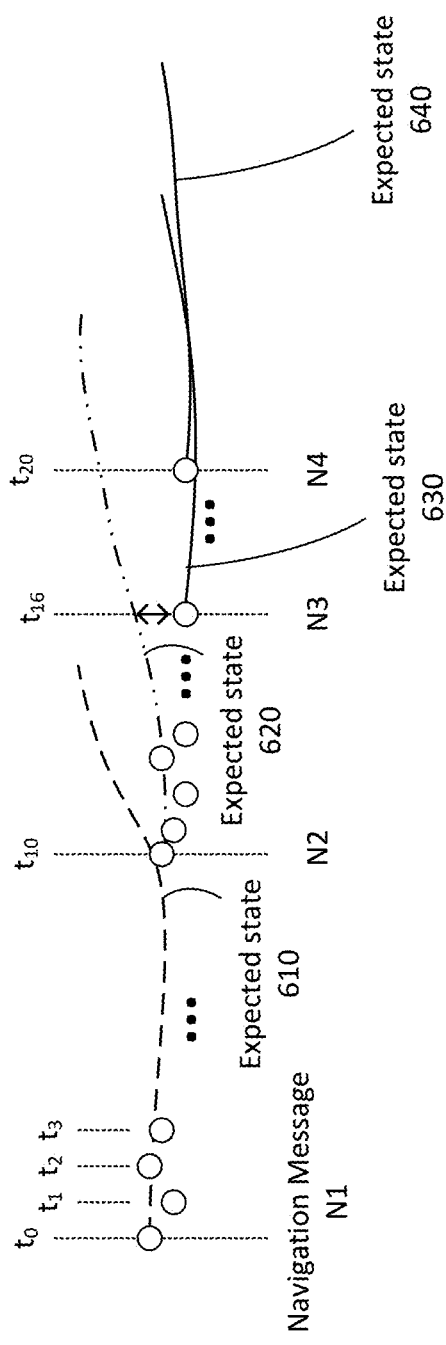
FIG. 6 is an illustration depicting the process of self-monitoring by a navigation processing system in accordance with various embodiments.

FIG. 5A illustrates an embodiment of a state estimation loop. The loop is configured to run at a specific rate or triggered based on new measurements from the sensors onboard the satellite. Upon the trigger, the new measurement from the onboard sensors, which can include, but is not limited to, inertial measurement units (IMIUs), GNSS receivers, attitude sensors (e.g. star trackers, horizon sensor, etc.), radio signal receivers to signals from neighboring satellites in this satellite positioning system, and other sensors, are used by the navigation filter to compute the precise state. Note that measurements can also be made from ground-based sensors and the data of the measurement can be transmitted to the satellite via any combinations of the links in FIG. 2. These sensor measurements can be used in conjunction with precise GNSS orbit and clock data estimated by the ground segment (PPP correction data) and/or other correction data (such as atmospheric models) desired. This correction data can be uploaded via any combinations of the links in FIG. 2 and can be stored in memory onboard the satellite. The newly computed state can be saved to an onboard history vector of the current and/or past states. Additionally, this newly computed state can be compared to the expected state at the current time based on the last navigation message. If the error metric exceeds a given threshold then the navigation loop is triggered to generate a new navigation message as described in FIG. 5B. A more detailed example of the comparison with the expected state is depicted in FIG. 6.

Typical ground-based orbit and clock determination for GNSS only uses the signals received on the ground. Having the orbit and clock determination onboard, enables the satellite to make use of additional sensors that help decouple the attitude from the orbit as well as the orbit from the clock. Decoupling the attitude is important as it enables the use of this orbit and clock determination system to be used on a variety of satellites including small satellites where only minimal attitude control may be available. For example, in a satellite configuration where the broadcast signals are nadir pointing and the received GNSS L1/L2/L5 signals are received from a zenith antenna, a non-trivial offset will be present between these antennas which must be accounted for in user precise positioning. Inertial sensors, which are essentially only affected by orbital effects and not clock effects, can be integrated into the orbit determination and propagation process and help separate orbit and clock errors, especially as GNSS geometry worsens in polar regions.

The orbit determination can be aided by terrestrial stations, especially in polar regions, where not only would ground stations be typically visible to the greatest number of satellites, but the GNSS geometry is weakest on orbit. The ground stations can broadcast another ranging signal that can be received by satellites on orbit to aid in the orbit determination by providing more high accuracy range measurements. This allows for the measurements to very cleanly enter the estimator. This also allows for the ground station to be broadcast-only (one-to-many) rather than talking directly to a specific satellite, keeping orbit determination autonomous without need for direct communication to the ground station. The ground stations can also be capable of receiving the ranging signal broadcast by this satellite system, allowing the ground stations to either do some estimation on the ground and send the estimate back to the satellite or more simply send the measurements collected on the ground up to the satellites on orbit and let the satellite use the measurements in their onboard estimators. The latency between the collection of the measurement on the ground and the reception of that on orbit may introduce some complications in the estimation. Ground stations can also be equipped with a laser to point at a retroreflector on the satellite providing another accurate range measurement to the satellite. Once again, this measurement can then be used on the ground and estimates can be sent to the satellite, or the measurements can be directly sent to the satellites to be used in the onboard estimators.

The precise orbit determination computed onboard the satellites can use Precise Point Positioning (PPP) correction data, which consists of precise orbit and clock estimates of GNSS satellites. PPP data can be transmitted from the ground to the satellites via any combination of the links depicted in FIG. 2.

The navigation message creation is a second loop running onboard the satellite that can be set to its own rate independent of the precise orbit determination rate. The process flow for the navigation message creation is shown in FIG. 5B. This loop can be either triggered by timing for a fixed frequency of operation or by a trigger based on a computed error metric that is computed at the precise orbit determination rate. One manifestation is that the navigation message is generated by computing a best fit curve on the expected future state computed by running the filter's prediction step.

Such a best fit curve has a set of parameters (e.g. that define the orbit and clock state) that can be put into a binary message to be sent as part of the navigation message.

The broadcast flow of FIG. 5C can be once again running at an independent rate, this time specified by the desired data rate for data to be transmitted on the ranging signal, handles the transmission of the navigation message, along with any other data messages that are desired. This transmission system reads a queue of messages and modulates the data contained in the messages onto the navigation signal (which in some embodiments has a ranging signal already modulated onto the carrier), which can be at various different frequencies. Note that in some cases only the ranging is modulated on the carrier to make the navigation signal.

Once modulated, that signal is transmitted from the satellite 110 and can be received by at least one client device 160 which can include, but is not limited to, devices on the ground (such as handheld devices, vehicles, etc.), devices in the air (such as planes, drones, etc.), devices in space, and/or other embodiments of client device 160 discussed herein. Client device 160 can compute a range to each satellite 110 in view with the ranging signal and, given the precise navigation message data, is able to compute a precise position.

In various embodiments, the orbit determination process onboard of each of the satellites 110 allows the satellites to monitor their own messages and/or those of the neighboring satellites. Satellites 110 can be operable to perform a self-monitoring process. In particular, at every time step that the navigation filter updates the precise state of the satellite, navigation processing system 300 can compare the newly computed precise state with the expected state as described in the most recent navigation message.

FIG. 6 demonstrates an example of this self-monitoring process. For this example, the rate of the estimation loop and the navigation message generation are such that a new navigation message is generated, nominally, every 10 measurement updates. Starting at time $t_0$, the navigation filter has computed a precise state, shown as a circle at time step $t_0$ on the figure, and a navigation message, N1, is generated as described in conjunction with FIG. 5B. Using the navigation message data, the expected state for all time steps in the time window between $t_0$ and $t_{10}$ is shown as a line, which corresponds to expected state 610. Note that the line, and therefore the message can be valid for a longer time period than the time period for the next triggered navigation message update. Moving forward in time, FIG. 6 shows the estimated states at time steps $t_1$, $t_2$, and $t_3$. At each one of these time steps, a comparison is computed between the estimated state and the expected state as given by navigation message N1. In this example, none of these comparisons compare unfavorably, so the system behaves nominally.

At the end of the time window at time $t_{10}$, the time-based trigger results in a new navigation message, N2, being generated as depicted in FIG. 5B. This new navigation message is now what is being transmitted at regular intervals over, for example, the navigation signal. The new expected state through time is once again shown as a curve, in this case expected state 620. A new time window is set between times $t_{10}$ and $t_{20}$.

Moving forward through time to time step $t_{16}$, the difference between the estimated state (shown as a circle) and the expected state as computed using navigation message N2, exceeds a given threshold, resulting in a trigger of the generation of a new navigation message, N3. This new message has a new curve for future expected states, in this case expected state 630.

As time continues to move forward to the end of the new time window at step $t_{20}$, the generation of a new navigation message, N4, is triggered by the nominal time based trigger behavior. This new message has a new curve for future expected states, in this case expected state 640. Other variations are possible, for example, a new time window can be set between times $t_{16}$ and $t_{26}$ upon the transmission of navigation message N3. In the absence of deviation from the expected state 630 during this time window, the next navigation message (N4) could then be sent at step $t_{26}$ when this updated time window expires.

Alternatively and/or additionally to performing this self-monitoring, satellites 110 can be configured to perform neighborhood monitoring, where satellites 110 are operable to monitor some or all physically neighboring satellites in constellation. Through an ability to transmit and/or receive navigation signals, a consistency check based on in-situ measurements can be used to identify upsets on any one particular satellite or group of satellites to quickly resolve any issues and maintain integrity of the system. Each satellite 110 can be equipped to transmit and/or receive navigation signal 240 and the corresponding navigation message data through any link depicted in FIG. 2 to and/or from its neighbors both within its orbital plane, and/or in neighboring orbital planes, as depicted in the configuration in FIGS. 7A and 7B.

Figure 7B:
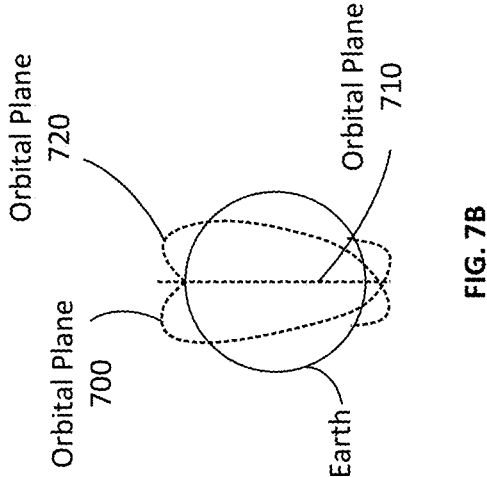
FIG. 7B is an illustration of orbital planes in accordance with various embodiments.
Figure 7A:
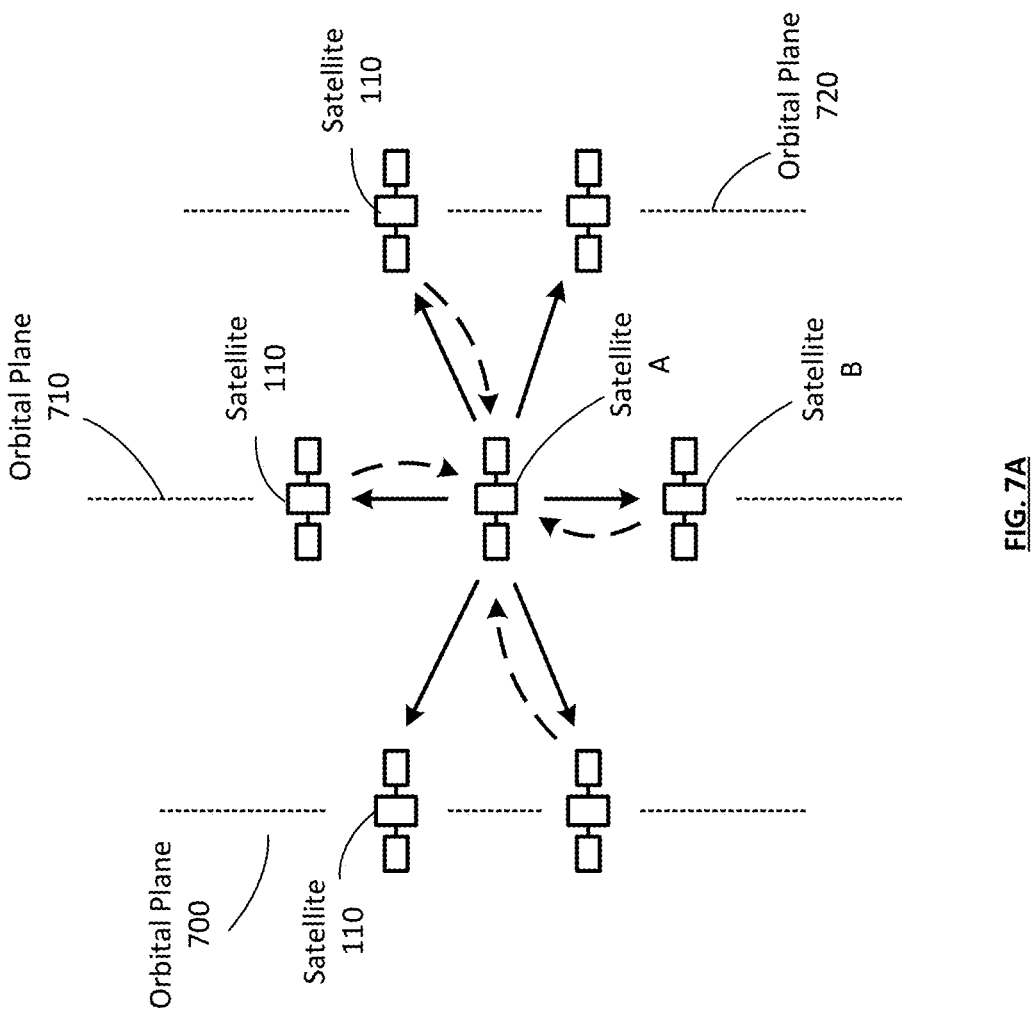
FIG. 7A is a schematic block diagram of satellites utilized to perform neighborhood monitoring in accordance with various embodiments.

FIG. 7A illustrates a two-dimensional depiction of a subset of the plurality of satellites 110, including satellite A and satellite B. This subset can constitute a "neighborhood" with respect to satellite A, where all satellites 110 are in view of satellite A and/or where satellite A can otherwise transmit and/or receive navigation signal 240 from its neighboring satellites. These neighboring satellites of satellite A can include satellites 110 on the same orbital plane 710 as satellite A, and can include one or more satellites on either side of satellite A along orbital plane 710. These neighboring satellites of satellite A can alternatively or additionally include satellites 110 on different orbital planes 700 and 720. As illustrated in the three-dimensional depiction of orbital planes 700, 710, and 720 with respect to earth of FIG. 7B, orbital planes 700 and 720 can be neighboring orbital planes of orbital plane 710. Some or all of the other satellites 110, such as satellite B, can have their own neighborhood of neighboring satellites, which can include a proper subset of the satellites 110 in the neighborhood of satellite A and/or can include at least satellite A.

In this example embodiment, navigation signal 240 contains both the ranging signal and data containing at least the navigation message data. However, in other embodiments, navigation signal 240 can contain only the ranging signal with each satellite either already knowing the navigation message data for its neighboring satellites and/or receiving the navigation message data through any combination of the links depicted in FIG. 2.

In the example embodiment depicted in FIG. 7A, the neighboring satellites (e.g. satellite B) to satellite A can compute the expected range measurement to satellite A as each satellite knows its own estimated state and can compute the expected state of satellite A using the corresponding navigation message data for satellite A. Satellite B can also compute the measured range using navigation signal 240 from satellite A. From these two ranges, an error metric can be computed (e.g. a range residual). If that error metric exceeds a given threshold, then satellite B can send a message, through any combination of the links in FIG. 2, to satellite A notifying satellite A that it may be broadcasting incorrect navigation message data. This notification can be in the form of a status message that can send a flag, the error metric data, and/or any data that can be used by Satellite A as a notification of possible error or other anomalies. If satellite A receive messages from more than a threshold number or percentage of neighboring satellites, satellite A can update its status information in the navigation message to notify users (including the neighboring satellites) that its navigation message data should not be trusted and therefore that the satellite should not be used. In addition to notifying satellite A, the neighboring satellites can also send error information that satellite A can use to verify and update its state estimate to correct for errors in the estimator, provided that each of the neighboring satellites are performing nominally.

Figure 7C:
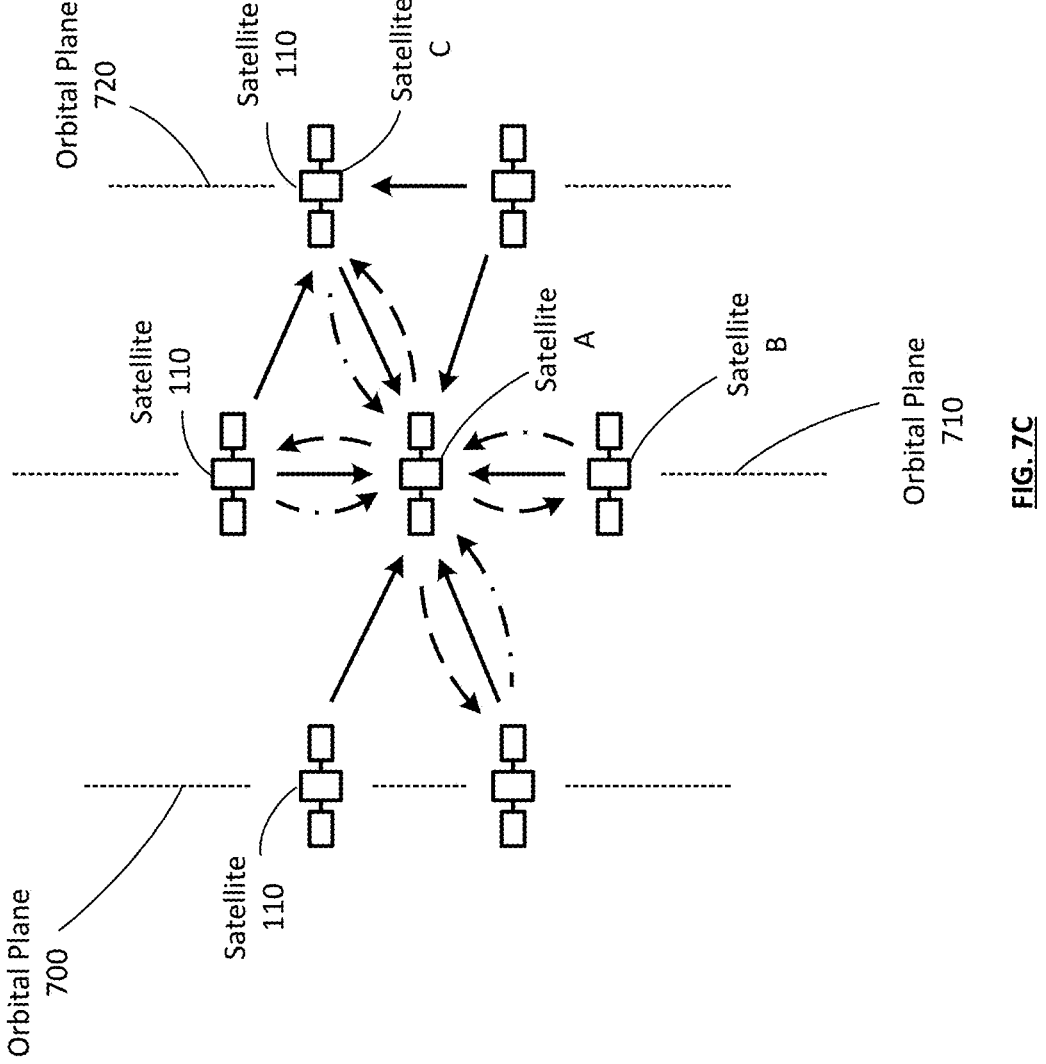
FIG. 7C is a schematic block diagram of satellites utilized to perform neighborhood monitoring in accordance with various embodiments.

FIG. 7C depict a further example case with a neighborhood of satellites on orbital planes 700, 710, and 720 of FIG. 7B. If Satellite A computes an error metric that exceeds a given threshold value to a number of neighboring satellites above a threshold number or percentage, it can either self-detect that it may have an error in its state estimate, and/or the neighboring satellites can alert Satellite A that Satellite A may have a problem. Satellite A can notify each of the neighbors that they may be wrong (e.g. Satellites B and C) in response to computing the error metric that exceeds a given threshold for these neighboring satellites. If the neighbors (e.g. Satellites B and C) have not received enough warning messages to put it over a threshold number or percentage, they can each respond to Satellite A indicating Satellite A may be the satellite in the neighborhood with an error.

Satellites 110, as part of satellite constellation system 100, can also adjust signal parameters, for example as described previously, for the purpose of improving the performance of the reception and/or use of navigation signal 240 by users in space and/or users on Earth. Trigger conditions for adjusting signal parameters (such as beamwidth, power levels, and/or other signal characteristics of interest) can include the following, alternatively or in addition to the trigger conditions discussed in previous sections:

Determining the location of satellite 110 above the Earth is, for example, over a major city or otherwise compares favorably to a location range for a trigger condition. As a result, satellite 110 can narrowing the beamwidth and/or increasing the signal power to aid in increasing the received signal strength of navigation signal 240.

Determining proximity and/or density of one or more satellites 110 in orbit (such as over the polar regions if the satellite orbits are polar orbits) that result in a very high density of transmissions of navigation signal 240. As a result, some or all satellites 110 can autonomously decide to turn off transmissions, for example based on remaining battery capacity and/or power margins left in satellites 110.

Determining other location based and/or monitoring based triggers that are deemed to affect the quality of navigation signal 240 received by users.

The setting of these parameters can be adjusted autonomously by satellites 110 by utilizing navigation processing system 300 based on information received from neighboring satellites and/or ground measurements, adjusted by a ground segment with a human in the loop and/or autonomously based on monitoring data of satellite constellation system 100, and/or can be configured before launch of the satellite and fixed for a given satellite 110 and given orbit.

In various embodiments, forces on the satellite can be calculated based on satellite orientation and precise measurements, which can be utilized to build an atmospheric density model. Many LEO satellites at lower altitudes feel forces due to atmospheric drag. While the upper atmosphere is very thin, it still provides an appreciable amount of force that eventually leads to the de-orbit of these satellites unless preventative measures are taken. While existing rough models can be used for the density of air in the upper atmosphere, it is known that this density is not temporally or spatially constant. Satellite constellation system 100 can be capable of taking precise GNSS measurements, as described in conjunction with FIGS. 5A-5C, and thus can have precisely known positions and velocities. Satellite 110 can also know its orientation (pose) precisely and can therefore calculate the expected forces due to solar and/or albedo radiation pressure, among other forces acting on the satellite. Once all other large orbital perturbations are taken into account, this information can be processed on board the satellite and/or on the ground and used to determine the magnitude of the atmospheric drag force acting on a given satellite 110. Once this drag force is calculated, the density of the atmosphere at these specific satellite 110 positions can be calculated. With a dense constellation of satellite 110 and this data from each satellite 110, models of the upper atmospheric density can be generated by either interpolating values spatially and/or temporally, or through other means. The resulting atmospheric density models can be used to help with on-orbit trajectory prediction for satellite 110 and/or any other satellite in similar orbits that are capable of receiving the atmospheric density model data. Additionally, these models can form the foundation for creating forecasts of upper atmosphere density.

In various embodiments, certain users can become nodes transmitting navigation signals to expand the network of satellite constellation system 100, giving rise to substantially more navigation signals and an improved service. These additional nodes can be implemented utilizing hardware and/or software of any of the client devices 160 discussed herein, for example, equipped with its own navigation processing system 300 and/or operable to perform some or all of the functionality of a satellite 110 as discussed herein. These additional nodes can be static, for example, fastened to infrastructure and/or otherwise installed in a particular constant and/or known location. These additional nodes can alternatively be mobile, for example, corresponding to a mobile device and/or vehicle with a changing location.

Similar to how orbit determination is performed in this navigation constellation scheme with satellites in low Earth orbit to deliver an additional navigation signal on the ground, all other aerial and ground receivers can employ the same precise positioning scheme and can in turn transmit similar navigation signals to create a much larger and more comprehensive navigation network. Each additional receiver works as a node in a more substantial network of navigation signals, aiding both in collaborative positioning and in current GNSS-challenged environment.

Employing similar estimation processes as satellites 110 from satellite constellation system 100, user devices or other devoted ground or aerial navigation nodes can create and/or transmit their own navigation signals. This gives rise to substantially more signals for more robust positioning in traditionally challenging GNSS environments. In one embodiment, these navigation signals can be nearly identical to those transmitted by satellites as part of satellite constellation system 100. In other implementations, different schema may be considered for specific applications or use cases. This may include the usage of different electromagnetic spectrum or other transmission modalities including but not limited to, optical and/or ultrasonic. This can also include a different number of transmission frequencies or signal modulations.

As an example, consider a dense urban environment with several aerial and ground-based robotic systems in operation. Aerial systems flying above buildings can utilize the line of sight signals to a combination of GNSS satellite and satellite constellation system 100 satellite navigation signals for precise and secure positioning. With its position solution computed, this aerial platform can broadcast its own navigation message, in much the same way as the satellites in satellite constellation system 100. This, along with aerial and other navigation nodes in the network, including potentially as stationary infrastructure, adds significant diversity in line of sight in urban canyons, substantially aiding ground vehicle navigation. For example, the top corners of certain tall buildings can be good candidates for infrastructure node locations, having a clear line of sight to the sky and the road below. To further aid in this problem, ground vehicles can broadcast their own navigation signals to improve collaborative localization at the street level where now relative range measurements help the multi-agent navigation system.

In various embodiments, the satellite constellation system 100 can provide secure data to its users. Current GNSS signals that are available for civilian use are broadcast unencrypted with known signal and data structures. This was pivotal in the global adoption of GNSS as the standard bearer for positioning, but as the number of those that depend on GNSS services has grown, the vulnerabilities of GNSS have become more apparent. GNSS being at such low power is often jammed unintentionally and since its signal structure is publicly available it is subject to malicious spoofing attacks.

The satellite constellation system 100 improves upon traditional GNSS services by performing full encryption of the spreading code along with the navigation data. In this case, there can be several channels that offer different data at different rates. This is accomplished using a combination of code shift keying along with encrypted data modulated at a lower rate. Where appropriate, the data is encoded using a Low Density Parity Check scheme that allows for forward error correction, enabling the satellites to deliver data to ground users at a high, robust data rate.

The encryption keys can be locally stored in memory of client devices 160, for example, in some manifestation of tamper-resistant hardware within the receiver utilized by some or all client devices 160 to receive navigation signals 240 from satellites 110. Each client device's key can be leaf that belongs to a layered Merkle-Damgard tree, giving this satellite constellation system 100 the ability to provide service to any number of client devices 160 while denying service to anyone who breaks the terms of service. These keys can be changed collectively at predetermined intervals that allow for a subscription plan alongside permanent users. These changeovers can be carried out using secure one-way functions.

There can be several acquisition methods for the encrypted signal. Any client devices 160 with preexisting knowledge of their location and time within reason can carry out direct acquisition of the signal using a parallel search strategy. All other client devices 160 can directly acquire these signals as the required computational resources are available to them. Once a single satellite from the constellation has been acquired, a coarse almanac is recovered that allows the user to find any other satellites that may also be in view along while anticipating the satellites that will soon be in view.

With a single satellite in view, a client device 160 in a known location can have secure knowledge of their time. Likewise, any users that know 3 out of 4 position domain parameters (latitude, longitude, height, clock-bias) can securely determine the fourth with this satellite system. In a secure time example, a receiver is surveyed and has a known latitude, longitude, and height. In order to provide a secure timing service, the receiver need only acquire a single satellite signal. The pseudo range calculated from the user to the satellite can be subtracted by the predicted range to the satellite knowing the surveyed receiver location. The clock bias can be calculated from this difference. Since the signals and data are encrypted, the user can trust that the signal came from a trusted satellite in this constellation and thus the clock bias calculation can be trusted. With four satellites in view, an unambiguously secure position and time solution can be solved for using these satellite signals.

Application data corresponding to a secure service of the satellite constellation system 100 can be stored in at least one memory of the client device 160. For example, the application data can be received by the client device 160 for download from a server system associated with the satellite constellation system 100 via network 250 and/or can be received in a signal transmitted by a satellite 110. When this application data, and/or other executable instructions stored in memory of the client device 160, are executed by at least one processor of the client device 160, this can cause the client device 160 to securely obtain and/or update their key, to utilize their key to securely determine their position and/or time based on encrypted signals received from satellites 110, and/or to utilize their key to confirm authenticity of received signals as being transmitted by received from satellites 110 as opposed to a spoofing entity.

In various embodiments, the satellite constellation system 100 can be operable to perform space-based GNSS Constellation Monitoring. A GNSS satellite fault can produce serious positioning errors if incorporated into a calculated position. In order for GNSS signals to be incorporated in safety-critical applications, such as aviation, their performance must be constantly monitored for such fault events. Many receivers used in these applications incorporate autonomous monitoring techniques such as Receiver Autonomous Integrity Monitoring (RAIM) to detect and exclude signals that may be faulty, but autonomous integrity techniques for receivers using code-phase positioning have severe limitations in that they cannot easily observe some satellite faults. These techniques may be enough to ensure that the true position is within one-third of a mile from the calculated position, but in order to obtain tighter bounds, also known as protection levels, on true position, local or wide area monitoring techniques must be employed. Satellite monitoring can be accomplished through systems known as Satellite Based Augmentation Systems (SBAS). In existing systems, reference stations in a region of interest can use these measurements to estimate the different error sources that may be present. These error estimates are then passed to central processing facilities where they are then then broadcast to users via a satellite link from a geostationary satellite. These systems are able to detect satellite faults and broadcast alerts to users, for example, within 6 seconds of the beginning of such faults.

Similar GNSS satellite fault monitoring can be carried out by satellite 110 in LEO when satellite 110 is using carrier phase precise positioning techniques, such as described in conjunction with FIGS. 5A-5C. Autonomous integrity monitoring techniques can be utilized to achieve precise protection levels, for example, by calculating position solutions using subsets of GNSS satellites running in parallel. For instance, if there are N satellites in view, there are N+1 position solutions calculated for the case that one GNSS satellite is excluded. These solutions are compared with each other in order to derive protection levels for the calculated position. If a single GNSS satellite is faulted, all N+1 solutions will begin to deviate from the true position except for the subset solution that has excluded that GNSS satellite. If the solutions become separated by an amount set by a threshold, then it can be determined that there is a fault in the GNSS signal emanating from the GNSS satellite. By computing these subsets and comparing the solutions to a given threshold, satellite 110 can know that a GNSS satellite was producing a faulty measurement if the solutions separated by more than the given threshold and can then transmit alert information for the faulted GNSS satellite.

A single satellite 110 in LEO can use the above method to detect a faulty GNSS measurement. Satellite constellation system 100 can have multiple satellites 110 in view of the same faulted GNSS satellite. Because of this, there will be larger observability of such a GNSS satellite fault and this will allow all satellite 110 observing the faulted GNSS satellite to form a consensus and thus have higher confidence in a decision to alert users. This technique differs from existing services in that all current GNSS satellite health monitoring is carried out by terrestrial reference stations whereas this provides a satellite-based solution that carries out this task autonomously. Satellite constellation system 100 can also be capable of transmitting alerts via navigation messages or other alert data to users in the event that there is an observed GNSS satellite fault through any combination of links in FIG. 2.

Beyond GNSS faults, satellite constellation system 100 can also transmit parameters describing the performance of the GNSS satellites. Satellite constellation system 100 can provide multiple simultaneous precise observations of the GNSS satellites using the methods outlined above. These observations can then be compiled and transmitted as corrections and confidence parameters to be used by GNSS receivers.

By utilizing satellites 110 in this fashion to detect GNSS faults and/or to determine parameters describing the performance of the GNSS satellites for transmission, GNSS systems can be monitored entirely in space. This presents an improvement to existing systems by facilitating this GNSS monitoring without any dependence on ground-based reference stations or ground based central processing facilities. Existing systems are further improved due to the better geometry, higher signal strength, and greater number of satellites more satellites in view as a result of utilizing the satellites 110 rather than ground-based facilities.

Figure 8B:
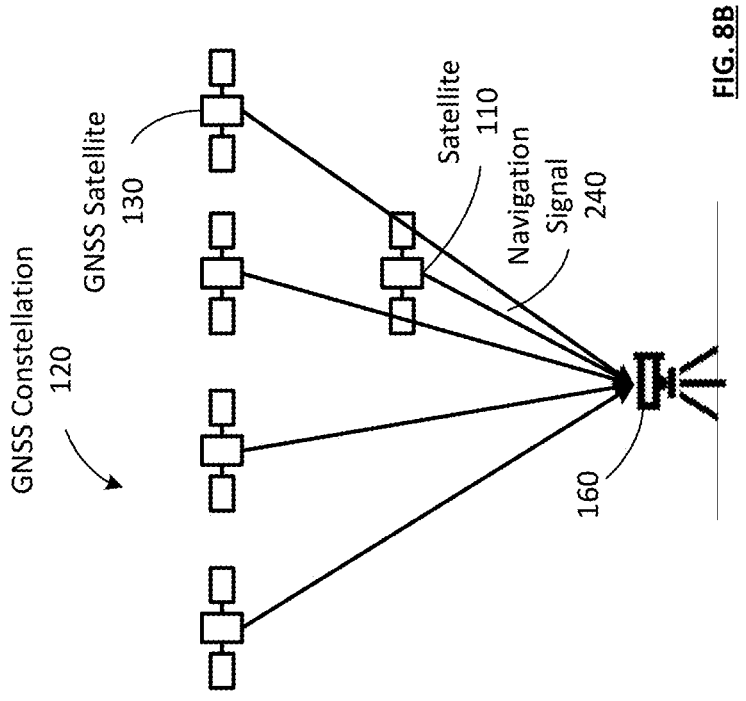
FIGS. 8A-8F are schematic block diagrams illustrating utilization of satellite constellation system by various client devices in accordance with various embodiments.
Figure 8A:
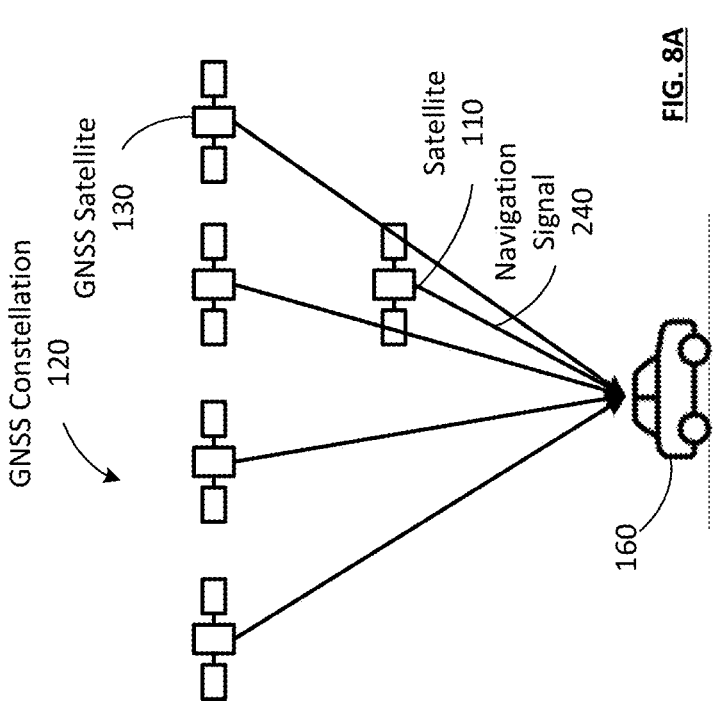
Figure 8C:
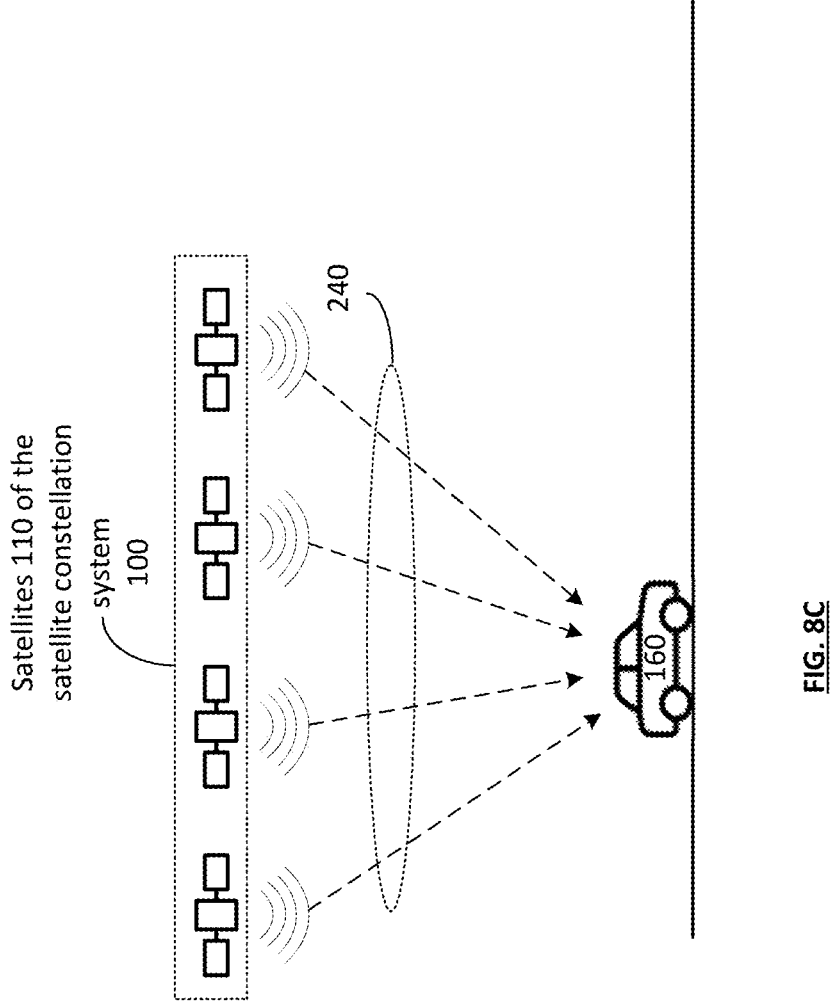

FIGS. 8A, 8B, and 8C illustrate the service levels available to ground and/or aerial users as a function of the number of satellites 110 in view from satellite constellation system 100. FIG. 8A shows the scenario with one satellite 110 in view with a client device 160 corresponding to a mobile user such as a vehicle. When used in conjunction with GNSS satellites, satellite 110 can provide data to increase the precision of GNSS. Satellite 110 further adds a navigation signal to provide additional range and range rate information. The rapid geometry change associated with satellite 110 allows for fast initialization of precise positioning. Hence, this augments GNSS, improving precision. FIG. 8B shows the case for a client device 160 corresponding to a static user with one satellite 110 in view. In this case, because the position of static user is known, satellite 110 provides a secure source of timing information when the navigation signal is provided with encryption, which can be used without GNSS.

FIG. 8C shows the scenario where satellite constellation system 100 has sufficient satellites such that four or more satellites 110 are in view to the client device 160, such as the automobile represented. In this scenario, a sufficient number of independent navigation signals 240 from satellite constellation system 100 are available such that a highly precise can be supported by exclusive use of navigation signals 240, and/or such that highly secure position solution with full encryption can be supported when navigation signals are provided with encryption.

The various functionality of the satellite constellation system 100 discussed can be utilized to implement one or more other applications. For example, satellite constellation system 100 can be utilized by maritime systems, where one or more client devices 160 is onboard and/or otherwise corresponds to one or more boats or other maritime systems. Satellite constellation system 100 can provide precision positioning to maritime systems, which can be utilized by the maritime systems for mapping, ice navigation, ice routing, and port operation. The precise position information can further be shared with neighboring maritime systems to improve maritime situational awareness. This can greatly improve the safety of these systems (e.g. in bad weather) due to the much better precision (especially in the arctic where signals 132 are harder to receive) if that information is shared between different ships, or between static maritime elements (e.g. lighthouses) and ships. Authentication and/or encryption can be utilized to protect against GNSS spoofing. Position security provided satellite constellation system 100 by can be utilized by maritime systems for asset tracking, for example, to be utilized by autonomous or highly automated ships that operate without a crew onboard. Boats and/or other maritime systems can thus be implemented as client devices 160.

Alternatively or in addition, satellite constellation system 100 can be utilized by banking systems or other entities to perform transaction authentication. Location-based security can be provided for entities that perform financial transactions and/or other transactions. For example, position security can be used as a form of two step authentication in banking and other password-protected critical functions. This can also be utilized by voting systems to provide protection against voter fraud in elections. ATM machines, voting machines, and/or other equipment utilized to perform secure transactions can be implemented as client devices 160.

Alternatively or in addition, satellite constellation system 100 can be utilized to enable infrastructure time synchronization. Satellite constellation system 100 can provide an additional source of secure timing to infrastructure systems that provide timing. Client devices 160 across different infrastructure entities can be utilized to synchronize timing across power stations, data centers, telecommunications hubs, cellular towers, financial institutions and/or other critical infrastructure.

Alternatively or in addition, satellite constellation system 100 can be utilized as a source for timing traceability for financial transactions. Satellite constellation system 100 can provide an additional source for timing traceability required for proof-of-payment systems and applications that require accurate and reliable timing traceability. For example, transactions on the New York Stock Exchange require timing traceability for legal purposes. Timing for these transactions is typically traced through GPS measurements to national timing centers like those managed at the USNO. Measurements taken from a client device 160 using the satellite constellation 100 can aid or replace these methods of timing traceability.

Alternatively or in addition, satellite constellation system 100 can be utilized in supply chain management to provide secure tracking of individual shipping containers, packages, vehicle assets, and/or vessel assets, allowing management with finer granularity and/or confirmation of arrival at destination. The individual shipping containers, packages, vehicle assets, and/or vessel assets can be implemented as client devices 160 and/or can be coupled to client devices 160 to enable the secure tracking of these assets by an entity that owns these assets or otherwise oversees the transportation and/or delivery of and/or by these assets.

Alternatively or in addition, satellite constellation system 100 can be utilized in surveying and/or mapping. In particular, satellite constellation system 100 can be utilized to provide precision, integrity, and/or security while enabling high definition mapping for autonomous or highly automated applications and/or safety critical applications. Surveying and/or mapping equipment can be implemented as client devices 160.

Alternatively or in addition, satellite constellation system 100 can be utilized by autonomous or highly automated road vehicles. Autonomous or highly automated road vehicles require high integrity (safety-critical), precise, and secure positioning, as provided by the satellite constellation system 100. Autonomous or highly automated road vehicles can be implemented as client devices 160, and satellite constellation system 100 can enable geofencing, lane determination, and vehicle control of the autonomous or highly automated road vehicles.

Alternatively or in addition, satellite constellation system 100 can be utilized by autonomous or highly automated mobile robotic platforms. The satellite constellation system 100 can provide location precision and/or security for mobile robotic platforms targeted at the movement/delivery of goods within small areas, shipping yards, or cities, where the autonomous or highly automated mobile robotic platforms are implemented as client devices 160.

Alternatively or in addition, satellite constellation system 100 can be utilized by autonomous or highly automated aerial vehicles, urban air mobility vehicles, drones, and/or UAVs. Autonomous or highly automated aerial vehicles require high integrity (safety-critical), precise, and secure positioning, as provided by the satellite constellation system 100. Autonomous or highly automated road vehicles can thus be implemented as client devices 160. The satellite constellation system 100 can enabled services such as autonomous or highly automated navigation and management of the airspace, and/or full automated takeoff, taxi, and landing.

Alternatively or in addition, satellite constellation system 100 can be utilized in asset tracking and/or Fleet Tracking. This can include the tracking of assets such UAVs, truck and vehicle fleets, as well as bike, scooter, and/or other 'last mile' device services. These assets can thus be implemented as client devices 160. Precision and security is required for utilization of these services, for example to unlock a bike at a given depot and/or to return the user's deposit upon return of the asset.

Alternatively or in addition, satellite constellation system 100 can be utilized by transportation services. In ride sharing scenarios, the satellite constellation system 100 provides both precision and security. Precision is needed to aid in passenger-vehicle pairing where, especially in a robo-taxi environment, precise navigation is required to correctly determine the vehicle in question. Furthermore, location security prevents drivers from spoofing rides or misleading customers and similarly prevents riders from misleading drivers (or robo-taxis) in terms of pick up location. Thus, these vehicles can be implemented as client devices 160.

Alternatively or in addition, satellite constellation system 100 can be utilized in robotic Agriculture. The agricultural industry pioneered precise GNSS corrections for machine control and it is still the primary sensor for localization in featureless environments, e.g. an open field. Currently, tractors require a driver, but as they become more autonomous or highly automated, a driver may no longer be present and security in positioning will be critical. Other robotic platforms in agriculture may include UAVs, mobile robotic platforms with wheels, legs, tracks, and/or articulated manipulator arms. Thus, some or all of this agricultural equipment can be implemented as client devices 160.

Alternatively or in addition, satellite constellation system 100 can be utilized in the Internet of Things (IoT) and/or 'Big Data' Security. As IoT devices become more prevalent, tying data to the world in a geospatial sense, the criticality of this data will increase. Even if stationary, as a periodic security check, devices of an IoT network can check its location, perhaps even indoors, to verify the installation location has not been tampered with, inadvertently or otherwise. Thus, IoT devices can be implemented as client devices 160.

Alternatively or in addition, satellite constellation system 100 can be utilized in insurance entities. For example, as autonomous or highly automated system interaction increases, who is responsible for what will become more important, and secure geolocation will be critical in resolution.

Alternatively or in addition, satellite constellation system 100 can be utilized in environmental monitoring, as discussed herein. Through radio occultation data, improved spatial and temporal resolution of atmospheric maps can be built for improving scientific models as well as weather prediction models.

Figure 8E:
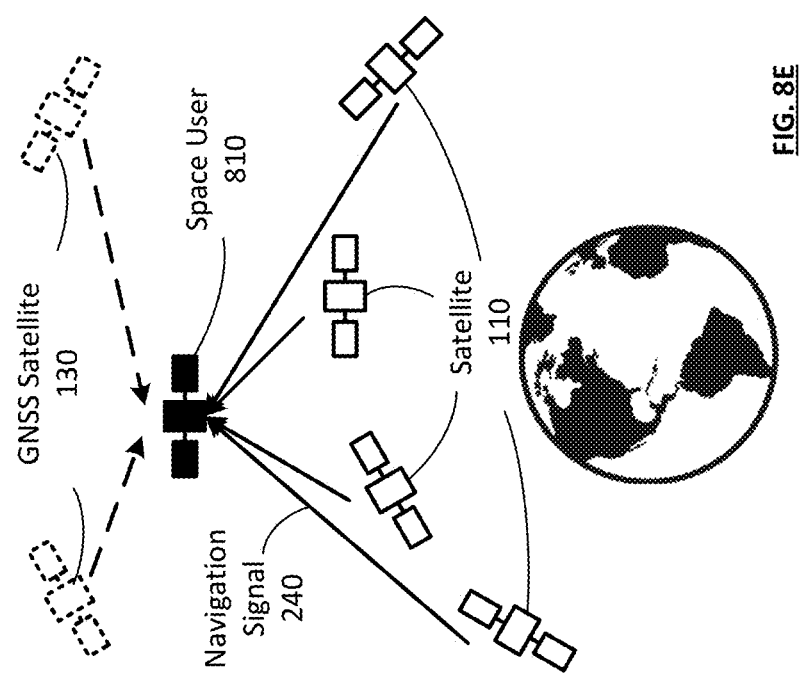
Figure 8D:
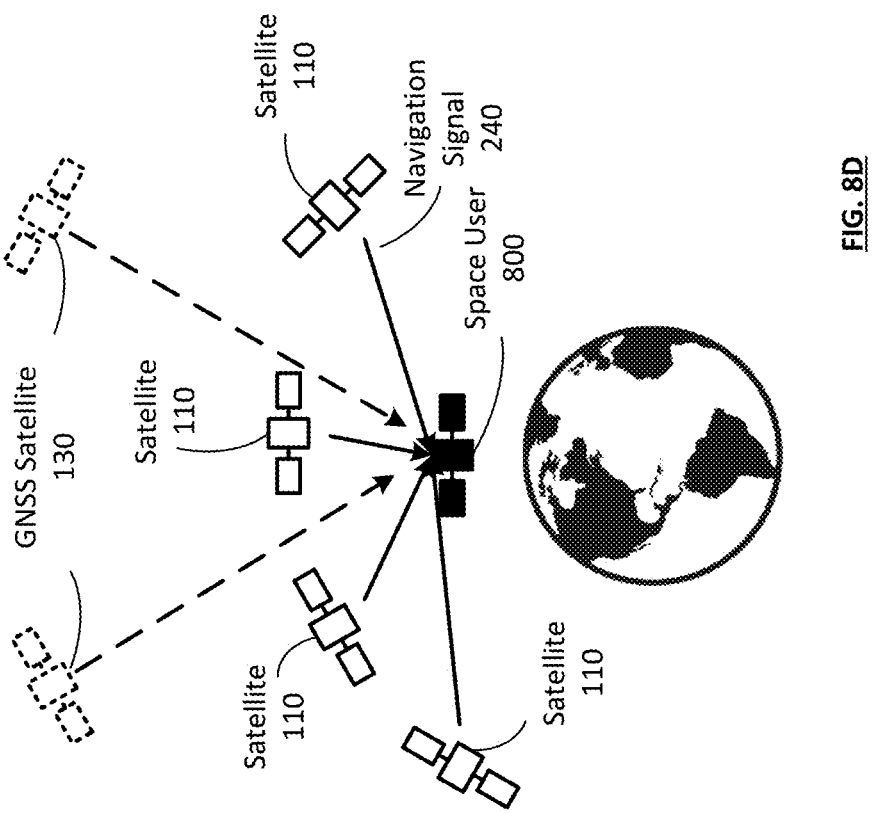

Alternatively or in addition, satellite constellation system 100 can be utilized in various space applications, as illustrated in FIGS. 8D and 8E. Client device 160 can be implemented by space-based devices, such as space user 800 and space user 810. Users in orbit at altitudes both higher (Space User 810) and lower (Space User 800) than the satellite constellation system 100 can utilize satellite constellation system 100, either in conjunction with GNSS or independently as shown by FIG. 8D and FIG. 8E, to obtain a secure and/or precision location for use in orbit determination. The beamwidth of navigation signal 240 can be designed and/or adjusted to be an omni-directional signal to enable users higher than satellite constellation system 100 and/or multiple antennas onboard satellite 110 can support transmitting navigation signal 240 with a more directional beamwidth pointed in various directions.

Figure 8F:
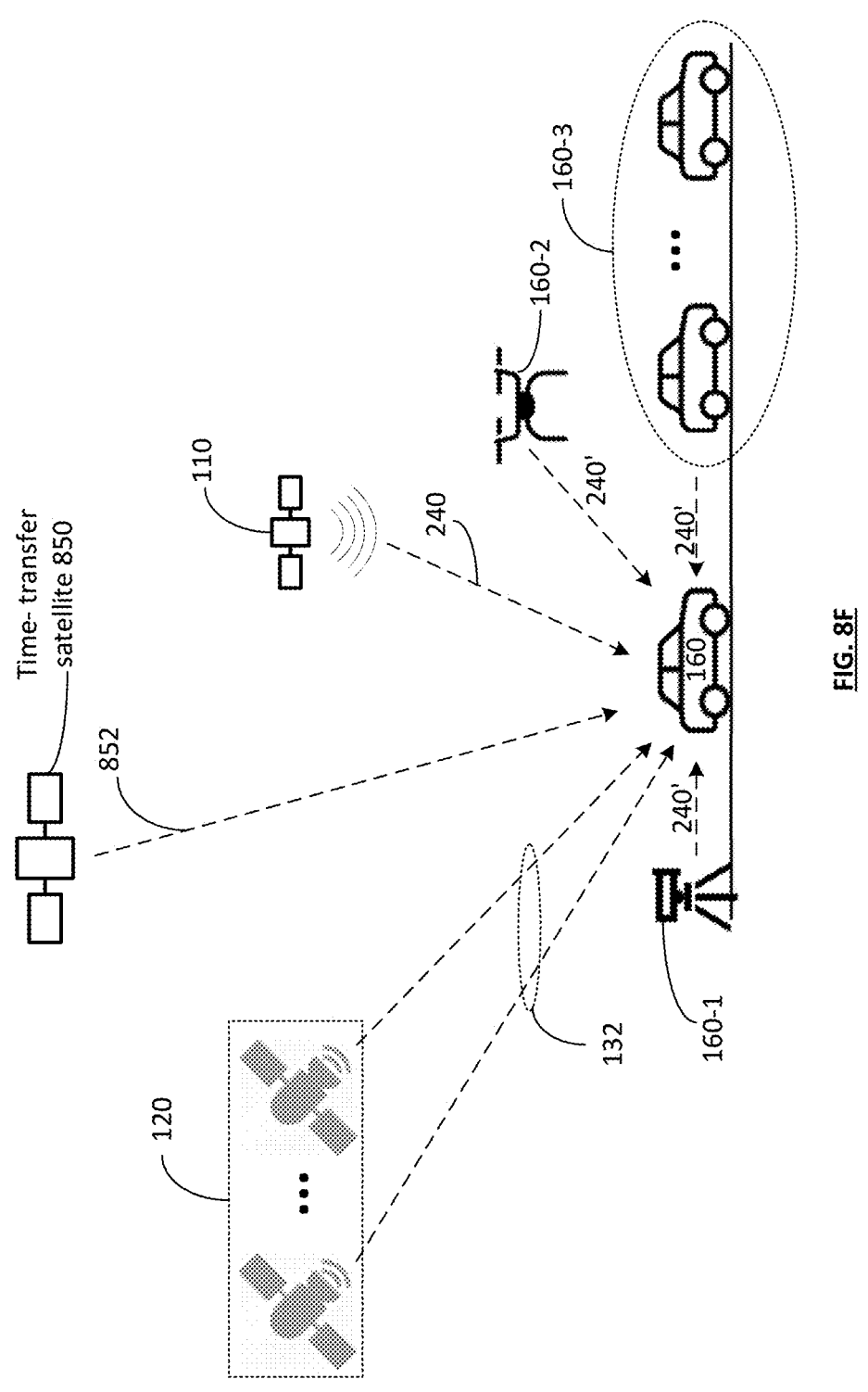

FIG. 8F presents another scenario with one satellite 110 in view with a client device 160 corresponding to a mobile client device such as a vehicle. When used in conjunction with GNSS satellites of constellation 120, satellite 110 can provide data to increase the precision of GNSS signaling 132. As previously discussed, satellite 110 further adds a navigation signal 240 to provide additional range and range rate information. The rapid geometry change associated with satellite 110 allows for fast initialization of precise positioning.

In this example, however, additional navigation signals 240' are received from a ground station 160-1 such as a terrestrial navigation station, an aircraft, such as UAV 160-2, and one or more other vehicles 160-3. In various embodiments, the navigation signals 240' are formatted similarly to the navigation signal 240 and further augment GNSS accuracy, improving precision in the position, navigation and timing of the mobile device 160. Furthermore, the presence of many vehicles 160-3 in close proximity, each of which is determining its position on a precision basis provides the vehicles the opportunity to operate in a mesh navigation network to share their positions and collectively enhance the accuracy of position, navigation and/or timing as a group. Furthermore, sharing of the navigation messages 240' in such a mesh network configuration can be used to identify, model the signal characteristics of, and track, a mobile jammer in proximity to the client devices 160-1, 160-2 and 160-3. In various embodiments, the client devices 160-1, 160-2 and/or 160-3 respond to stored user preferences that indicate, for example, whether or not a user of the corresponding device opts-in or opts-out of the generation of its own navigation messages 240'.

As further illustrated, a time-transfer satellite 850 is provided that transmits a secure timing signal 852, such as an encrypted signal or other secure signal that provides a ground truth timing reference. The time-transfer satellite 850 can be implemented via a special satellite dedicated to the purpose. Consider a spoofing scenario where one or more spoofing stations capture and repeat valid signals 132 and/or 140. The secure timing signal 852 can be used by the client device 160 to detect the spoofing stations by determining that the timing in the signals 132 and/or 140 repeated by these stations varies from the ground truth timing of the secure timing signal 852 by more than some acceptable timing threshold.

In a further example, the time-transfer satellite 850 can be implemented via one or more other satellites 110 that has been dedicated to this purpose via command and control signaling sent via inter-satellite links 230. The role of time-transfer satellite 850 can be assigned to any of the satellites 110, based on the memory usage of the satellite; the memory usage other satellites; the distance between the satellite and a backhaul receiver; the battery level of the satellite; a difference between the battery level of the satellite and the battery level other satellites; an estimated time that the satellite can generate more power; an estimated time that other satellites can generate more power; atmospheric data that indicates atmospheric conditions; and/or other state of the particular satellite, particularly when compared to the state or states of the other satellites 110.

Consider another example where integrity monitoring of the LEO constellation 100 determines that one or more particular satellites 110 are no longer capable of generating accurate orbital positioning. The role of these particular satellites 110 can be relegated to the reduced functionality of providing the secure timing signal 852.

Figure 9A:
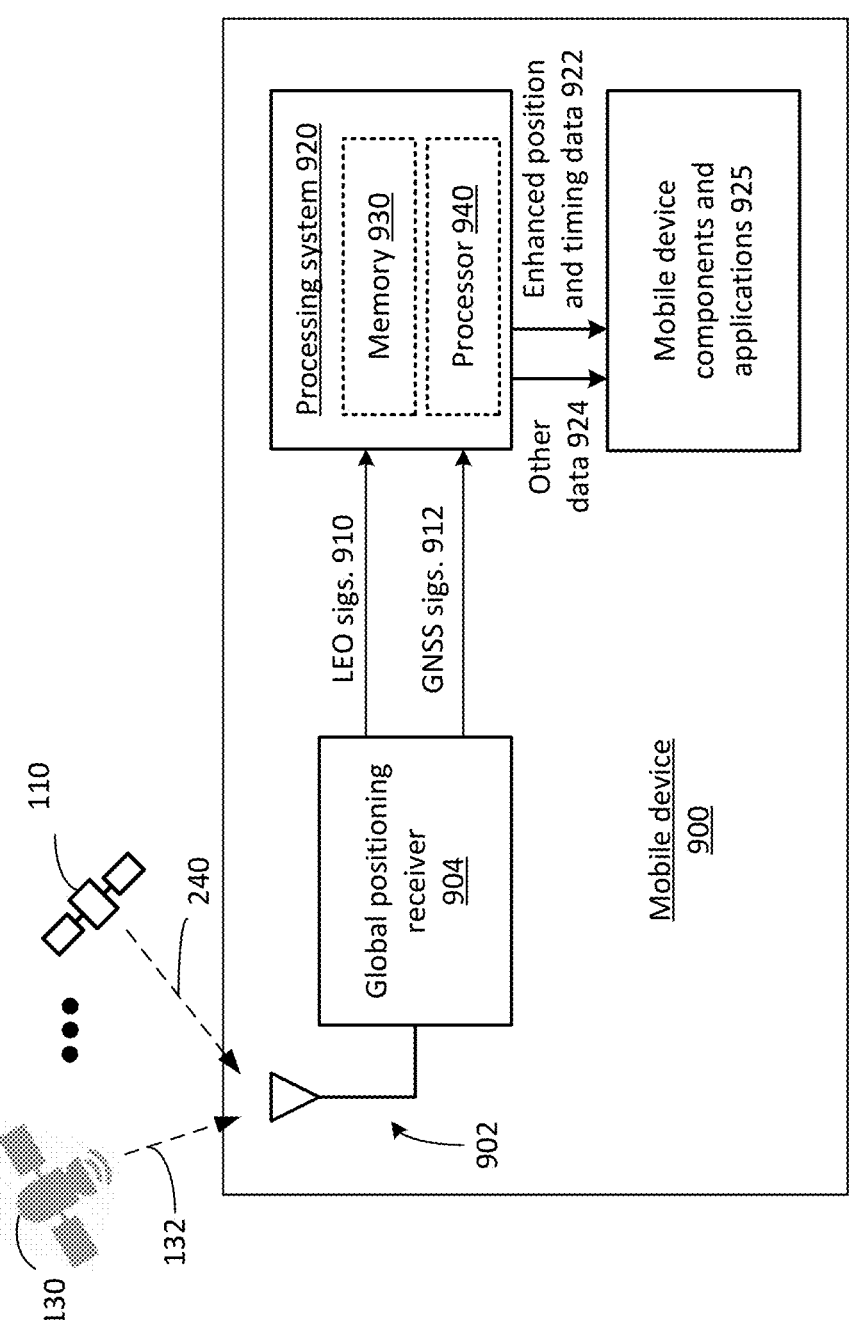
FIG. 9A is a schematic block diagram illustrating an example client device in accordance with various embodiments.

FIG. 9A is a schematic block diagram illustrating an example client device in accordance with various embodiments. In particular, a mobile device 900 is presented that includes a global positioning receiver 904 having an antenna 902, a processing system 920 having a memory 930 and one or more processors 940 and further having additional mobile device components and applications 925 that round out the specific functionality of the mobile device. For example, the mobile device 900 can be an automobile, a tablet, a smartphone, a smartwatch, a laptop computer, another mobile computer or computer system, a navigation device, a device location system, a weather system, a marine navigation system, a rail navigation system, an aircraft, an agricultural vehicles, a surveying system, an autonomous or highly automated vehicle, a UAV or other mobile device that operates by generating timing, navigation and/or positioning.

In various embodiments, the global positioning receiver 904 includes an RF section configured to receive signals 132 in one or more frequency channels from Global Navigation Satellite System (GNSS) satellites 130 of a GNSS constellation 120 and to downconvert these signals to GNSS signals 912, each having a ranging signal containing clock information and ephemeris information for each of the GNSS satellites 130 in range. Similarly, the RF section is configured to receive one or more navigation signals 240 in one or more frequency channels from satellites 110 of constellation 100 and to downconvert these signals to LEO signals 910, each having a ranging signal containing a navigation message that includes clock information and ephemeris information for each of the satellites 110 in range. In addition, the navigation message can contain correction data associated with the GNSS satellites 130, such as PPP correction messages, other clock and orbital correction data, constellation integrity information relating to the health of one or more satellites 110 and/or constellation integrity information relating to the health of one or more satellites GNSS satellite 130. Furthermore, the LEO signals 910 can contain other data contained in the navigation signals 240 including, for example, command and control data, RO data, atmospheric or weather data, secure clock data, encryption and security information, and/or any of the other types of data produced or transmitted by the satellites 110 as discussed herein.

The processing system 920 is configured to generate enhanced position and timing data 922 based on the GNSS signals 912 and/or the LEO signals 910 for use by the mobile device components and applications 925 that use such information, for example, for precision position, navigation and timing. In addition, the other data 924 can be demodulated, or otherwise extracted, from the LEO signals 910 by the processing system 920 that includes, for example, command and control data, RO data, atmospheric or weather data including a current weather state, a weather map and/or a predictive weather model, secure clock data, encryption and security information, any of the other types of data produced or transmitted by the satellites 110 or can be generated by the processing system 920 based on the navigation signals 240 and/or the signals 132. In various embodiments, the constellation integrity information is used by the processing system 920 to exclude or otherwise ignore signals 132 and/or navigation signals 240 that correspond to satellites that have been identified as faulty.

The operations of the processing system 920 can further include, for example, locking-in on the timing of the ranging signals via the associated pseudo random noise (PRN) codes associated with each satellite 110 and 130 (that is not excluded), demodulating and decoding the ranging signals from the GNSS signals 912 to generate and extract the associated navigation messages from the GNSS satellites 130 in range of the receiver, demodulating and decoding navigation messages contained in the ranging signals of the LEO signals 910 to extract the precise position and timing data associated with each satellite 110 along with the correction data for the GNSS signals 912, and applying the correction data and atmospheric data to the position and timing information from the navigation messages from the GNSS satellites 130. In various embodiments, the first-order ionospheric delay is mitigated using the combinations of dual-frequency GNSS measurements. Otherwise, ionospheric and tropospheric delay can be corrected using atmospheric models generated based on the RO data. Furthermore, the processing system 920 can use closed loop state estimation techniques such as a Kalman filter, extended Kalman filter or other estimation technique where, for example orbital position, clock error, ionospheric delay, tropospheric delay and/or carrier-phase errors are estimated states. The precise position of the generate enhanced position and timing data 922 can be generated by positioning calculations that employ navigation equations to the orbital positions and timing for each of the satellites 110 and 130.

It should be noted, that when encryption is employed to the navigation signals 240, decryption can be employed by the global positioning receiver 904 and or the processing system 920 in order to securely lock on to the ranging signal and/further to extract the data therefrom.

Consider the following example. The global positioning receiver 904 receives navigation signals 240 that includes a navigation message from at least one satellite 110 containing correction data associated with a non-LEO constellation of satellites, such as non-LEO satellites 130. The global positioning receiver 904 also receives signals 132 from the non-LEO satellites 130. One or more processors 940 is configured to execute operational instructions that cause the processor(s) to perform operations that include: applying the correction data to the signals 132 to generate corrected signaling; and generating enhanced position data corresponding to a position of the mobile device based on the navigation message and the corrected signaling. In this fashion, PPP correction messages, other clock and orbital correction data, constellation integrity information relating to the health of one or more satellites 110 and/or constellation integrity information relating to the health of one or more satellites GNSS satellite 130 can be used be used to generate more precise position, navigation and timing from the signals 132 received from satellites of the non-LEO constellation and further based on the timing signal and the orbital position associated with the satellite 110.

Consider a further example. The global positioning receiver 904 receives navigation signals 240 that include navigation messages from four or more satellites 110. One or more processors 940 is configured to execute operational instructions that cause the processor(s) to perform operations that include: generating enhanced position data corresponding to a position of the mobile device based on the navigation messages. In this fashion, navigation messages that may include constellation integrity information relating to the health of one or more satellites 110 can be used be used to generate more precise position, navigation and timing based on the timing signals and the orbital positions associated with the satellites 110.

Figure 9B:
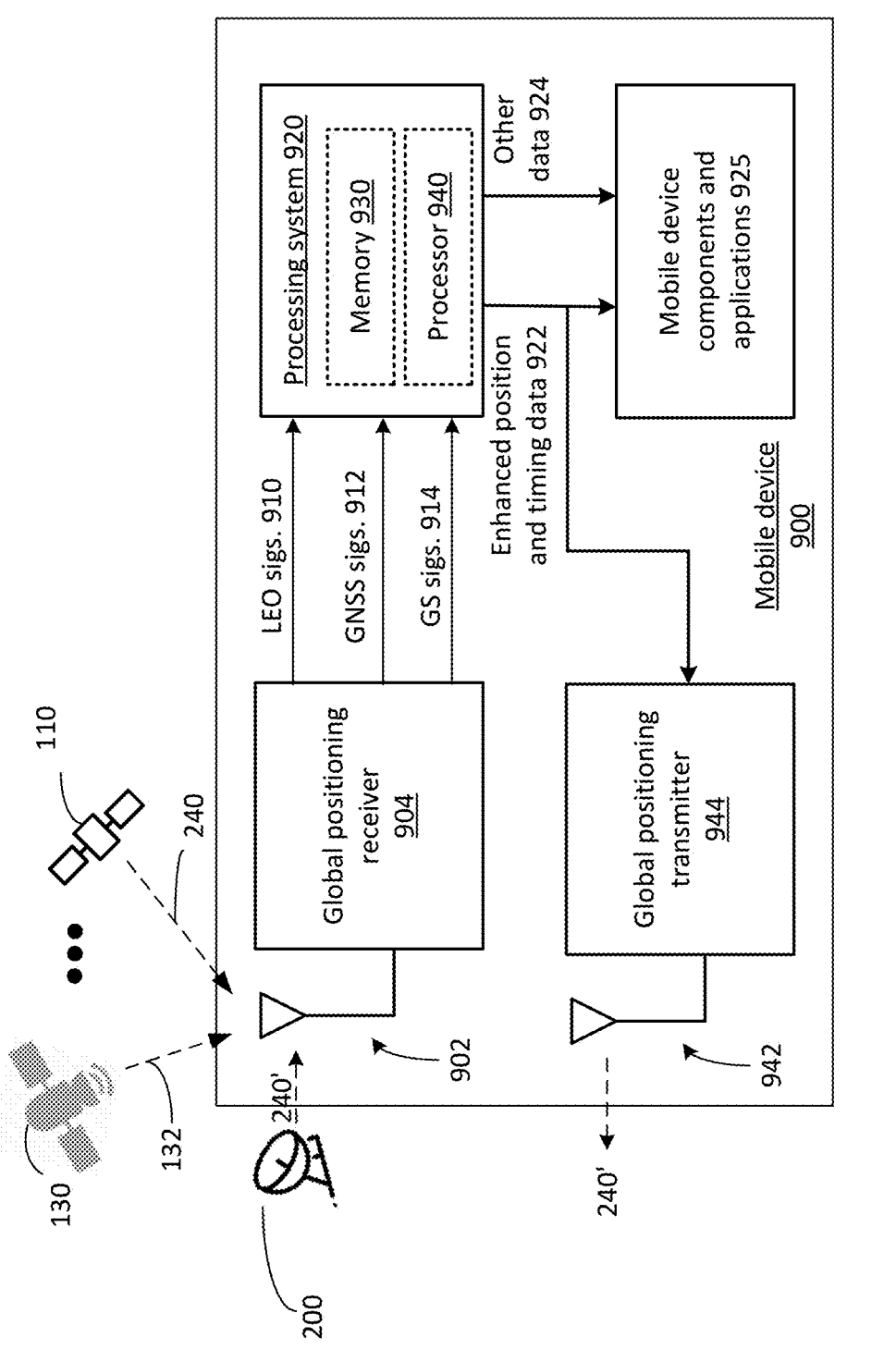
FIG. 9B is a schematic block diagram illustrating an example client device in accordance with various embodiments.

FIG. 9B is a schematic block diagram illustrating an example client device in accordance with various embodiments. In particular, another mobile device 900 is presented that includes many common elements of presented in conjunction with FIG. 9A that are referred to by common reference numerals. In this example, however, an additional navigation signal 240' is received from a ground station 200 and/or 201 such as a terrestrial GPS station, terrestrial station implemented as a node of the satellite constellation system 100, or other ground station that provides a source of a navigation signal 240'. The navigation signal 240' reside in one of the frequency channels of navigation signal 240. Other frequency channels can likewise be employed to avoid interference with navigation signals 240 and/or signals 132.

In various embodiments, the navigation signal 240' is formatted similarly to the navigation signal 240 and the GPS receiver generates ground station (GS) signals 914 that can include any or all of the information contained in the LEO signals 910. The processing system 920 is configured to generate enhanced position and timing data 922 based on the GNSS signals 912, GS signals 914 and/or the LEO signals 910 for use by the mobile device components and applications 925 that use such information, for example, for precision position, navigation and timing. In addition, the other data contained in the navigation signals 240 and/or 240' is processed by the processing system 920 to generate other data 924 that includes, for example, command and control data, RO data, atmospheric or weather data, secure clock data, encryption and security information, any of the other types of data produced or transmitted by the satellites 110 or can be generated by the processing system 920 based on the navigation signals 240, 240' and/or the signals 132. In this fashion, the ground station 160-1 operates as an additional satellite with a fixed, and therefore, precise location.

As discussed in conjunction with FIG. 8F the navigation signals 240' can be generated by mobile client devices 160. Furthermore, the mobile device 900 can include a global positioning transmitter 944 that operates similar to the corresponding functionality of satellite 110 in generating its own navigation signal 240' that is transmitted via antenna 942. In various embodiments, the memory 930 includes stored user preferences that indicate, for example, whether or not a user of the mobile device 900 opts-in or opts-out of the generation of its own navigation messages 240'.

Figure 9C:
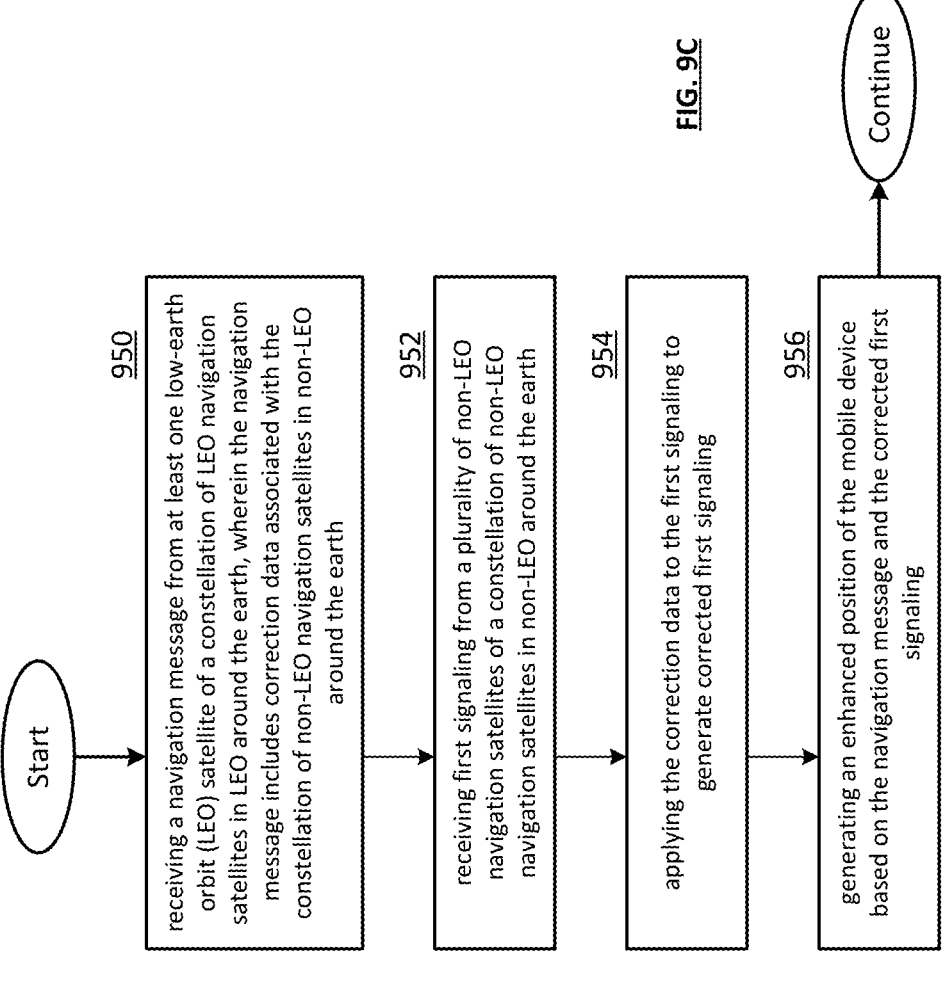
FIG. 9C is a flowchart diagram illustrating an example of a method in accordance with various embodiments.

FIG. 9C is a flowchart diagram illustrating an example of a method in accordance with various embodiments. In particular, a method is presented for use with one or more of the other functions and features discussed herein. Step 950 includes receiving a navigation message from at least one low-earth orbit (LEO) satellite of a constellation of LEO navigation satellites in LEO around the earth, wherein the navigation message includes correction data associated with the constellation of non-LEO navigation satellites in non-LEO around the earth. Step 952 includes receiving first signaling from a plurality of non-LEO navigation satellites of a constellation of non-LEO navigation satellites in non-LEO around the earth. Step 954 includes applying the correction data to the first signaling to generate corrected first signaling. Step 956 generating an enhanced position of the mobile device based on the navigation message and the corrected first signaling.

Figure 9D:
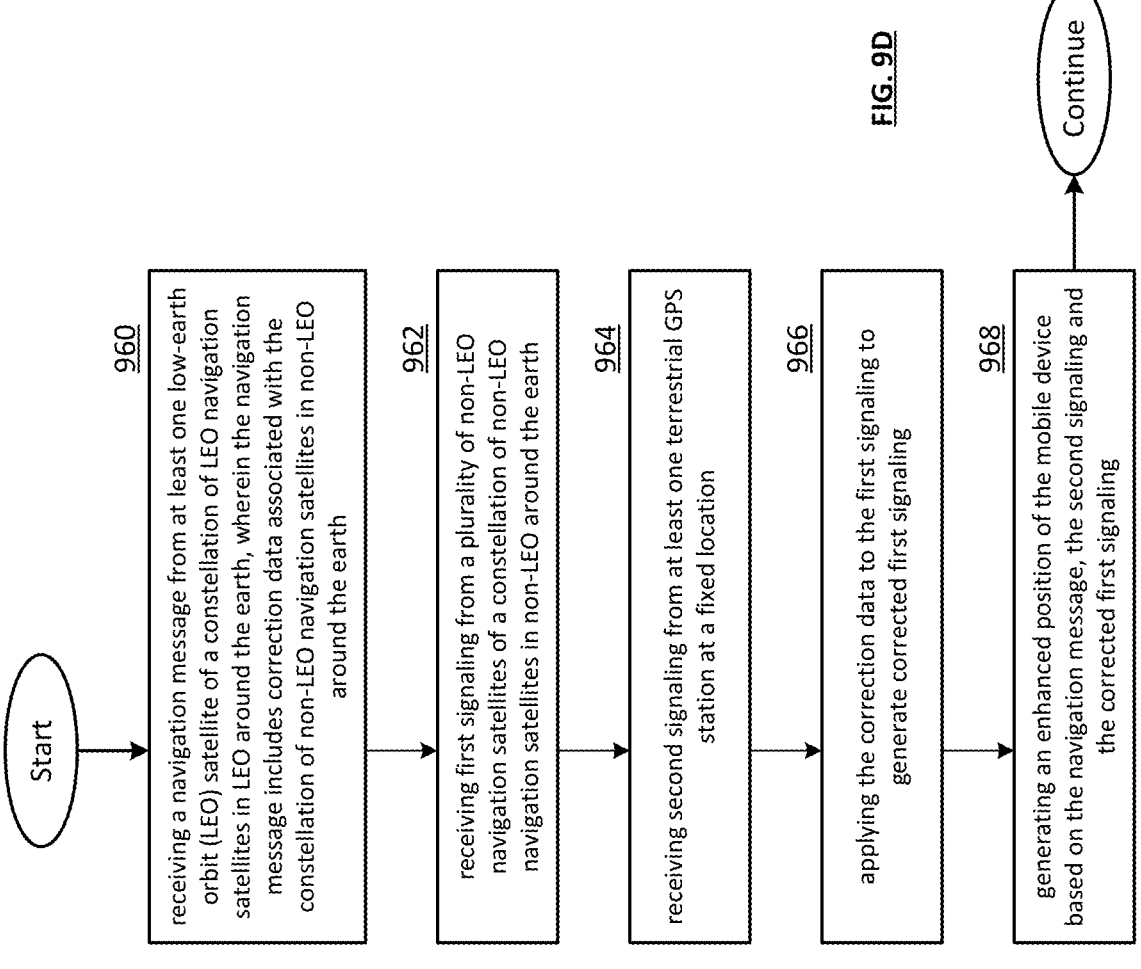
FIG. 9D is a flowchart diagram illustrating an example of a method in accordance with various embodiments.

FIG. 9D is a flowchart diagram illustrating an example of a method in accordance with various embodiments. In particular, a method is presented for use with one or more of the other functions and features discussed herein. Step 960 includes receiving a navigation message from at least one low-earth orbit (LEO) satellite of a constellation of LEO navigation satellites in LEO around the earth, wherein the navigation message includes correction data associated with the constellation of non-LEO navigation satellites in non-LEO around the earth. Step 962 includes receiving first signaling from a plurality of non-LEO navigation satellites of a constellation of non-LEO navigation satellites in non-LEO around the earth. Step 964 includes receiving second signaling from at least one terrestrial GPS station at a fixed location. Step 966 includes applying the correction data to the first signaling to generated corrected first signaling. Step 968 includes generating an enhanced position of the mobile device based on the corrected first signaling, the second signaling and the navigation message.

FIG. 10 illustrates an example embodiment of a flowchart illustrating an example of performing self-monitoring. In particular, a method is presented for use in association with one or more functions and features described in conjunction with FIGS. 1-8E, for execution by a navigation processing system 300 that includes a processor or via another processing system of satellite constellation system 100 that includes at least one processor and memory that stores instructions that configure the processor or processors to perform some or all of the steps described below.

Step 1002 includes receiving a first plurality of measurement data via at least one sensor onboard the satellite and/or at least one signal received via a receiver onboard the satellite. For example, the at least one sensor can include an IMU and/or a clock. The at least one signal can include a GNSS signal received from a GNSS satellite, and/or can include a signal generated by another navigation processing system 300. The at least one signal can include PPP corrections received over a backhaul data link. Some or all of the first plurality of measurements can be stored in memory of the navigation processing system for later use as historical measurements.

Step 1004 includes calculating first current state data for the satellite at a first current time based on the first plurality of measurement data and/or based on historical measurements retrieved from the memory. The current state data can indicate a position of the satellite, an attitude of the satellite, and/or the first current time. Step 1006 includes generating first curve fit parameter data based on the first current state data. The curve fit parameter data can indicate a plurality of state estimates for a plurality of consecutive future times within a time window. For example, the time window can be predefined, and can start at the current time and/or can start at a time shortly after the current time. Steps 1002, 1004, and/or 1006 can be performed as discussed in conjunction with the state estimator flow illustrated in FIG. 5A.

Step 1008 includes generating a first navigation message that includes the first curve fit parameter data. The first navigation message can be generated in accordance with some or all of the steps illustrated in the navigation message generation flow illustrated in FIG. 5B. Step 1010 includes scheduling the first navigation message for broadcast by a transmitter onboard the satellite during a predetermined portion of the time window. For example, the first navigation message can be scheduled to be transmitted repeatedly multiple times within the predetermined portion of the time window. The predetermined portion of the time window can be a proper subset of the time window and/or can include the entire time window. The predetermined portion of the time window can correspond to a first temporal portion of the time window, for example, beginning with the current time and/or the first one of the plurality of future times, and lasting for a predefined duration. In some embodiments, the predefined duration and/or the frequency at which the first navigation message is scheduled to be repeatedly transmitted can correspond to and/or based on a predetermined minimum time to first fix. The first navigation message can be scheduled and/or transmitted by the transmitter in accordance with some or all of the steps illustrated in the broadcast flow illustrated in FIG. 5C.

Step 1012 includes receiving a second plurality of measurement data via the same or at least one sensor onboard the satellite and/or the at least one signal received via the receiver onboard the satellite. Step 1014 includes calculating second current state data for the satellite at a second current time based on the first plurality of measurement data, wherein the current state data indicates a position of the satellite, an attitude of the satellite, and/or the second current time. The second current time can be after the first current time, and the second current time can correspond to one of the plurality of consecutive future times within the time window. Step 1016 includes generate an error metric by comparing the second current state estimate to the one of the plurality of state estimates indicated in the curve fit parameter data for the one of the plurality of consecutive future times, for example, as illustrated in the state estimation flow of FIG. 5A.

In response to determining the error metric compares unfavorably to an error threshold, the method can include steps 1018-1024, for example as illustrated in the state estimation flow of FIG. 5A. Step 1018 includes generating second curve fit parameter data based on the second current state data, wherein the curve fit parameter data indicates a plurality of state estimates for a plurality of consecutive future times within a time window. Step 1020 includes generating a second navigation message that includes the second curve fit parameter data. Step 1022 includes interrupting the scheduling of the broadcast of the first navigation message at a time before the elapsing of the predetermined portion of the time window, and step 1024 includes scheduling the second navigation message for broadcast by the transmitter of the satellite starting at the time and/or starting shortly after the time. For example, the next scheduled transmission of the first navigation message can be replaced by a transmission of the second navigation message, once the second navigation message is generated.

Figure 11:
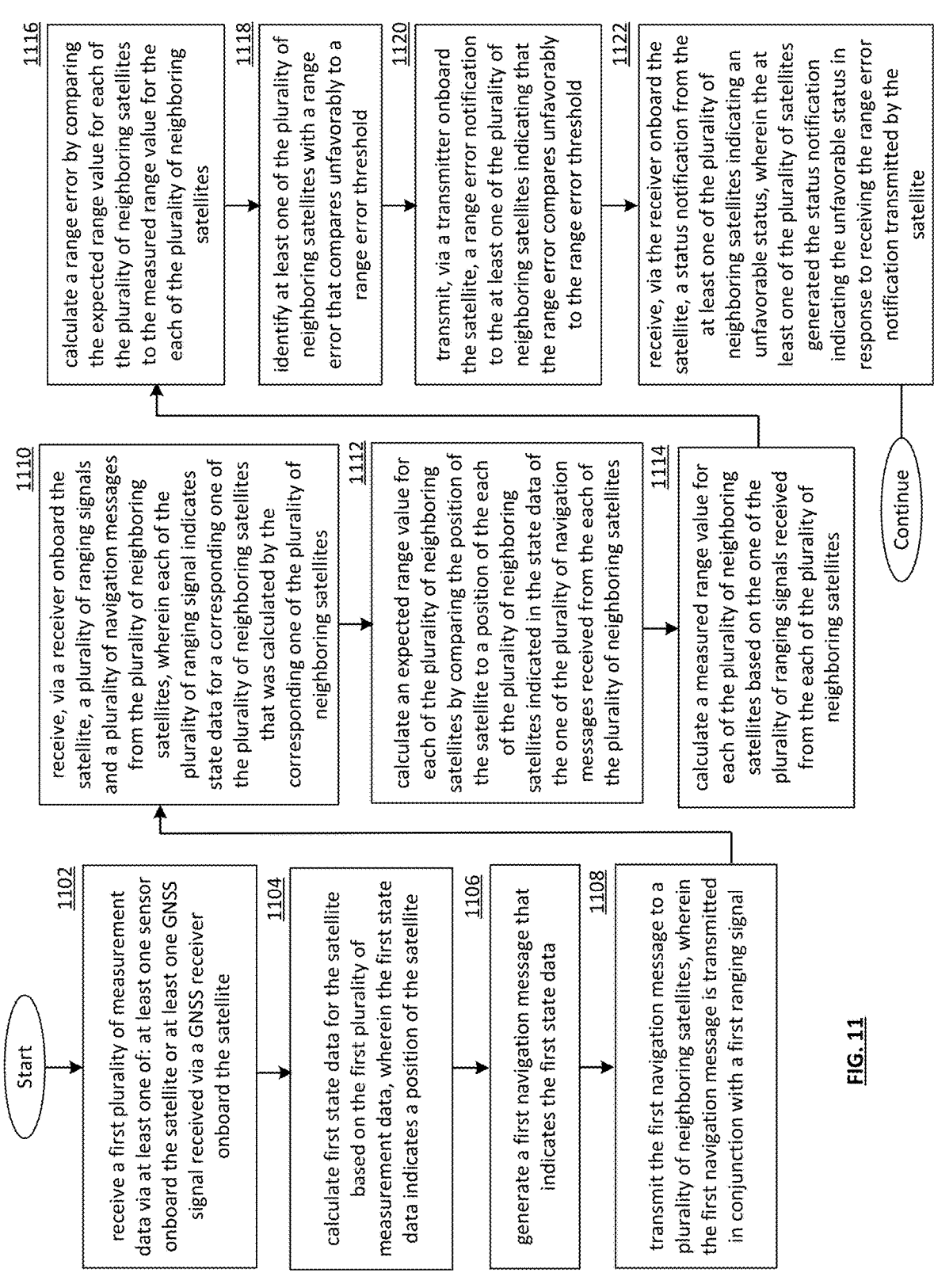
FIG. 11 is a logic diagram of an example of a method of performing neighborhood-monitoring in accordance with various embodiments.

FIG. 11 illustrates an example embodiment of a flowchart illustrating an example of performing neighborhood-monitoring. In particular, a method is presented for use in association with one or more functions and features described in conjunction with FIGS. 1-10, for execution by a navigation processing system 300 that includes a processor or via another processing system of satellite constellation system 100 that includes at least one processor and memory that stores instructions that configure the processor or processors to perform the some or all of the steps described below.

Step 1102 includes receiving a first plurality of measurement data at least one sensor onboard the satellite and/or or at least one GNSS signal received via a GNSS receiver onboard the first satellite. Step 1104 includes calculating first state data for the first satellite based on the first plurality of measurement data, wherein the first state data indicates a position of the first satellite. Step 1106 includes generating a first navigation message that indicates the first state data. Step 1108 includes transmitting the first navigation message to a plurality of neighboring satellites, wherein the first navigation message is transmitted in conjunction with a first ranging signal.

Step 1110 includes receiving, via a receiver onboard the first satellite, a plurality of ranging signals and a plurality of navigation messages from the plurality of neighboring satellites. Each of the plurality of navigation messages can indicate state data for a corresponding one of the plurality of neighboring satellites, where each state data was calculated by the corresponding one of the plurality of neighboring satellites. Step 1112 includes calculating an expected range value for each of the plurality of neighboring satellites by comparing the position of the first satellite to a position of the each of the plurality of neighboring satellites indicated in the state data of the one of the plurality of navigation messages received from the each of the plurality of neighboring satellites. Step 1114 includes calculating a measured range value for each of the plurality of neighboring satellites based on the one of the plurality of ranging signals received from the each of the plurality of neighboring satellites. Step 1116 includes calculating a range error by comparing the expected range value for each of the plurality of neighboring satellites to the measured range value for the each of the plurality of neighboring satellites.

Step 1118 includes identifying at least one of the plurality of neighboring satellites with a range error that compares unfavorably to a range error threshold. Step 1120 includes transmit, via a transmitter onboard the first satellite, a range error notification to the at least one of the plurality of neighboring satellites indicating that the range error compares unfavorably to the range error threshold. Step 1122 includes receiving, via the receiver onboard the first satellite, a status notification from the at least one of the plurality of neighboring satellites indicating an unfavorable status, wherein the at least one of the plurality of satellites generated the status notification indicating the unfavorable status in response to receiving the range error notification transmitted by the first satellite.

Some or all of the plurality of neighboring satellites can each include their own navigation processing system 300, and some or all of the plurality of the plurality of neighboring satellites can be operable to similarly perform some or all of these steps of FIG. 10.

In various embodiments, the method further includes receiving a second plurality of measurement data via the at least one of: the at least one sensor onboard the first satellite or the at least one GNSS signal received via the GNSS receiver onboard the first satellite, for example at a different time. The method further includes calculating second state data for the first satellite on the second plurality of measurement data, where the second state data indicates a second position of the first satellite, for example, at the different time. The method further includes generating a second navigation message that indicates the second state data. The method further includes transmitting the second navigation message to the plurality of neighboring satellites in conjunction with a second ranging signal. The method further includes receiving, via the receiver onboard the first satellite, a range error notification from a subset of the plurality of neighboring satellites. The range error notification was transmitted by each of the plurality of neighboring satellites in the same fashion as illustrated in FIG. 11, in response to the each of the subset of the plurality of neighboring satellites determining a second range error compares unfavorably to the range error threshold. In particular, the each of the subset of the plurality of neighboring satellites calculated the second range error for the first satellite by comparing a second expected range value for the first satellite to a measured range value for the first satellite. Each of the subset of the plurality of neighboring satellites calculated the second measured range value for the first satellite based on the second ranging signal received from the first satellite, and the each of the subset of the plurality of neighboring satellites calculate the second expected range value for the first satellite by comparing the second position of the first satellite to its current position. Each of the subset of the plurality of neighboring satellites calculate its current position based on measurement data it collected.

In various embodiments, the method further includes determining a status of the first satellite is unfavorable in response to determining a proportion of the plurality of neighboring satellites included in the subset of the plurality of neighboring satellites compares unfavorably to a maximum threshold proportion. The method can further include transmitting, via the transmitter onboard the satellite, a status notification indicating an unfavorable status of the satellite to the plurality of neighboring satellites. For example, the maximum threshold proportion can dictate that at least a predefined number and/or proportion of satellites must have sent range error notifications to the first satellite for the first satellite to determine that its status is unfavorable. If less than the maximum threshold proportion of satellites send the range error notification to the first satellite, the first satellite can determine its status is favorable. In some embodiments, the range error notification can be generated by the neighboring satellites to include the value of the calculated range error, and the first satellite determining whether or not the status is unfavorable as a function of the number of satellites from which the calculated range error as well as the value of the range error in each notification. For example, fewer number of satellites may be required to have send range error notifications if these range error notifications indicate high range errors, while a higher number of satellites may be required to have send range error notifications if these range error notifications indicate smaller range errors.

In some embodiments, the method further includes determining a status of each of the subset of the plurality of neighboring satellites is unfavorable in response to determining a proportion of the plurality of neighboring satellites included in the subset of the plurality of neighboring satellites compares unfavorably to a minimum threshold proportion. The method can further include transmitting, via the transmitter onboard the satellite, a notification indicating the unfavorable status of the to the subset of the plurality of neighboring satellites to the subset of the plurality of neighboring satellites. The minimum threshold proportion can be the same as, can be lower than, and/or substantially or lower than the maximum threshold proportion. For example, the minimum threshold proportion can dictate that less than a predefined number and/or proportion of satellites must have sent range error notifications to the first satellite for the first satellite to determine that their statuses are unfavorable. If more than the minimum threshold proportion of satellites send the range error notification to the first satellite, the first satellite can determine their statuses are favorable and/or cannot conclude that their statuses are unfavorable. In some embodiments, a neighboring satellite is only determined to be unfavorable if they were the only satellite of the plurality of neighboring satellites that sent the range error notification.

Figure 12A:
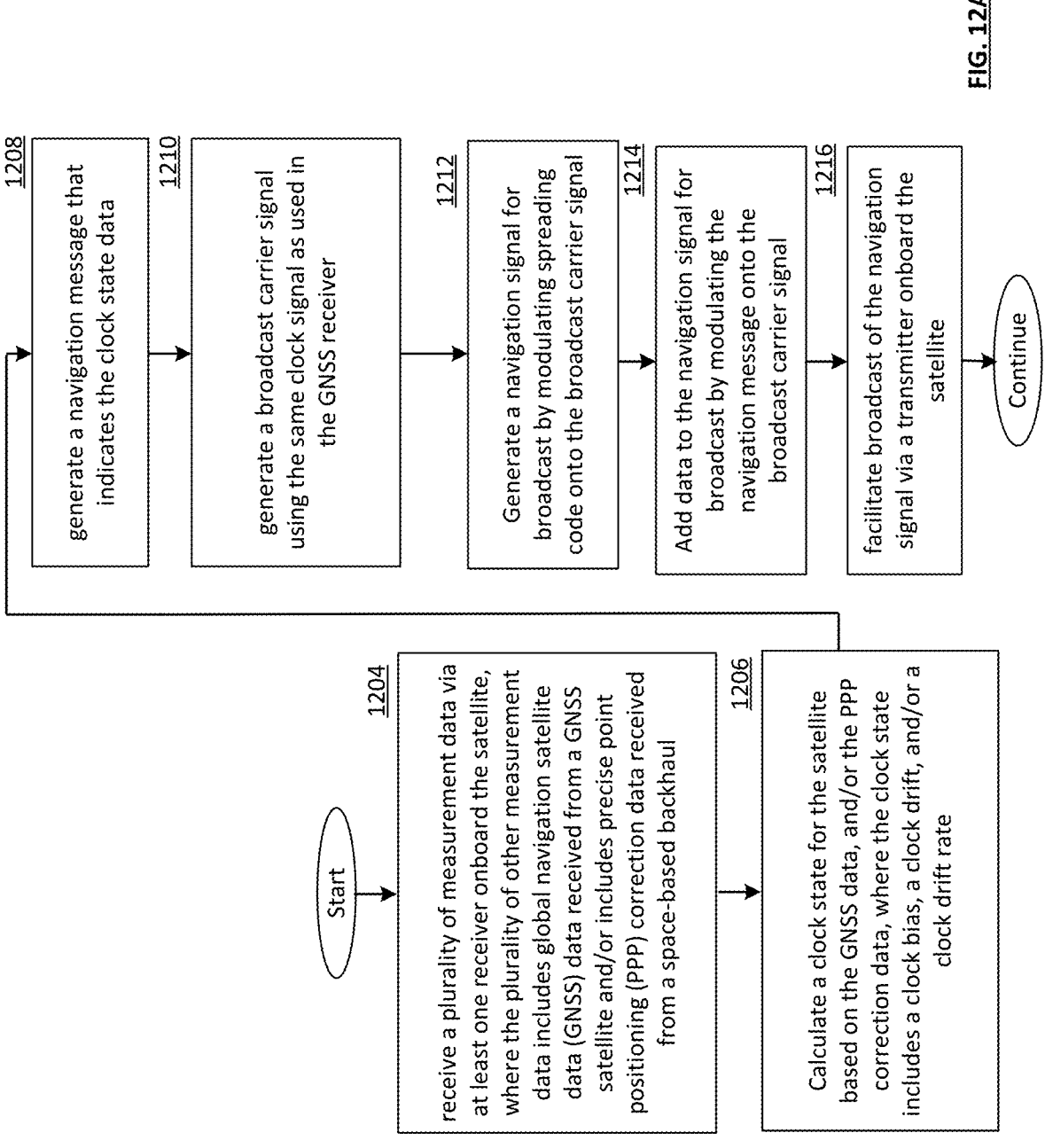
FIG. 12A is a logic diagram of an example of a method of performing state estimation in accordance with various embodiments.
Figure 12B:
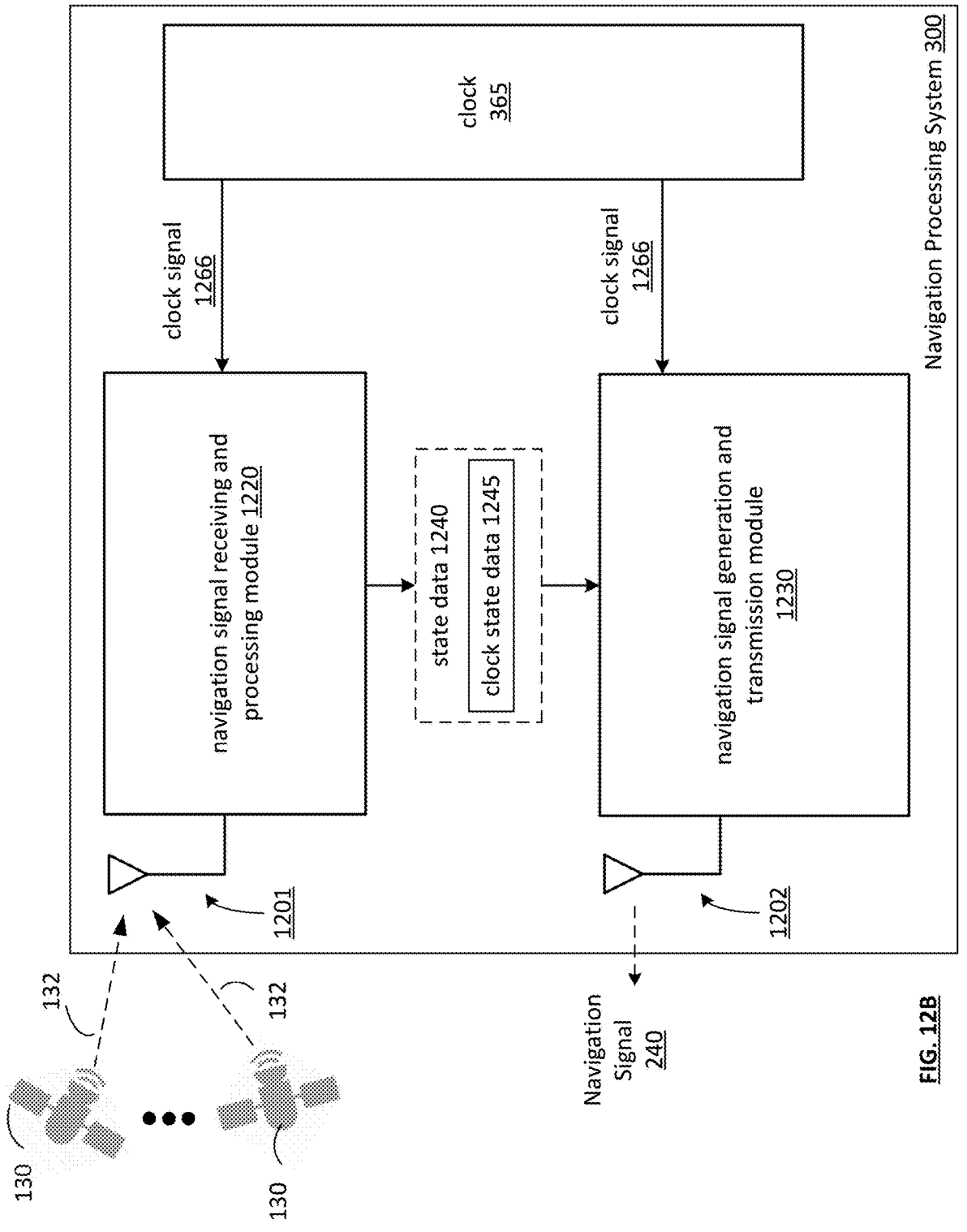
Figure 12C:
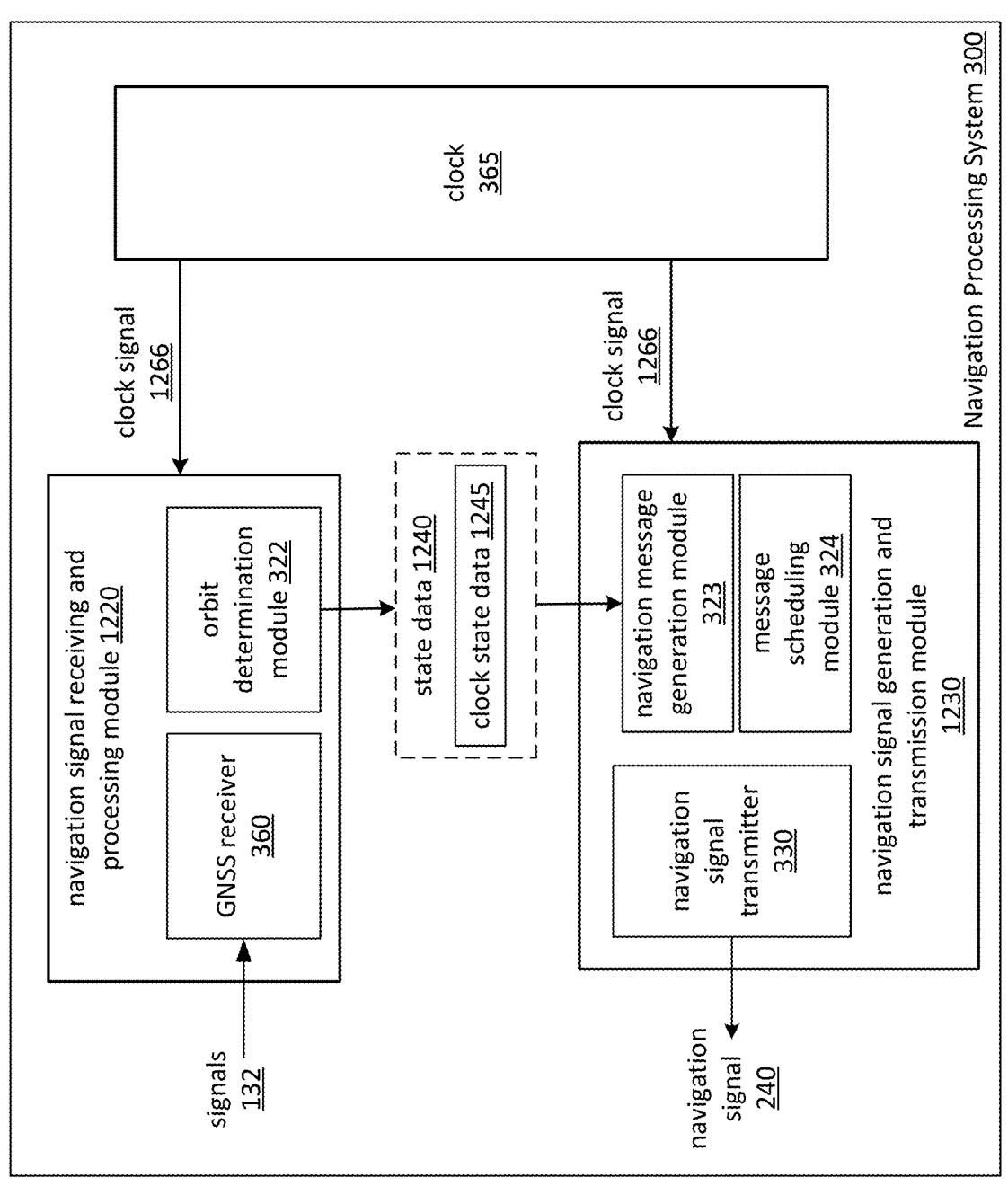
Figure 12D:
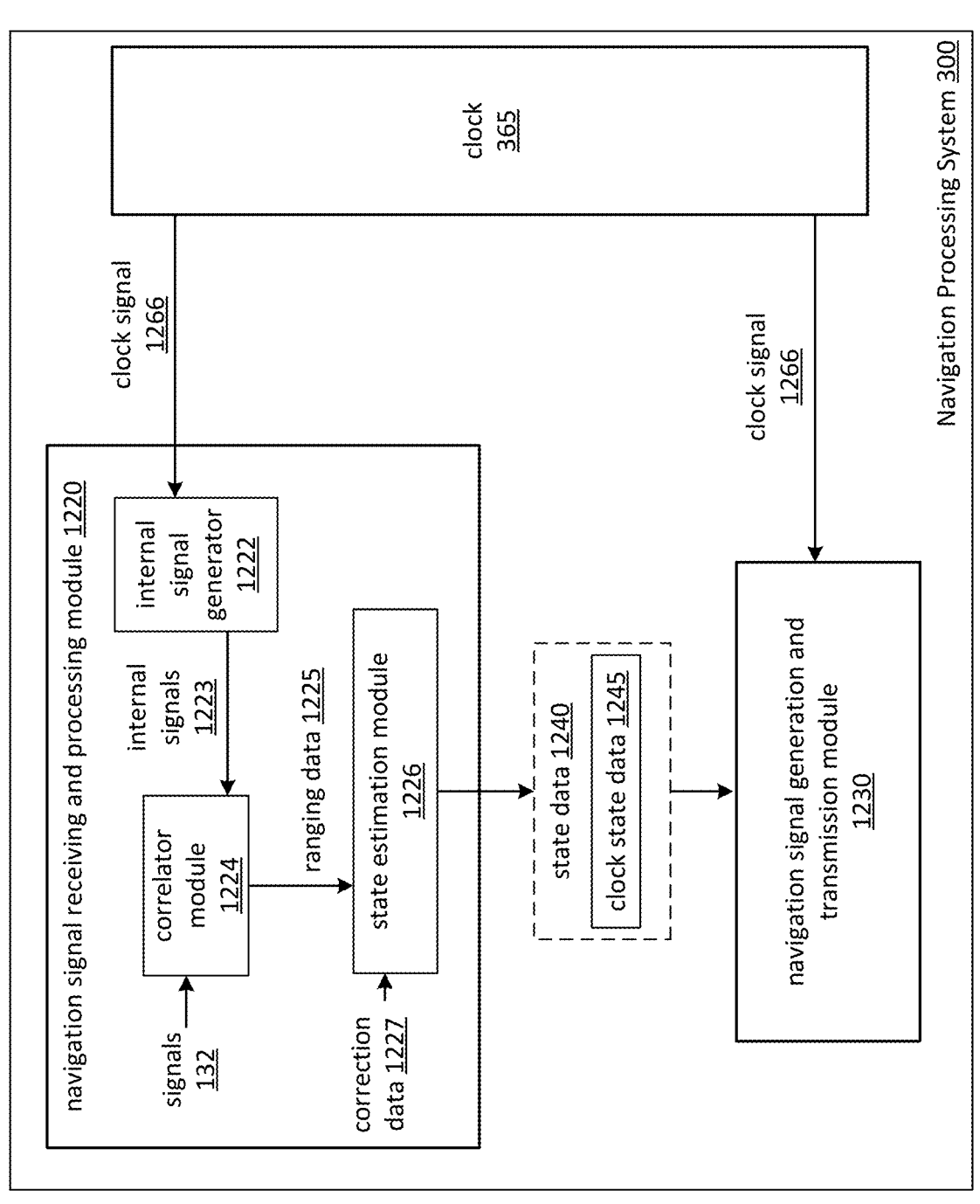
Figure 12F:
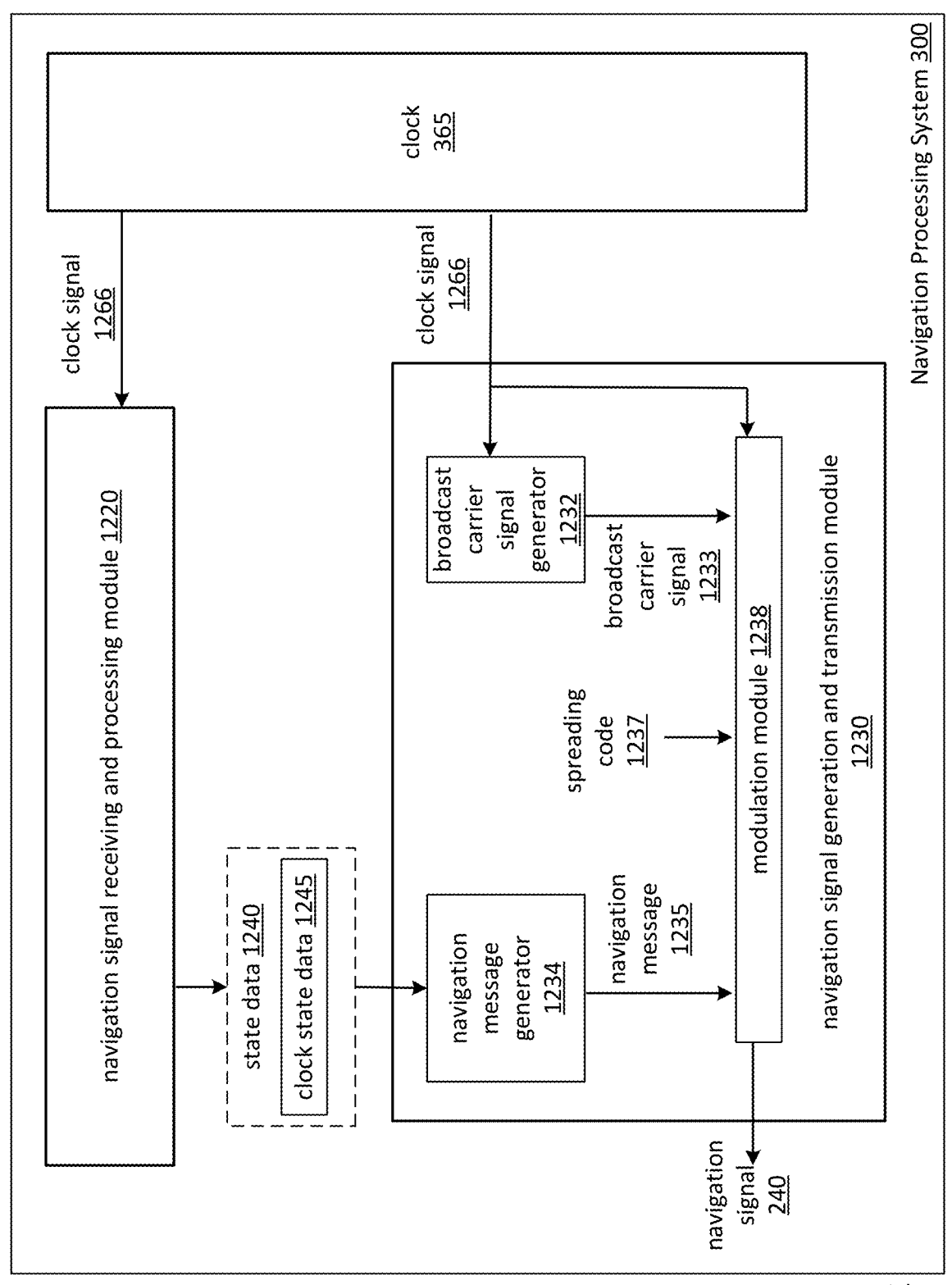
Figure 12G:
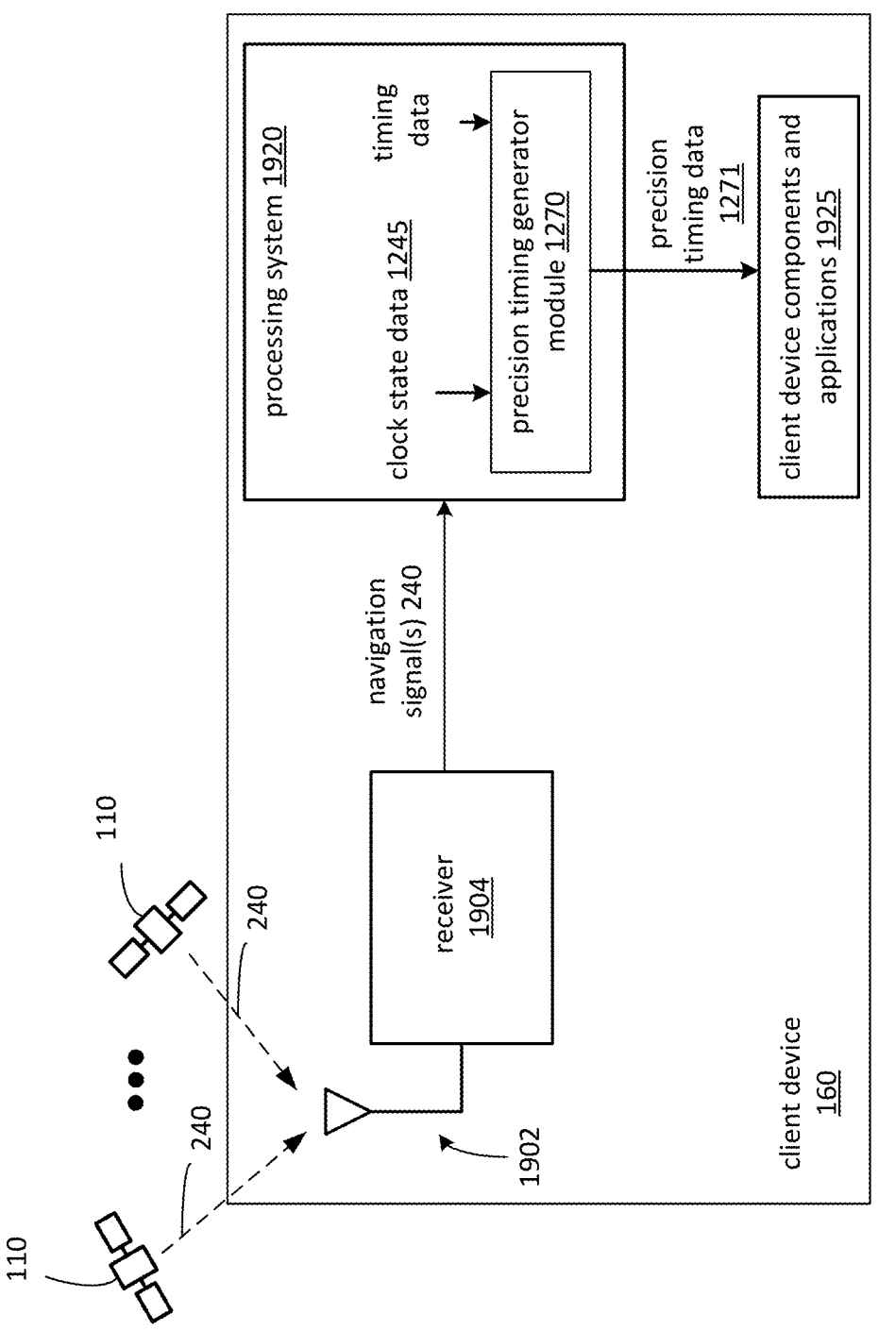
FIGS. 12G-12H are schematic block diagrams of a client device in accordance with various embodiments.
Figure 12H:
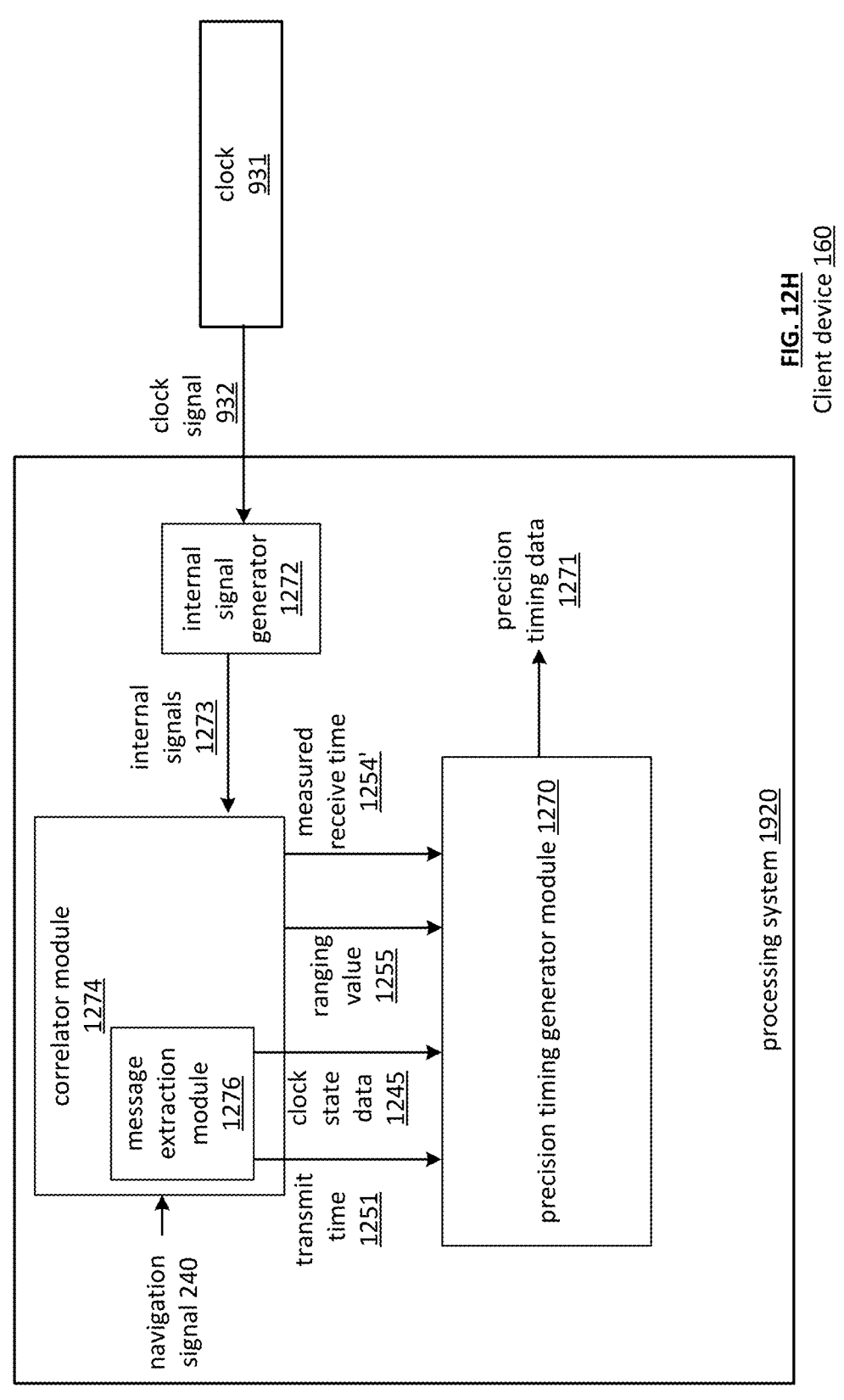
Figure 12I:
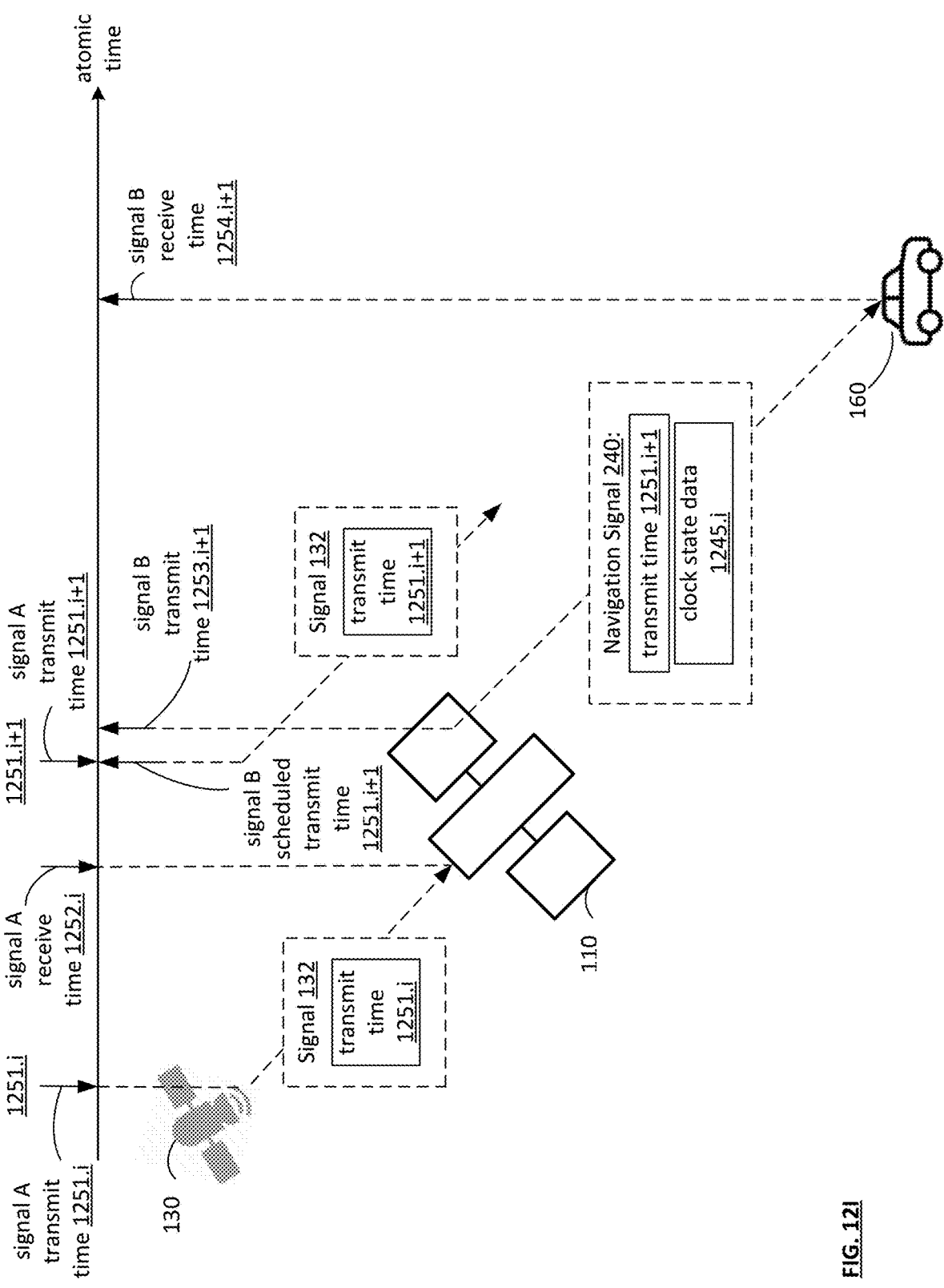
FIGS. 12I-12L illustrate the transmission and receipt of signals overtime in accordance with various embodiments.
Figure 12J:
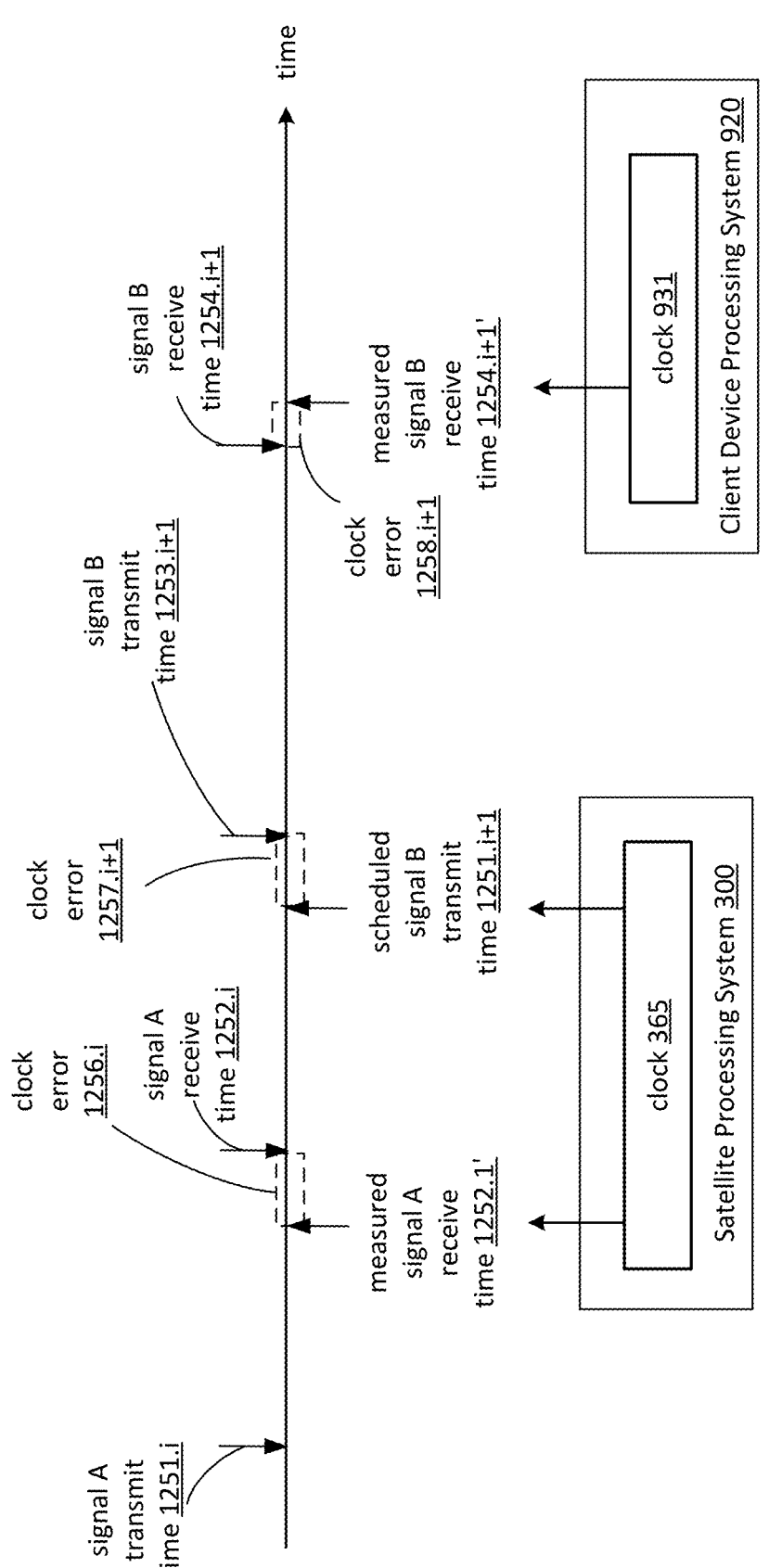
Figure 12K:
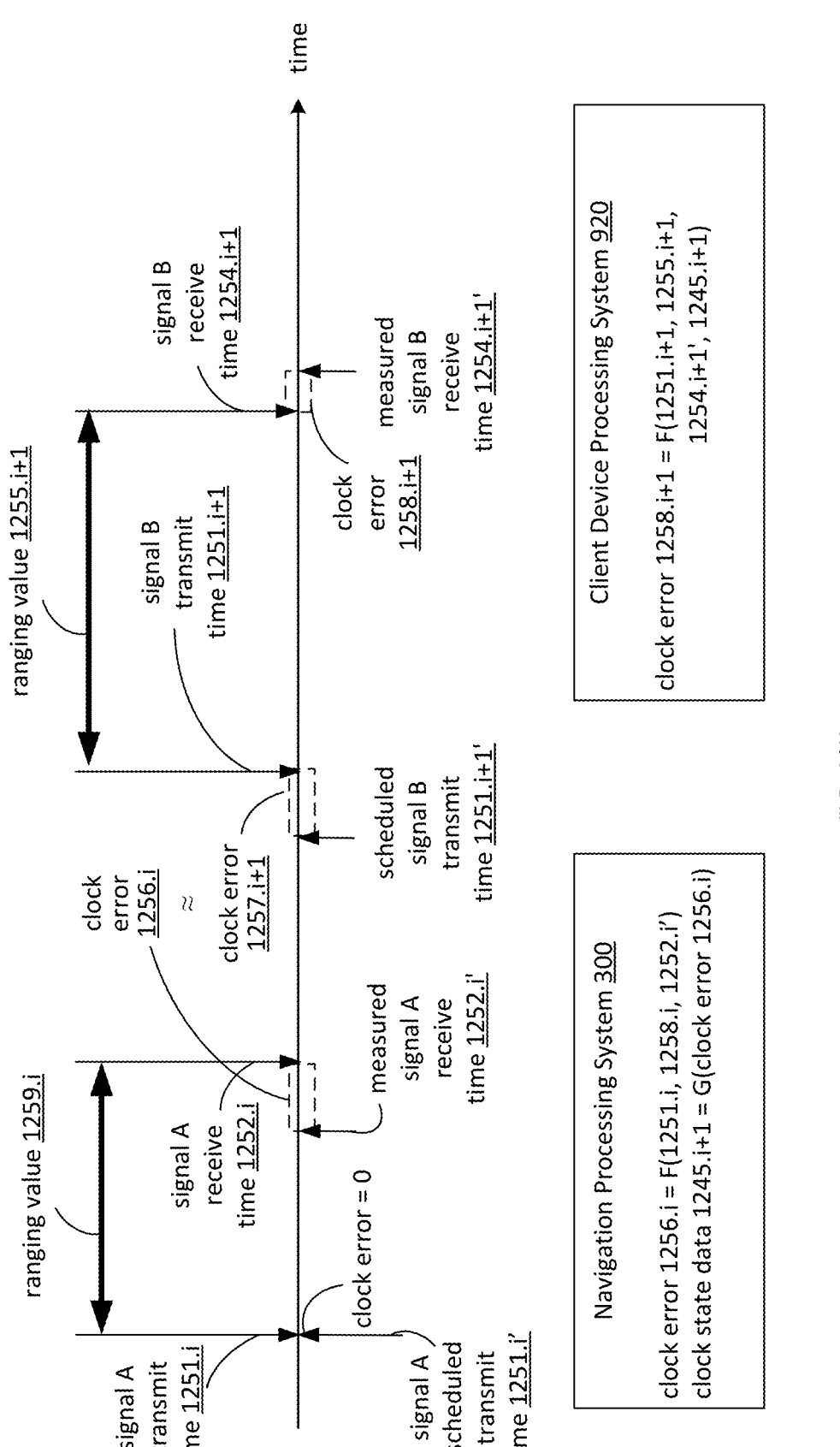
Figure 12L:
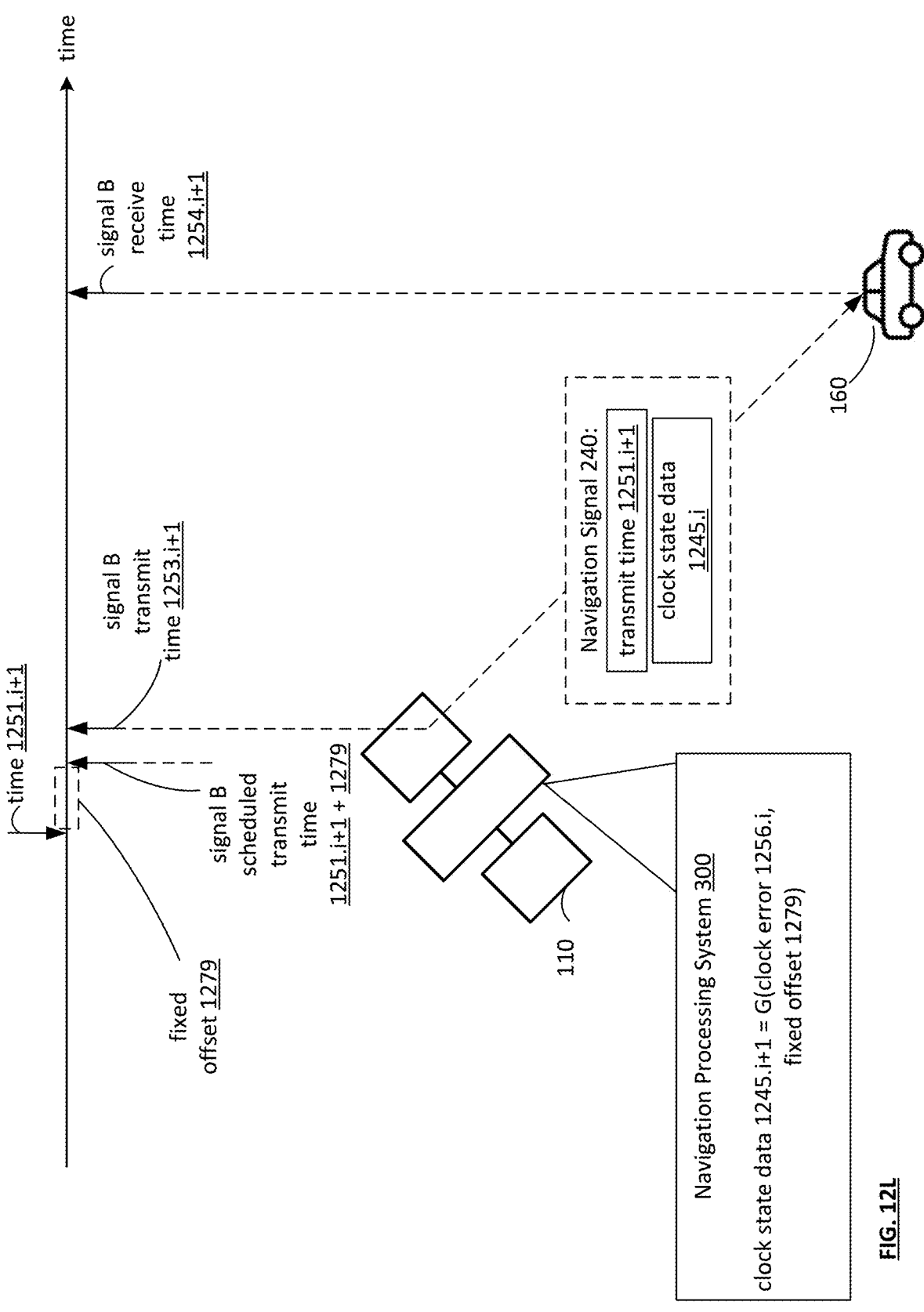
Figure 12M:
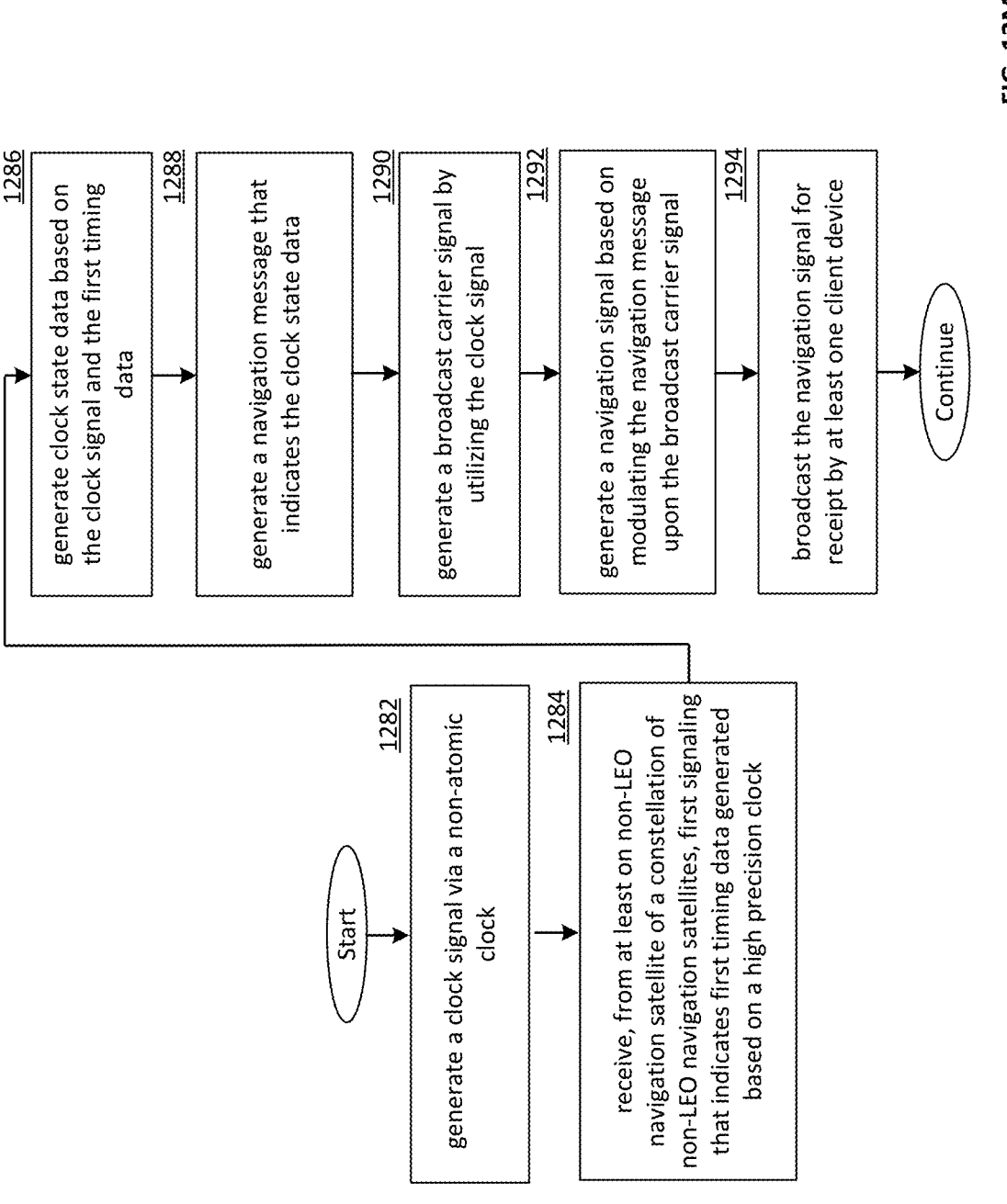
FIG. 12M is a logic diagram of an example of a method of generating a navigation signal estimation in accordance with various embodiments.
Figure 12N:
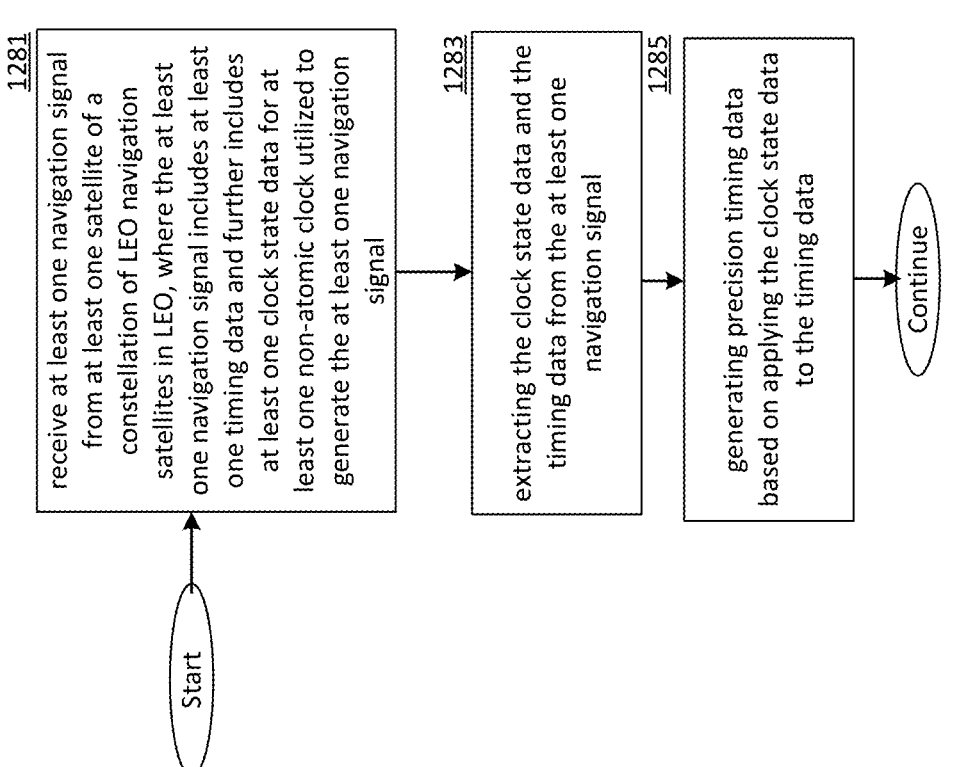
FIG. 12N is a logic diagram of an example of a method of generating precision timing data in accordance with various embodiments.

FIGS. 12A-12N present embodiments of a satellite constellation system 100 that is configured to facilitate generation of and/or synchronization with precision timing data, such as atomic time, by client devices 160 and/or one or more of its nodes. For example, satellites 110 or other nodes of satellite constellation system 100 can generate navigation signals 240 as discussed herein to indicate state data that includes clock state data of a clock utilized to generate the navigation signals 240. Client devices 160, or other nodes that receive navigation signals 240, can generate their own state data, such as their enhances position and timing data 922, based on generating or establishing synchronization with atomic time. These client devices can generate and/or establish synchronization with atomic time based on navigation signals 240, despite these navigation signals 240 not having been generated via an atomic clock or other high precision clock onboard corresponding satellites 110 and/or other nodes that generated these navigation signals 240. Thus, the satellite constellation system 100 can be configured to deliver, or otherwise facilitate synchronization with, atomic time, even if corresponding high precision clocks are not implemented onboard its satellites 110 and/or nodes.

This functionality can be ideal, as high precision clocks can be significantly more expensive than non-atomic clocks. For example, necessitating inclusion of a high precision clock onboard a satellite 110 to ensure the satellite is able to generate navigation signals that enable receiving client devices 160 to establish the enhanced position and/or timing data 922 as described herein can cause each satellite to be significantly more expensive than satellite that include non-high precision clocks. Facilitating delivery and/or synchronization with high precision time without necessitating the implementing of onboard high precision clocks can improve the technology of navigation systems and/or satellite communication systems by enabling some or all satellites 110 and/or other nodes of satellite constellation system 100 to be constructed via cheaper elements, without sacrificing the ultimate generation of precision timing data by client devices receiving their navigation signals 240.

Furthermore, as individual satellites 110 and/or other nodes of satellite constellation system 100 can be constructed more cheaply via inclusion of non-atomic clocks, a greater number of satellites can be constructed and launched via a same amount of monetary resources, which can further improve the technology of navigation systems and/or satellite communication systems by enabling greater global coverage, for example, where a greater number of satellites are expected and/or guaranteed to be in view of a given client device 160 on earth, which increases the ability of the given client device 160 to generate enhanced position and timing data 922 via satellite constellation system 100 and/or increases the proportion of client devices 160 on earth that are capable of generating enhanced position and timing data 922 due to a greater number of satellites being included in satellite constellation system 100.

As used herein "atomic time" can correspond to a "true time." Atomic time can be established by one or more atomic clocks, or one or more other high precision clocks. For example, atomic time is established based on a plurality of GNSS satellites 130 of a GNSS satellite constellation based on signals generated via their own high precision clocks, such as their own atomic clocks.

As used herein a "high precision clock" can correspond to any clock and/or clock ensemble with precision and/or long term stability of an atomic clock. A "high precision clock" can correspond to any clock and/or clock ensemble that is: operable to generate a clock signal that is in compliance with atomic time; is characterized to have long term stability; and/or has long term stability that compares favorably to a threshold stability required to establish atomic time and/or high precision time. For example, a "high precision clock" is implemented as one or more atomic clocks, or any other type of clock and/or clock ensemble that emulates the precision, long term stability, and/or some or all other functionality of an atomic clock.

As used herein a "non-atomic clock" can correspond to any clock and/or clock ensemble that is not a high precision clock and/or is not an atomic clock. For example, a "non-atomic clock": is not operable to generate a clock signal that is in compliance with atomic time; is not characterized to have long term stability; has long term stability that compares unfavorably to a threshold stability required to keep atomic time and/or high precision time; has a long term stability that is less favorable than the long term stability of a high precision clock; generates a clock signal that has a known and/or unknown error relative to atomic time and/or high precision time; and/or otherwise is not capable of some or all functionality of a high precision clock and/or an atomic clock.

Atomic time can be established by one or more processing systems, such as a processing system of a satellite 110 and/or a client device 160, and/or another processing system that does not include and/or is not coupled to its own atomic clock based on: receiving a signal indicating atomic time; synchronizing with atomic time; calculating and/or correcting for a clock error of one or more of its non-atomic clocks and/or one or more non-high precision clocks; and/or otherwise determining atomic time. For example, a processing system that does not include and/or is not coupled to its own atomic clock can determine the true, atomic time if it has enough other information, such as information regarding the error of its own non-atomic clock and/or the error of a non-atomic clock that transmitted a navigation signal utilized to establish the true, atomic time. Examples of this determining of atomic time by utilizing non-atomic clocks is discussed in further detail in conjunction with FIGS. 12A-12N.

FIG. 12A illustrates an example embodiment of a flow-chart illustrating an example of performing orbit determination. In particular, a method is presented for use in association with one or more functions and features described in conjunction with FIGS. 1-11, for execution by a navigation processing system 300 that includes a processor or via another processing system of satellite constellation system 100 that includes at least one processor and memory that stores instructions that configure the processor or processors to perform some or all of the steps described below.

Step 1204 includes receiving a plurality of measurement data via at least one receiver onboard the satellite, where the plurality of other measurement data includes global navigation satellite data (GNSS) data received from a GNSS satellite and/or includes precise point positioning (PPP) correction data received from a space-based backhaul. A clock signal, for example, generated by a clock onboard the satellite 110, can be utilized by a GNSS receiver onboard the satellite to receive a GNSS signal from the GNSS satellite, and/or this clock signal can be utilized by an analog to digital converter onboard the satellite 110 to generate the GNSS data from the GNSS signal received by the GNSS receiver.

Step 1206 includes calculating a clock state for the satellite based on the GNSS data, and/or the PPP correction data, where the clock state includes a clock bias, a clock drift, and/or a clock drift rate. Step 1208 includes generating a navigation message that indicates the clock state data. Step 1210 includes generating a broadcast carrier signal using a clock signal. This clock signal can be the same clock signal and/or can be disciplined to the clock signal utilized in step 1204. For example, this clock signal can be the same as the clock signal used by GNSS receiver to receive the GNSS signal from the GNSS satellite, can be discipled to the clock signal used by GNSS receiver to receive the GNSS signal from the GNSS satellite, can be the same as the clock signal that is utilized by the analog to digital converter onboard the satellite 110 to generate the GNSS data from the GNSS signal received by the GNSS receiver, and/or can be disciplined to the clock signal that is utilized by the analog to digital converter onboard the satellite 110 to generate the GNSS data from the GNSS signal received by the GNSS receiver.

Step 1212 includes generating a navigation signal for broadcast by modulating the spreading code onto the broadcast carrier signal. Step 1214 includes adding additional data to the navigation signal for broadcast by modulating the navigation message onto the broadcast carrier signal. Step 1216 includes facilitating broadcast of the navigation signal via a transmitter onboard the satellite.

FIG. 12B illustrates an embodiment of a navigation processing system 300. The navigation processing system 300 of FIG. 12B can be implemented onboard: a satellite 110, a client device 160, a ground station 200, a backhaul satellite 150, and/or any other node of the satellite constellation system 100 described herein. The navigation processing system 300 of FIG. 12B can alternatively or additionally be implemented by a navigation system component or another navigation system that is different from satellite constellation system 100 and/or can be implemented by any computing device, for example, not associated with and/or not communicating with satellite constellation system 100.

The navigation processing system 300 of FIG. 12B can be implemented utilizing some or all features and/or functionality of the navigation processing system of FIG. 3B. The navigation processing system 300 of FIG. 12B can be implemented to perform some or all steps of FIG. 12A and/or some or all steps of FIG. 12M. Some or all features and/or functionality of the navigation processing system 300 of FIG. 12B can be utilized to implement any other embodiment of navigation processing system 300 described herein.

The navigation processing system 300 can include and/or be operably coupled to a clock 365. Clock 365 can be implemented via an OCXO, another type of crystal oscillator, and/or any other clock. The clock 365 can be onboard and/or implemented within a corresponding satellite 110, backhaul satellite 150, ground station 200, client device 160, or other node of navigation processing system that implements the navigation processing system 300. Clock 365 can be implemented as one or more clocks 365 of FIG. 3B. The clock 365 can be implemented as a non-atomic clock.

A navigation processing system 300 can implement a navigation signal receiving and processing module 1220. The navigation signal receiving and processing module 1220 can utilize at least one antenna 1201 to receive at least one signal 132, such as a GNSS signal, generated by at least one corresponding GNSS satellite 130. For example, the least one antenna 1201 is implemented via GNSS receiver 360 of FIG. 3B.

The navigation signal receiving and processing module 1220 can include at least one processor, and can be configured to generate state data 1240 by utilizing the at least one processor. The state data 1240 can be generated to include clock state data 1245 that characterizes a clock 365. The state data 1240 can additionally include such as the clock state data 1245, orbital position data, timing state data, and/or other state data of a corresponding satellite and/or node as described herein. Multiple state data 1240 can be generated over time as discussed previously, as the same or different one or more signals 132 are received over time, where the most recent state data 1240 indicates a most recent estimated and/or computed state of the satellite 110 and/or other node that implements the given navigation processing system 300 that optionally updated from a prior state data 1240 due to an estimated and/or computed change in state of the satellite 110 and/or other node at a given time corresponding to the most recent state data 1240 from a prior time corresponding to the prior state data 1240.

The navigation signal receiving and processing module 1220 can receive the clock signal 1266 generated by clock 365. The navigation signal receiving and processing module 1220 can perform some or all of its functionality, such as processing incoming signals 132 to generate state data 1240, based on utilizing clock signal 1266. For example, one or more local clocks of navigation signal receiving and processing module 1220 are disciplined to this clock signal 1266, and/or the functionality of navigation signal receiving and processing module 1220 is otherwise performed based on applying clock signal 1266, and/or not the clock signal of another clock of navigation processing system 300.

In particular, clock state data 1245 can be generated and updated over time in state data 1240 generated via signals 132 are received over time. The clock state data 1245 can change over time to reflect estimated and/or computed changes in the state of clock 365, such as characterization of changes in error of clock signal 1266 relative to atomic time.

The navigation processing system 300 can implement a navigation signal generation and transmission module 1230. The navigation signal generation and transmission module can broadcast a navigation signal 240 via at least one antenna 1202. For example, the least one antenna 1202 is implemented via navigation signal transmitter 330 of FIG. 3B.

The navigation signal generation and transmission module 1230 can include at least one processor, and can be configured to generate the navigation signal 240 by utilizing the at least one processor. The navigation signal 240 can be generated to include some or all of the state data 1240, such as the clock state data 1245, orbital position data, timing state data, and/or other state data of a corresponding satellite and/or node as described herein.

The navigation signal generator and transmission module 1230 can also receive the clock signal 1266 generated by clock 365. The navigation signal generator and transmission module 1230 can perform some or all of its functionality, such as generating navigation signal 240 to include state data 1240, based on utilizing clock signal 1266. For example, one or more local clocks of navigation signal generator and transmission module 1230 are disciplined to this clock signal 1266, and/or the functionality of navigation signal generator and transmission module 1230 is otherwise performed based on applying clock signal 1266, and/or not the clock signal of another clock of navigation processing system 300.

In some embodiments, the at least one processor that implements the navigation signal receiving and processing module 1220 can include one or more shared processing resources with the at least one processor that implements the navigation signal generation and transmission module 1230. In other embodiments, the at least one the at least one processor that implements the navigation signal receiving and processing module 1220 is entirely distinct from the at least one processor that implements the navigation signal generation and transmission module 1230.

In some embodiments, the at least one processor of navigation signal receiving and processing module 1220 is implemented via at least one processor of GNSS receiver 360. In some embodiments, at least one local clock of the GNSS receiver 360 that is utilized to perform some or all functionality of the navigation signal receiving and processing module 1220, such as generating ranging data based on signals 132 to generate the state data 1240, is disciplined to the clock signal 1266. Alternatively or in addition the GNSS receiver 360 otherwise performs some or all of its functionality, such as generating ranging data, based on receiving and utilizing clock signal 1266. Alternatively or in addition, the local clock of the GNSS receiver 360 is implemented as clock 365, where the clock signal of this local clock of the GNSS receiver 360 is also received and utilized by the navigation signal generation and transmission module 1230 as clock signal 1266.

In some embodiments, the at least one processor of navigation signal generation and transmission module 1230 is implemented via at least one processor of a software defined radio (SDR). In some embodiments, at least one local clock of the SDR that is utilized to perform some or all functionality of the navigation signal generation and transmission module 1230, such as generating a carrier signal and/or modulating data upon the carrier signal, is disciplined to the clock signal 1266. Alternatively or in addition the GNSS receiver 360 otherwise performs some or all of its functionality, such as generating a carrier signal and/or modulating data upon the carrier signal, based on receiving and utilizing clock signal 1266. Alternatively or in addition, the local clock of the SDR is implemented as clock 365, where the clock signal of this local clock of the SDR is also received and utilized by the navigation signal receiving and processing module 1220 as clock signal 1266.

In particular, as discussed in further detail herein, the use of the same clock signal 1266 by both the navigation signal receiving and processing module 1220 and the navigation signal generation and transmission module 1230 enables client devices 160 that receive and process navigation signals 240 to appropriately account for any clock error induced in the generation and transmission of navigation signal 240. In particular, based on the signals 132 being generated via an atomic time source, all clock error and/or a substantial portion of clock error induced in receiving and processing these signals 132, such as a discrepancy between a ranging value of the signal 132, a transmit time indicated in data of the signal 132, and a measured receive time generated utilizing clock signal 1266, can be attributed to error of clock signal 1266 relative to true, atomic time. This error can be characterized in clock state data 1245, and can similarly characterize any clock error induced in the generation and transmission of navigation signal 240 based on the navigation signal 240 being generated and transmitted utilizing the same clock signal that was utilized to receive and process the received signals 132. Thus, when a client device 160 receives navigation signal 240, any of these clock errors in the generation and transmission of the navigation signal 240 can be corrected and/or otherwise accounted for based on extracting and utilizing the clock state data 1245 included in these navigation signals 240. Any remaining errors can be attributed to the client device's own clock error in receiving the signals, and precise, atomic time can be established by the client device 160. This relationship between clock error and establishing atomic time by navigation processing system 300 and client devices 160 is discussed in conjunction with the first order example illustrated in FIGS. 12I-12L.

Thus, this use of the same clock signal by both the navigation signal receiving and processing module 1220 and the navigation signal generation and transmission module 1230 improves the technology of navigation systems by enabling generation and transmission of clock state data 1245 that characterizes clock error induced in generating and transmitting corresponding navigation messages 240 via a non-atomic clock, enabling receiving devices to establish atomic time despite these clock error induced in generating and transmitting corresponding navigation messages 240, as well as their own additional clock error induced in receiving and processing the navigation messages 240. In particular, if the clock error induced in the generation and/or transmission of navigation signal 240 via non-atomic clock wasn't appropriately characterized, the receiving device could be unable to establish atomic time unless their own clock error was known and/or appropriately characterized. As this is not the case for the clocks of many client devices 160 utilized to receive signals, this communication of clock state data 1245 can be necessary for the corresponding client device to establish atomic time if the signals are transmitted via a non-atomic clock.

The generation of accurate clock state data 1245 can be reliant upon leveraging the use of signals generated in accordance with atomic time and/or via synchronization with atomic time. In particular, if the clock signal utilized to transmit the navigation signal 240 were different from the clock signal utilized to receive and process the signals 132, additional measurement data and/or information would be necessary to determine the clock state of this different clock signal utilized to transmit the navigation signal 240.

In some embodiments, the clock 365 can be implemented via clock with favorable short term stability. As used herein "short term stability" can correspond to a stability within a given short time frame, such as a second, that compares favorably to a stability threshold. In particular, as there is a lapse in time between receiving of the signals 132 and transmission of signal 240, the clock state data 1245 generated based on clock error of the clock signal 1266 in receiving and processing signals 132 would not necessarily characterize the clock error of the clock signal 1266 in subsequently generating and sending signals 240 that include this clock state data 1245 if the clock signal 1266 were not stable within the short time frame, as the clock error could change within time between receiving signals 132 and transmitting navigation signal 240. Instead, the short term stability of clock 365 can be leveraged to guarantee and/or estimate that the clock state data 1245 characterizing the state of the clock signal 1266 at the time a signal 132 was received and processed can also accurately, and/or approximately within a given threshold, characterize the state of the clock signal 1266 at the later time that the navigation signal 240 that includes this clock state data 1245 is transmitted. In some embodiments, the short term stability of the clock 365 can be more favorable and/or otherwise more stable than the short term stability of the high precision clock, such as an atomic clock of a GPS satellite, implemented to generate navigation signals 132.

FIG. 12C illustrates an embodiment of a navigation processing system 300. Some or all features and/or functionality of the navigation processing system 300 of FIG. 12C can be utilized to implement the navigation processing system 300 of FIG. 12B and/or any other embodiment of navigation processing system 300 described herein.

The navigation signal receiving and processing module 1220 can implement the GNSS receiver 360 of FIG. 3B and/or the orbit determination module 322 of FIG. 3B. The orbit determination module 322 can be operable to generate the state data 1240 based on implementing some or all features and/or functionality discussed in conjunction with the state estimator flow of FIG. 5A. The clock signal 1266 can be utilized to implement the GNSS receiver 360 and/or the orbit determination module 322 of the navigation signal receiving and processing module 1220.

The navigation signal generation and transmission module can implement the navigation signal transmitter 330, the navigation message generator module 323, and/or the message schedule module 324 of FIG. 3B. The navigation message generation module 232 can generate navigation messages to include some or all of the state data 1240, for example, based on implementing some or all features and/or functionality discussed in conjunction with the navigation message generation flow of FIG. 5B, and/or can otherwise generate navigation messages for inclusion in navigation signals 240 as described herein. The message schedule module 324 can generate navigation signal based on implementing some or all features and/or functionality discussed in conjunction with the broadcast flow of FIG. 5C.

The clock signal 1266 can be utilized to implement navigation signal transmitter 330, the navigation message generator module 323, and/or the message schedule module 324 of the navigation signal generation and transmission module 1230. For example, the message schedule module 324 can generate navigation signals for transmission in accordance with scheduling and modulating navigation messages at scheduled times by applying the clock signal 1266.

FIG. 12D illustrates an embodiment of a navigation processing system 300. Some or all features and/or functionality of the navigation processing system 300 of FIG. 12D can be utilized to implement the navigation processing system 300 of FIG. 12B and/or any other embodiment of navigation processing system 300 described herein.

The signal receiving and processing module 1220 can implement an internal signal generator 1222 that is configured to utilize clock signal 1266 to generate at least one internal signal 1223. For example, the one or more internal signals 1223 are generated in accordance with at least one frequency, for example, corresponding to at least one frequency of the signals 132. As another example, the one or more internal signals 1223 are generated in accordance with a spreading code, for example, corresponding to at least one spreading code of the signals 132. In some embodiments, the internal signal generator 1222 is implemented via a GNSS receiver 360 of the navigation processing system 300 and/or other processing resources of the navigation processing system 300.

The signal receiving and processing module 1220 can implement a correlator module 1224, for example, that is configured to cross-correlate the signals 132 with internal signals 1223. The correlator module 1224 can be configured to generate ranging data 1225, for example, based on identifying a peak in correlation data of the correlation module and based on further identifying a range of time, such as a number of peaks of signal 132 and/or internal signal 1223 and/or number of bits of signal 132 and/or internal signal 1223, corresponding to timespan between transmission and receipt of the signal 132, such as a particular peak and/or particular data in signal 132, and/or corresponding to physical distance between the corresponding satellite 110 and/or other node implementing the navigation processing system 300 and a satellite 130 that transmitted the signal 132, for example, based on applying a value of the speed of light to the timespan. In some embodiments, the correlator module 1224 is implemented via a GNSS receiver 360 of the navigation processing system 300 and/or other processing resources of the navigation processing system 300.

The ranging data 1225 can be utilized by a state estimation module 1226 to generate the state data 1240, including clock state data 1245 and/or other state data such as an orbital position of the corresponding satellite 110 and/or other node implementing the navigation processing system 300. The state estimation module can optionally utilize correction data 1227, such as PPP correction data or other correction data received from a backhaul satellite 150 and/or ground station 200 to apply corresponding corrections to generate the state data 1240 as described previously. In some embodiments, the state estimation module 1226 is implemented via orbital determination module 322 of the navigation processing system 300 and/or any other processing resources of the navigation processing system 300. In some embodiments, the state estimation module 1226 is implemented based on performing some or all features and/or functionality of the state estimation flow of FIG. 5A and/or the navigation message generator flow of FIG. 5B to generate the state data 1240.

FIG. 12E illustrates an embodiment of a navigation processing system 300. Some or all features and/or functionality of the navigation processing system 300 of FIG. 12E can be utilized to implement the navigation processing system 300 of FIG. 12D and/or any other embodiment of navigation processing system 300 described herein.

The correlator module 1224 of FIG. 12D can further implement and/or can be operably coupled to a message extraction module 1228 that is operable to extract messages and/or other data modulated upon one or more carrier signals of signals 132. This can include extracting a transmit time 1251, such as a time stamp and/or time data included in a navigation message of signal 132 that indicates a time of transmission of a corresponding bit of the signal 132 that includes the transmit time and/or that corresponds to a start of the navigation message. The transmit time 1251 can indicate a number of seconds and/or a number of weeks. The transmit time 1251 can be in accordance with a time format associated with the GNSS constellation that includes the GNSS satellite 130 that generates the signal 132.

In some embodiments, a current time, corresponding to true atomic time can be established by the based on utilizing a given transmit time 1251, subsequently received transmit times 1251, and/or peaks and/or bits of signal 132 thereafter in conjunction with a known frequency of signals 132 to synchronize with and/or lock-into atomic time as signals 132 continue to be received from the same or different one or more GNSS satellites 130 over time, for example, as different GNSS satellites 130 come in and out of view of the satellite 110 implementing the navigation processing system as the satellite 110 orbits over time. The state data 1240 can optionally indicate and/or be based on the current time, for example, as timing data and/or transmit time values in a same or different time format as transmit times 1251 and/or at a same or different scheduled recurrence as transmit times 1251. In some embodiments, some transmit times 1251 are not extracted directly from a message of the signal 132, but are instead generated to reflect the current time.

The correlator module 1224 can be further implemented to generate a ranging value 1259 and a measured receive time 1252'. For example, the ranging value is a pseudorange value or other value of ranging data 1225 measured in cross-correlating the signals 132 with the internal signals. The measured receive time 1252' can correspond to a measured time that a corresponding bit and/or portion of signal 132 at which the transmit time was received, for example, as measured by utilizing clock signal 1266 and/or internal signals 1223.

The state estimation module can generate the clock state data 1245 as a function of the transmit time 1251, the ranging value 1259, and/or the measured receive time 1252'. A given clock state data 1245.*i*, for example, corresponding to the clock state at the receipt of portion of the signal that indicates a given transmit time 1251.*i*, can optionally be further generated based on prior clock state data 1245.*i*–1 and/or based on updating a corresponding estimation filter. This prior clock state data 1245.*i*–1 can be accessed in memory module 310 and/or other memory of navigation processing system 300 storing at least one prior clock state data, such as clock state data 1245.*i*−1. The newly generated clock state data 1245.*i* can be stored in memory module 310 for use in generating one or more subsequent clock state data 1245, such as subsequent clock data 1245.*i*+1, for one or more subsequent transmit times 1251, such as a subsequent transmit time 1251.*i*+1 or other subsequent current time. The newly generated clock state data 1245.*i* can replace the prior clock state data 1245.*i*−1, where only the most recent clock state data 1245 is maintained memory. Alternatively, a log of multiple clock state data 1245 can be maintained in memory, where the newly generated clock state data 1245.*i* is added to memory for storage in conjunction with at least the prior clock state data 1245.*i*−1.

In particular, the clock state data 1245 can include a clock bias 1246, which can indicate a bias value of the clock signal 1266 of clock 365, for example, relative to atomic time and/or relative to time established based on received signals 132. The clock bias 1246 can be determined based on the transmit time 1251, the ranging value 1259, and/or the measured receive time 1252'.

The clock state data 1245 can include a clock drift 1247, which can indicate a drift value of the clock signal 1266 of clock 365, for example, relative to atomic time and/or relative to time established based on received signals 132. This clock drift 1247 can correspond to a derivative and/or differential of the clock bias 1246, for example, from one or more prior clock states to the current clock state. For example, the clock bias 1246 of prior clock state data 1245.*i*−1 and clock bias 1246 of the new clock state data is utilized to determine the clock drift 1247 of the new clock state data 1245.*i*.

The clock state data 1245 can include a clock drift rate 1248, which can indicate a drift rate value of the clock signal 1266 of clock 365, for example, relative to atomic time and/or relative to time established based on received signals 132. This clock drift rate 1248 can correspond to a derivative and/or differential of the clock drift 1247, and/or a second derivative and/or second differential of the clock bias 1246, for example, from one or more prior clock states to the current clock state. For example, the clock drift 1247 of prior clock state data 1245.*i*−1 and clock drift 1247 of the new clock state data is utilized to determine the clock drift rate 1248 of the new clock state data 1245.*i*. As another example, the clock bias 1246 of multiple prior clock state data 1245.*i*−1-1245.*i*-*k* and clock bias 1246 of the new clock state data is utilized to determine the clock drift rate 1248 of the new clock state data 1245.*i*.

The clock bias 1246, clock drift 1247, and/or clock drift rate 1248 of the clock state data 1245 can optionally be generated and stored over time as discussed in conjunction with the state estimator flow of FIG. 5A. The clock bias 1246, clock drift 1247, and/or clock drift rate 1248 of the clock state data 1245 can optionally include, implement, and/or be expressed as some or all of the curve fit parameters and/or propagated state data discussed in conjunction with FIG. 5B. For example, the propagated state data includes propagated clock state data based on the clock bias 1246, clock drift 1247, and/or clock drift rate 1248.

While not depicted in FIG. 12E, additional derivatives and/or differentials, such as any Nth derivative and/or differential of clock bias 1246 can be generated in given clock state data 1245 to characterize the clock 365. Alternatively or in addition, any other distribution information, estimations, and/or other characterization of the clock signal 1266, such as any type of measured and/or estimated error relative to atomic time, can be indicated in and/or determined based on one or more clock state data 1245 generated over time.

While not depicted in FIG. 12E, in some embodiments, the most recent clock state data 1245 can be utilized applied to clock signal 1266, for example, where generating internal signals 1223 and/or determining measured receive time 1252' includes applying the most recent clock state data 1245 can be utilized applied to clock signal 1266 to correct for any known clock error of the clock 365. Alternatively, as illustrated in FIG. 12E, the clock state data simply indicates these errors, where clock signal 1266 is not adjusted in generating internal signals 1223 and/or in generating measured receive time 1252'.

FIG. 12F illustrates an embodiment of a navigation processing system 300. Some or all features and/or functionality of the navigation processing system 300 of FIG. 12F can be utilized to implement the navigation processing system 300 of FIG. 12B and/or any other embodiment of navigation processing system 300 described herein.

The signal receiving and processing module 1220 can implement a navigation message generator 1234 that is configured to generate a navigation message that includes the clock state data 1245. The navigation message 1235 can further include the transmit time 1251 and/or a time stamp or other time data indicating a current time generated by the navigation signal receiving and processing module based on synchronizing with atomic time as discussed previously.

The signal receiving and processing module 1220 can implement a broadcast carrier signal generator 1232 that is configured to generate a broadcast carrier signal based on utilizing clock signal 1266. For example, the broadcast carrier signal 1233 is generated at a configured and/or predetermined one or more frequencies based on clock signal 1266. An actual frequency of broadcast carrier signals 1233 at a given time can be different from a corresponding configured and/or predefined frequency, where this difference is based on a corresponding the clock signal 1266 error, such as a non-zero clock bias, clock drift, and/or clock drift rate. For example, the difference between the actual frequency and the configured and/or predefined frequency can be a deterministic function and/or increasing function of clock bias 1246.

The signal receiving and processing module 1220 can implement a modulation module 1238 that is configured to generate a navigation signal 240 for broadcast based upon modulating the navigation message 1235 upon the broadcast carrier signals 1233. The modulation module 1238 can optionally modulate spreading code 1237 upon the broadcast carrier signals 1233, for example, that identifies a satellite 110 or other node implementing the navigation processing system 300 and/or enables a receiving client device 160 to generate ranging data from the navigation signal 240.

Modulating a given navigation message 1235 upon broadcast carrier signal can include modulating a given navigation message 1235 and/or a given one or more bits of navigation message 1235 upon navigation signal 240 in accordance with a scheduled time and/or for transmission in accordance with the scheduled time. For example, timing data, such as a transmit time 1251, other time value, or other data indicating when the corresponding bit and/or portion of the signal was transmitted, can be included in navigation message 1235 based on navigation message 1235 being generated to include this timing data. The navigation message can be scheduled for transmission in navigation signals 240 at a time corresponding to the timing data and/or at a time with a predetermined offset from the timing data. Transmission at the scheduled time can be achieved via modulation module 1238 based on utilizing clock signals 1266. However, a clock error in clock signals 1266 can render the timing data to be transmitted at an actual transmit time that is different from the scheduled transmit time. A difference in time from the actual transmit time and the scheduled transmit time denoted by the timing data can be different based on a corresponding the clock signal 1266 error, such as a non-zero clock bias, clock drift, and/or clock drift rate. For example, a difference in time from the actual transmit time and the scheduled transmit time denoted by the timing data can be a deterministic and/or increasing function of the clock bias 1246 of clock signals 1266.

Navigation signals 240 can be different from navigation signals 132. For example, the navigation signals 240 are generated and/or transmitted: in a different frequency band from navigation signals 132; at a different amplitude and/or power from navigation signals 132, for example, based on navigation signals 240 being transmitted from LEO and based on navigation signals 132 being transmitted from MEO and/or based on navigation signals 240 being transmitted from satellites in a different constellation configuration from satellites transmitting navigation signals 132; at a different to include a broadcast carrier signal 1233 that is in accordance with a different one or more frequencies than navigation signals 132; to include spreading code 1237 that is in accordance with a different type and/or structure of spreading code than navigation signals 132; to include navigation messages 1235 in accordance with a different schema, structure, size, and/or format than navigation messages of navigation signals 132; in accordance with a different encryption scheme and/or encryption level than navigation signals 132; and/or in accordance with other differences from navigation signals 132.

In various embodiments, while not illustrated in FIGS. 12B-12F, the navigation signal receiving and processing module 1220 can be operable to receive and/or process another one or more signals from another one or more entities, such one or more backhaul satellite 150, one or more ground stations 200, one or more satellites 110, and/or one or more other nodes of the satellite constellation system 100. For example, alternatively or in addition to receiving and processing GNSS signals generated and transmitted via GNSS satellites based on high precision clocks onboard these GNSS satellites, the navigation signal receiving and processing module 1220 can receive signals generated via one or more backhaul satellite 150, one or more ground stations 200, one or more satellites 110, and/or one or more other nodes of the satellite constellation system 100 based on high precision clocks onboard these entities. This can be ideal to enable the satellite constellation system 100 to facilitate client devices 160 to establish atomic time as discussed herein without a reliance upon GNSS signals and/or without synchronizing with time established by a GNSS constellation.

As a particular example, a backhaul satellite 150, a ground station 200, and/or a small subset of the satellites 110 in satellite constellation system 100 are equipped with onboard high precision clocks, such as onboard atomic clocks. The backhaul satellite 150, a ground station 200, and/or a small subset of the satellites 110 can thus generate their own signals that implement signals 132 and/or that otherwise indicate timing data, such as one or more time-stamps, a carrier frequency, and/or a ranging signal, that are generated via the high precision clock and/or that are modulated by utilizing the high precision clock.

As another particular example, the backhaul satellite 150, ground station 200, and/or some or all of the satellites 110 in satellite constellation system 100 are equipped with onboard non-atomic clocks, such as clock 365, and generate their own navigation signals 240 that include clock state data 1245, for example, by implementing their own navigation processing system 300 discussed in conjunction with FIG. 12B-12F. For example, rather than receiving a signal 132 from a GNSS satellite as illustrated in FIGS. 12B-12F, a given navigation processing system 300 can receive a navigation signal 240 generated and transmitted by another navigation processing system 300 of FIGS. 12B-12F that is onboard a corresponding backhaul satellite 150, ground station 200, and/or satellites 110. For example, the given navigation processing system 300 can extract and apply the clock state data generated by the other navigation processing system 300 from the navigation signal received from the other navigation processing system, enabling the given navigation processing system 300 to generate its own clock state data. In such embodiments, the given navigation processing system 300 can perform some or all of the functionality of a client device 160 of FIGS. 12G-12H to receive and process navigation signals 240 to generate its precision timing data and/or to determine the clock state data for its own clock 365.

FIG. 12G presents an embodiment of a client device 160 that implements a receiver 1904, processing system 920, and/or client device components and applications 1925. For example, the client device 160 of FIG. 12G can be implemented as the mobile device 900 of FIG. 9A, where the receiver 1904 is implemented by utilizing the global positioning receiver 904; where the processing system 1920 is implemented as the processing system 920, and/or where the client device components and applications 1925 is implemented as the mobile device components and applications 925. The client device 160 can correspond to any type of client device described herein, such as a cellular device, smart phone, mobile device, vehicle, stationary infrastructure element, or other type of client device 160 described herein. The client device 160 can optionally correspond to a node of the satellite constellation system 100. Some or all features and/or functionality of the client device 160 of FIG. 12G can be utilized to implement mobile device 900 of FIG. 9A and/or any other embodiments of client device 160 described herein.

The receiver 1904 can utilize an antenna 1902, such as the antenna 902 of FIG. 9A, to receive navigation signals 240 from one or more satellites 110 and/or other nodes of the satellite constellation system 100 that generate and transmit navigation signals 240 via a navigation processing system 300. For example, the navigation signals 240 are generated to include clock state data 1245 and/or transmit times 1251 via some or all functionally discussed in conjunction with FIGS. 12B-12F.

The processing system 1920 can utilize at least one processor to implement a precision timing generator module 1270 that is configured to generate precision timing data 1271 based on the clock state data 1245 included in navigation signal 240 and/or other timing data of the navigation signal 240, such as a transmit time 1251 and/or other time value indicating when a corresponding one or more bits or other portions of navigation signal 240 was transmitted. The precision timing data 1271 can be utilized by client device components and/or application, for example, that require operation via atomic time and/or other precision time. The precision timing data 1271 can indicate atomic time and/or can correspond to synchronization with and/or establishing of atomic time.

The precision timing data 1271 can be implemented as the timing data 922 of FIG. 9A and/or can be utilized to generate the timing data 922 of FIG. 9A. The precision timing data 1271 can further enable the client device 160 to generate its own position solution, such as the enhanced position data 922.

FIG. 12H illustrates an embodiment of client device 160. Some or all features and/or functionality of the client device 160 of FIG. 12H can be utilized to implement the client device 160 of FIG. 12G and/or any other embodiment of client device 160 described herein.

The client device can include its own clock 931, which can be implemented as one or more clocks and/or a clock ensemble. The clock 931 can be a non-atomic clock. The clock 931 can be the same or different type of clock as clock 365, and can have: a same or different long term stability as clock 365; a same or different short term stability as clock 365; and/or same or different error characterization as clock 365 over time.

The processing system 1920 can implement an internal signal generator 1272, which can be configured to generate internal signals 1273 based on clock signal 932. The internal signal generator 1272 can be implemented in a same or similar fashion as internal signal generator 1222. For example, the one or more internal signals 1273 are generated in accordance with at least one frequency, for example, corresponding to at least one frequency of the navigation signals 240. As another example, the one or more internal signals 1273 are generated in accordance with a spreading code, for example, corresponding to at least one spreading code 1237 of the navigation signals 240. In some embodiments, the internal signal generator 1272 is implemented via a GNSS receiver 360 of the client device 160, the global positioning receiver 904, receiver 1904, and/or other processing resources of the client device 160.

The processing system 1920 can implement a correlator module 1224, for example, that is configured to cross-correlate the navigation signals 240 with internal signals 1273. The correlator module 1274 can be implemented in a same or similar fashion as correlator module 1224. The correlator module 1274 can be configured to generate ranging data, for example, based on identifying a peak in correlation data of the correlation module and based on further identifying a range of time, such as a number of peaks of signal navigation signal 240 and/or internal signal 1273 and/or number of bits of navigation signal 240 and/or internal signal 1273, corresponding to timespan between transmission and receipt of the navigation signal 240, such as a particular peak and/or particular data in navigation signal 240, and/or corresponding to physical distance between the client device 160 and the satellite 110 and/or other node that transmitted the navigation signal 240, for example, based on applying a value of the speed of light to the timespan. In some embodiments, the correlator module 1274 is implemented via a GNSS receiver 360 of the client device 160, the global positioning receiver 904, receiver 1904, and/or other processing resources of the navigation processing system 300.

The correlator module 1274 can implement a message extraction module 1276. The message extraction module 1276 can be implemented in a same or similar fashion as the message extraction module 1228. The message extraction module 1276 can be operable to extract messages and/or other data modulated upon one or more broadcast carrier signals 1233 of navigation signals 240.

The message extraction module 1276 can further extract a transmit time 1251, and/or other timing data included in a navigation message 1235 of navigation signal 240 that indicates a time of transmission of a corresponding bit of the signal 132 that includes the transmit time and/or that corresponds to a start of the navigation message. The transmit time 1251 can optionally indicate a number of seconds and/or a number of weeks, and/or can correspond to a current and/or atomic time determined by the navigation processing system 300 that generated the navigation signal 240 as discussed previously.

The message extraction module 1276 can extract clock state data 1245 and/or other state data 1240 included in navigation messages 1235. This extracted clock state data 1245 can include clock bias 1246, clock drift 1247, and/or clock drift rate 1248. The extracted clock state data 1245 can include propagated clock state data generated based on the clock bias 1246, clock drift 1247, and/or clock drift rate 1248.

The correlator module 1274 can further generate a ranging value 1255, such as a pseudorange, and/or measured receive time 1254', for example, corresponding to a time that one or more bits indicating transmit time 1251 were received.

The precision timing generator module 1270 can generate precision timing data 1271 based on the transmit time 1251, clock state data 1245, ranging value 1255, and/or measure receive time 1254'. As the one or more navigation signals 240 are received from the same or different satellites 110 or other nodes over time, further transmit times 1251, clock state data 1245, ranging values 1255, and/or measured receive times 1254' can be generated as illustrated in FIG. 12H to enable the client device 160 to maintain generating of precision timing data 1271 over time and/or to maintain synchronization with atomic time over time.

For example, a current time, corresponding to true atomic time can be established by the client device 160 based on utilizing a given transmit time 1251, subsequently received transmit times 1251, and/or peaks and/or bits of navigation signal 240 thereafter in conjunction with a known frequency of navigation signal 240 to synchronize with and/or lock-into atomic time as navigation signal 240 continue to be received from the same or different one or more satellites 110 or other nodes over time, for example, as different satellites 110 or other nodes come in and out of view of the client device 160 over time.

This can include applying the clock bias 1246, clock drift 1247, clock drift rate 1248, and/or propagated clock state data of a given clock state data 1245 for a window of time after the clock state data 1245, for example, until a subsequent clock state data 1245 is generated by and received from the satellite 110 or other node in the navigation signal 240. For example subsequently determined current times of the precision timing data 1271 can be generated within this window of time based on applying the clock drift 1247, clock drift rate 1248, and/or propagated clock state data of the most recently received clock state data 1245. In cases where the clock state data 1245 indicates that the clock signal 1266 is estimated to drift or otherwise change over time, different current times in the time window can be generated based on applying different corresponding clock biases 1246 to the received navigation signal 240, for example, to correct corresponding changes in error of navigation signal 240 induced by clock signal 1266.

The precision timing data 1271, other state data 1240 extracted from navigation signals 240 such as orbital position data, and/or other ranging data can be further utilized to generate the enhanced position data 922 indicating a precise position of the client device, for example, in conjunction with receiving other navigation signals 240 from one or more other satellites and/or in conjunction with receiving navigation signals 132 from one or more GNSS satellites 130. The precision timing data 1271, other state data 1240 extracted from navigation signals 240 such as orbital position data, and/or other ranging data can be further utilized to generate clock state data for the client device, characterizing error in the client device's own clock 932 relative to atomic time.

FIGS. 12I-12L provide an illustrative example of determining and correcting for clock error as described in conjunction with FIGS. 12A-12H. Some or all features and/or functionality discussed in conjunction with FIGS. 12I-12L can be utilized to implement navigation processing system 300 of FIGS. 12B-12F and/or client device 160 of FIGS. 12G and/or 12H.

As illustrated in FIG. 12I, a GNSS satellite 130 generates and transmits signal 132, corresponding to "signal A." The signal 132 can indicate various transmit times 1251 as it is transmitted over time. Each transmit time 1251 can indicate when the corresponding signal was transmitted by the GNSS satellite 130.

At a particular time 1251.$i$ of atomic time, transmitted signal 132 indicates this time transmit time 1251.$i$. The corresponding bits and/or portion of signal 132 that indicate transmit time 1251.$i$ can be transmitted by satellite 130 at exactly the time 1251.$i$ and/or at an actual transmit time that is within the time 1251.$i$ by a maximum threshold as required for keeping atomic time. For example, the corresponding bits and/or portion of signal 132 that indicate transmit time 1251.$i$ can be transmitted at exactly the time 1251.$i$ based on GNSS satellite 130 utilizing an onboard high precision clock to generate and transmit its signal 132.

A satellite 110 can receive this portion of the signal 132 at a corresponding receive time 1252.$i$. The satellite can extract transmit time 1251.$i$ from signal 132 to establish and/or maintain synchronization with atomic time, for example, based on generating a ranging value indicating the actual difference from corresponding receive time 1252.$i$ to transmit time 1251.$i$ and/or locking-in upon signal 132 as the satellite 110 continues to receive signals 132 from the same or different satellite 130.

The satellite 110 can generate and transmit its own navigation signal 240, corresponding to "signal B." The navigation signal 240 can similarly indicate various transmit times 1251 as it is transmitted over time. Each transmit time 1251 can indicate when the corresponding signal was scheduled to be transmitted by the navigation satellite 110. The transmit times can be established by satellite 110 and included in navigation signals based on the satellite 110 receiving one or more prior transmit times 1251 in received signals 132 and/or establishing synchronization with atomic time accordingly. The navigation signal 240 can further include clock state data 1245, for example indicating the current and/or propagated state of the satellite 110's clock 365 at the corresponding scheduled transmit time 1251.

In this case, transmit time 1251.$i$+1 is indicated in the navigation signal 240 generated by navigation satellite 110 as a scheduled transmit time. This scheduled transmit time 1251.$i$+1 can align with a time that satellite 130 transmits this time 1251.$i$+1 in its own signal 132, as illustrated in FIG. 12I. Alternatively, transmit times 1251 included in navigation signals 240 can be offset from and/or in different intervals from the transmit times included in signals 132, for example, based on different carrier frequencies of these signals and/or based on other predetermined interval and/or scheduling of their transmit times. In either case, the scheduled transmit time 1251.$i$+1 can be in accordance with a true, corresponding time of atomic time based on the satellite having synchronized with and/or having established atomic time.

A client device, for example, on earth, can receive this portion of the navigation signal 240 indicating transmit time 1251.$i$+1 at a corresponding receive time 1254.$i$+1. The satellite can extract transmit time 1251.$i$+1 from signal 240 to establish and/or maintain synchronization with atomic time, for example, by locking-in upon navigation signal 240 as the client device continues to receive navigation signals 240 from the same or different satellite 110.

However, due to clock error of clock signal 1266, the corresponding portion of navigation signal indicating transmit time 1251.$i$+1 is actually transmitted by satellite 110 at a different corresponding time 1253.$i$+1. The clock state data 1245.$i$ can indicate and/or estimate this clock error, and can be utilized by client device to establish atomic time or other precision timing data accurately, based on the clock state data 1245.$i$ characterizing the corresponding error appropriately.

As illustrated in FIG. 12J, a clock error 1256 is induced in receiving of signal A by navigation processing system of satellite 300. In particular, the navigation processing system measures a measured receive time 1252.$i$' based on clock 365, which is different from an actual receive time 1252.$i$. This difference can correspond to a clock error 1256.$i$, for example, which is induced based on a clock bias, clock drift, and/or clock drift rate of the clock 365 at the given time. The clock error 1256 for receipt of signal A over time can be change over time due to the clock bias, clock drift, and/or clock drift rate changing over time, for example, due to the clock 365 not having long term stability and/or based on clock 365 not being an atomic clock. These changes over time can cause the differences between a measured receive time 1252' and corresponding actual receive times 1252 to be different by differing, and perhaps unpredictable, amounts over time.

A clock error 1257 is also induced in transmitting of signal B by navigation processing system 300 of satellite 110. In particular, a given scheduled transmit time 1251.$i$+1 can be different from a different from the actual transmit time 1253.$i$+1 as discussed previously based on utilizing clock 365 to transmit signal B. This difference can correspond to a clock error 1257.$i$+1, for example, which is induced based on a clock bias, clock drift, and/or clock drift rate of the clock 365 at the given time. The clock error 1257 for transmission of signal B over time can be changed over time due to the clock bias, clock drift, and/or clock drift rate changing over time, for example, due to the clock 365 not having long term stability and/or based on clock 365 not being an atomic clock. These changes over time can similarly cause the differences between a scheduled transmit time 1251 and corresponding actual transmit times 1253 to be different by differing, and perhaps unpredictable, amounts over time.

A clock error 1258 is also induced in receiving of signal B by client device processing system 920 of client device 160. In particular, the client device processing system 920 measures a measured receive time 1254.$i$+1' based on clock 365, which is different from an actual receive time 1254.$i$+1. This difference can correspond to a clock error 1258.$i$, for example, which is induced based on a clock bias, clock drift, and/or clock drift rate of the clock 931 at the given time. The clock error 1256 for receipt of signal B over time can be changed over time due to the clock bias, clock drift, and/or clock drift rate changing over time, for example, due to the clock 931 not having long term stability and/or based on clock 931 not being an atomic clock. These changes over time can cause the differences between a measured receive time 1252' and corresponding actual receive times 1252 to be different by differing, and perhaps unpredictable, amounts over time.

As illustrated in FIG. 12K, the clock error 1256.*i* can be characterized by navigation processing system 300 as a function of the transmit time 1251.*i*, the measured receive time 1252.*i'*, and the ranging value 1259.*i* indicating the difference between the true transmit time 1251.*i* and the true receive time 1252.*i*, for example, that is measured via cross-correlating signal A with internal signal 1223 as discussed previously, In particular, as the clock error in transmission of signal A is zero and/or negligible due to the use of a high precision clock, most or all discrepancy between the difference between transmit time 1251.*i* and the measured receive time 1252.*i'*, and the ranging value 1259 can be attributed to the clock error 1256.*i* in receiving signal A. The clock state data 1245.*i* can be generated by the navigation processing system 300 as a function of, and/or to otherwise indicate this clock error 1256.*i*.

Client device processing system 920 can apply this clock error clock error 1256.*i* indicated in clock state data 1245.*i* to determine clock error 1257.*i*+1. In particular, the use of the same clock 365 to both receive signal A and to transmit signal B, as well as the short term stability of this clock 365, can be leveraged as discussed previously to enable the assumption that a given clock error 1257.*i*+1 is the same and/or is substantially the same as the clock error 1256.*i*, and/or is otherwise characterized in the most recent clock state data 1245.*i* received in signal B.

Thus, given the clock state data 1245.*i* that indicates this transmission clock error 1257.*i*+1 as well as the transmit time 1251.*i*+1 extracted from signal B, the measured receive time 1254.*i*+1' measured using clock 931, and the ranging value 1255.*i*+1 indicating the difference between the true transmit time 1251.*i*+1 and the true receive time 1254.*i*+1 for example, that is measured via cross-correlating signal B with internal signal 1273 as discussed previously. As both the clock error 1257.*i*+1 in transmission of signal B and the clock error 1258.*i*+1 in receiving of signal B can be resolved, the true atomic time can be established to enable generation of precision timing data 1271.

FIG. 12L illustrates a further example of this timeline where a fixed offset 1279, such as a known and/or estimated latency in the message generation and/or transmission process, and/or another predefined and/or scheduled offset, is applied in transmission of the bits and/or portion of navigation signal 240 indicating a given transmit time 1251.*i*+1. In particular, the scheduled transmit time 1251.*i*+1 is offset by this fixed offset 1279, and the bits and/or portion of the navigation signal indicating this scheduled transmit time 1251.*i*+1 is sent at a true transmit time 1253.*i*+1 that thus offset by a combination of this fixed transmit time and the clock error 1256.*i*. The clock state data 1256.*i* can further indicate and/or further be a function of this fixed offset 1279, enabling the client device 160 to appropriately account for this fixed offset 1279, as well as the characterization of clock error 1256.*i*.

In other embodiments, the transmit time 1251.*i*+1 can be adjusted to reflect the actual scheduled transmit time, rather than time 1251.*i*+1, by applying this offset 1279, for example, where the navigation signal instead indicates transmit time 1251.*i*+1+1279, and only the clock error 1256.*i* need be accounted for.

While the examples of FIGS. 12I-12L corresponds to a simple example that only visually illustrates effects of clock bias 1246, similar functionality can be performed by navigation processing systems 300 and client devices 160 to similarly determine and correct for clock drift 1247, clock drift rate 1248, and/or other characterization of current and/or propagated clock state of clock state data 1245, as discussed in conjunction with FIGS. 12A-12H.

In various embodiments, a low-earth orbit (LEO) satellite of a constellation of LEO satellites in LEO includes a non-atomic clock, a navigation signal receiving and processing module, and/or a navigation signal generation and transmission module. The non-atomic clock can be configured to generate a clock signal, such as clock signal 1266. The navigation signal receiving and processing module can be configured to receive first signaling, such as one or more signals 132, from at least one non-LEO navigation satellite of a constellation of non-LEO navigation satellites in non-LEO, such as at least one GNSS satellite 130. The first signaling can include first timing data generated based on a high precision clock, such as transmit time 1251 generated via an atomic clock of satellite 130. The navigation signal receiving and processing module can alternatively or additionally be configured to generate clock state data, such as clock state data 1245, based on the clock signal and the first timing data. The navigation signal generation and transmission module can be configured to receive the clock signal from the non-atomic clock, generate a navigation message, such as navigation message 1235, that indicates the clock state data. The navigation signal generation and transmission module can be alternatively or additionally configured to generate a broadcast carrier signal, such as broadcast carrier signal 1233, by utilizing the clock signal. The navigation signal generation and transmission module can be alternatively or additionally configured to generate a navigation signal, such as navigation signal 240, based on modulating the navigation message upon the broadcast carrier signal. The navigation signal generation and transmission module can be alternatively or additionally configured to broadcast the navigation signal for receipt by at least one client device. The navigation signal can facilitate the at least one client device to generate precision timing data based on the clock state data.

In various embodiments, the non-atomic clock is implemented via clock 365 of FIGS. 12B-12F, the navigation signal receiving and processing module is implemented via navigation signal receiving and processing module 1220 of FIGS. 12B-12F, and/or the navigation signal generation and transmission module can be implemented via the navigation signal generation and transmission module 1230 of FIGS. 12B-12F.

In various embodiments, the navigation signal is further modulated based on modulating spreading code identifying the LEO satellite upon the broadcast carrier signal. In various embodiments an analog to digital converter of the navigation signal receiving and processing module is configured to extract the first timing data from the first signaling by utilizing the clock signal. In various embodiments, a signal generator of the navigation signal receiving and processing module is configured to generate at least one internal signal by utilizing the clock signal, wherein the navigation signal receiving and processing module is further configured generate ranging data based on cross-correlating the at least one internal signal with the first signaling, and wherein the clock state data is based on the ranging data.

In various embodiments, the signal generator of the navigation signal receiving and processing module is configured to generate the at least one internal signal for cross-correlation with the first signaling by applying prior clock state data to the clock signal. In various embodiments, the clock state data is updated from the prior clock state data. In various embodiments, the navigation signal receiving and processing module is further configured to receive subsequent first signaling indicating subsequent first timing data. In various embodiments, the signal generator of the navigation signal receiving and processing module is further configured to generate at least one updated internal signal for cross-correlation with the subsequent first signaling by applying the clock state data to the clock signal.

In various embodiments, a signal generator of the navigation signal generation and transmission module is configured to generate the broadcast carrier signal by applying the clock state data to the clock signal.

In various embodiments, the LEO satellite further includes at least one memory, for example, implemented via memory module 310. In various embodiments the navigation signal receiving and processing module is further configured to generate clock state data further based on prior clock state data accessed in the at least one memory, store the clock state data in the at least one memory; receive subsequent first signaling; generate updated clock state data based on the subsequent first signaling, the clock signal, and the clock state data accessed in the at least one memory; and/or store the updated clock data in the at least one memory.

In various embodiments, the at least one non-LEO navigation satellite includes a Global Positioning System (GPS) satellite, and/or the high precision clock is an atomic clock of the GPS satellite. In various embodiments, the navigation signal receiving and processing module includes a GNSS receiver disciplined to the clock signal of the non-atomic clock, and/or the navigation signal receiving and processing module includes a software defined radio (SDR) disciplined to the clock signal of the non-atomic clock. In various embodiments, the non-atomic clock is an oven-controlled crystal oscillator (OCXO).

In various embodiments, a low-earth orbit (LEO) satellite includes a non-atomic clock configured to generate a clock signal. The LEO satellite can further include at least one receiver configured to receive first signaling from at least on non-LEO navigation satellite of a constellation of non-LEO navigation satellites in non-LEO. The first signaling can include first timing data generated based on a high precision clock. The LEO satellite can further include at least one processor configured to execute operational instructions that cause the at least one processor to perform operations that include generating clock state data based on the clock signal and the first timing data; generating a navigation message that indicates the clock state data generating a broadcast carrier signal by utilizing the clock signal; and/or generate a navigation signal based on modulating the navigation message upon the broadcast carrier signal. The LEO satellite can further include a navigation signal transmitter configured to broadcast the navigation signal for receipt by at least one client device, the navigation signal facilitating the at least one client device to generate precision timing data based on the clock state data.

In various embodiments, the non-atomic clock is implemented via clock 365, the at least one receiver is implemented via at least one GNSS receiver 360, the at least one processor is implemented via processing module 320, and/or the navigation signal transmitter is implemented via a navigation signal transmitter 330.

In various embodiments, the clock state data includes a clock bias relative to the high precision clock, a clock drift relative to the high precision clock, and/or a clock drift rate relative to the high precision clock. In various embodiments, the client device generates precision timing data based on applying the clock bias, the clock drift, and/or the clock drift rate to the navigation signal.

In various embodiments, the first signaling includes at least one GNSS signal generated by a GNSS satellite of a GNSS satellite constellation. Execution of the operational instructions can cause the at least one processor to perform operations that further include generating orbital position data of the LEO satellite based on the GNSS signal. In various embodiments, the navigation signal is generated to include the orbital position data.

In various embodiments, the at least one receiver is configured to receive correction data associated with the GNSS satellite constellation. In various embodiments, generating the clock state data for the non-atomic clock includes applying the correction data to the first timing data.

In various embodiments, the correction data includes Precise Point Positioning (PPP) correction data. In various embodiments, generating the clock state data includes applying clock estimate data for the GNSS satellite included in the PPP correction data to the first timing data. In various embodiments, the at least one receiver is configured to receive the correction data from at least one of: a backhaul satellite, or a ground station. In various embodiments, the PPP correction data is received via a backhaul receiver 340 of the satellite, a satellite receiver 350 of the satellite, and/or another receiver of the satellite.

In various embodiments, the navigation signal is generated to indicate timing data based on the first timing data. In various embodiments, the navigation signal facilitates the at least one client device to generate precision timing data based on applying the clock state data to the timing data.

In various embodiments, a client device includes at least one receiver configured to receive at least one navigation signal from at least one satellite of a constellation of LEO navigation satellites in LEO. The at least one navigation signal can include at least one timing data and/or can include at least one clock state data for at least one non-atomic clock utilized to generate the at least one navigation signal. The at least one processor can be configured to execute operational instructions that cause the at least one processor to perform operations that include extracting the clock state data and the timing data from the at least one navigation signal and/or generating precision timing data based on applying the clock state data to the timing data.

In various embodiments, the client device includes a client device non-atomic clock that generates a clock signal. The operations can further include generating at least one internal signal by utilizing the clock signal; generating ranging data based on cross-correlating the at least one internal signal with the at least one navigation signal; and/or generating client device clock state data for the client device non-atomic clock based on the ranging data and the clock state data. The precision timing data can be generated based on applying the client device clock state data to the timing data. In various embodiments, the at least one navigation signal further includes at least one orbital position data for the at least one satellite. The operations can further include generating enhanced position data based on the orbital position data and based on the precision timing data.

FIG. 12M illustrates a method for execution. Some or all steps of FIG. 12M can be executed by at least one processor of a satellite, such as a satellite 110. Some or all steps of FIG. 12M can be performed via a navigation processing system 300 implemented by a satellite, a client device, a ground station, a backhaul satellite, stationary infrastructure, and/or any node of the satellite constellation system 100. Multiple different satellites 110 of the satellite constellation system 100 and/or any multiple different nodes of the satellite constellation system 100 can each implement their own navigation processing system 300 to perform some or all steps of FIG. 12M independently and/or simultaneously, with or without coordination. Some or all steps of FIG. 12M can be performed in conjunction with performing some or all steps of FIG. 12A. Some or all steps of FIG. 12M can be performed in conjunction with implementing some or all features and/or functionality of the navigation processing system 300 and/or a satellite 110 as discussed in conjunction with some or all of FIGS. 12B-12L.

Step 1282 includes generating a clock signal via a non-atomic clock, such as clock signal 1266 generated via clock 365. In various embodiments, the non-atomic clock can be included onboard a corresponding satellite 110 or other node that performs the method of FIG. 12M.

In various embodiments, the non-atomic clock is implemented via a single OCXO. In various embodiments, the non-atomic clock is implemented via multiple OCXOs of a clock ensemble. In various embodiments, the mon-atomic clock is implemented one or more TCXOs, one or more VCXOs, or one or more other types of clocks and/or clock ensembles. In various embodiments, the non-atomic clock is implemented as any non-atomic clock, such as any non-high precision clock and/or any other clock that is not characterized as having long term stability and/or that is non characterized as generating atomic time. In various embodiments, the non-atomic clock is implemented via a clock that is characterized as having short term stability, such as at least a threshold level of stability within a threshold amount of time, such as one second.

Step 1284 can include receiving, from at least one non-LEO navigation satellite of a constellation of non-LEO navigation satellites, first signaling. For example, the first signaling is implemented as signal 132 that is received from one or more non-LEO navigation satellites, such as one or more GNSS satellites 130. The first signaling, such as each of the one or more signals 132, can be generated via a high precision clock of the corresponding non-LEO navigation satellite, such as an atomic clock or other high precision clock onboard the corresponding non-LEO navigation satellite.

In various embodiments, the high precision clock can be characterized as having long term stability, such as a threshold level of stability over at least a threshold amount of time and/or indefinitely. In various embodiments, high precision clock can be characterized as being capable of generating atomic time. In various embodiments, the high precision clock can optionally be implemented via a clock that is characterized as having short term stability, such as at least a threshold level of stability within a threshold amount of time, such as one second.

In various embodiments, the short term stability of the non-atomic clock is greater than and/or is otherwise more favorable than the short term stability of the high precision clock. In various embodiments, the long term stability of the high precision clock is greater than and/or is otherwise more favorable than the long term stability of the non-atomic clock.

Generation of the first signaling based on the high precision clock can include the one or more non-LEO satellites generating a carrier signal at one or more carrier frequencies of the first signaling via a clock signal generated by the high precision clock. The one or more carrier frequencies of the first signaling can be fixed and/or stable based on the high precision clock being characterized as having the short term and/or long term stability.

Generation of the first signaling based on the high precision clock can include the one or more non-LEO satellites utilizing a clock signal of the high precision clock to modulate a ranging signal and/or a navigation message upon the carrier signal. For example, the ranging signal and/or a navigation message are modulated upon the carrier signal at a precise time based on utilizing the high precision clock.

The first signaling can indicate first timing data generated based on a high precision clock. For example, each signal 132 was generated by a corresponding one of the non-LEO navigation satellites based on a high precision clock, such as one or more atomic clocks and/or a high precision clock ensemble, onboard the corresponding one of the non-LEO navigation satellites.

In various embodiments, the first timing data is implemented as a time stamp or other time data indicating a transmit time included in a navigation message and/or other navigation data modulating upon a carrier and/or ranging signal of the signal 132. For example, the first timing data is implemented as transmit time 1251. This time data can be in accordance with a time format associated with the constellation of non-LEO navigation satellites. For example, the time data indicates a week number and/or second number corresponding to the current week and/or current second, and/or corresponding to atomic time. As a particular example, the time data indicates a week number and/or a second number of GPS time generated via a GPS satellite based on an atomic clock or other high precision clock on board the GPS satellite. The time data can otherwise indicate a high precision current time, such as a current time in accordance with true, atomic time, corresponding to the time at which this time data was transmitted by the corresponding non-LEO navigation satellite. For example, the time data is modulated upon the carrier signal at a corresponding time indicated by the time data based on utilizing the high precision clock.

In various embodiments, the first timing data is alternatively or additionally implemented as and/or based on a frequency of the signal 132, and/or implemented as and/or based on a ranging code of the signal 132. For example, a given current time can be determined by the navigation processing system 300 as a function of the time data included in the navigation message, as well as a determined amount of time after the time data in the signal 132, such as a number of peaks of the signal 132 after the time data was indicated in the signal 132 and/or a number of bits of the signal 132 after the time data was indicated in the signal 132.

Step 1286 includes generating clock state data based on the clock signal and the first timing data. For example, the clock state data can be implemented as clock state data 1245 that is included in state data 1240.

In various embodiments, clock state data can characterize a current state determined for and/or estimated for the non-atomic clock. In various embodiments, the clock state data indicates a clock bias, such as a value indicating a current bias of the non-atomic clock. The clock bias can be relative to the high precision clock and/or atomic time.

In various embodiments, the clock state data can alternatively or additionally indicate a clock drift, such as a value indicating a current drift of the non-atomic clock. The clock drift can be relative to the high precision clock and/or atomic time. The clock drift can be based on at least one clock bias value, such as a derivative and/or differential calculated based on the current clock bias value and/or at least one prior clock bias value.

In various embodiments, the clock state data can alternatively or additionally indicate a clock drift rate, such as a value indicating a current drift rate of the non-atomic clock. The clock drift rate can be relative to the high precision clock and/or atomic time. The clock drift rate can be based on at least one clock bias value, such as a second derivative and/or second differential calculated based on the current clock bias value and/or at least one prior clock bias value. The clock drift rate can be based on at least one clock drift value, such as a derivative and/or differential calculated based on the current clock drift value and/or at least one prior clock drift value.

In various embodiments, generating clock state data is further based on prior clock state data accessed in at least one memory. In various embodiments, the method can further include storing the clock state data in the at least one memory; receive subsequent first signaling; generating updated clock state data based on the subsequent first signaling, the clock signal, and/or the clock state data accessed in the at least one memory; and/or storing the updated clock data in the at least one memory.

In various embodiments, the method includes generating at least one internal signal by utilizing the clock signal and/or generating ranging data based on cross-correlating the at least one internal signal with the first signaling. The clock state data can be generated based on the ranging data.

In various embodiments, the method includes generating the at least one internal signal for cross-correlation with the first signaling by applying prior clock state data to the clock signal. The clock state data can be updated from the prior clock state data. The method can further include receiving subsequent first signaling indicating subsequent first timing data, and/or generating at least one updated internal signal for cross-correlation with the subsequent first signaling by applying the clock state data to the clock signal. For example, the updated internal signal is phase shifted from the at least one internal signal and/or has a different frequency from the at least one internal signal based on a clock bias indicated in the prior clock state data.

In various embodiments, the method includes extracting the first timing data from the first signaling by utilizing the clock signal. For example, an analog to digital converter utilizes the clock signal to extract message data that includes the first timing data from the first signaling. As another example, cross-correlating the at least one internal signal with the first signaling further includes extracting the first timing data from the first signaling.

In various embodiments, the method includes determining a measured receive time for the first signaling based on the clock signal, such as a measured receive time corresponding to receipt of the first timing data in the first signaling. For example, cross-correlating the at least one internal signal with the first signaling further includes identifying the measured receive time. Generating the clock state data can be further based on the measured receive time.

In various embodiments, the method includes receiving correction data associated with the non-LEO satellite constellation. Generating the clock state data for the non-atomic clock can include applying the correction data to the first timing data. In various embodiments, the correction data includes Precise Point Positioning (PPP) correction data, and the generating the clock state data the PPP correction data to the first timing data. For example, the PPP data can include clock estimate data for a corresponding non-LEO satellite that sent the first signaling. In various embodiments, the correction data is received from at least one of: a backhaul satellite, or a ground station.

In various embodiments, the method includes generating orbital position data of the corresponding satellite and/or corresponding node based on the first signaling. For example, the orbital position data is generated in conjunction with the clock state data as satellite state data.

In various embodiments, step 1284 and/or step 1286 are performed via at least one antenna of a GNSS receiver and/or at least one processor of a GNSS receiver, for example, where the GNSS receiver is implemented onboard the corresponding satellite and/or node that performs the step of FIG. 12M. In various embodiments, the GNSS receiver is disciplined to the clock signal of the non-atomic clock and/or the GNSS receiver otherwise performs its functionality, such as functionality of steps 1284 and/or step 1286, based on utilizing the clock signal of the non-atomic clock.

Step 1288 includes generating a navigation message that indicates the clock state data. Step 1290 includes generating a broadcast carrier signal by utilizing the clock signal. Step 1292 includes generating a navigation signal based on modulating the navigation message upon the broadcast carrier signal. Step 1294 includes broadcasting the navigation signal for receipt by at least one client device.

In various embodiments, the navigation signal is further modulated based on modulating spreading code identifying the corresponding LEO satellite and/or the corresponding node upon the broadcast carrier signal. In various embodiments, modulating the modulating the navigation message upon the broadcast carrier signal includes utilizing the clock signal of the non-atomic clock to modulate the navigation message upon the broadcast carrier signal, In various embodiments, the broadcast carrier signal is generated based on applying the clock state data to the clock signal. For example, an updated broadcast carrier signal is phase shifted from a prior broadcast carrier signal and/or has a different frequency from the prior broadcast carrier signal based on a clock bias indicated in the prior clock state data.

In various embodiment, the navigation message of the navigation signal further includes timing data indicating a scheduled time and/or estimated time that the navigation message is transmitted. For example, the method includes modulating the time data of the navigation message upon the carrier signal at a corresponding time indicated by the time data based on utilizing the clock signal of the non-atomic clock. In various embodiments, the scheduled transmission time indicated by the time data is different an actual transmission time indicated by the time data based on clock error of the non-atomic clock. In various embodiments, this clock error of the non-atomic clock is characterized by the clock state data generated in step 1286.

In various embodiments, the at least one client device the navigation signal facilitates the at least one client device to generate precision timing data based on the at least one client device applying the clock state data to the timing data included in the navigation signal.

In various embodiments, the navigation message further includes orbital position data. For example, the clock state data is generated in conjunction with orbital position data as satellite state data, and both the clock state data and the orbital position data are included in the navigation message based on including the satellite state data in the navigation message. In various embodiments, the at least one client device the navigation signal facilitates the at least one client device to generate enhanced position data based on: utilizing the precision timing data determined by the at least one client device; the at least one client device applying the clock state data to the navigation signal; and/or the at least one client device utilizing the orbital position data.

In various embodiments, step 1288, step 1290, step 1292, and/or step 1294 are performed via a software defined radio (SDR), where the SDR is implemented onboard the corresponding satellite and/or node that performs the step of FIG. 12M. In various embodiments, the SDR is disciplined to the clock signal of the non-atomic clock and/or the SDR otherwise performs its functionality, such as functionality of steps 1288, 1290, 1292, and/or 1294, based on utilizing the clock signal of the non-atomic clock.

FIG. 12N illustrates a method for execution. Some or all steps of FIG. 12N can be executed by at least one processor of a client device, such as a mobile device, infrastructure device, vehicle, a node of the satellite constellation 100, and/or any other client device 160 discussed herein. Some or all steps of FIG. 12N can be performed via a client device processing system 920 implemented by a client device 160. Multiple different client devices 160 can each implement their own client device processing system 920 to perform some or all steps of FIG. 12N independently and/or simultaneously, with or without coordination. Some or all steps of FIG. 12N can be performed in conjunction with implementing some or all features and/or functionality of the client device processing system 920 and/or a client device 160 as discussed in conjunction with some or all of FIGS. 12G-12L.

Step 1281 includes receiving at least one navigation signal from at least one satellite of a constellation of LEO navigation satellites in LEO. The at least one navigation signal includes at least one timing data and further includes at least one clock state data for at least one non-atomic clock utilized to generate the at least one navigation signal. For example, a given navigation signal is generated and transmitted by a given corresponding satellite based on the given satellite performing some or all steps of FIG. 12A and/or FIG. 12M. The clock state data of a given navigation signal can indicate bias, drift and/or drift rate of a non-atomic clock of the given satellite.

Step 1283 includes extracting the clock state data and the timing data from the at least one navigation signal. Step 1285 includes generating precision timing data based on applying the clock state data to the timing data.

In various embodiments, the method further includes generating a clock signal via a non-atomic clock of the client device. The method can further include generating at least one internal signal by utilizing the clock signal, generating ranging data based on cross-correlating the at least one internal signal with the at least one navigation signal, and/or generating client device clock state data for the non-atomic clock of the client device based on the ranging data and the clock state data. The precision timing data can be generated based on applying the client device clock state data to the timing data.

In various embodiments, the at least one navigation signal further includes at least one orbital position data for the at least one satellite. The method can further include generating enhanced position data based on the orbital position data and/or based on the precision timing data.

Figure 13A:
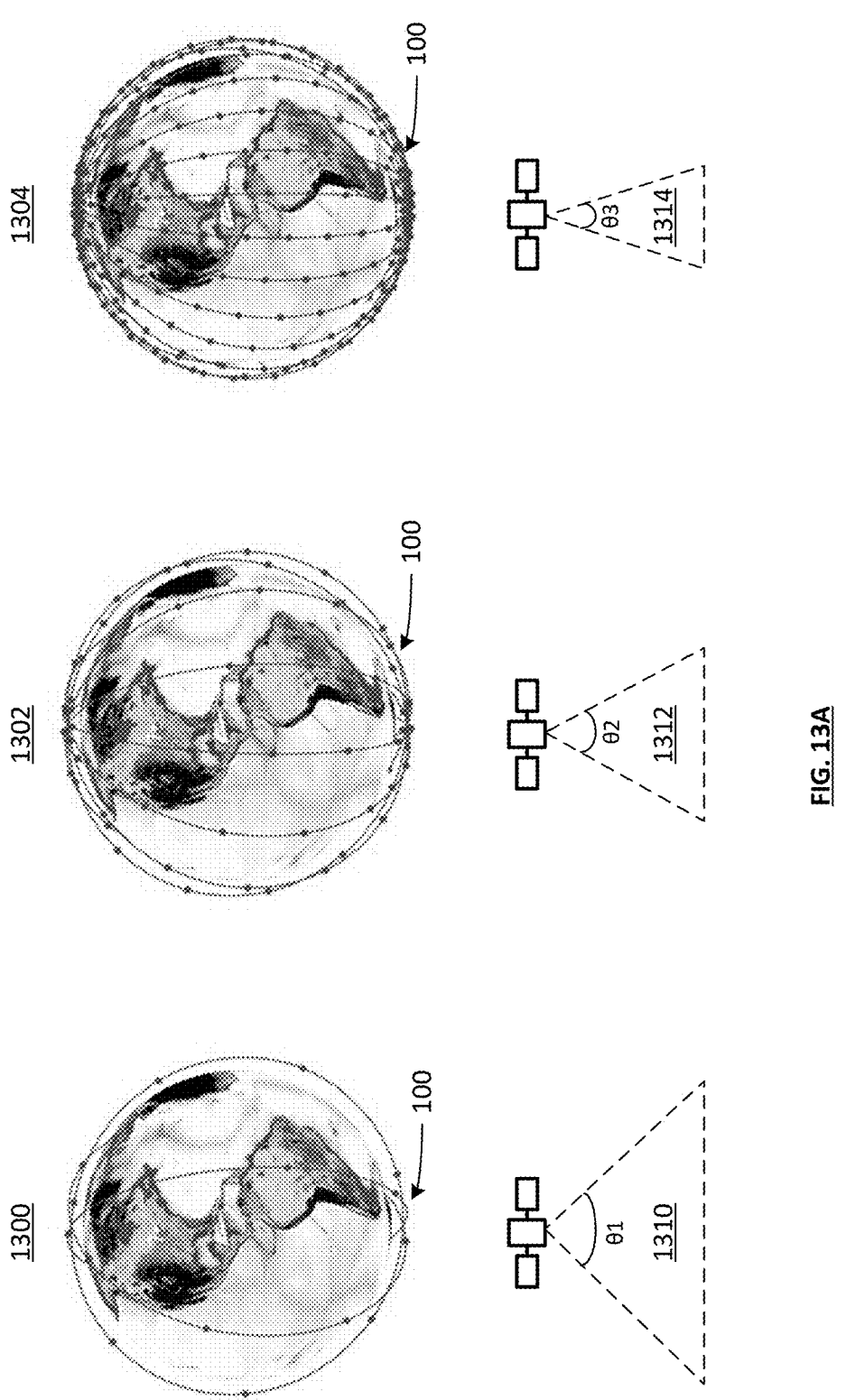
FIG. 13A is an illustration of various satellite constellations and antenna beamwidth adjustments in accordance with various embodiments.

FIG. 13A is an illustration of various satellite constellations and antenna beamwidth adjustments in accordance with various embodiments. In various embodiments, the beamwidth of navigation signal 240 produced by the satellite 110 can be adjusted from a wider bandwidth with a lower gain over a wider area to a more directional beamwidth having a higher gain over a smaller area. For example, the navigation signal transmitter 330 discussed in conjunction with FIG. 3B can be equipped with a phased-array antenna system that allows the beam to be controlled in such a fashion under control of the resource allocation module 325.

As previously discussed, the beamwidth of the navigation signal 240 can be adjusted along with other signal parameters of the satellite 110 to adapt to various conditions of the satellite 110. In addition or in the alternative, the beamwidth of navigation signal 240 can be adjusted to adapt to the status of the satellite constellation system 100. For example, when more satellites are present in the constellation, satellite coverage can be maintained with reduced beamwidth.

The examples 1300, 1302 and 1304 present, respectively, states of the satellite constellation system 100 with 3, 6 and 12 orbital paths/planes and an increasing numbers of satellites per path/plane. While polar orbits are shown, other orbital configurations are likewise possible. In state 1300 of the satellite constellation system 100, a greater beamwidth $\theta 1$ is used to cover more area. In state 1302 of the satellite constellation system 100, a reduced beamwidth $\theta 2$ can be used due to the decreased spacing between individual satellites. In state 1304 of the satellite constellation system 100, a further reduced beamwidth $\theta 3$ can be used due to the further decreased spacing between individual satellites.

It should also be noted that the orbital position of each satellite 110 can also be used to adjust the beamwidth from a widest coverage, at or near the equator, to a narrowest coverage at or near the north and south poles. Gravitational dynamics caused by the non-spherical shape of the earth can change distances between satellites. Coverage changes caused by such changes in satellite distance can be compensated, all or in part, by changes in antenna beamwidth. It should be noted that a reduced beamwidth and corresponding higher antenna gain can enable either a greater link budget for a constant transmit power or a lower transmit power and power consumption for a fixed link budget.

Figure 13B:
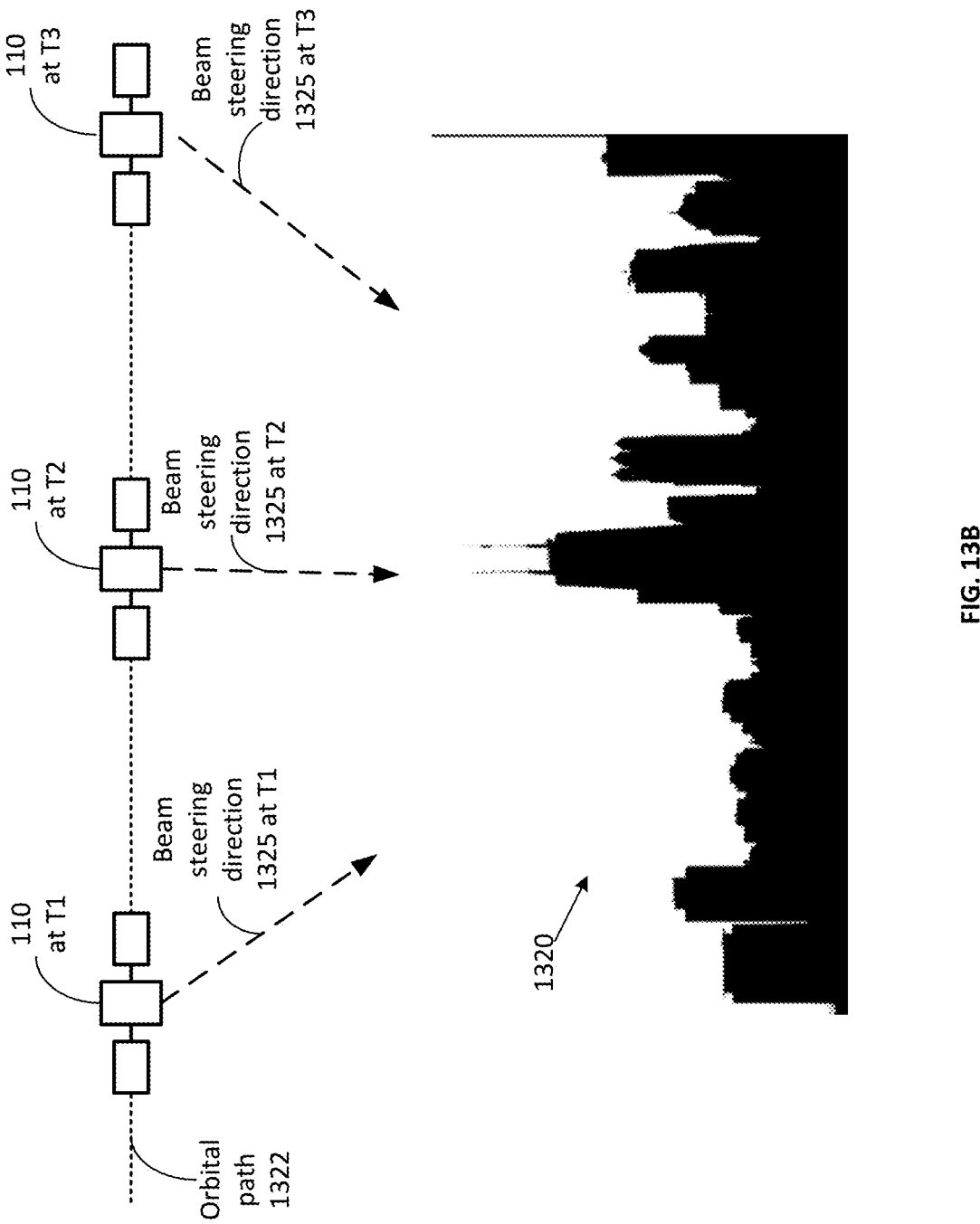
FIG. 13B is an illustration of various antenna beam steering adjustments in accordance with various embodiments.

FIG. 13B is an illustration of various antenna beam steering adjustments in accordance with various embodiments. As previously discussed, the resource allocation module 325 of the satellite 110 can control the various operations of the satellite 110 based on the orbital position of the satellite 110 relative to positions above the earth corresponding to high population density, low population density, an ocean, a rainforest, a mountain range, a desert or other terrestrial condition or feature. In the example shown, the satellite 110 proceeds from T1 to T2 to T3 along an orbital path 1322 in LEO above an area of high population density 1320 when compared with the population density of the surround areas along the orbital path 1322. Such areas of high population density can include a corresponding high density of autonomous or highly automated vehicles and/or other client devices that may heavily rely upon high precision position, navigation and timing and/or that provide challenges to signal reception due to tall buildings and other infrastructure and/or other terrestrial features.

The processing system of the satellite 110 stores a map or other data structure of the orbital path 1322 that indicates the position of the area of high population density 1320 along the orbital path 1322. The beam steering direction 1325 corresponds, for example, to the center of the main transmission lobe of the antenna beam pattern of the navigation signal transmitter 330. As shown, the beam steering direction 1325 is adjusted as the satellite 110 proceeds from T1 to T2 to T3 along an orbital path 1322 to point at the area of high population density 1320. The effect of this beam-steering adjustment is to increase the signal strength of the navigation signals transmitted by the satellite 110 in the area of the of high population density 1320, facilitating better reception and improved positioning, navigation and timing of client devices 160 within this area.

Figure 14:
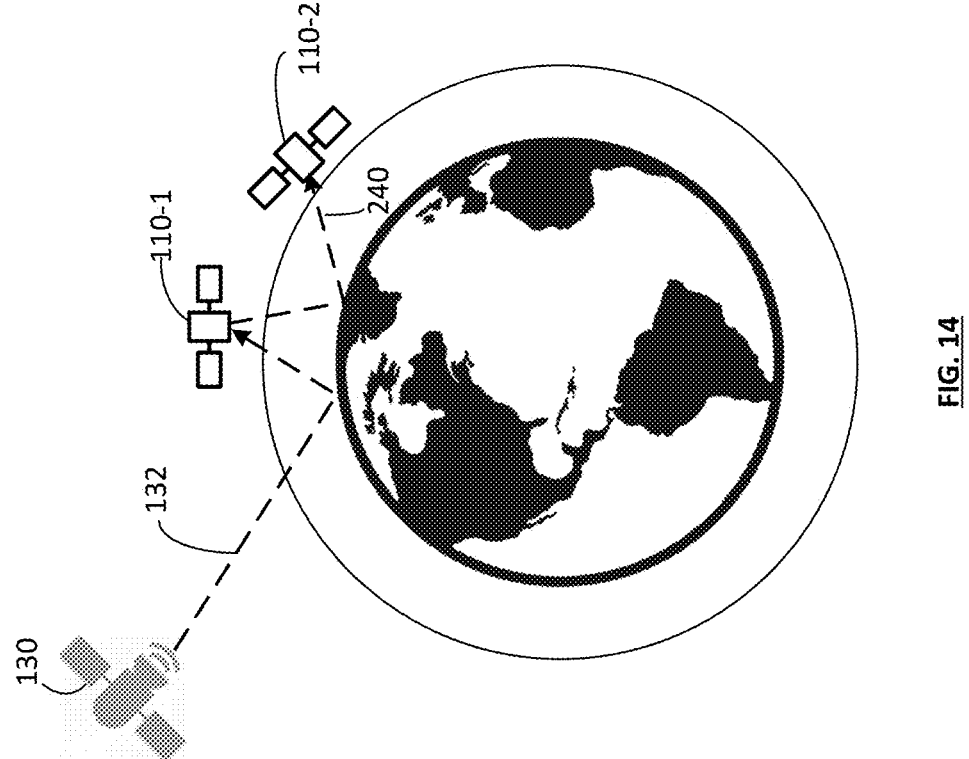
FIG. 14 is an illustration of GPS reflectometry in accordance with various embodiments.

FIG. 14 is an illustration of GPS reflectometry in accordance with various embodiments. While the foregoing has discussed the use of satellite to satellite signals used for radio occultation, satellite signals transmitted by one satellite and reflected by the surface of the earth can be received by one or more other satellites. In the examples shown, a satellite 110-1 receives signals 132 from satellite 130 that reflect off the surface of the earth. In other configurations, satellite 110-2 receives navigation signal 240 from satellite 110-2 that reflect off the surface of the earth. The strength of the received signal, together with factors such as the orbital position of both the transmit and receive satellites, the transmit power, the transmit and receive beamwidth, and a current atmospheric model can be used to determine and map the current reflectivity of different regions of the globe. Such GPS reflectometry can be used, for example, to create maps of current sea surface conditions, rainforest tree canopy density, snowfall, crop conditions, soil water density and/or other environmental conditions around the globe.

FIGS. 15A-15M illustrate embodiments of a navigation processing system 300. The navigation processing system 300 of FIGS. 15A-15M can be implemented onboard: a satellite 110, a client device 160, a ground station 200, a backhaul satellite 150, and/or any other node of the satellite constellation system 100 described herein. The navigation processing system 300 of FIGS. 15A-15M can alternatively or additionally be implemented by a navigation system component or another navigation system that is different from satellite constellation system 100 and/or can be implemented by any computing device, for example, not associated with and/or not communicating with satellite constellation system 100.

The navigation processing system 300 of FIGS. 15A-15M can be implemented utilizing some or all features and/or functionality of the navigation processing system of FIG. 3B. The navigation processing system 300 of FIGS. 15A-15M can be implemented to perform some or all steps of and/or some or all steps of FIG. 15Q. Some or all features and/or functionality of the navigation processing system 300 of FIGS. 15A-15M can be utilized to implement any other embodiment of navigation processing system 300 described herein. Some or all features and/or functionality of the navigation processing system 300 of FIGS. 15A-15M can be utilized to implement functionality of one or more satellites 110 and/or other nodes of the satellite constellation system 100, and/or to implement functionality of a navigation system component and/or computing device of another navigation system.

Figure 15A:
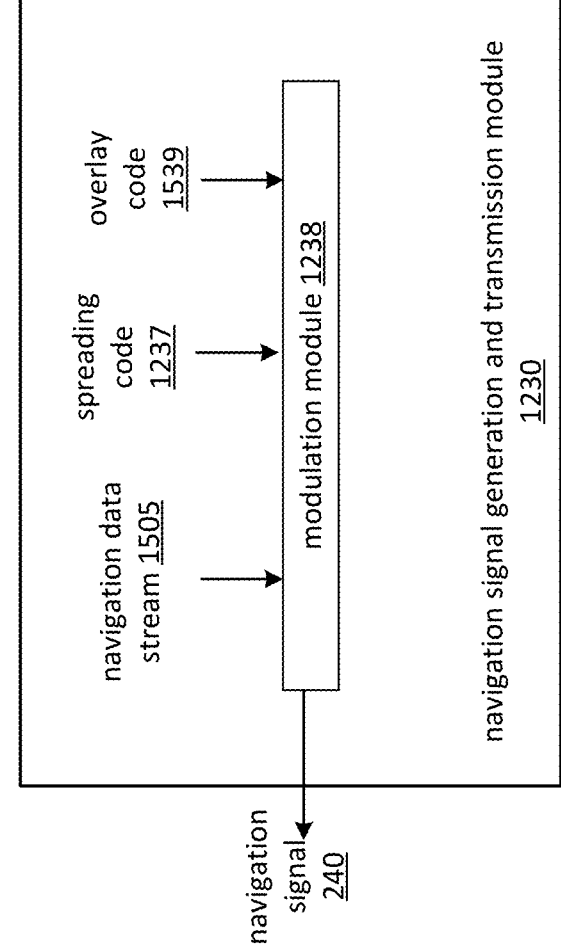
FIGS. 15A-15D are schematic block diagrams of a navigation processing system that implements a modulation module in accordance with various embodiments.

FIG. 15A illustrates an embodiment of a navigation signal generation and transmission module 1230 of navigation processing system 300. Some or all features and/or functionality of the navigation signal generation and transmission module 1230 of FIG. 15A can implement the navigation signal generation and transmission module 1230 of the navigation processing system 300 of FIG. 12F, and/or any other embodiment of navigation signal generation and transmission module 1230 and/or navigation processing system 300 described herein.

As illustrated in FIG. 15A, a navigation signal generation and transmission module 1230 of navigation processing system 300 can be operable to transmit a navigation signal 240 based on modulating a navigation data stream 1505 of navigation messages 1235 with spreading code 1237 and overlay code 1539 via a modulation module 1238. The modulation module 1238 can utilize processing and/or memory resources of the navigation processing system 300 to generate the navigation signal based on modulating the navigation data stream 1505 with spreading code 1237 and overlay code 1539. The navigation signal 240 can be generated in a same or similar fashion as discussed in conjunction with FIG. 12F. The navigation signal generation and transmission module 1230 can implement some or all features and/or functionality of the broadcast flow of FIG. 5C to generate and transmit navigation signal 240.

The spreading code 1237 can be implemented as the spreading code of FIG. 12F. The spreading code 1237 can uniquely identify the navigation processing system 300 from other navigation processing systems 300 corresponding to other nodes in the satellite constellation system 100. For example, the spreading code 1237 can uniquely identify a corresponding satellite 110, where each satellite 110 in the satellite constellation system 100 has different spreading code 1237. The spreading code 1237 can enable client devices 160 to identify which satellite 110 transmitted the corresponding navigation signal 240 based on the spreading code 1237 uniquely identifying one satellite 110. The spreading code 1237 can facilitate the generation of ranging data by client devices 160, for example, based on receiving the navigation signal 240 and correlating the received navigation signal 240 with one or more internal signals 1273, for example, as discussed in conjunction with FIG. 12G. In some cases, the spreading code 1237 is optionally encrypted as discussed in conjunction with FIGS. 17A-17M.

In some embodiments, the spreading code 1237 is implemented as a Pseudo Random Noise (PRN) spreading sequence. The spreading code 1237 can be a periodic sequence of a fixed number of chips, such as 10,000 chips or another number of chips that is repeatedly generated for inclusion in navigation signal 240. For example, the spreading code 1237 is implemented as a truncated Gold sequence or another type of spreading sequence.

The overlay code 1539 can be implemented as secondary codes to aid in receiver synchronization functions, such as carrier, code, symbol, and/or frame synchronization. The overlay code 1539 can be distinct from the spreading code 1237. Once a user receiver synchronizes to the overlay code 1539, it can be removed, creating a pure pilot tone for improved carrier tracking and/or longer-duration coherent code tracking. The overlay code 1539 can also be utilized to establish data frame and symbol synchronization. More complex receivers may also elect to acquire the overlay code 1539 during an initial code acquisition process, to aid in coherent detection of the navigation signal waveforms during the signal acquisition phase. The use of overlay codes can improve tracking performance, facilitate extension of the duration of coherent integration by client devices 160, provide a means for data symbol and frame synchronization and/or, in conjunction with the spreading code 1237, synthesize a longer composite code with better autocorrelation and/or cross-correlation performance. Overlay codes can be also unique to each satellite 110 and/or to each node of the satellite constellation system 100. In some cases, the overlay code 1539 is optionally encrypted as discussed in conjunction with FIGS. 17A-17M.

The navigation data stream 1505 can be implemented as a data stream that includes navigation data generated by the navigation processing system 300 over time. The navigation data stream 1505 can include a plurality of navigation messages generated via a navigation message generator 1234, for example, as illustrated in FIG. 15B.

Figure 15B:
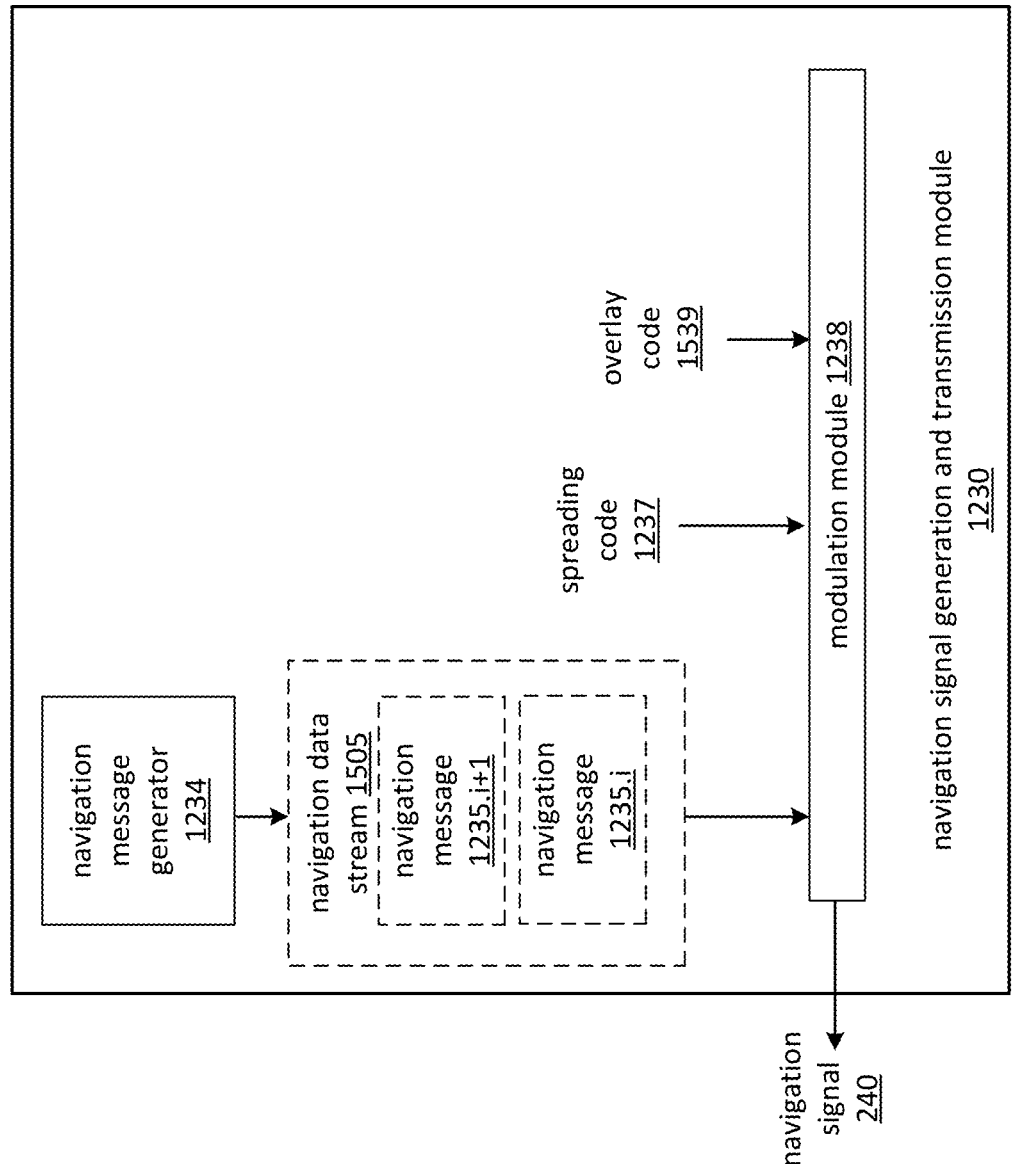

FIG. 15B illustrates another embodiment of a navigation signal generation and transmission module 1230. Some or all features and/or functionality of the navigation signal generation and transmission module 1230 of FIG. 15B can implement the navigation signal generation and transmission module 1230 of the navigation processing system 300 of FIG. 15A, and/or any other embodiment of navigation signal generation and transmission module 1230 and/or navigation processing system 300 described herein.

The navigation message generator 1234 can be implemented via at least one processor of the navigation processing system 300 and can implement some or all features and/or functionality of the navigation message generation flow of FIG. 5B to generate a plurality of navigation messages 1235 over time as a navigation data stream 1505. The navigation message generator 1234 can be implemented via the message scheduling module 324 and/or the navigation message generation module 323. The navigation messages 1235 can indicate orbital state data, correction data, and/or any other information included in navigation messages as described herein. The navigation data stream 1505 can correspond to a stream of navigation messages 1235 prior to error-coding and/or encryption. Alternatively, the navigation data stream 1505 can correspond to a stream of navigation messages 1235 after error-coding and/or encryption.

The navigation messages 1235 can be generated in accordance with a fixed structure, such as a fixed-length frame of a given number of bits. For example, the navigation message includes 250 bits, 296 bits, or another number of bits. Example embodiments of the structure of navigation messages 1235 are illustrated in FIG. 15K and FIG. 15M. In some cases, the navigation messages 1235 are optionally encrypted as discussed in conjunction with FIGS. 17A-17M.

The overlay code can be synchronized with both the navigation symbol and frame timing on the data component and/or can have a code symbol duration equal to the symbol period of the navigation messages of the navigation message stream. The overlay code can have a lengths match the message frame size of navigation messages 1235 prior to and/or after being error-coded.

Figure 15C:
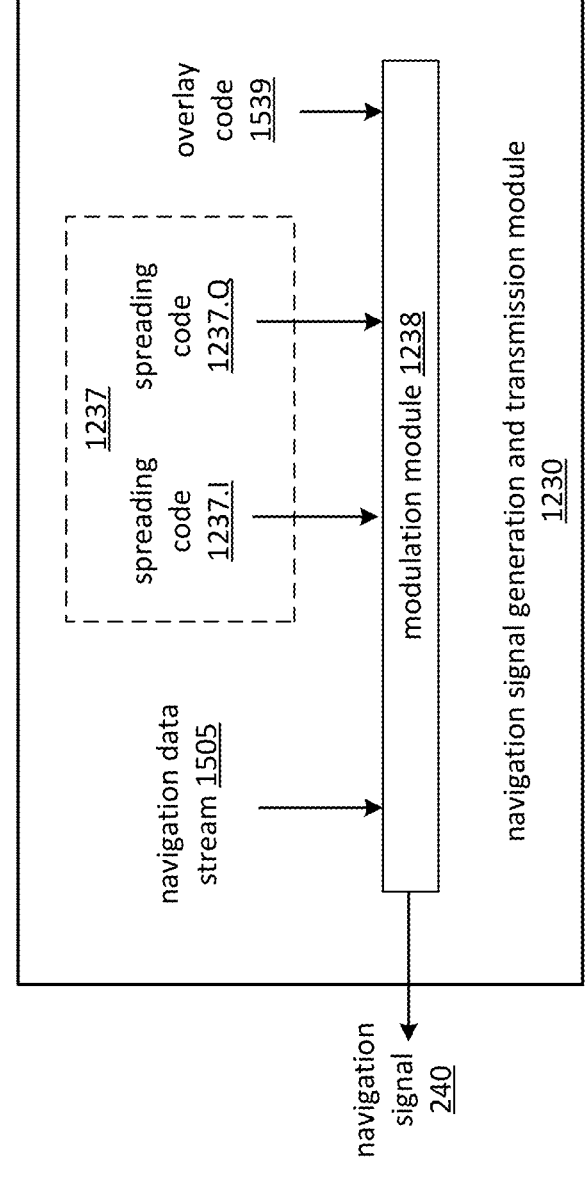

As illustrated in FIG. 15C, the spreading code 1237 can include an in-phase (I) spreading code component 1237.I and a quadrature (Q) spreading code component 1237.Q. The spreading code 1237.I can be distinct from spreading code 1237.Q. Some or all features and/or functionality of the navigation signal generation and transmission module 1230 of FIG. 15C can implement the navigation signal generation and transmission module 1230 of the navigation processing system 300 of FIG. 15A, and/or any other embodiment of navigation signal generation and transmission module 1230 and/or navigation processing system 300 described herein.

Figure 15D:
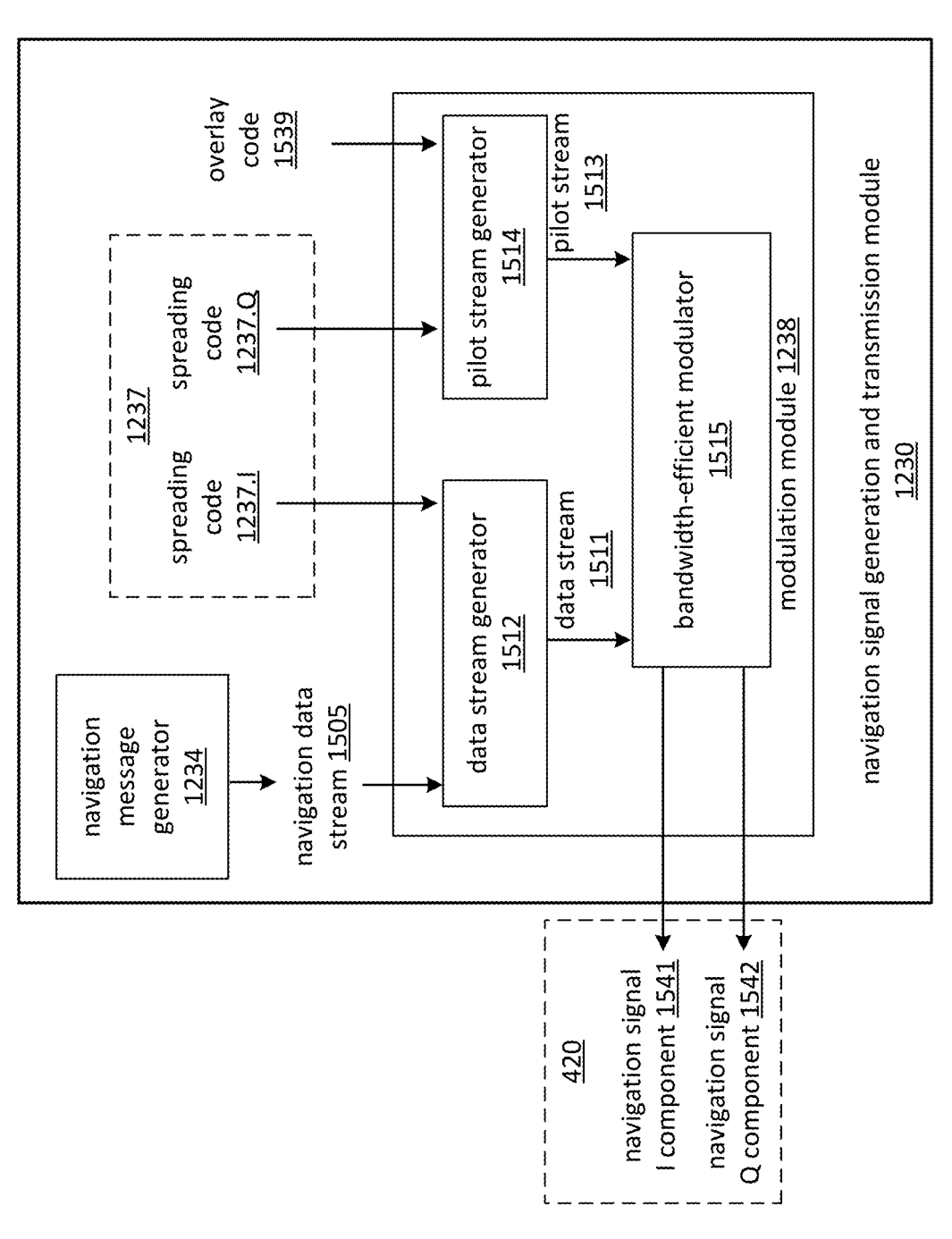

FIG. 15D illustrates another embodiment of a navigation signal generation and transmission module 1230. Some or all features and/or functionality of the navigation signal generation and transmission module 1230 of FIG. 15D can implement the navigation signal generation and transmission module 1230 of the navigation processing system 300 of FIG. 15A, and/or any other embodiment of navigation signal generation and transmission module 1230 and/or navigation processing system 300 described herein.

As illustrated in FIG. 15D, the modulation module 1238 can implement a data stream generator 1512 that generates a data stream 1511 from navigation data stream 1505 and spreading code 1237.I, a pilot stream generator 1514 that generates a pilot stream 1513 from overlay code 1539 and spreading code 1237.Q. The spreading code 1237.I can be considered a data spreading code as it is utilized to generate data stream 1511, while spreading code 1237.Q can be considered a pilot spreading code as it is utilized to generate pilot stream 1513.

The data stream generator 1512 and/or the pilot stream generator 1514 can be implemented via processing and/or memory resources of the navigation processing system 300, and can generate their respective streams in parallel for modulation via the bandwidth-efficient modulator 1515.

A bandwidth-efficient modulator 1515 can generate navigation signal 240 from the data stream 1511 and the pilot stream 1513. The resulting waveform of navigation signal 240 can be a composite signals consisting of a data and pilot component. Transmit power can optionally be split equally (50%/50%) between the two components. For example, the navigation signal is implemented as at least one radio frequency (RF) carrier signal includes the data stream 1511 and the pilot stream 1513. The resulting navigation signal 240 can include a navigation signal in-phase (I) component 1541 and a navigation signal quadrature (Q) component 1542. The I component 1541 can be considered the data component based on including data stream 1511 and/or Q component 1542 can be considered the pilot component based on including pilot stream 1513. In some embodiments, navigation data is only transmitted on the data component. In some embodiments, the pilot component is modulated with overlay code.

The bandwidth-efficient modulator 1515 can be implemented via processing and/or memory resources of the navigation processing system 300. The bandwidth-efficient modulator 1515 can generate the navigation signal components 1541 and 1542 of navigation signal 240 based on applying a bandwidth-efficient modulation scheme. For example, the bandwidth-efficient modulator 1515 applies a cross-correlated phase shift keying (XPSK) scheme to generate the generate the navigation signal components 1541 and 1542 of navigation signal 240 from the data stream 1511 and pilot stream 1513. As a particular example, the bandwidth-efficient modulator 1515 applies a Feher-Patented Quadrature-Phase-Shift Keying (FQPSK) modulation technique, such as the Enhanced Feher-Patented Quadrature-Phase-Shift Keying (EFQPSK) modulation technique.

The bandwidth-efficient modulator 1515 can utilize an intentional but controlled amount of cross-correlation between the data and pilot spreading code chips at baseband to form the transmitted signal. For example, the data stream 1511 and pilot stream 1513 are cross-coupled in a prescribed way, along with a pulse shaping look-up table, to generate a navigation signal 240. The resulting navigation signal 240 can have favorable bandwidth efficiency based on the bandwidth-efficient modulation scheme inducing a fast spectral roll-off of navigation signal 240. The resulting navigation signal 240 can have favorable power efficiency based on the bandwidth-efficient modulation scheme inducing a near-constant envelope of navigation signal 240.

Other navigation signals, such as GNSS navigation signals, are generated based on applying a filter to a waveform with greater sidelobes. For example, some GNSS navigation signals are generated via applying a bandpass filter to a SINC function waveform. Instead of applying a bandpass filter to a waveform in this fashion, the modulation module 1238 of navigation processing system 300 can instead implement bandwidth-efficient modulation technique to ensure the navigation signal is within, or otherwise compares favorably to, a specified threshold bandwidth without necessitating a filter. In particular, the navigation signal 240 generated via the bandwidth-efficient modulation technique can be a spread spectrum signal that is highly contained within the threshold bandwidth. This threshold bandwidth can be induced by regulatory constraints and/or by the frequencies of one or more other signals, such as navigation signals generated by other navigation systems such as one or more GNSS navigation systems.

Applying a bandwidth-efficient modulation technique to generate navigation signals 240 can improve the technology of navigation systems based on a sharp roll-off of the out-of-band spectrum being maintained, even while the transmitted navigation signal 240 is generated with power amplifiers operating near saturation, which allows the navigation signal to interoperate with existing GNSS signals and/or other systems on a non-interfering basis. Applying a bandwidth-efficient modulation technique to generate navigation signals 240 can improve the technology of navigation systems by rendering navigation signals that are more power efficient than navigation signals generated via applying a bandpass filter to a signal with greater sidelobes. Applying a bandwidth-efficient modulation technique to generate navigation signals 240 can improve the technology of navigation systems by rendering navigation signals with less distortion than navigation signals generated by applying a bandpass filter to a signal with greater sidelobes. The increased power efficiency and/or decreased distortion can be based on the bandwidth-efficient modulation technique not allowing any shifts in phase beyond a predetermined threshold, for example, where no 180 degree phase-shifts between symbols are induced based on the bandwidth-efficient modulation technique adopting features of Offset QPSK modulation techniques.

Furthermore, applying a bandwidth-efficient modulation technique to generate navigation signals 240 can leverage the desired utility of navigation signals in enabling generation of precise ranging data, such as precise pseudorange estimates. For example, this precision can be based on the precision of ranging data generated in correlating internal signals with incoming navigation signals by receiving devices, as discussed in conjunction with FIG. 15P.

Figure 15E:
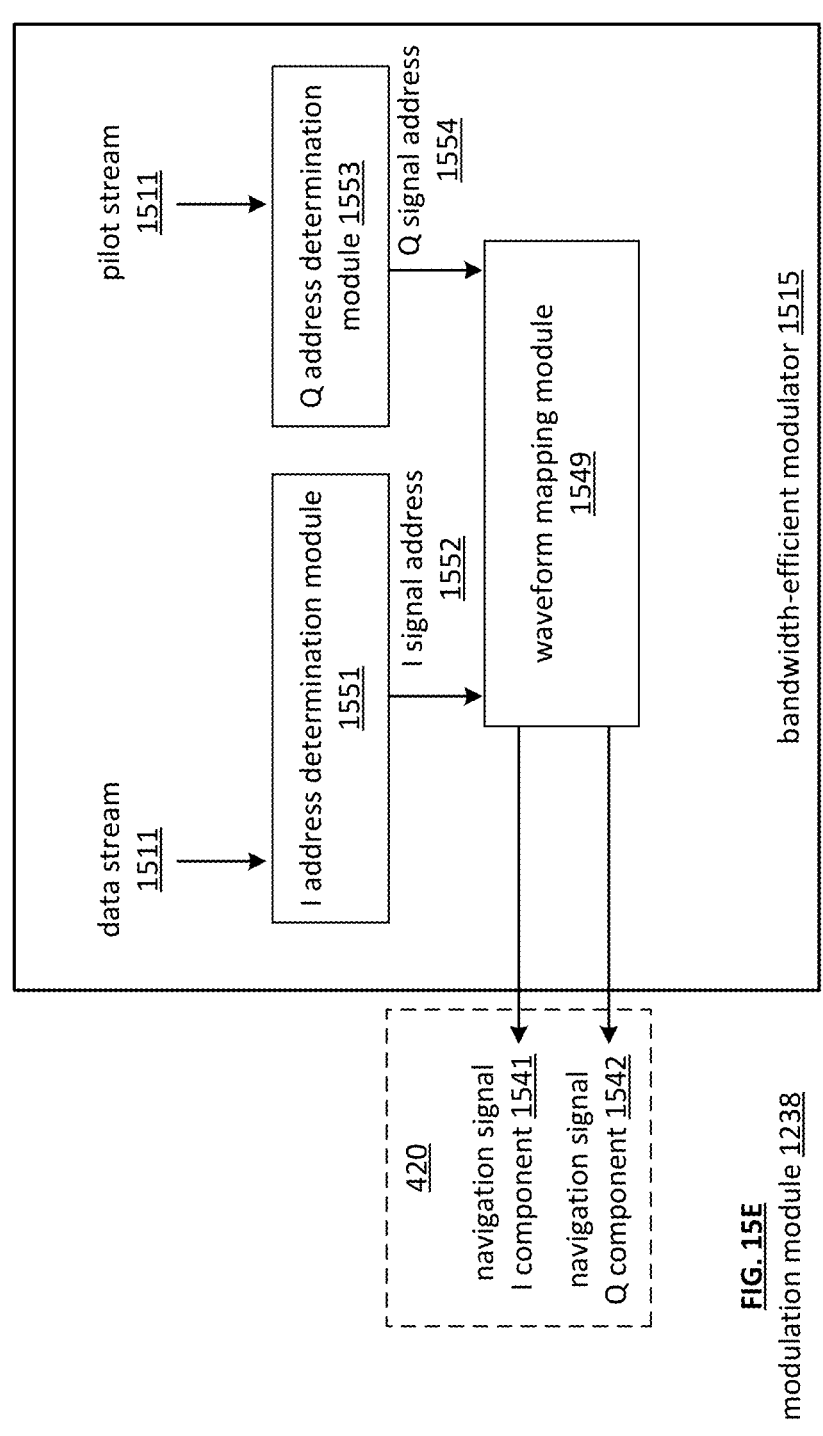
FIGS. 15E-15G illustrate embodiments of a modulation module in accordance with various embodiments.

FIG. 15E illustrates an embodiment of a bandwidth-efficient modulator 1515 of a modulator module 1238. Some or all features and/or functionality of the modulator module 1238 of FIG. 15E can implement the modulator module 1238 of FIG. 15A, and/or any other embodiment of modulator module 1238 described herein. Some or all features and/or functionality of the bandwidth-efficient modulator 1515 of FIG. 15E can implement the bandwidth-efficient modulator 1515 of FIG. 15D, and/or any other embodiment of bandwidth-efficient modulator 1515 described herein.

The bandwidth-efficient modulator 1515 can include an in-phase (I) address determination module 1551 that outputs an in-phase (I) signal address 1552 based on data stream 1511. The bandwidth-efficient modulator 1515 can include a quadrature (Q) address determination module 1553 that outputs a quadrature (Q) signal address 1554 based on pilot stream 1513. For example, the data stream 1511 can be considered an in-phase (I) component based on being processed by the I address determination module 1551 to output the I signal address 1552, and the pilot stream 1513 can be considered a quadrature (Q) component based on being processed by the Q address determination module 1553 to output the Q signal address 1554.

The I signal address 1552 and/or the Q signal address 1554 can be utilized by a waveform mapping module 1549 to render the navigation signal I component 1541 and the navigation signal Q component 1542. The waveform mapping module 1549 utilizes a one-to-one mapping of signal addresses to waveform outputs to select one of a plurality of possible waveform outputs for given signal address input. This mapping can be in accordance with a corresponding bandwidth-efficient modulation scheme, such as the EFQPSK modulation scheme. In some embodiments, the waveform mapping module 1549 can utilize a look-up table indicating the mapping of signal addresses to waveform outputs, which can be stored and/or accessed in memory resources of the navigation processing system 300.

In some embodiments, the I signal address 1552 and/or the Q signal address 1554 can have a fixed number of bits, such as b bits. The waveform mapping module utilize the mapping of signal addresses to waveform outputs to select one of a plurality of possible waveform outputs, such as $2^b$ waveform outputs, based on addressing the I signal address 1552 and/or the Q signal address 1554, which can be sequentially read out to form I and Q components, for example, in accordance with the EFQPSK modulation scheme. For example, the I signal address 1552 the Q signal address 1554 each include 4 bits, and the plurality of possible waveform outputs can include 16 waveform outputs each mapped to a corresponding one of the possible 4-bit addresses of the I signal address 1552 or the Q signal address 1554. The plurality of possible waveform outputs of the waveform mapping module 1549 can be guaranteed to induce no jumps in phase beyond a predefined threshold between any two of the plurality of possible waveform outputs, for example, to render improved power efficiency and/or reduced distortion.

The waveform mapping utilized by the waveform mapping module 1549, such as a waveform look-up table, can be shared by the I and Q addresses computed each chip interval. In some embodiments, the I and Q addresses computed each chip interval can be time-multiplexed to share the waveform mapping. In some embodiments, the waveform mapping can be duplicated and operated in parallel to generate the output I and Q signals. In some embodiments, the chip-length waveform segments in the waveform table can be sampled at an integer ratio of M samples/chip period prior to D/A conversion, such as 8 samples/chip period.

Figure 15F:
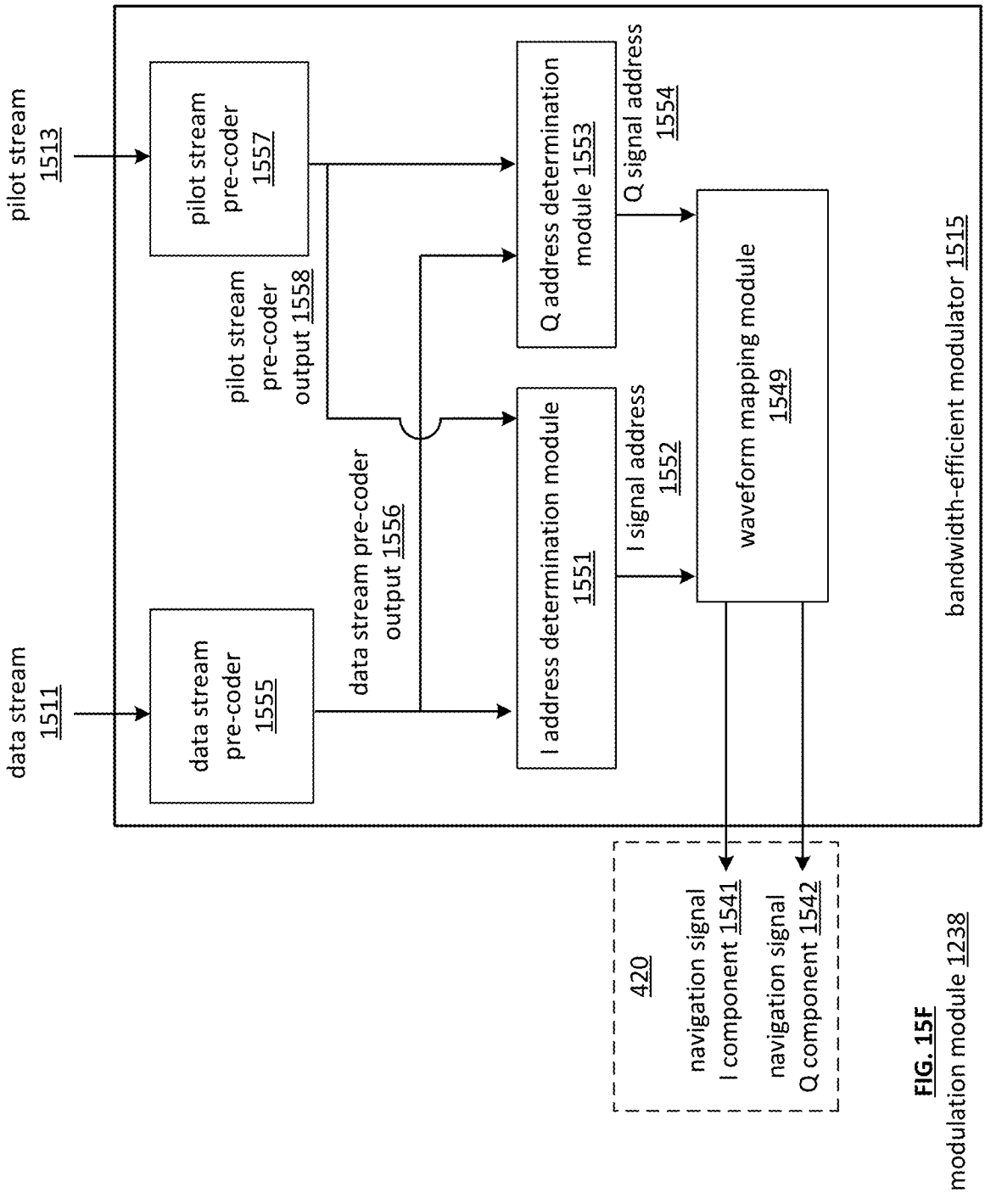
Figure 15G:
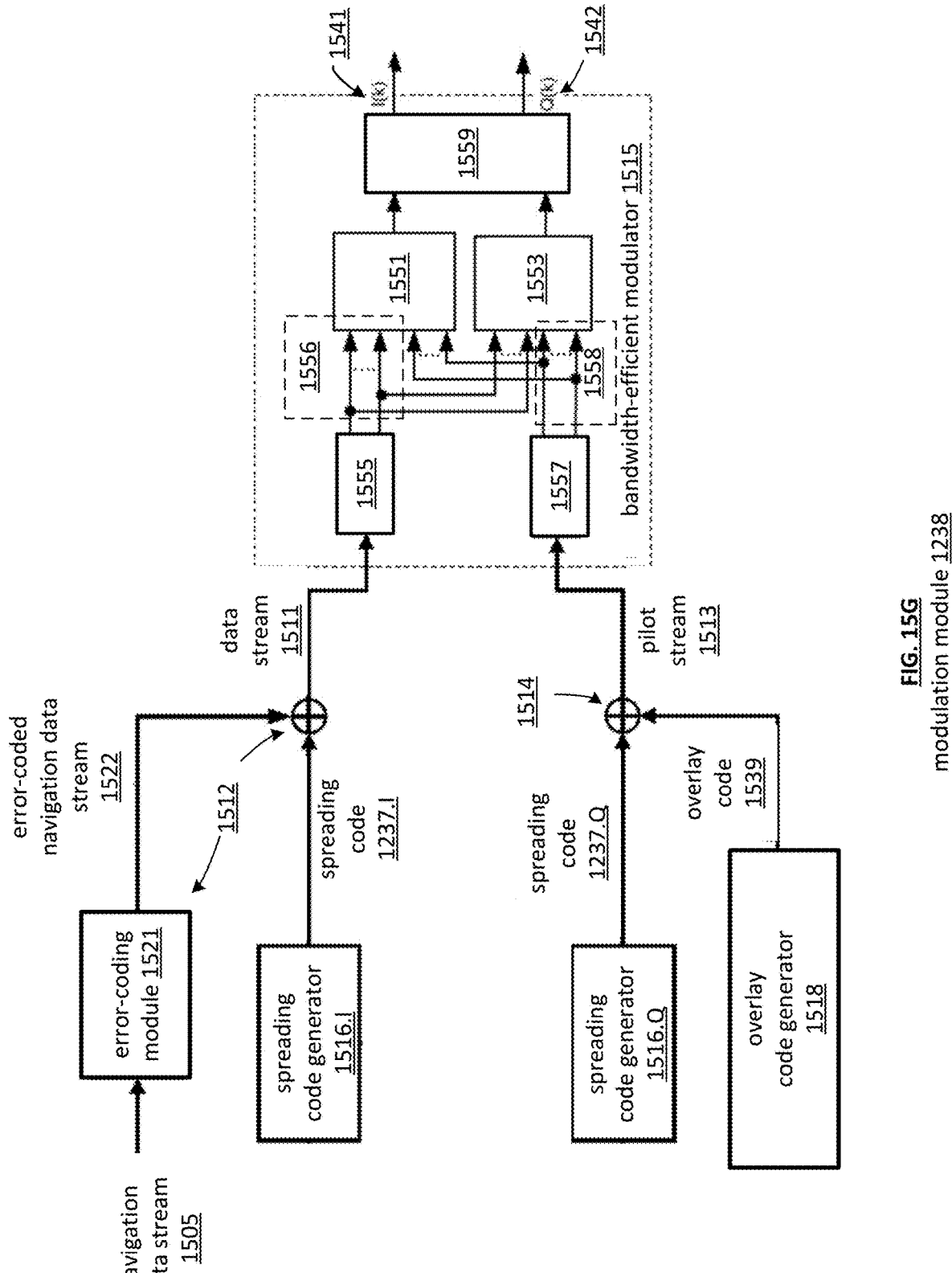

FIG. 15F illustrates an embodiment of a bandwidth-efficient modulator 1515 of a modulator module 1238. Some or all features and/or functionality of the modulator module 1238 of FIG. 15F can implement the modulator module 1238 of FIG. 15A, and/or any other embodiment of modulator module 1238 described herein. Some or all features and/or functionality of the bandwidth-efficient modulator 1515 of FIG. 15F can implement the bandwidth-efficient modulator 1515 of FIG. 15E, and/or any other embodiment of bandwidth-efficient modulator 1515 described herein.

As illustrated in FIG. 15F, the bandwidth-efficient modulator 1515 can implement a data stream pre-coder 1555 that generates data stream pre-coder output 1556 from the data stream 1511, and/or a pilot stream pre-coder 1557 that generates pilot stream pre-coder output 1558 from the pilot stream 1513. For example, the data stream pre-coder 1555 is implemented as a 3-tap register, such as a 3-tap linear feedback shift register, on the data stream and/or the pilot stream pre-coder 1557 is implemented as a 3-tap register, such as a 3-tap linear feedback shift register, on the pilot stream. In such embodiments, the data stream pre-coder output 1556 can be processed by the I address determination module 1551 to output the I signal address 1552, and the pilot stream pre-coder output 1558 can be processed by the Q address determination module 1553 to output the Q signal address 1554. Register updates and/or address generation can occur at a chip rate of the spreading code 1237.

FIG. 15F illustrates an embodiment of a modulator module 1238. Some or all features and/or functionality of the modulator module 1238 of FIG. 15G can implement the modulator module 1238 of FIG. 15A, and/or any other embodiment of modulator module 1238 described herein.

The spreading code 1237.I and/or 1237.Q can be generated via a spreading code generator 1516.I and 1516.Q, respectively. The spreading code generator 1516.I and/or 1516.Q can be implemented via at least one Linear Feedback Shift Register (LFSR), such as at least one 13-stage LFSR. In some embodiments, the resulting spreading code 1237.I and/or 1237.Q can be generated using a periodic truncated Gold sequence, such as a 10,000 chip truncated Gold sequence, for both the data and pilot components.

As illustrated in FIG. 15F, the data stream 1511 can be generated based on performing modulo-two addition upon an error-coded navigation data stream 1522 and spreading code 1237.I. This can include performing an exclusive-OR operation upon error-coded navigation data stream 1522 and spreading code 1237.I.

The error-coded navigation data stream 1522 can be generated based on applying an error-coding module 1521 to the navigation data stream 1505. For example, the error-coding module 1521 applies a Forward Error Correction (FEC) code or other coding scheme to the navigation data stream. As a particular example, the error-coding module 1521 applies a rate-1/2 binary convolutional code to the navigation data stream to generate the error-coded navigation data stream 1522. The error-coded navigation data stream 1522 can be considered the navigation data stream 1505 in some embodiments, for example, based on the navigation data stream 1505 already having been error-coded.

The pilot stream 1513 can be generated based on performing modulo-two addition upon a spreading code 1237.Q and overlay code 1539. This can include performing an exclusive-OR operation upon spreading code 1237.Q and overlay code 1539. The overlay code can be generated via an overlay code generator 1518.

Figure 15H:
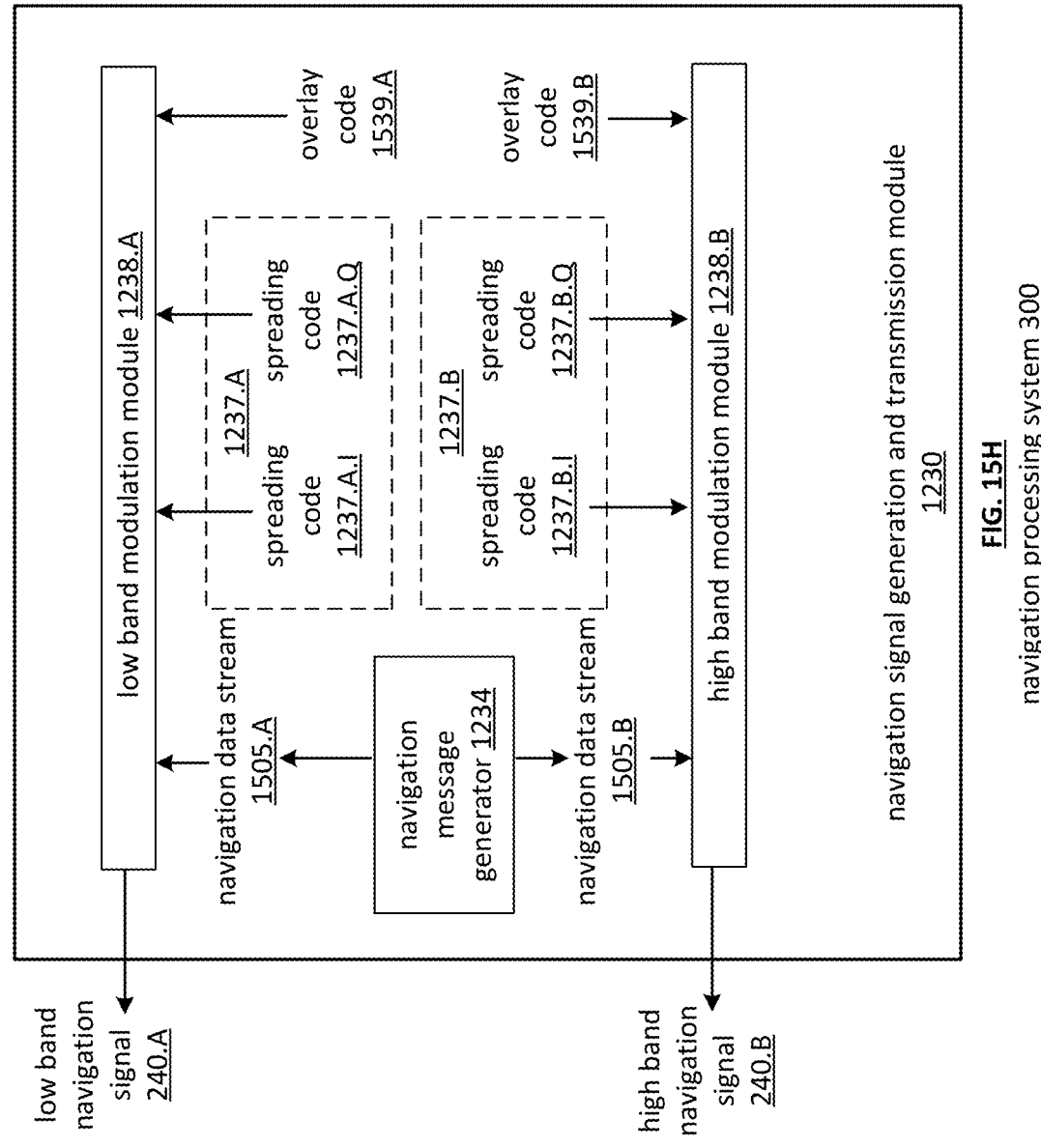
FIGS. 15H-15I are schematic block diagrams of a navigation processing system that implements am low band modulation module and a high band modulation module in accordance with various embodiments.

FIG. 15H illustrates an embodiments of navigation signal generation and transmission module 1230 of a navigation processing system 300 that generates navigation signal 240 as two separate signals: a low band navigation signal 240.A and a high band navigation signal 240.B. Some or all features and/or functionality of the navigation processing system 300 of FIG. 15H can implement the modulator module 1238 of FIG. 15A, and/or any other embodiment of navigation processing system 300 described herein. The low band navigation signal 240.A and/or the high band navigation signal 240.B can be implemented as any embodiment of navigation signal 240 described herein. Alternatively or in addition, any embodiment of navigation signal 240 described herein can include both a low band navigation signal 240.A and a high band navigation signal 240.B.

The low band navigation signal 240.A and the high band navigation signal 240.B can have frequencies in two different respective frequency bands, denoted herein as the "low band" and "high band" respectively, based on the frequency of low band navigation signal 240.A being included in a lower frequency band than, or otherwise being lower than, the frequency of high band navigation signal 240.B. A first frequency band that includes low band navigation signal 240.A can include lower frequencies than a second frequency band that includes the frequency of high band navigation signal 240.B. The low band and high band can be distinct and/or non-overlapping radio frequency (RF) bands, for example, of the IEEE radar band standard or other frequency band standard. In some embodiments, the low band and/or the high band are both frequency bands in the microwave range.

In some embodiments, the low band is the L band frequency band, where the low band navigation signal 240.A has a frequency that is greater than 1 GHz and/or smaller than 2 GHz. Alternatively, the low band can correspond to another frequency band, such as the HF band, the VH band, the UHF band, and/or another frequency band that is lower in frequency than the high frequency band.

In some embodiments, the high band is the C band frequency band, where the high band navigation signal 240.B has a frequency that is greater than 4 GHz and/or smaller than 8 GHz. Alternatively, the high band can correspond to another frequency band, such as the S band, the X band, the $K_u$ band, the K band and/or another frequency band that is higher in frequency than the low frequency band.

The low band navigation signal 240.A and the high band navigation signal 240.B can each be generated, for example, separately and/or in parallel, based on each applying respective modulation modules 1238.A and 1238.B. For example, the low band navigation signal 240.A can be generated as navigation signal 240 via some or all features and/or functionality described in conjunction with FIGS. 15A-15G and/or the high band navigation signal 240.B can be generated as navigation signal 240 via some or all features and/or functionality described in conjunction with FIGS. 15A-15G.

The low band modulating module 1238.A can generate low band navigation signal 240.A based on modulating navigation data stream 1505.A with spreading code 1327.A and overlay code 1539.A. The high band modulating module 1238.B can generate high band navigation signal 240.B based on modulating navigation data stream 1505.B with spreading code 1327.B and overlay code 1539.B.

The navigation data streams 1505.A and 1505.B can collectively constitute the navigation data transmitted in navigation signal 240. The navigation message generator 1234 can be operable to generate the separate navigation data streams 1505.A and 1505.B, for example, that each include their own navigation messages 1235 and/or their own respective portions of navigation messages 1235.

The spreading code 1237.A can be the same as and/or different from spreading code 1237.B. The overlay code 1539.A can be the same as and/or different from overlay code 1539.B.

In some embodiments, the spreading code 1237.A and 1237.B can be generated as PRN codes via one or more spreading code generators 1516. For example, PRN code is generated from two 13-stage shift-registers. At the start of every fixed code period, such as 1 msec for spreading code 1237.B and/or 2 msec for spreading code 1237.A, the first register can be reset to its initial all-1's state, and/or the second register can is set to the state which occurs when the register is advanced by a fixed number of chips relative to the all-1's state. The PRN code can be generated by modulo-2 addition of the outputs of the two registers. After a fixed number of chips, such as 10,000 chips, have been generated, the registers can be reset to the same state.

The low band modulating module 1238.A and/or the high band modulating module 1238.B each be implemented in a same or similar fashion as the modulating module 1238 of some or all of FIGS. 12A-12G. For example, some or all features and/or functionality of the modulating module of FIGS. 12A-12G can be utilized to implement the modulating module 1238.A and/or the modulating module 1238.B.

Figure 15I:
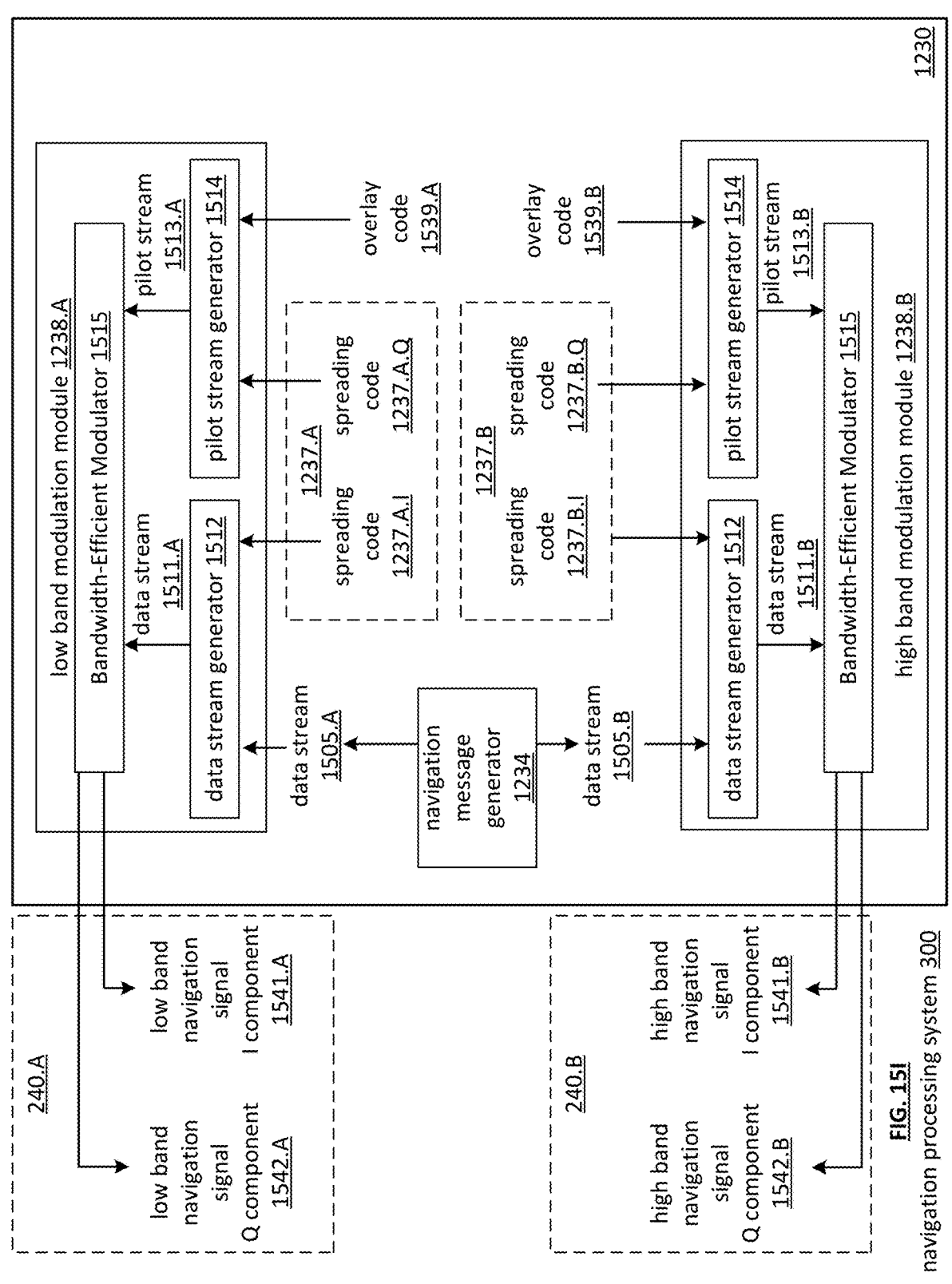

FIG. 15I illustrates an embodiment of a navigation signal generation and transmission module 1230 of a navigation processing system 300. Some or all features and/or functionality of the navigation signal generation and transmission module 1230 of FIG. 15I can implement the navigation signal generation and transmission module 1230 of the navigation processing system 300 of FIG. 15H, of FIG. 15A, and/or any other embodiment of navigation signal generation and transmission module 1230 and/or navigation processing system 300 described herein.

The modulating module 1238.A and/or the modulating module 1238.B can each implement their own data stream generator 1512, pilot stream generator 1514, and/or bandwidth-efficient modulator 1515. The modulating module 1238.A can thus generate I and Q components 1541.A and 1542.A of navigation signal 240.A and/or the modulating module 1238.B can thus generate I and Q components 1541.B and 1542.B of navigation signal 240.B. The data stream generator 1512, pilot stream generator 1514, and/or bandwidth-efficient modulator 1515 of the low band modulating module 1238.A and/or the high band modulating module 1238.B be implemented in a same or similar fashion as discussed in conjunction with FIGS. 15D, 15E, 15F, and/or 15G.

Figure 15J:
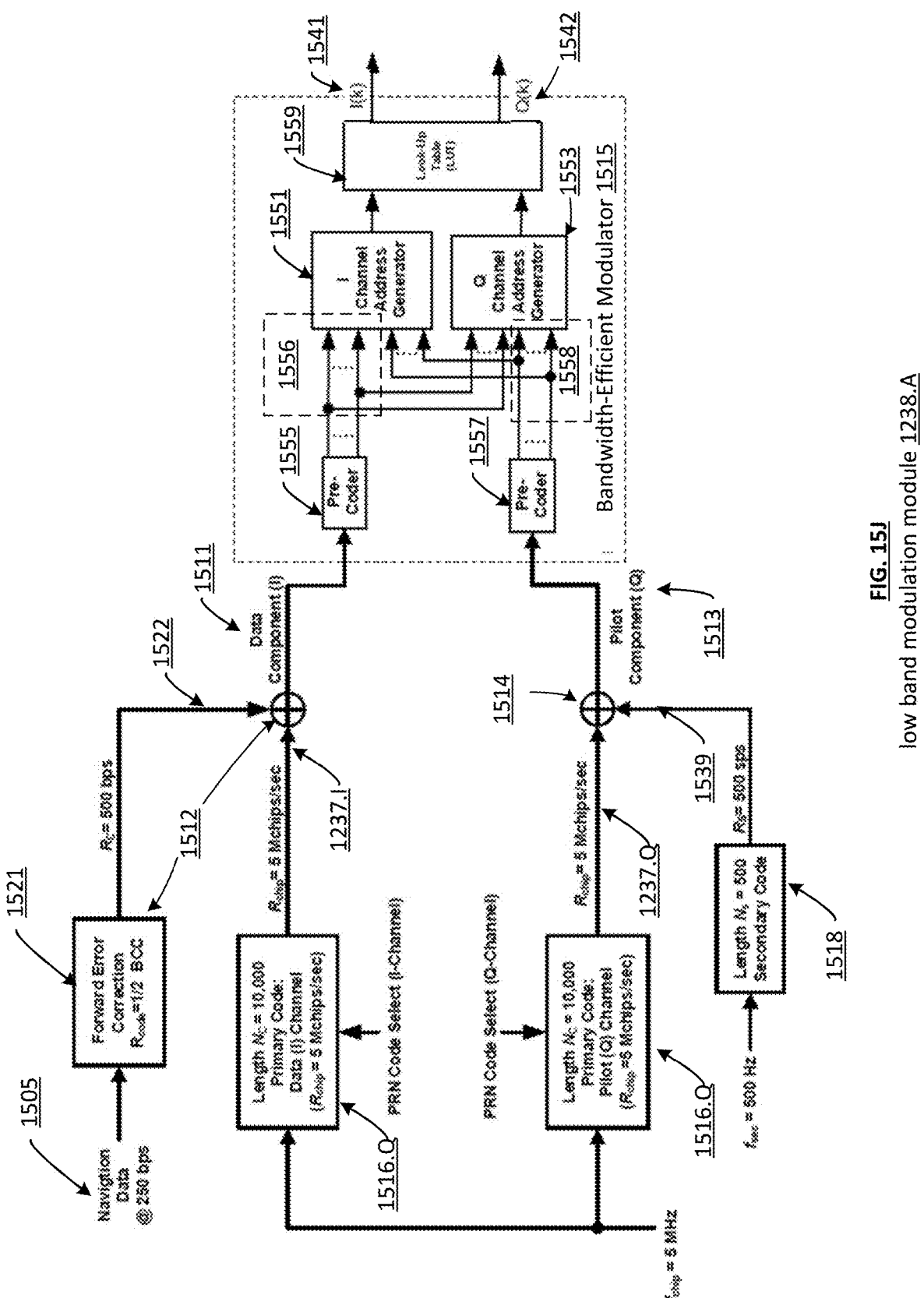
FIG. 15J illustrates an example embodiment of a low band modulation module in accordance with various embodiments.
Figure 15K:
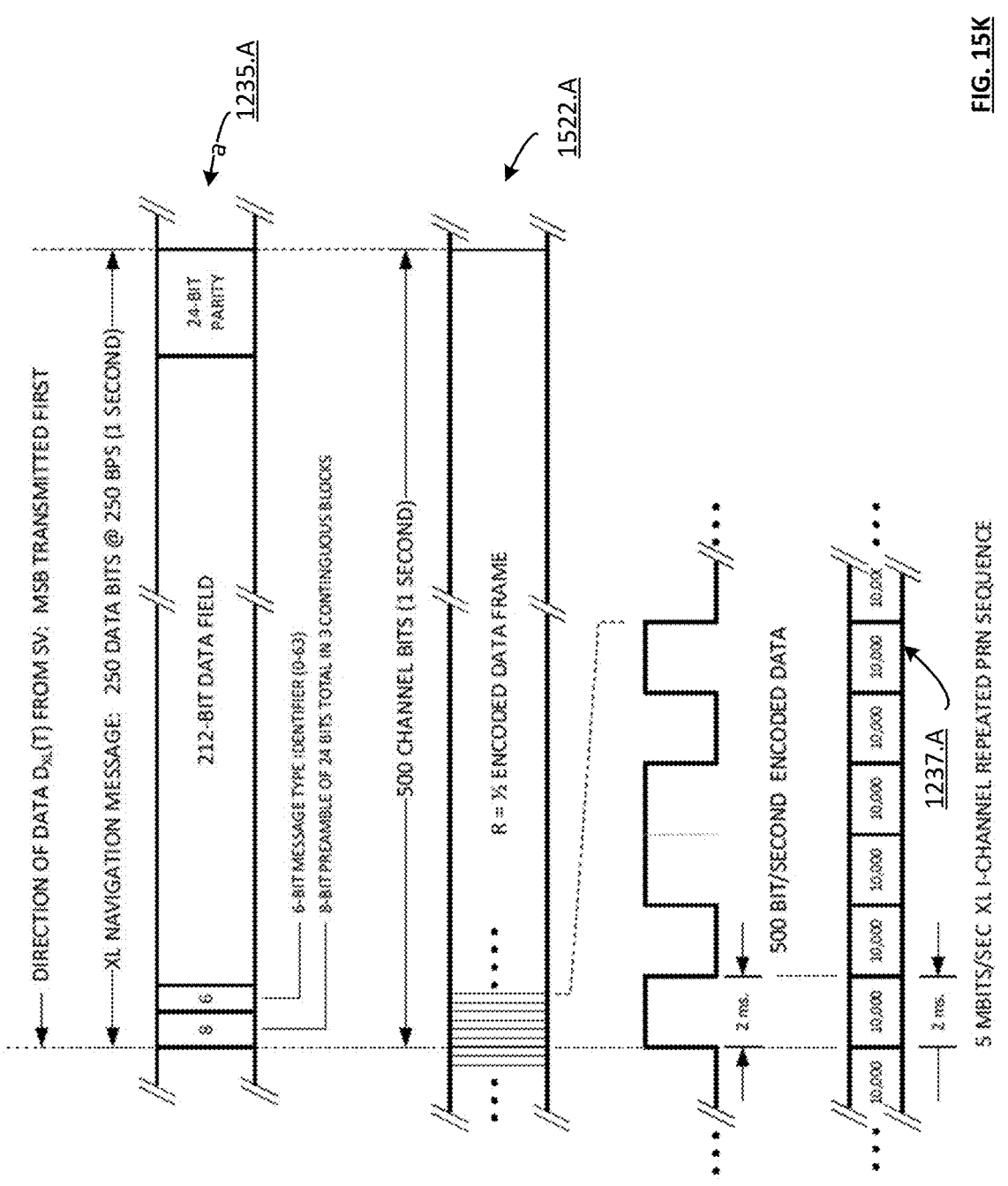
FIG. 15K illustrates an example embodiment of navigation message structure in accordance with various embodiments.

FIG. 15J illustrates an embodiment of a low band modulation module 1238.A. Some or all features and/or functionality of the low band modulation module 1238.A of FIG. 15J can implement the modulation module 1238 of FIG. 15G, the low band modulation module 1238.A of FIG. 15H and/or 15I, and/or any other embodiment of modulation module 1238 described herein.

The navigation data stream 1505 can have a rate of 250 data bits per second, or another data bit rate, for example, enabled based on the signal frequency, chipping rates, encoding scheme, and/or modulation applied in constructing the navigation signal. The error-coded navigation data stream 1522 can have a rate of 500 channel bits per second, or at another channel bit rate, for example, based on being transmitted at 500 channel bits per second, or at another data rate. The spreading codes 1237.I and 1237.Q can have length of 10,000 chips and/or can have a chipping rate of 5 Mchips per second, or another chipping rate. The overlay code 1539 can have length of 500 symbols, for example, aligned with the coded 500 bit message frame of the error-coded navigation data stream 1522. These rates can be based on a 10 MHz reference frequency.

These relationships of this example embodiment of FIG. 15J are illustrated in FIG. 15K. In other embodiments, similar frame alignments can be employed via different respective rates. The various bit, data, channel, and chip rates depicted in FIG. 16G and/or FIG. 16H can otherwise be same and/or different for other embodiments of navigation processing system 300.

The low band modulation module 1238.A of FIG. 15J can implement error-coding module 1521 by applying a Forward Error Correction (FEC) scheme, for example, that utilizes a binary convolutional code, for example, with a code rate R=1/2, where a corresponding alignment of error-coded data stream 1522 is illustrated in FIG. 15K. Other embodiments of low band modulation module can implement other types of error-coding schemes, such as other types of Forward Error Correction coding schemes and/or any other type of coding scheme.

Figure 15L:
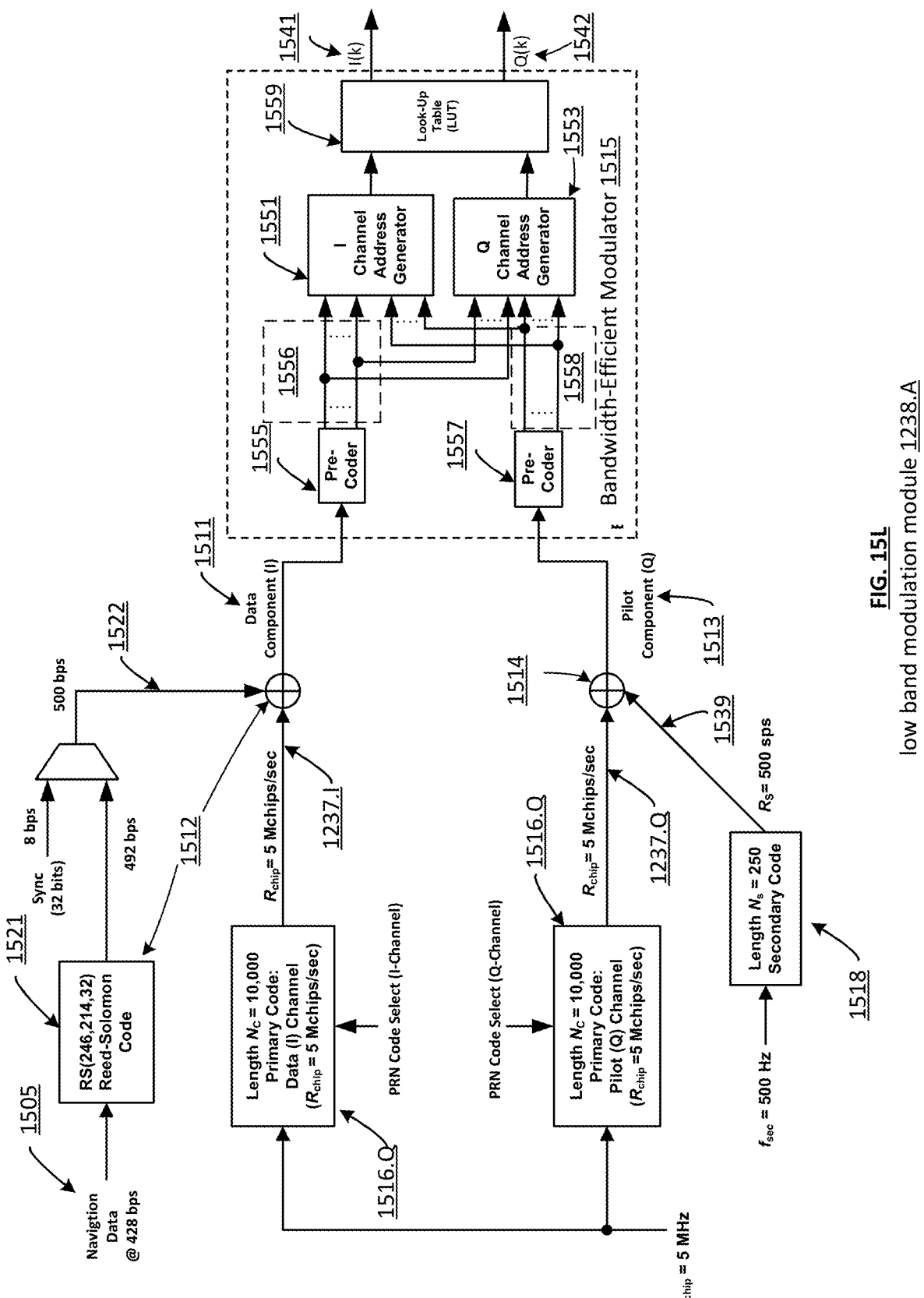
FIG. 15L illustrates an example embodiment of a low band modulation module in accordance with various embodiments.
Figure 15M:
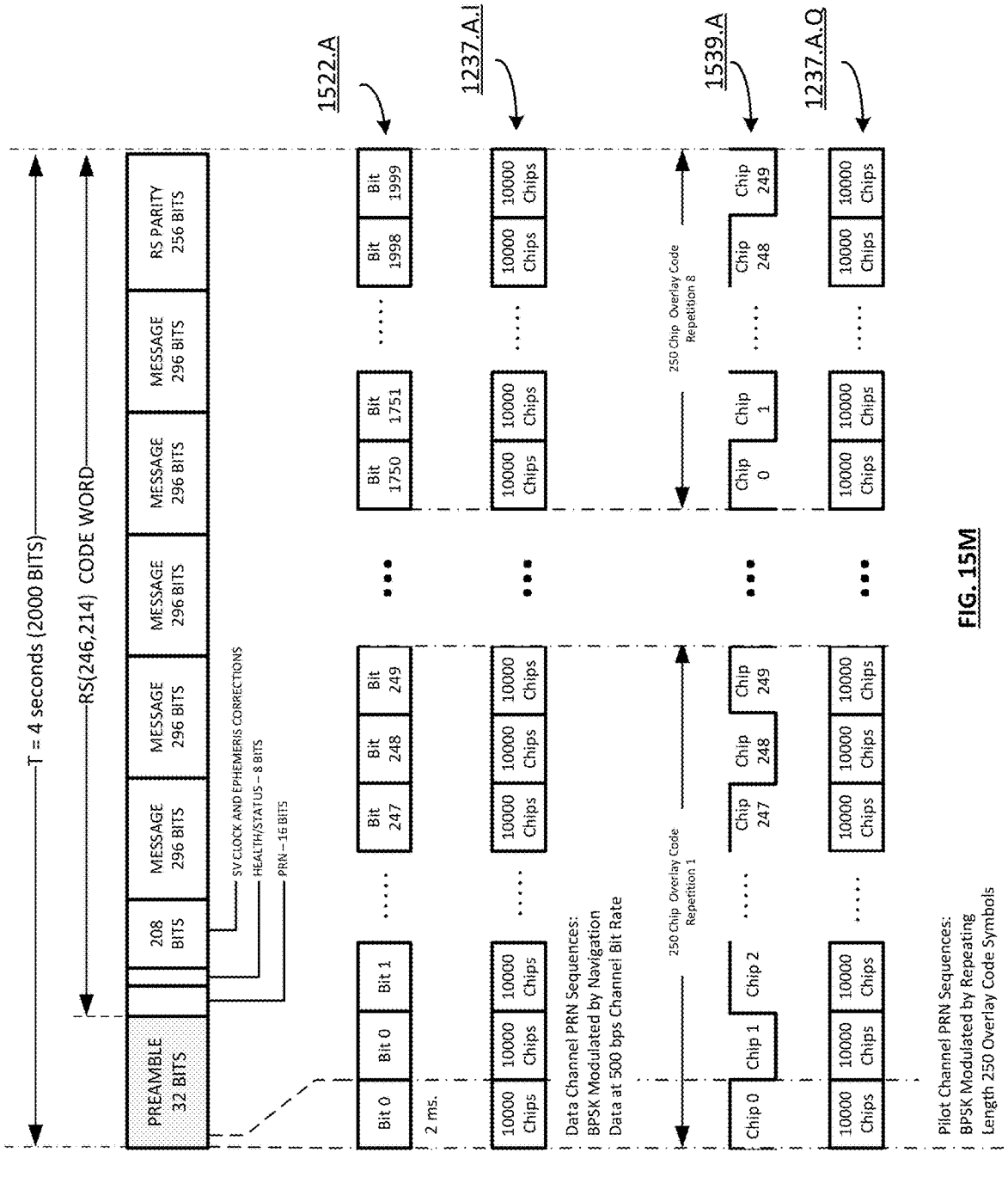
FIG. 15M illustrates an example embodiment of code word structure in accordance with various embodiments.

FIG. 15L illustrates another embodiment of low band modulation module 1238.A that applies functionality of FIGS. 15A-15I to generate a low band navigation signal. Some or all features and/or functionality of the modulation module 1238 of FIG. 15L can implement the modulation module 1238 of FIG. 15A, and/or any other embodiment of modulation module 1238 described herein, for example, instead of or in addition to features and/or functionality of FIG. 15I. Some or all features and/or functionality of the modulation module 1238 of FIG. 15L can implement the low band modulation module 1238.A and/or the high band modulation module 1238.B of FIG. 15H, and/or any other embodiment of modulation module 1238 described herein.

The low band modulation module 1238 of FIG. 15L can be implemented in a same or similar fashion as discussed in conjunction with FIG. 15J, were a different error-coding scheme is applied. In particular, a Reed-Solomon coding scheme, or other linear block coding scheme can be implemented as the error-coding scheme by error-coding module 1521 to generate error-coded navigation data stream 1522 from navigation message stream 1505. This can include performing a Reed-Solomon (RS) scheme as an RS(246, 214) scheme, for example, where the number of symbols per block n is equal to 246, where the number of data symbols in the block k is 214, and where the number of parity symbols in the block n minus k is 246−214=32. Other values of n and k can optionally be implemented for applying a Reed-Solomon coding scheme in other embodiments, and/or another type of coding scheme that is different from a Reed-Solomon coding scheme can optionally be implemented.

The output rate of the Reed-Solomon coding scheme can thus be at a rate of (n/k) times the data rate of the navigation data to account for parity, where in this case, the rate of bits included in codewords outputted by the Reed-Solomon coding scheme is optionally 492 bits per second based on enabling an input navigation data rate being 428 bits per second, based on n being 246, and based on k being 214. The navigation data rate can further be enabled based on the signal frequency, chipping rates, encoding scheme, and/or modulation applied in constructing the navigation signal.

Another data rate can be rendered based on applying a different type of coding scheme rate. In some embodiments, such as the example of FIG. 15L, the data rate of navigation data, and/or the values of n and k of the Reed-Solomon code, are configured such that the number of bits per second is evenly divisible by the value of k. A 32 bit sync can be applied to the raw Reed-Solomon output at 8 bits per second to render an outputted error-coded navigation data stream 1522 at 500 bits per second for modulo-2 addition with the PRN code as discussed previously.

The relationships of rates of the error-coded data stream 1521, spreading codes 1237.I and 1237.Q, and overlay code 1539 of the example embodiment of FIG. 15L are illustrated in FIG. 15M. In other embodiments, similar frame alignments can be employed via different respective rates. The various bit, data, channel, and chip rates depicted in FIG. 15L and/or FIG. 15M can otherwise be same and/or different for other embodiments of navigation processing system 300. Some or all of the features of FIG. 15L and/or FIG. 15M can be implemented instead of or in addition to features of FIG. 15J and/or FIG. 15K in aligning and/or modulating various streams with corresponding data, code, and chip rates to render navigation signals via modulation module 1238. In some embodiments, some or all features of the data rates and/or error-coding scheme of FIG. 15L and/or FIG. 15M can be implemented instead of features of the data rates and/or error-coding scheme of FIG. 15J and/or FIG. 15K to achieve more favorable data rates.

Figure 15N:
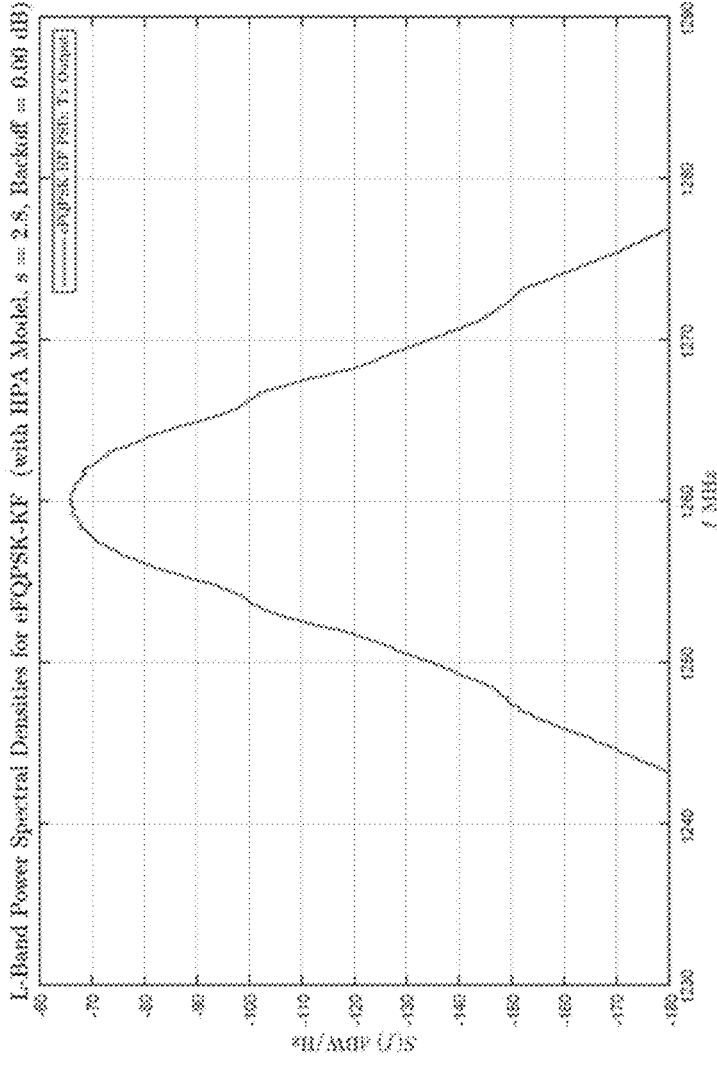
FIG. 15N illustrates an example embodiment of a power spectral density plot of a navigation signal in accordance with various embodiments.
Figure 150:
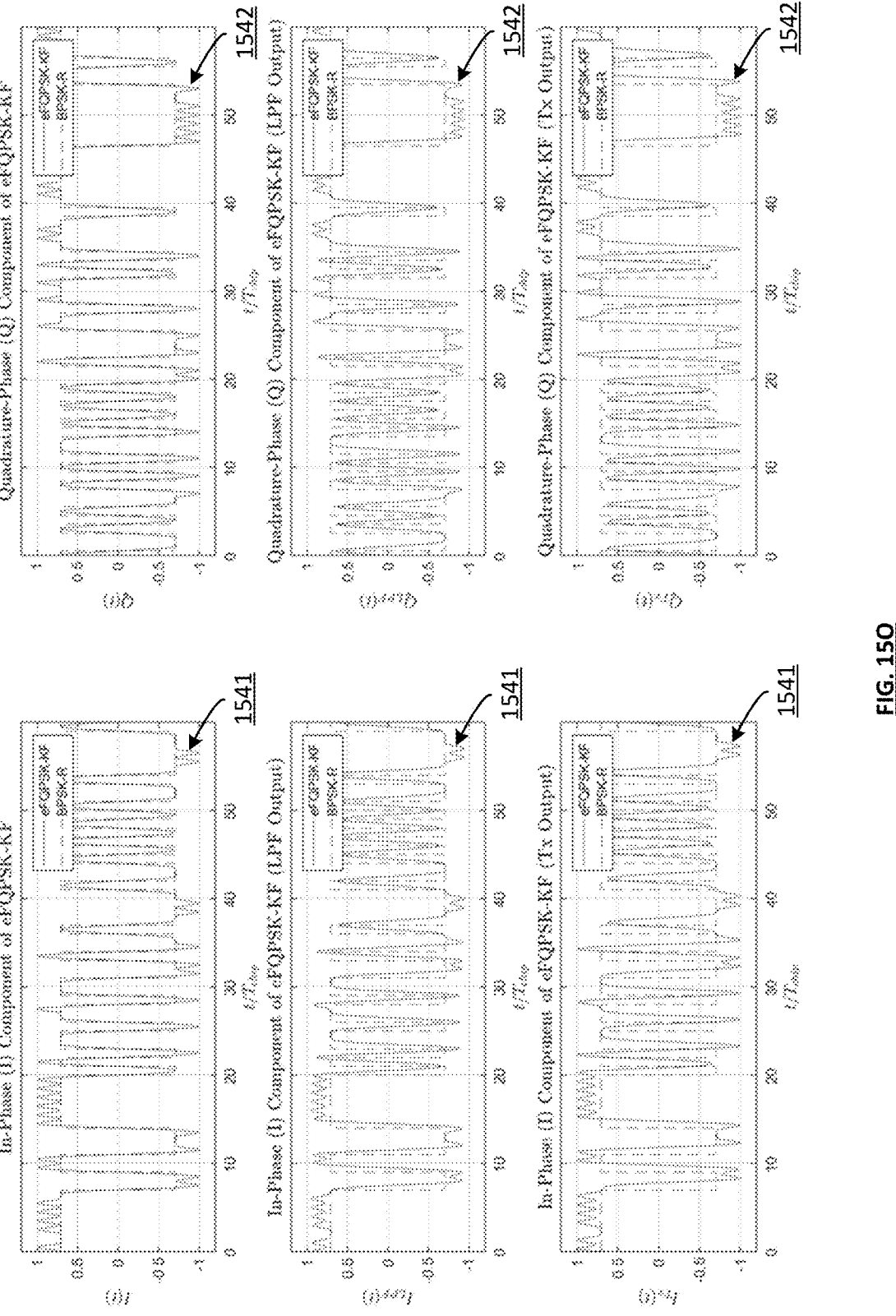

FIG. 15N illustrates an example low band power spectral density plot of navigation signal 240.A when implementing an EFQPSK modulation scheme.

FIG. 15O illustrates example waveforms of navigation signal I components 1541 and navigation signal Q components 1542.

Figure 15P:
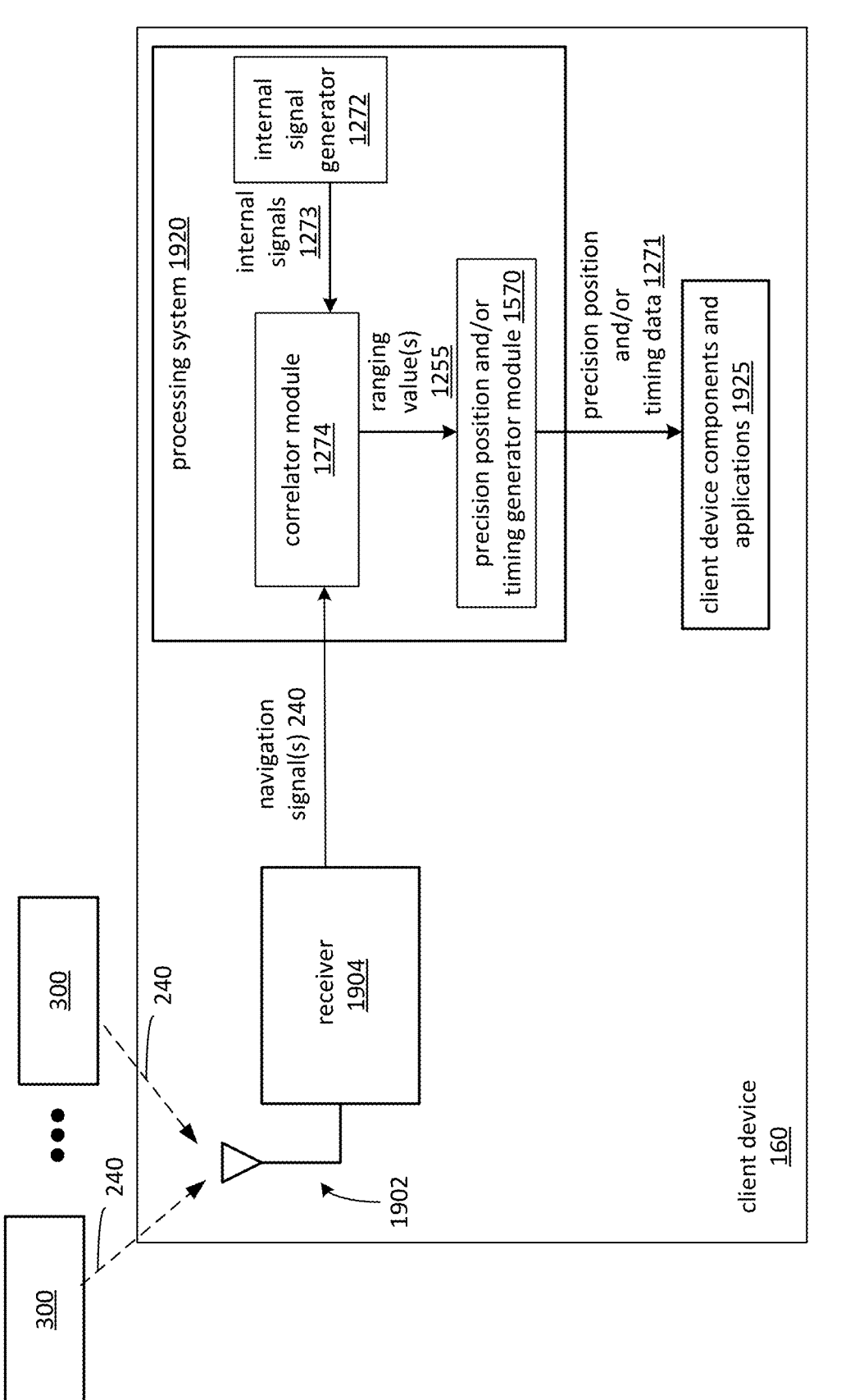
FIG. 15P illustrates an example embodiment of navigation message structure in accordance with various embodiments.

FIG. 15P presents an embodiment of a client device 160 that implements a receiver 1904, processing system 920, and/or client device components and applications 1925. For example, the client device 160 of FIG. 15P can be implemented as the mobile device 900 of FIG. 9A, where the processing system 1920 is implemented as the processing system 920, and/or where the client device components and applications 1925 is implemented as the mobile device components and applications 925. The client device 160 of FIG. 15P can correspond to any type of client device described herein, such as a cellular device, smart phone, mobile device, vehicle, stationary infrastructure element, or other type of client device 160 described herein. The client device 160 can optionally correspond to a node of the satellite constellation system 100. Some or all features and/or functionality of the client device 160 of FIG. 15P can be utilized to implement mobile device 900 of FIG. 9A, the client device 160 of FIG. 12G, and/or any other embodiments of client device 160 described herein.

The receiver 1904 can utilize an antenna 1902, such as the antenna 902 of FIG. 9A, to receive navigation signals 240 from at least one navigation processing system 300. For example, navigation signals 240 are received from one or more satellites 110 and/or other nodes of the satellite constellation system 100 that generate and transmit navigation signals 240 via a navigation processing system 300. For example, the navigation signals 240 are generated via a navigation signal generator and signal transmission module 1230 as described in one or more embodiments discussed herein. The navigation signals 240 can alternatively or additionally be generated based on applying some or all features and/or functionality of: the state estimator flow of FIG. 5A; the navigation message generation flow of FIG. 5B, and/or the broadcast flow of FIG. 5C. The navigation signals 240 can be implemented as any other embodiment of navigation signals 240 described herein.

The processing system 1920 can utilize at least one processor to implement a precision position and/or timing generator module 1570 that is configured to generate precision position and/or timing data 1571 based on one or more received navigation signals 240. The precision position and/or timing data 1571 can be implemented to include the precision timing data 1271 of FIG. 12G, and/or the enhanced position data 922 and/or enhanced timing data 922 of FIG. 9A. The precision position and/or timing data 1571 can enable the client device 160 to generate its own timing and/or position solution for use and/or display by one or more client device components and applications 1925.

Generating the precision position and/or timing data 1571 can be based on one or more ranging values 1255 generated over time by a correlator module 1274 based on correlating internal signals 1273 generated by an internal signal generator 1272 with the received navigation signals 240. For example, the correlator module 1274 and/or the internal signal generator 1272 can be implemented in a same or similar fashion as discussed in conjunction with FIG. 12G. In some embodiments, the correlator module 1274 is implemented in accordance with a receiver reference bandwidth. For example, a receiver reference bandwidth of low band navigation signal 240.A is 20 MHz and/or a receiver reference bandwidth of high band navigation signal 240.B is 10 MHz.

In some embodiments, the processing system 1920 of client device 160 generates precision position and/or timing data 1571 based on processing the navigation signals 240 generated in accordance with some or all features and/or functionality discussed in conjunction with some or all of FIGS. 15A-15O. This can include composing a complex waveform of the navigation signal 240 into the data stream component and the pilot stream components. This can be based on applying Offset QPSK demodulation techniques to the navigation signal 240, for example, based on processing the navigation signal 240 as an Offset QPSK waveform. In some embodiments, the processing system 1920 can recover the data stream 1511 based on correlation with the data channel spreading code 1237.I. In some embodiments, the processing system 1920 can recover the pilot stream 1513 based on correlation with the pilot channel spreading code 1237.Q. For example, the processing system 1920 generates the data channel spreading code 1237.I and/or the pilot channel spreading code 1237.Q as internal signals 1273 of FIG. 12H for correlation with navigation signal 240. The pilot channel spreading code 1237.Q can be generated by the processing system 1920 delayed in time by half a chip from the data channel spreading code 1237.I.

In some embodiments, although generation of the transmit high band and low band signal cross-correlates the I (data) and Q (pilot) spreading code chip streams via the bandwidth-efficient modulator 1515, the operation can be transparent to user equipment receivers and/or does not require demodulation of the resulting signal, such as an EFQPSK-modulated signal. In some embodiments, from a user equipment perspective, the navigation signal can be treated as two BPSK-R type GNSS signals in quadrature and can be acquired and tracked using standard techniques for modern GNSS signals such as the GPS L5 signal or other BPSK-R type GNSS waveforms, but with an addition 1/2-chip offset.

Applying a bandwidth-efficient modulation technique to generate navigation signals 240 can improve the technology of navigation systems based on receiving devices generating more precise position and/or timing solutions via more precise ranging data generated in correlating internal signals with incoming navigation signals. For example, client devices 160 can generate more precise orbital state data based on receiving navigation signals 240 from satellites 110, and/or other nodes of the satellite constellation system 100, that are generated in accordance with a bandwidth-efficient modulation technique. As another example, satellites 110 and/or client devices 160 can generate more precise position and/or timing data based on receiving signals 132 from GNSS satellites generated in accordance with a bandwidth-efficient modulation technique.

For example, the ranging value 1255 generated by correlator module 1274 has a first precision metric that compares favorably to a precision threshold based on the navigation signal 240 being generated via a bandwidth-efficient modulation technique. Ranging values 1255 generated by the same or different correlator module 1274 when correlating with other navigation signals generated by applying a bandpass filter to a waveform can have a second precision metric that is less favorable than the first precision metric and/or that compares unfavorably to the precision threshold based on these other navigation signals instead being generated by applying a bandpass filter to a waveform.

In some embodiments, navigation signals generated via a bandwidth-efficient modulation technique can render more precise ranging data than signals generated by applying a bandpass filter to a waveform based on the navigation signals generated via a bandwidth-efficient modulation technique inducing sharper correlator peaks generated when correlating internal signals with incoming navigation signals than the correlator peaks induced for signals generated by applying a bandpass filter to a waveform.

In some embodiments, navigation signals generated via a bandwidth-efficient modulation technique can render more precise ranging data than signals generated by applying a bandpass filter to a waveform based on the bandwidth-efficient modulation technique inducing a higher chipping rate than that induced for signals generated by applying a bandpass filter to a waveform. For example, this higher chipping rate can render smaller spacing between an early replica, a prompt replica, and a late replica that are each modulated with the incoming navigation signal 240 via a multicorrelator implemented by correlator module 1274. This can render smaller shifts of the early replica, the prompt replica, and the late replica for subsequent correlation with navigation signal 240 that are induced by the multicorrelator based on the relative correlations with the early replica, the prompt replica, and the late replica. These smaller shifts can enable closer synchronization with the navigation signal and lower margin of error, which can render position and/or timing errors that are smaller than and/or otherwise more favorable than an error rate threshold, and/or that are smaller than and/or otherwise more favorably than error induced by the greater shifts of the early replica, the prompt replica, and the late replica required by applying a bandpass filter to a waveform.

In various embodiments, a navigation processing system includes at least one processor configured to execute operational instructions that cause the at least one processor to perform operations. The operations can include generating navigation data; generating a data stream based on the navigation data and a data channel spreading sequence; generating a pilot stream based on a pilot channel spreading sequence; generating a navigation signal based on applying a bandwidth-efficient modulation scheme to the data stream and the pilot stream. A navigation signal transmitter of the navigation processing system can broadcast the broadcast the navigation signal for receipt by at least one client device. The navigation signal can facilitate the at least one client device to determine state data of the at least one client device, such as precision timing and/or position data, of the at least one client device.

In various embodiments, a navigation processing system includes at least one processor configured to execute operational instructions that cause the at least one processor to perform operations. The operations can include generating navigation data based on orbital state data; generating a low band data stream and a high band data stream based on the navigation data and a data channel spreading sequence; generating a low band pilot stream and a high band pilot stream based on a pilot channel spreading sequence; generating a low band navigation signal based on cross-correlating the low band data stream and the low band pilot stream in accordance with a bandwidth-efficient modulation scheme; and/or generating a high band navigation signal based on cross-correlating the high band data stream and the high band pilot stream in accordance with the bandwidth-efficient modulation scheme. The navigation processing system can further include a navigation signal transmitter configured to broadcast the low band navigation signal and the high band navigation signal for receipt by at least one client device. The low band navigation signal and/or the high band navigation signal can facilitate the at least one client device to determine state data of the at least one client device, such as precision timing and/or position data, of the at least one client device.

In various embodiments, a satellite includes at least one processor configured to execute operational instructions that cause the at least one processor to perform operations. The operations can include generating navigation data; generating a data stream based on the navigation data and a data channel spreading sequence; generating a pilot stream based on a pilot channel spreading sequence; generating a navigation signal based on applying a bandwidth-efficient modulation scheme to the data stream and the pilot stream. A navigation signal transmitter of the satellite can broadcast the broadcast the navigation signal for receipt by at least one client device. The navigation signal can facilitate the at least one client device to determine state data of the at least one client device, such as precision timing and/or position data, of the at least one client device.

In various embodiments, a satellite includes at least one processor configured to execute operational instructions that cause the at least one processor to perform operations. The operations can include generating navigation data based on orbital state data; generating a low band data stream and a high band data stream based on the navigation data and a data channel spreading sequence; generating a low band pilot stream and a high band pilot stream based on a pilot channel spreading sequence; generating a low band navigation signal based on cross-correlating the low band data stream and the low band pilot stream in accordance with a bandwidth-efficient modulation scheme; and/or generating a high band navigation signal based on cross-correlating the high band data stream and the high band pilot stream in accordance with the bandwidth-efficient modulation scheme. The satellite can further include a navigation signal transmitter configured to broadcast the low band navigation signal and the high band navigation signal for receipt by at least one client device. The low band navigation signal and/or the high band navigation signal can facilitate the at least one client device to determine state data of the at least one client device, such as precision timing and/or position data, of the at least one client device.

FIG. 15Q illustrates a method for execution. Some or all steps of FIG. 15Q can be executed by at least one processor of a satellite, such as a satellite 110. Some or all steps of FIG. 15Q can be performed via a navigation processing system 300 implemented by a satellite, a client device, a ground station, a backhaul satellite, stationary infrastructure, and/or any node of the satellite constellation system 100. Multiple different satellites 110 of the satellite constellation system 100 and/or any multiple different nodes of the satellite constellation system 100 can each implement their own navigation processing system 300 to perform some or all steps of FIG. 15Q independently and/or simultaneously, with or without coordination. Some or all steps of FIG. 15Q can be performed via a navigation processing system 300 implemented by a navigation system component and/or a computing device not associated with and/or not communicating with the satellite constellation system 100 and/or communicating with another satellite constellation system. Some or all steps of FIG. 15Q can be performed in conjunction with implementing some or all features and/or functionality of the navigation processing system 300 and/or a satellite 110 as discussed in conjunction with some or all of FIGS. 15A-15O.

Step 1582 includes generating navigation data. For example, the navigation data is generated based on state data, such as timing data and/or orbital position data of a corresponding satellite 110 and/or other node of the satellite constellation system 100. The method can further include generating the state data, for example, based on implementing some or all functionality of the state estimator of FIG. 5A. The navigation data can include at least one navigation message 1235. The navigation data can be implemented as a navigation data stream generated to include a stream of navigation messages 1235. For example, the navigation data is generated based on implementing some or all functionality of the state estimator flow of FIG. 5A and/or based on implementing some or all functionality of the navigation message generation flow of FIG. 5B.

Step 1584 includes generating a data stream based on the navigation data and a data channel spreading sequence. The data channel spreading sequence can be implemented as and/or can be based on spreading code, such as spreading code 1237.I. The data stream can be implemented as a data stream 1511. Step 1584 can be performed via implementing at least one data stream generator 1512.

Step 1586 includes generating a pilot stream based on a pilot channel spreading code. The pilot channel spreading sequence can be implemented as and/or can be based on spreading code 1237, such as the spreading code 1237.Q. The pilot stream can be implemented as a pilot stream 1513. Step 1586 can Step 1584 can be performed via implementing at least one pilot stream generator 1514.

Step 1588 includes generating a navigation signal based on applying a bandwidth-efficient modulation scheme to the data stream and the pilot stream. This can include cross-correlating the data stream and the pilot stream in accordance with the bandwidth-efficient modulation scheme. The bandwidth-efficient modulation scheme can be implemented via bandwidth-efficient modulator 1515. The navigation signal can be implemented as navigation signal 240.

Step 1590 includes broadcasting the navigation signal for receipt by at least one client device. Performing some or all of steps 1584-1590 can be based on implementing the broadcast flow of FIG. 5C. Performing step 1590 can be based on implementing at least one transmitter of navigation processing system 300, such as navigation signal transmitter 330.

In various embodiments, generating the navigation signal includes utilizing waveform output selected from a discrete set of possible waveform outputs based on the data stream and the pilot stream. In various embodiments, selecting the waveform output includes selecting first waveform output for an in-phase (I) signal component of the navigation signal, and/or selecting second waveform output for a quadrature (Q) signal component of the navigation signal.

In various embodiments, selecting the first waveform output for the I signal component of the navigation signal includes determining a first address via a first address register corresponding to the I signal component based on the data stream and the pilot stream, and/or accessing a waveform look-up table to select the first waveform output based on the first address. For example, the first address register is implemented as the I address determination module 1551. In various embodiments, selecting the second waveform output for the Q signal component of the navigation signal includes determining a second address via a second address register corresponding to the Q signal component based on the data stream and the pilot stream, and/or accessing the waveform look-up table to select the second waveform output based on the second address. For example, the second address register is implemented as the Q address determination module 1553.

In various embodiments, generating the navigation signal further includes applying a first pre-coder to the data stream to generate first pre-coder output and/or applying a second pre-coder to the pilot stream to generate second pre-coder output. For example, the first pre-coder is implemented as the data stream pre-coder 1555 and/or the second pre-coder is implemented as the pilot stream pre-coder 1557. The first address register can determine the first address based on the first pre-coder output and the second pre-coder output. The second address register can determine the second address based on the first pre-coder output and the second pre-coder output.

In various embodiments, the at least one client device determines state data based on generating ranging data for the satellite, for example, where the ranging data is generated based on a correlator peak identified in performing a correlation with the data channel spreading sequence and/or the pilot channel spreading sequence. A precision metric of the correlator peak can compare favorably to a precision metric threshold based on the bandwidth-efficient modulation scheme.

In various embodiments, a precision metric of the state data determined by the at least one client device compares favorably to a precision metric threshold based on a chipping rate of the navigation signal induced by the bandwidth-efficient modulation scheme. In various embodiments, a bandwidth of the navigation signal compares favorably with a bandwidth threshold requirement based on the bandwidth-efficient modulation scheme. In various embodiments, a precision metric induced when correlating with the data channel spreading sequence and the pilot channel spreading sequence compares favorably to a precision metric threshold based on the bandwidth-efficient modulation scheme.

In various embodiments, the bandwidth threshold requirement is based on a frequency band of a Global Navigation Satellite System (GNSS) signal transmitted by a first set of satellites of a GNSS constellation. A satellite 110 that performs the steps of FIG. 15Q can be one of a second set of satellites of a non-GNSS satellite constellation system, where the first set of satellites and the second set of satellites are mutually exclusive, and/or the navigation processing system 300 that performs the steps of FIG. 15Q can be implemented via a navigation system that is distinct from the GNSS constellation. In various embodiments, at least one receiver configured to receive the GNSS signal from at least one of the first set of satellites of the GNSS constellation, and generating the navigation message can be based on orbital state data for the generated based on the GNSS signal.

In various embodiments, generating the pilot stream is based on modulating the pilot channel spreading sequence with an overlay code. In various embodiments, the bandwidth-efficient modulation scheme is a cross-correlated phase shift keying (XPSK) scheme. In various embodiments the bandwidth-efficient modulation scheme implements the Enhanced Feher-Patented Quadrature-Phase-Shift Keying (EFQPSK) modulation technique. In various embodiments, the navigation processing system performing the steps of FIG. 15Q is implemented via a satellite a Low Earth Orbit (LEO) satellite constellation, such as a satellite constellation system 100 orbiting in LEO. In various embodiments, the data channel spreading sequence and the pilot channel spreading sequence uniquely identify the satellite from other ones of the plurality of satellites of the LEO satellite constellation.

In various embodiments, the navigation data is generated based on orbital state data. In various embodiments, the method further includes generating the orbital state data.

In various embodiments, the method includes generating a low band data stream and a high band data stream based on the navigation data and a data channel spreading sequence. In various embodiments, the method includes generating a low band pilot stream and a high band pilot stream based on a pilot channel spreading sequence. In various embodiments, the method includes generating a low band navigation signal based on cross-correlating the low band data stream and the low band pilot stream in accordance with a bandwidth-efficient modulation scheme. In various embodiments, the method includes generating a high band navigation signal based on cross-correlating the high band data stream and the high band pilot stream in accordance with the bandwidth-efficient modulation scheme. In various embodiments, the method includes broadcasting the low band navigation signal and the high band navigation signal for receipt by at least one client device. The low band navigation signal and/or the high band navigation signal can facilitate the at least one client device to determine state data, such as precision timing and/or position data, of the at least one client device.

In various embodiments, the navigation signal transmitter is configured to broadcast the low band navigation signal at a first frequency and the high band navigation signal at second frequency.

In various embodiments, the navigation signal transmitter is implemented via a low band antenna array, having a dual-ring topology, that is configured to radiate the low band navigation signal. In various embodiments, the navigation signal transmitter is further implemented via a high band antenna array, nested within the low band antenna array and having a center and ring topology, that is configured to radiate the high band navigation signal. For example, the low band antenna array and/or the high band antenna array are implemented as discussed in conjunction with FIGS. 18A-18U.

FIGS. 16A-16J illustrate embodiments of a navigation processing system 300. The navigation processing system 300 of FIG. 16A-16J can be implemented onboard: a satellite 110, a client device 160, a ground station 200, a backhaul satellite 150, and/or any other node of the satellite constellation system 100 described herein. The navigation processing system 300 of FIGS. 16A-16J can alternatively or additionally be implemented by a navigation system component or another navigation system that is different from satellite constellation system 100 and/or can be implemented by any computing device, for example, not associated with and/or not communicating with satellite constellation system 100.

The navigation processing system 300 of FIGS. 16A-16J can be implemented utilizing some or all features and/or functionality of the navigation processing system of FIG. 3B. The navigation processing system 300 of FIGS. 16A-16J can be implemented to perform some or all steps of and/or some or all steps of FIG. 16M. Some or all features and/or functionality of the navigation processing system 300 of FIGS. 16A-16J can be utilized to implement any other embodiment of navigation processing system 300 described herein. Some or all features and/or functionality of the navigation processing system 300 of FIGS. 16A-16J can be utilized to implement functionality of one or more satellites

110 and/or other nodes of the satellite constellation system 100, and/or to implement functionality of a navigation system component and/or computing device of another navigation system.

Figure 16A:
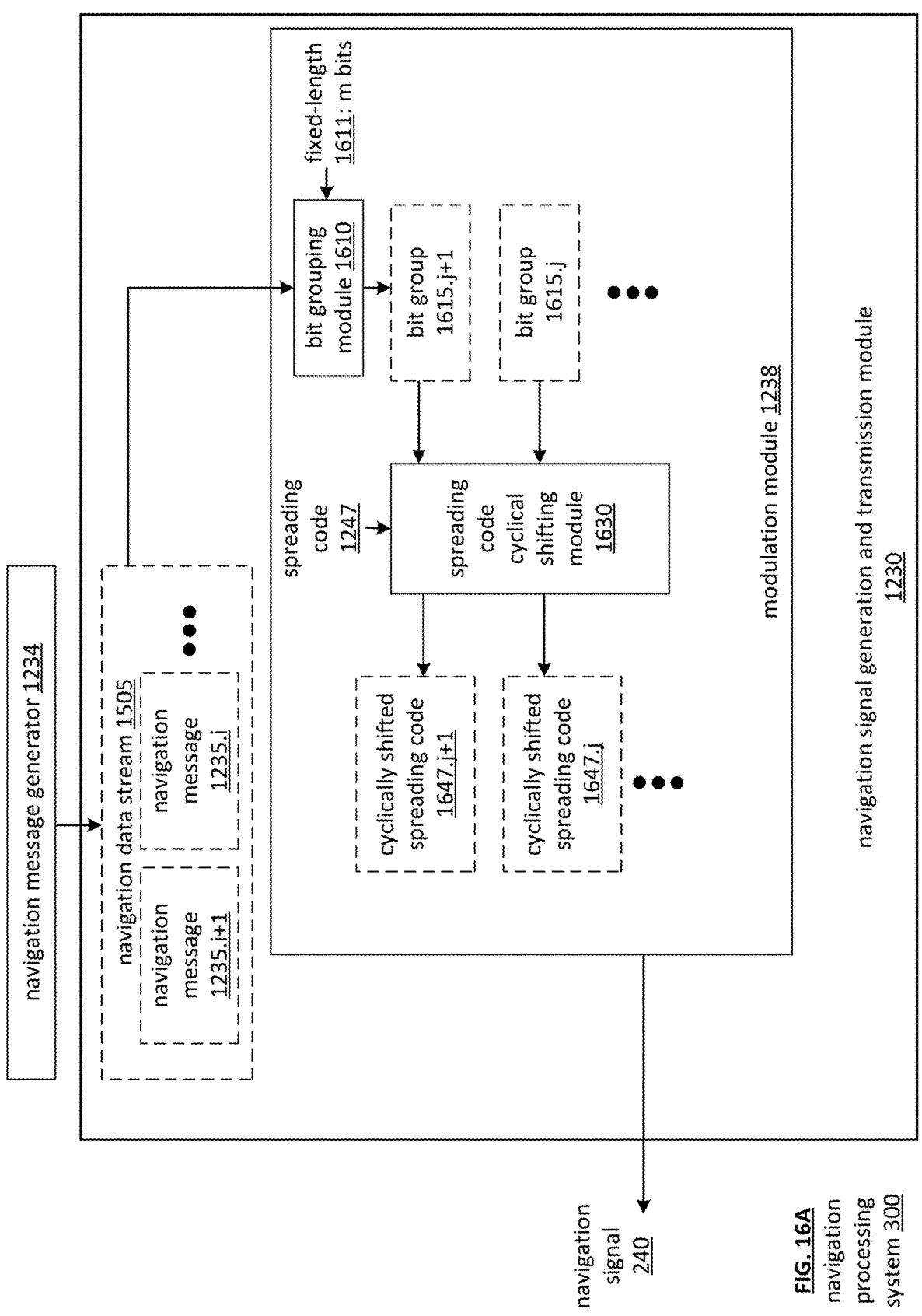
FIG. 16A is a schematic block diagram of a navigation processing system that implements a modulation module in accordance with various embodiments.

FIG. 16A illustrates an embodiment of navigation signal generation and transmission module 1230 that utilizes a modulation module 1238 that implements a spreading code cyclical shifting module. Some or all features and/or functionality of the modulation module 1238 of FIG. 16A can be utilized to implement the modulation module 1238 of FIG. 15A and/or any other embodiment of the modulation module 1238 described herein.

As discussed previously, the spreading code 1237 can correspond to a fixed-length set of chips, such as 10,000 pseudorandom chips, that is repeated over time. However, rather than repeating the same spreading code sequence, the modulation module 1238 of FIG. 16A can be applied such that each subsequent fixed-length set of chips can correspond to one of the plurality of pre-determined code phase shifts of the spreading sequence.

Modulation module 1238 can implement a bit grouping module 1610 to generate a plurality of bit groups 1615 from the navigation data stream 1505. This can include dividing the navigation data stream into a plurality of sequential groups of bits, maintaining their ordering in the navigation data stream 1505. For example, the set of bits in the i+1th bit group is sequentially after the ith bit group of the navigation data stream 1505. The bit grouping module 1610 can be implemented via processing and/or memory resources of the navigation processing system 300.

The plurality of bit groups 1615 can be fixed-length bit groups of a fixed-length 1611, such as a fixed-length of m bits. In some embodiments, m is equal to 6, 8, or any other number of bits. In some embodiments, m is smaller than the length of a navigation message 1235, prior to and/or after being error-coded and/or encrypted. For example, the navigation message frame length is 250 bits as discussed in the embodiment of FIG. 15K and/or is 296 bits as illustrated in the embodiment of FIG. 15M, A single navigation message can thus be divided into a plurality of fixed-length bit groups. In some embodiments, the bit length of a navigation message is divisible by m, where each fixed-length bit groups corresponds to data included in a single navigation message. In some embodiments, the bit length of a navigation message is not divisible by m, where some fixed-length bit groups corresponds to data included in different consecutive navigation messages. In some embodiments, the bit length of a navigation message is not divisible by m, and padding is applied to ensure that each fixed-length bit groups corresponds to data included in a single navigation message.

The bit groups 1615 can be determined prior to and/or after error-coding and/or encryption. For example, the navigation data stream 1505 of FIG. 15A is optionally implemented as error-coded navigation data stream 1522 based on having error-coded the navigation messages 1235 prior to implementing the bit grouping module 1610.

Each bit group 1615 can be processed by a spreading code cyclical shifting module 1630 to render cyclically shifted spreading code 1647 for each bit group 1615. For example, each unique set of m bits is mapped to exactly one cyclically shifted spreading code 1647 by a given shift offset. A plurality of cyclically shifted spreading code 1647 determined over time can be ordered in accordance with the ordering of the corresponding bit groups 1615, based on their ordering in the navigation data stream. For example, cyclically shifted spreading code 1647.$i$+1 corresponds to bit group 1615.$i$+1 and is applied after cyclically shifted spreading code 1647.$i$, which corresponds to bit group 1615.$i$, based on bit group 1615.$i$+1 being sequentially after bit group 1615.$i$ in the navigation data stream 1505. The spreading code cyclical shifting module 1630 can be implemented via processing and/or memory resources of the navigation processing system 300.

Thus, the navigation signal 240 can be generated to include, and/or can be otherwise based on, the plurality of plurality of cyclically shifted spreading code 1647. In particular, modulating the navigation data as illustrated in FIG. 16A can include encoding or "keying" the navigation data of navigation data stream 1505 into the spreading code 1237 based on circularly shifting the spreading code by one of a plurality of pre-determined code phase shifts, such as one of $2^m$ pre-determined phase shifts, determined by each successive bit group 1615 of m navigation data bits, prior to and/or after being error encoded. For example, these bit groups are encoded as code-shift keyed (CSK) symbols generated from shifting the spreading code. These code shifts can be decoded by the client device 160 to demodulate navigation data, for example, as illustrated in FIG. 16K.

Each fixed-length set of chips of each cyclically shifted spreading code 1647 can still identify the corresponding spreading code 1237 based on being cyclically shifted from this corresponding spreading code 1237, and thus can be utilized by client devices 160 to identify the corresponding satellite 110 and/or other node of the satellite constellation system 100 from other satellites and/or nodes with different spreading code 1237. Each fixed-length set of each cyclically shifted spreading code 1647 chips can be correlated with replicas of the spreading code 1237, such as one or more shifted replicas of the spreading code applied by multiple correlators of a client device 160, to enable ranging data to be generated by client devices 160. Furthermore, the cyclical shift applied to the spreading code 1237 for each fixed-length set of chips can further denote navigation data that can be further utilized in generating precise timing and/or position data.

This modulation technique of cyclically shifting the spreading code to encode the navigation data improves the technology of navigation systems by increasing the data rate of navigation data in navigation signals, enabling a richer amount of navigation data to be included in navigation messages 1235, which can enable more precise timing and/or position data to be generated by client devices based on processing the richer amount of navigation data in navigation messages of navigation signals. For example, greater amounts of correction data and/or state estimate data can be included in navigation signals, which can facilitate higher accuracy position and/or timing solutions generated by receiving client devices 160 that process this navigation data in conjunction with generating ranging data from the navigation signals 240.

In some embodiments, this form of modulation applied by the embodiment of modulation module 1238 illustrated FIG. 16A is only applied to the high band, where the high band navigation signal 240.B is generated via encoding the navigation data of navigation data stream 1505 into the spreading code 1237.B based on circularly shifting the spreading code by one of a plurality of pre-determined code phase shifts. In such embodiments, the low band navigation signal 240.A is optionally generated via different modulation where the spreading code 1237.A is optionally not circularly shifted for encoding of the navigation data. For example, the low band navigation signal 240.A is instead generated using some or all functionality illustrated in conjunction with FIG. 15J and/or FIG. 15L.

Figure 16B:
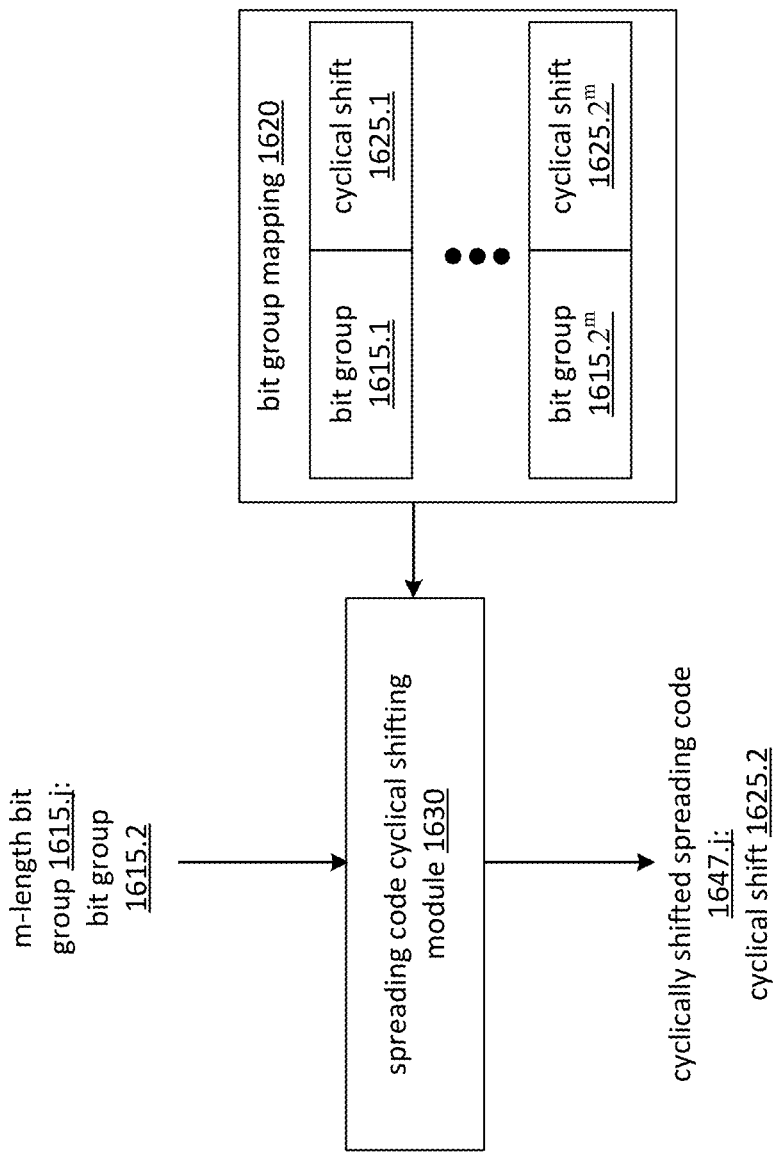
FIG. 16B illustrates an embodiment of a modulation module in accordance with various embodiments.

FIG. 16B illustrates an embodiment of modulation module 1238 that utilizes a mapping of a plurality of pre-determined cyclical shifts to bit groups. Some or all features and/or functionality of the modulation module 1238 of FIG. 16B can be utilized to implement the modulation module 1238 of FIG. 16A and/or any other embodiment of the modulation module 1238 described herein.

The spreading code cyclical shifting module 1630 can utilize a bit group mapping 1620 indicating a one-to-one mapping of bit groups 1615 to cyclical shifts 1625 applied to the spreading code 1237. The bit group mapping 1620 can be stored and/or accessed in memory of the navigation processing system 300.

In particular, for bit groups with m bits, the bit group mapping 1620 can indicate exactly one of $2^m$ different pre-determined cyclical shifts 1625 for each of the $2^m$ possible sets of m bits. In some embodiments, the bit groups each include 6 bits, and the bit group mapping 1620 indicates 64 different pre-determined cyclical shifts 1625. In some embodiments, the bit groups each include 8 bits, and the bit group mapping 1620 indicates 256 different pre-determined cyclical shifts 1625. Other numbers of bits in each bit group can be implemented in other embodiments, All of these $2^m$ cyclical shifts 1625 can be different from one another. In some embodiments, exactly one of the set of $2^m$ cyclical shifts 1625 corresponds to a shift of zero, where the spreading code 1237 is unshifted for the corresponding bit group 1615. In some embodiments, the amount of shift applied across the $2^m$ cyclical shifts 1625 is evenly and/or relatively evenly spaced apart over the full number of chips, such as the 10,000 chips of the spreading code 1237.

Each cyclical shift 1625 stored in bit group mapping 1620 can indicate an amount and/or offset by which the spreading code 1237 is to be cyclically shifted, where the spreading code cyclical shifting module 1630 shifts the given unshifted spreading code 1237 by the denoted amount and/or offset for the corresponding bit group 1615 to render the cyclically shifted spreading code 1237. Alternatively or in addition, each cyclical shift 1625 stored in bit group mapping 1620 can indicate a shifted version of the spreading code 1237, such as one cyclically shifted spreading code 1237 of a set of pre-determined cyclically shifted spreading codes 1237, where the spreading code cyclical shifting module 1630 applies the accesses cyclically shifted spreading code 1237 mapped to a given bit group 1615 rather than generating this cyclically shifted spreading code 1237 from the unshifted spreading code 1237.

To ensure that ranging data can be generated and that the navigation message can be decoded, in some embodiments, the length m is selected such that an orthogonality across the $2^m$ different cyclically shifted spreading code 1237 compares favorably to an orthogonality threshold, for example, such that autocorrelation of a given cyclically shifted spreading code 1237 meets and/or exceeds an auto-correlation threshold while cross-correlation with other ones of the $2^m$ cyclically shifted spreading codes 1237 meets and/or falls below a cross-correlation threshold. This can include selecting m such that m is smaller than a corresponding threshold length that, when exceeded, renders cross-correlation values with other cyclically shifted spreading codes 1237 that are not sufficiently low, which can be based on a length of the spreading code 1237 and/or based on a maximum ratio between m and the length of the spreading code 1237. The use of a pseudorandom sequence and/or a truncated Gold sequence as spreading code 1237 can further ensure that cross-correlation with other ones of the $2^m$ cyclically shifted spreading codes 1237 meets and/or falls below the cross-correlation threshold.

In some embodiments, the length m is selected such that an orthogonality across the $2^m$ different cyclically shifted spreading code 1237, across all satellites 110 and/or other nodes with unique spreading codes, compares favorably to the orthogonality threshold, for example, such that autocorrelation of a given cyclically shifted spreading code 1237 meets and/or exceeds an auto-correlation threshold while cross-correlation with the $2^m$ cyclically shifted spreading codes 1237 for all other unique spreading codes 1237 for other nodes and/or satellites meets and/or falls below a cross-correlation threshold. In some cases, the spreading codes 1237 for different satellites and/or nodes are selected such that they are not cyclical shifts of other spreading codes and/or such that cross-correlation between various cyclical shifts of different spreading codes meets and/or falls below the cross-correlation threshold.

Figure 16C:
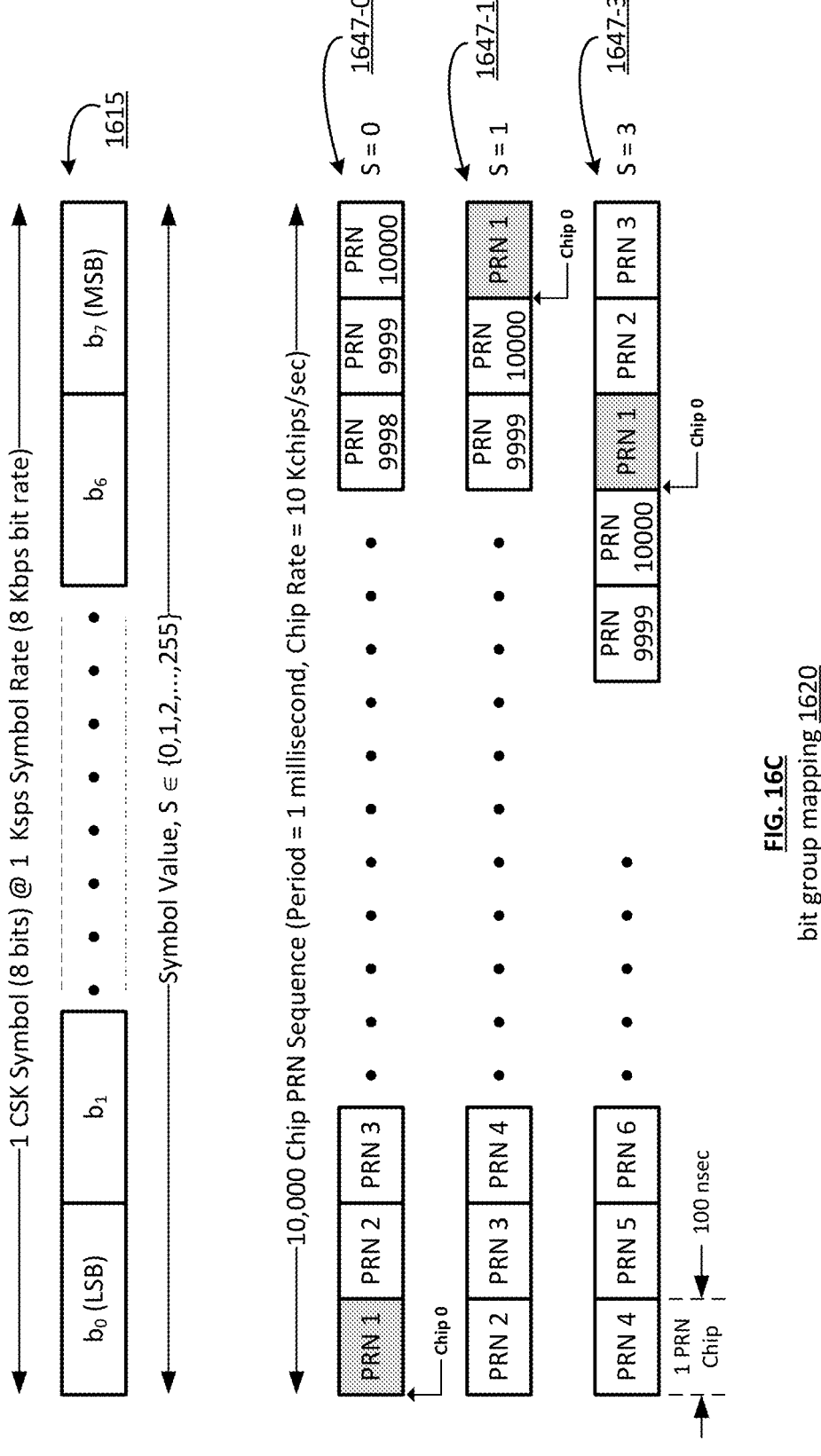
FIG. 16C illustrates an example embodiment of a bit group mapping utilized by a spreading code cyclical shifting module in accordance with various embodiments.

FIG. 16C illustrates an example embodiment of different cyclically shifted spreading codes 1647 for different symbols, for example, as indicated by a given example bit group mapping 1620 of FIG. 16B. Some or all features and/or functionality of FIG. 16C can implement the bit group mapping 1620 of FIG. 16B and/or any embodiment of modulation module 1238 described herein.

In this example, exactly 256 symbol values S are possible, based on all possible configurations of bit groupings 1615 of exactly 8 bits as illustrated in FIG. 16C, where $b_0$ is a least significant bit (LSB) in a given bit grouping 1615 of a set of 8 ordered bits, and where $b_7$ is a most significant bit (MSB) in a given bit grouping 1615. This particular example illustrates three possible symbols values S=0, S=1, and S=3, which are mapped to the three illustrated corresponding cyclically shifted spreading codes 1647-0, 1647-1, and 1647-3, corresponding to a cyclical shift 1625 of zero, a cyclical shift 1625 of one, and a cyclical shift 1625 of three, respectively, applied to the spreading code 1237. In particular, the 10,000 chips of a PRN code implementing the spreading code 1237 are shifted by a corresponding, unique amount to render each cyclically shifted spreading codes 1647, where a chip 0, indicated by shaded block "PRN 1", is shifted accordingly. A full set of cyclically shifted spreading codes 1647-0-1647-255 can be determined in this manner, where chip 0, and the following chips, are all cyclically shifted by a corresponding amount between 0 and 255.

Note that while FIG. 16C illustrates chips being shifted by a very small number for illustrative purposes, such as within one or three shifted chips for the three example cyclically shifted PRN sequences of the three example symbols, the set of 256 possible symbols, or other number of symbols, can be configured render more equal spacing of chip zero, and respective PRN block 1 of FIG. 16C, with respect to the 10,000 chips of the cyclically shifted PRN sequences of other symbols. For example, any given one of the cyclically shifted spreading codes 1647-0-1647-255 can be cyclically shifted by at least 39 chips, for example, based on shifting the 10,000 chip PRN sequence as evenly as possible across the 256 possible symbols, or another number of chips, from all other sequences in the full set of cyclically shifted spreading codes 1647-0-1647-255. This more even spacing can be ideal in ensuring that a receiver not mistake one symbol for another. Each of the set of 256 possible symbols can be configured to have high orthogonality and/or low-cross correlation with other ones of the set of 256 possible symbols.

Figures 16D, 16E:
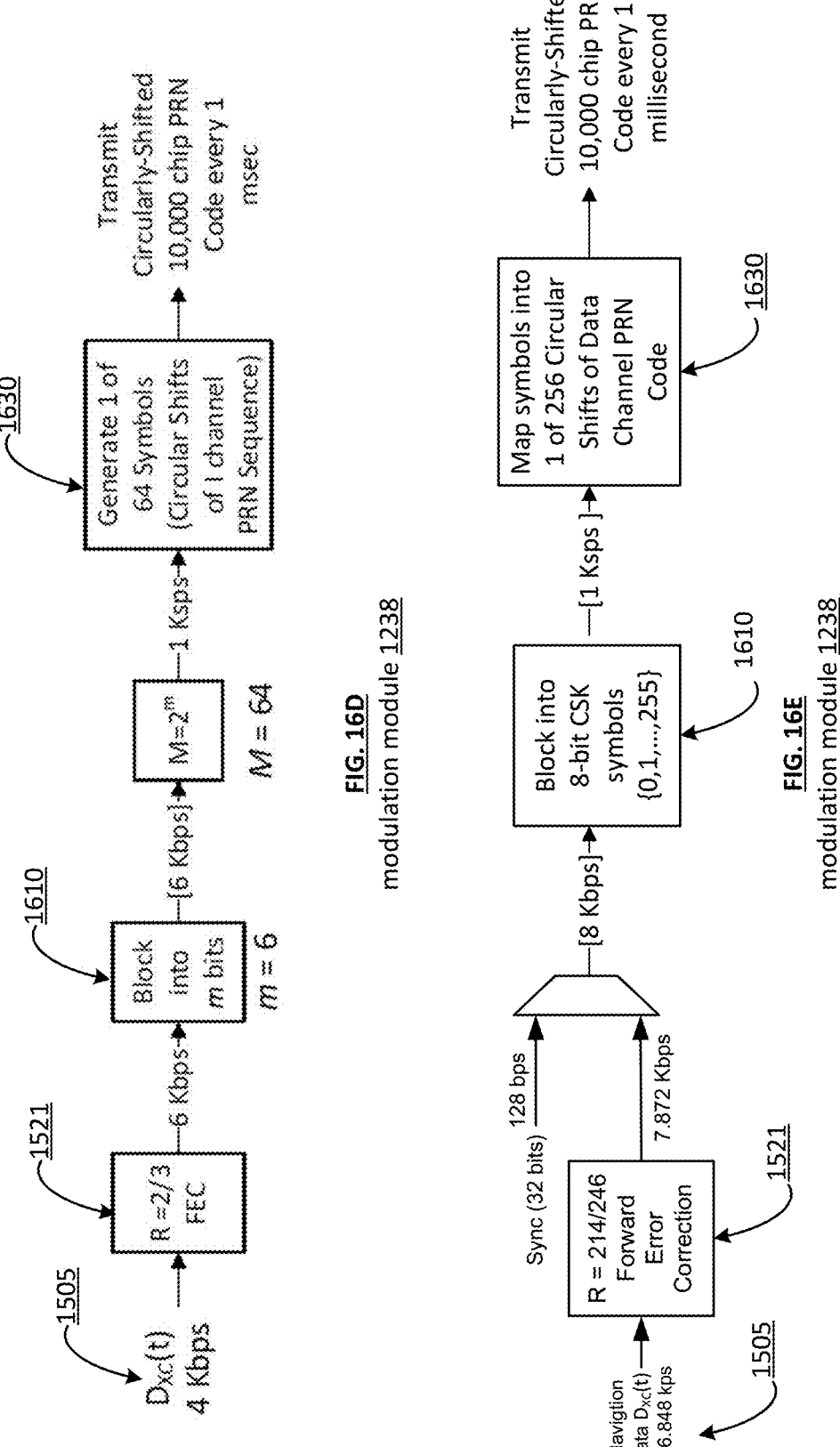
FIGS. 16D-16F illustrate embodiments of a modulation module in accordance with various embodiments.

FIG. 16D illustrates an example of the flow applied by modulation module 1238. Some or all features and/or functionality of the modulation module 1238 of FIG. 16D can be utilized to implement the modulation module 1238 of FIG. 16A and/or any other embodiment of the modulation module 1238 described herein. An example embodiment of modulation module 1238 that implements the flow of FIG. 16D is discussed in further detail in conjunction with FIG. 16G and FIG. 16H.

The navigation data stream 1505 can have a data rate of 4 Kilobits per second. For example, the navigation messages employ a 250-bit frame structure with a period of 125 milliseconds to support the 4 Kbps data rate.

An error-coded navigation data stream 1522 can optionally be generated from the navigation data stream 1505 by applying an error-coding scheme to navigation data stream 1505 via an error-coding module 1521. In some embodiments, the error-coding scheme utilizes a Forward Error Correction (FEC) scheme. In some embodiments, the error-coding scheme can utilize a high-rate channel code, for example, with a code rate R greater than 1/2, to achieve a favorable data rate, such as the 4 Kbps data rate. In some embodiments, a punctured binary convolutional code with a code rate R=2/3 can be utilized.

The bit grouping module 1610 can block the bits into 6 bit groups in this example, and one of 64 different corresponding cyclical shifts can be applied to spreading code 1237. This can render transmission of one circularly shifted spreading code 1547 every one millisecond, enabling a 4 Kbps data rate via conveyance of 1000 symbols per second to a receiving client device 160, rendering conveyance of 6000 coded bits per second, which can be decoded to render 4000 data bits per second. This example of circularly shifting the spreading code to render favorable data rates, for example, in conjunction with a high-rate channel code to encode the navigation data, can improve the technology of navigation systems based on transmission of navigation data at higher data rates to render richer amounts of navigation data transmitted for use in generating higher-accuracy position and/or timing data. These relationships are illustrated in FIG. 16H.

In some embodiments, the spreading code 1237 that is cyclically shifted is the I channel spreading code 1237.I utilized to generate the data stream 1511. Such an embodiment is illustrated in FIGS. 16G and 16I.

FIG. 16E illustrates another example of the flow applied by modulation module 1238. Some or all features and/or functionality of the modulation module 1238 of FIG. 16E can be utilized to implement the modulation module 1238 of FIG. 16A and/or any other embodiment of the modulation module 1238 described herein. Some or all features and/or functionality of the modulation module 1238 of FIG. 16E can be utilized to implement any modulation module 1238 described herein instead of or in addition to features and/or functionality of FIG. 16D. An example embodiment of modulation module 1238 that implements the flow of FIG. 16E is discussed in further detail in conjunction with FIG. 16I and FIG. 16J.

The navigation data stream 1505 can have a data rate of 6.848 Kilobits per second. An error-coded navigation data stream 1522 can optionally be generated from the navigation data stream 1505 by applying an error-coding scheme to navigation data stream 1505 via an error-coding module 1521. In some embodiments, the error-coding scheme utilizes a Forward Error Correction (FEC) scheme. In some embodiments, the error-coding scheme can utilize a Reed-Solomon Code, such as an RS(246,214) code, for example, in a same or similar fashion as discussed in conjunction with FIG. 15L. A 32 bit sync at 128 bits per second can be applied to render an error-coded navigation message stream 1522 at 8 kilobits per second.

The bit grouping module 1610 can block the bits into 8 bit groups in this example, and one of 256 different corresponding cyclical shifts can be applied to spreading code 1237. In this example, a data rate of 6.848 kbps can be enabled via of transmission of one circularly shifted spreading code 1547 every one millisecond for corresponding encoded data encoded via a Reed Solomon scheme, conveying 1000 symbols per second to a receiving client device 160, rendering conveyance of 8000 coded bits per second, which can be decoded in accordance with the Reed Solomon scheme to render 6.848 data bits per second. Thus, applying a Reed-Solomon coding scheme instead of other coding schemes such as the punctured binary convolutional code of FIG. 15D can render an even more favorable data rate than the example of FIG. 16D, which can further improve the technology of navigation systems based on transmission of navigation data at higher data rates to render richer amounts of navigation data transmitted for use in generating higher-accuracy position and/or timing data. These relationships are illustrated in FIG. 16J.

In some embodiments, the spreading code 1237 that is cyclically shifted in FIG. 15E is the I channel spreading code 1237.I utilized to generate the data stream 1511. Such an embodiment is illustrated in FIGS. 16G and 16I.

Figure 16F:
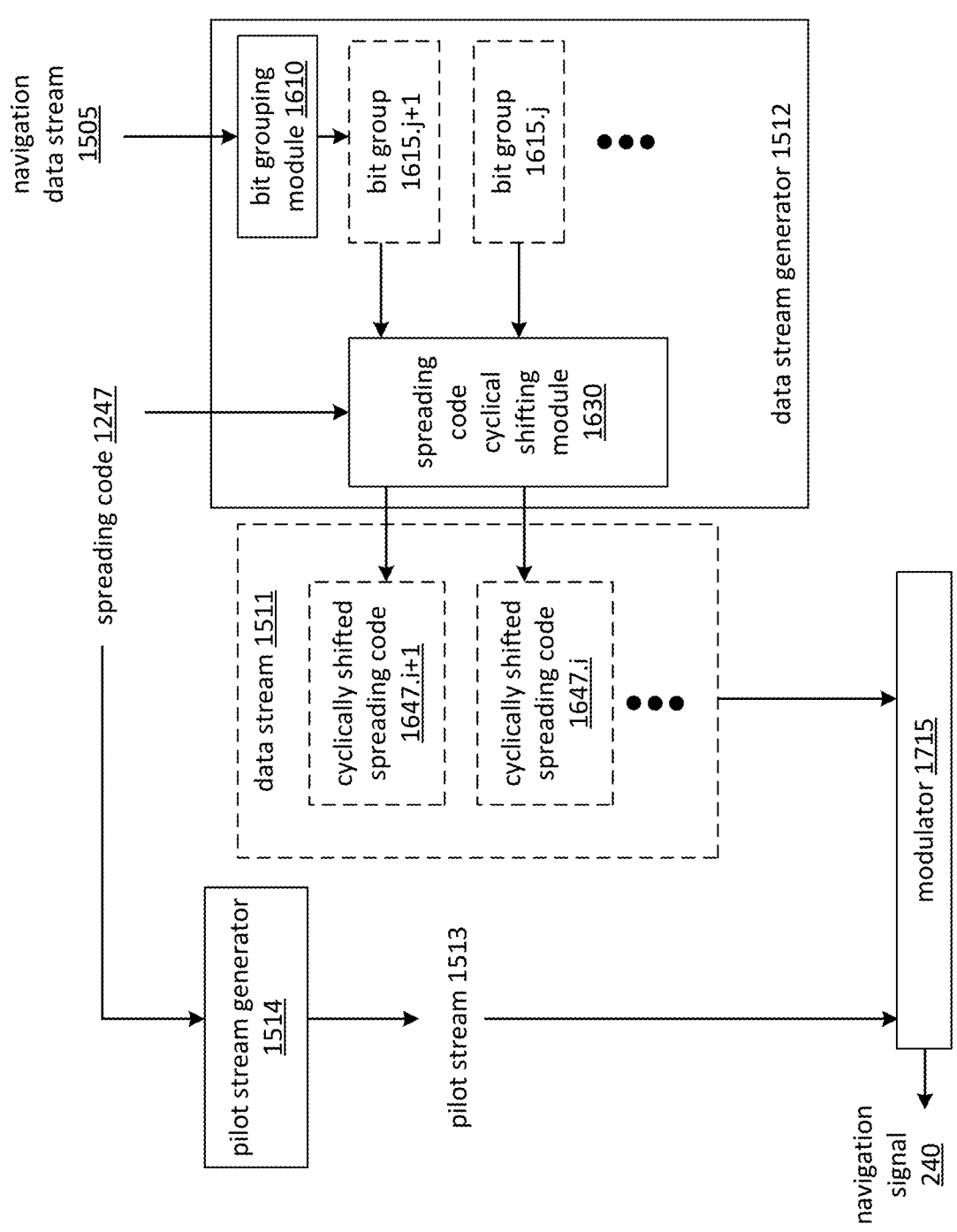
Figure 16G:
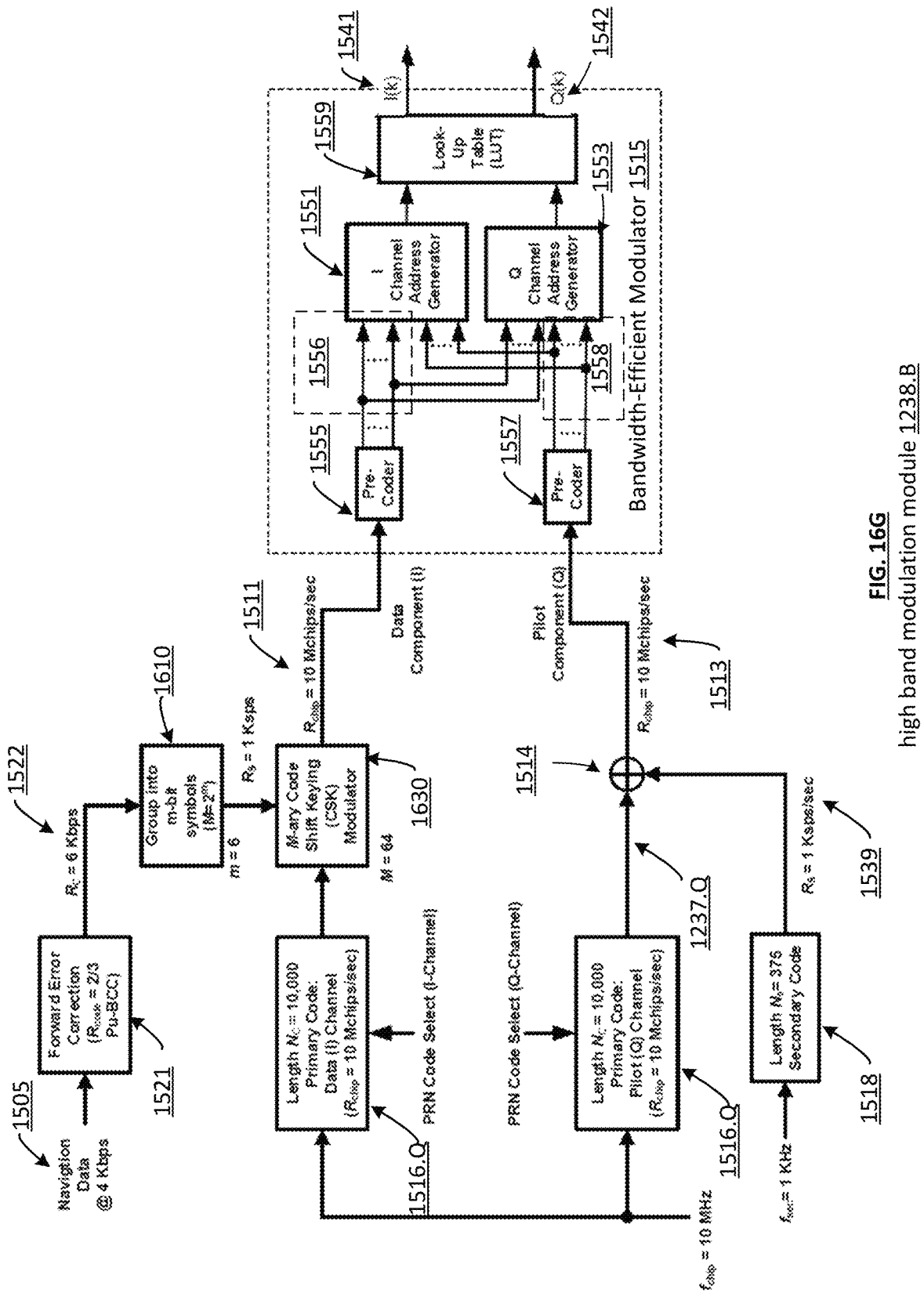
FIG. 16G illustrates an example embodiment of a high band modulation module in accordance with various embodiments.
Figure 16H:
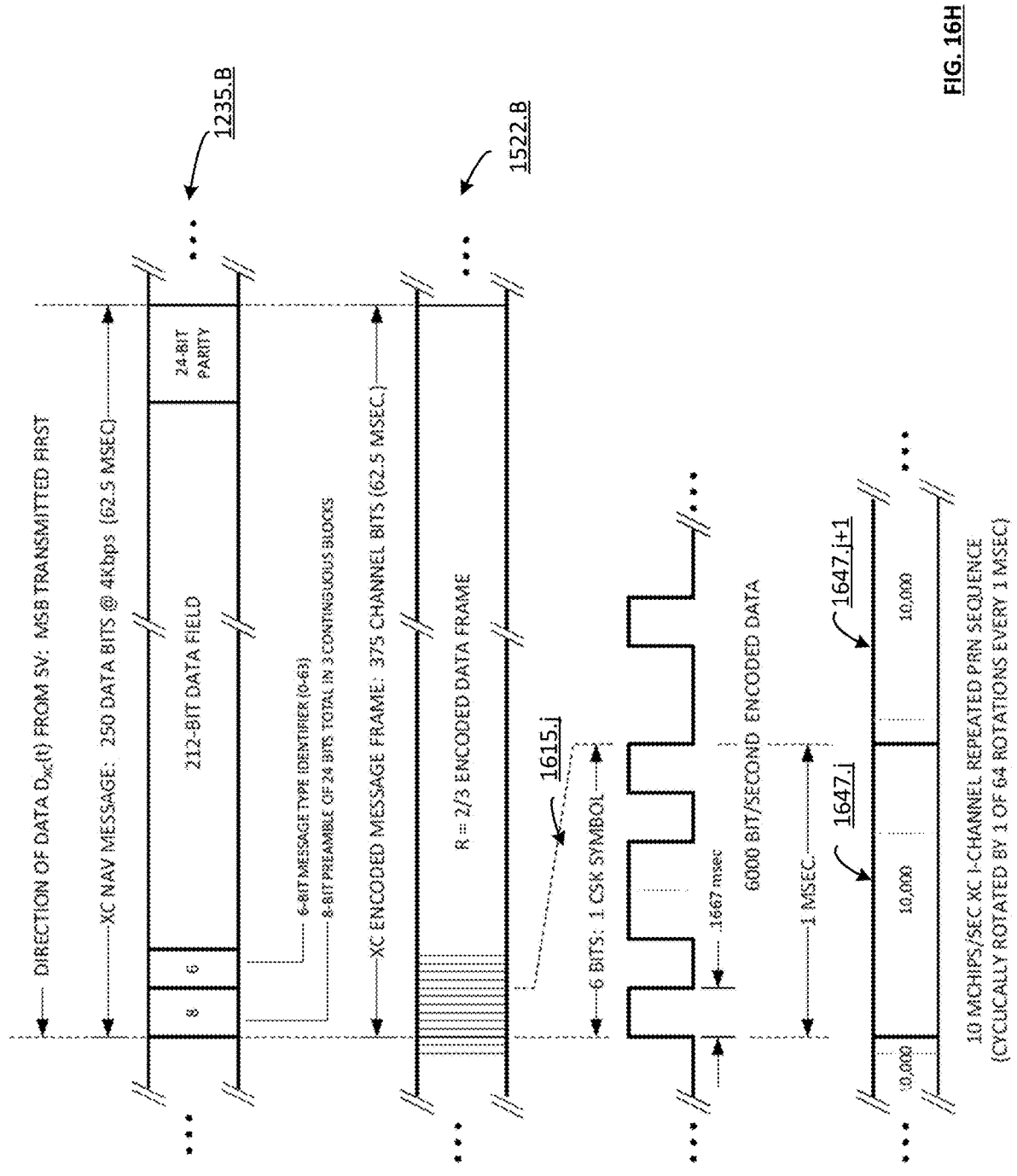
FIG. 16H illustrates an example embodiment of navigation message structure in accordance with various embodiments.
Figure 16I:
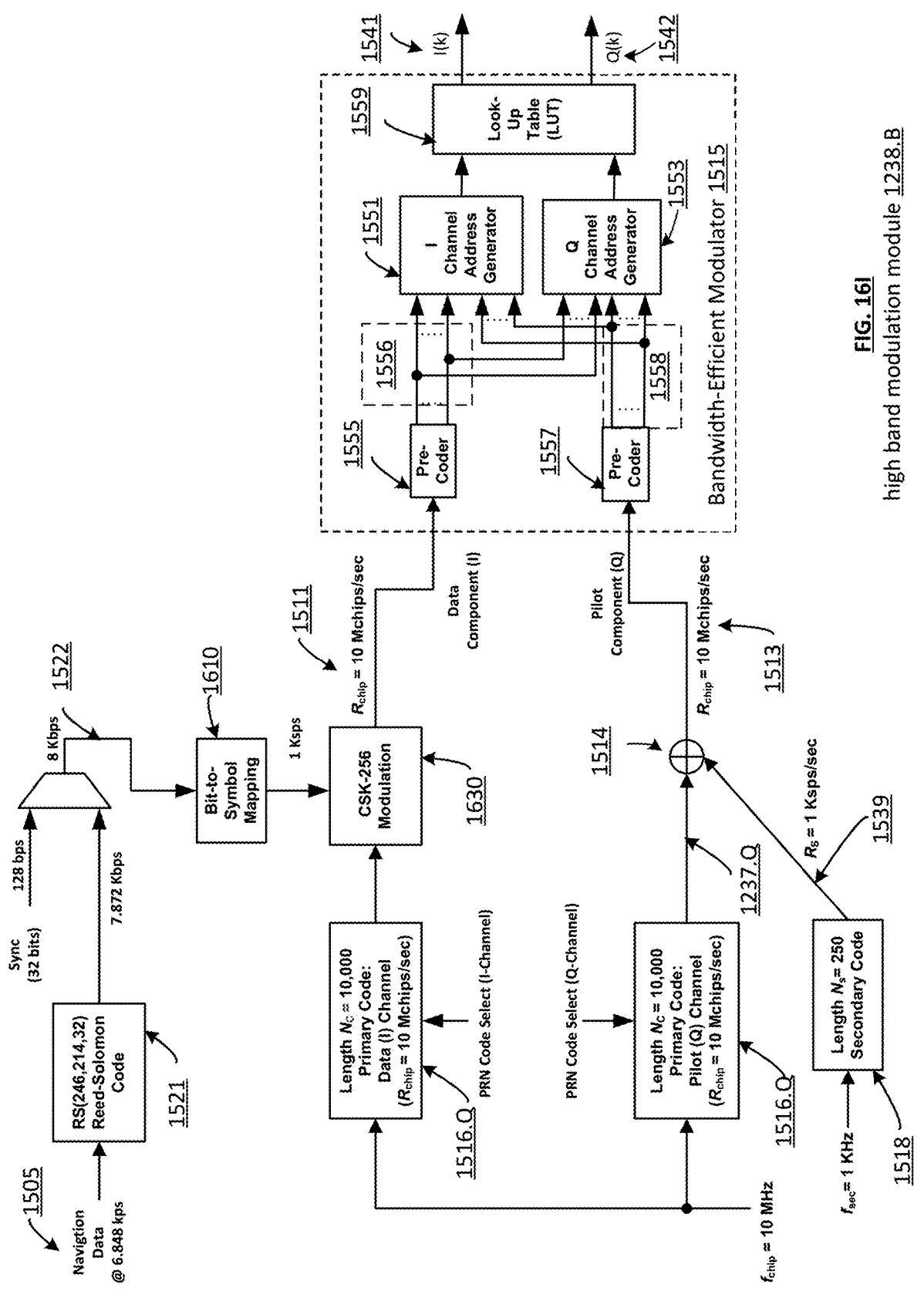
FIG. 16I illustrates an example embodiment of a high band modulation module in accordance with various embodiments.
Figure 16J:
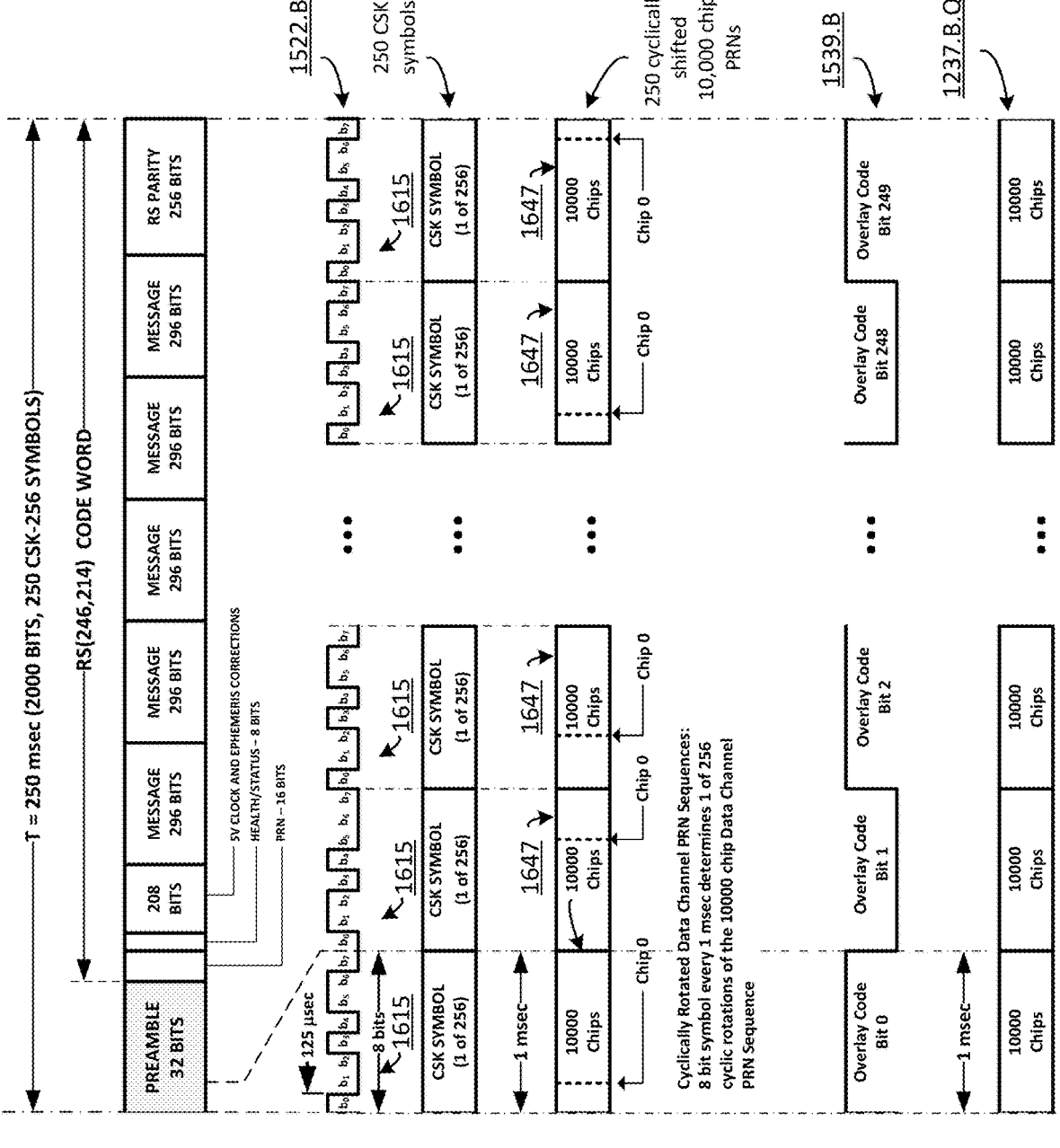
FIG. 16J illustrates an example embodiment of code word structure in accordance with various embodiments.
Figure 16K:
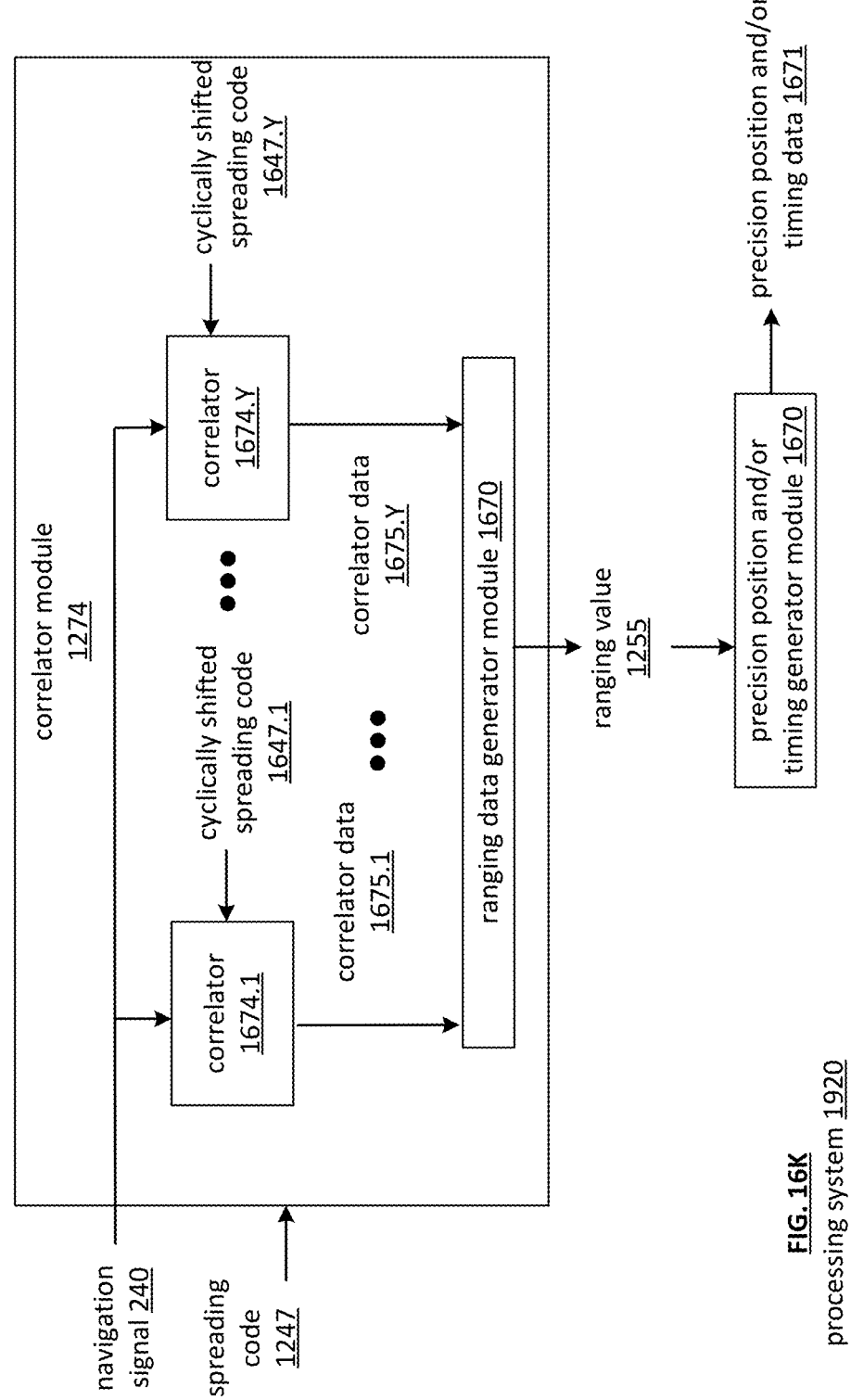
FIG. 16K-16L are schematic block diagrams of a processing system of a client device in accordance with various embodiments.

FIG. 16F illustrates an embodiment of a modulation module 1238 that applies a further modulator 1715 to the cyclically shifted spreading code 1647 to modulate the cyclically shifted spreading code 1647 with a pilot stream 1513. For example, the bit grouping module 1610 and spreading code cyclical shifting module 1630 of FIGS. 16A-16D are implemented by a data stream generator 1512, such as the data stream generator of FIG. 15D. For example, the modulator 1715 can be implemented as a bandwidth-efficient modulator 1515. Some or all features and/or functionality of the modulation module 1238 of FIG. 16F can implement the modulation module 1238 of FIG. 16A, of FIG. 15D, and/or any other embodiment of modulation module 1238 discussed herein.

FIG. 16G illustrates an embodiment of a high band modulation module 1238.B that applies functionality of FIGS. 16A-16F to generate a high band navigation signal. Some or all features and/or functionality of the modulation module 1238 of FIG. 16G can implement the modulation module 1238 of FIG. 16A, and/or any other embodiment of modulation module 1238 described herein. Some or all features and/or functionality of the modulation module 1238 of FIG. 16G can implement the low band modulation module 1238.A and/or the high band modulation module 1238.B of FIG. 15H, and/or any other embodiment of modulation module 1238 described herein.

In some embodiments, the navigation processing system 300 generates the low band navigation signal 240.A in accordance with some or all features of the low band modulation module 1238.A of FIG. 15J and/or FIG. 15L, and further generates the high band navigation signal 240.B in accordance with some or all features of the low band modulation module 1238.A of FIG. 16G. Alternatively, the navigation processing system 300 can optionally generate the low band navigation signal 240.A in accordance with some or all features of the high band modulation module 1238.B of FIG. 16G, and/or generates the high band navigation signal 240.B in accordance with some or all features of the low band modulation module 1238.A of FIG. 15J and/or FIG. 15L.

The modulation module 1238 of FIG. 16G can operate in a similar fashion as the low band modulation module 1238 of FIG. 15J. However, instead of performing modulo-2 addition upon the error-coded navigation stream 1522 and the spreading code 1237.I to render data stream 1511, the data stream 1511 is instead generated as discussed in conjunction with FIG. 16C and/or 16D, where the error-coded navigation stream 1522 is grouped into m-bit bit groupings 1615 that are utilized to shift the spreading code 1237.I via a corresponding one of $2^m$ possible cyclical shifts.

In some embodiments, an error-coding scheme applied by high band modulation module 1238.B to generate its error-coded navigation stream 1522 can be different from the error-coding scheme applied by low band modulation module 1238.A to generate its error-coded navigation stream 1522. For example, the error-coding scheme applied by high band modulation module 1238.B can be configured differently from the error-coding scheme applied by low band modulation module 1238.B based on the value of m, and/or based on utilizing the error-coded navigation stream 1522 to cyclically shift the spreading code rather than for performing modulo-2 addition with the spreading code. In some embodiments, the error-coding scheme applied by high band modulation module 1238.B is a high-rate channel code with a code rate R greater than 1/2, such as a punctured binary convolutional code with a channel code rate of R=2/3 as discussed previously, and/or the error-coding scheme applied by low band modulation module 1238.A is instead a binary convolutional code with code rate R=1/2. For example, the high band modulation module 1238.B of FIG. 16I is implemented based on implementing the flow of FIG. 16D.

Other types of error coding schemes can be applied instead of a binary convolutional code or a punctured binary convolutional code, such as Reed-Solomon code as discussed in conjunction with FIG. 16I, another type of Forward Error Correction code, and/or any other type of error coding scheme.

FIG. 16H illustrates the alignment of the various data of FIG. 16G. In other embodiments, similar frame alignments can be employed via different respective rates. The various bit, data, channel, and chip rates depicted in FIG. 16G and/or FIG. 16H can otherwise be same and/or different for other embodiments of navigation processing system 300.

FIG. 16I illustrates another embodiment of a high band modulation module 1238.B that applies functionality of FIGS. 16A-16F to generate a high band navigation signal. Some or all features and/or functionality of the modulation module 1238 of FIG. 16I can implement the modulation module 1238 of FIG. 16A, and/or any other embodiment of modulation module 1238 described herein, for example, instead of or in addition to features and/or functionality of FIG. 16G. Some or all features and/or functionality of the modulation module 1238 of FIG. 16I can implement the low band modulation module 1238.A and/or the high band modulation module 1238.B of FIG. 15H, and/or any other embodiment of modulation module 1238 described herein.

In some embodiments, the navigation processing system 300 generates the low band navigation signal 240.A in accordance with some or all features of the low band modulation module 1238.A of FIG. 15J and/or FIG. 15L, and further generates the high band navigation signal 240.B in accordance with some or all features of the low band modulation module 1238.A of FIG. 16G. Alternatively, the navigation processing system 300 can optionally generate the low band navigation signal 240.A in accordance with some or all features of the high band modulation module 1238.B of FIG. 16G, and/or generates the high band navigation signal 240.B in accordance with some or all features of the low band modulation module 1238.A of FIG. 15J and/or FIG. 15L.

The modulation module 1238 of FIG. 16I can operate in a similar fashion as the low band modulation module 1238 of FIG. 15L. However, instead of performing modulo-2 addition upon the error-coded navigation stream 1522 and the spreading code 1237.I to render data stream 1511, the data stream 1511 is instead generated as discussed in conjunction with FIG. 16C and/or 16E, where the error-coded navigation stream 1522 is grouped into m-bit bit groupings 1615 that are utilized to shift the spreading code 1237.I via a corresponding one of $2^m$ possible cyclical shifts.

The high band modulation module 1238.B of FIG. 16I can be implemented in a similar fashion as the high band modulation module 1238.B of FIG. 16G, where a different error coding scheme is applied. For example, similarly to the embodiment of low band modulation module 1238.A of FIGS. 15L and 15M, a reed Reed-Solomon coding scheme, or other linear block coding scheme, can implemented as error-coding scheme by error-coding module 1521 to generate error-coded navigation data stream 1522 from navigation message stream 1505. This can include performing a Reed-Solomon (RS) scheme as an RS(246,214) scheme. For example, the high band modulation module 1238.B of FIG. 16I is implemented based on implementing the flow of FIG. 16E.

In some embodiments, both the low band modulation module 1238.A and the high band modulation module 1238.B of a navigation signal generation and transmission module 1230 can implement the same type of error-coding scheme to generate the error-coded navigation data stream 1522 in generating their respective navigation signals 240.A and 240.B, respectively. As a particular example, bot the low band modulation module 1238.A and the high band modulation module 1238.B of a navigation signal generation and transmission module 1230 implement a Reed-Solomon coding scheme with same or different parameters n and k, such as both utilizing n=246 and k=214 in implementing a RS(246,214) scheme, for example, in performing some or all of the functionality of FIGS. 15L and 16I, respectively. Alternatively, the low band modulation module 1238.A and the high band modulation module 1238.B can optionally implement different types of error-coding schemes from each other.

The output rate of the Reed-Solomon coding scheme can thus be at a rate of (n/k) times the data rate of the navigation data to account for parity, where in this case, the rate of bits included in codewords outputted by the Reed-Solomon coding scheme is optionally 7.872 kilobits per second based on enabling an input navigation data rate of 6.848 kilobits per second, based on n being 246, and based on k being 214. The navigation data rate can further be enabled based on the signal frequency, chipping rates, encoding scheme, and/or modulation applied in constructing the navigation signal.

Another navigation data rate can be rendered based on applying a different coding scheme. In some embodiments, such as the example of FIG. 15L, the data rate of navigation data, and/or the values of n and k of the Reed-Solomon code, are configured such that the number of bits per second is evenly divisible by the value of k. A 32 bit sync can be applied to the raw Reed-Solomon output at 128 bits per second to render an outputted error-coded navigation data stream 1522 at 8 kilobits per second bits per second, where 8 bit symbols of this 8 kilobits per second error-coded navigation data stream 1522 are utilized to cyclically shift the spreading code 1237, for example, via CSK-256 modulation based on corresponding symbols mapped to each set of 8-bits as discussed previously.

The relationships of rates of the error-coded data stream 1521, spreading codes 1237.I and 1237.Q, and overlay code 1539 of the example embodiment of FIG. 16I are illustrated in FIG. 16J. In other embodiments, similar frame alignments can be employed via different respective rates. The various bit, data, channel, and chip rates depicted in FIG. 16I and/or FIG. 16J can otherwise be same and/or different for other embodiments of navigation processing system 300.

Some or all of the features of FIG. 16I and/or FIG. 16J can be implemented instead of or in addition to features of FIG. 16G and/or FIG. 16H in aligning and/or modulating various streams with corresponding data, code, and chip rates to render navigation signals via modulation module 1238. In some embodiments, some or all features of the data rates and/or error-coding scheme of FIG. 16I and/or FIG. 16J can be implemented instead of features of the data rates and/or error-coding scheme of FIG. 16G and/or FIG. 16H to achieve more favorable data rates.

FIG. 16J is further illustrated to depict how chip zero, denoting the first chip in the unshifted version of the spreading code, such as PRN 1 of the example of FIG. 15C, is placed in different portions of different respective 10,000 chip cyclically shifted PRNs, due to different respective cyclical shifts being applied due to different respective CSK symbols of the possible set of 256 symbols being rendered from 8 bit groups of the error-coded navigation message stream 1522.

Figure 16L:
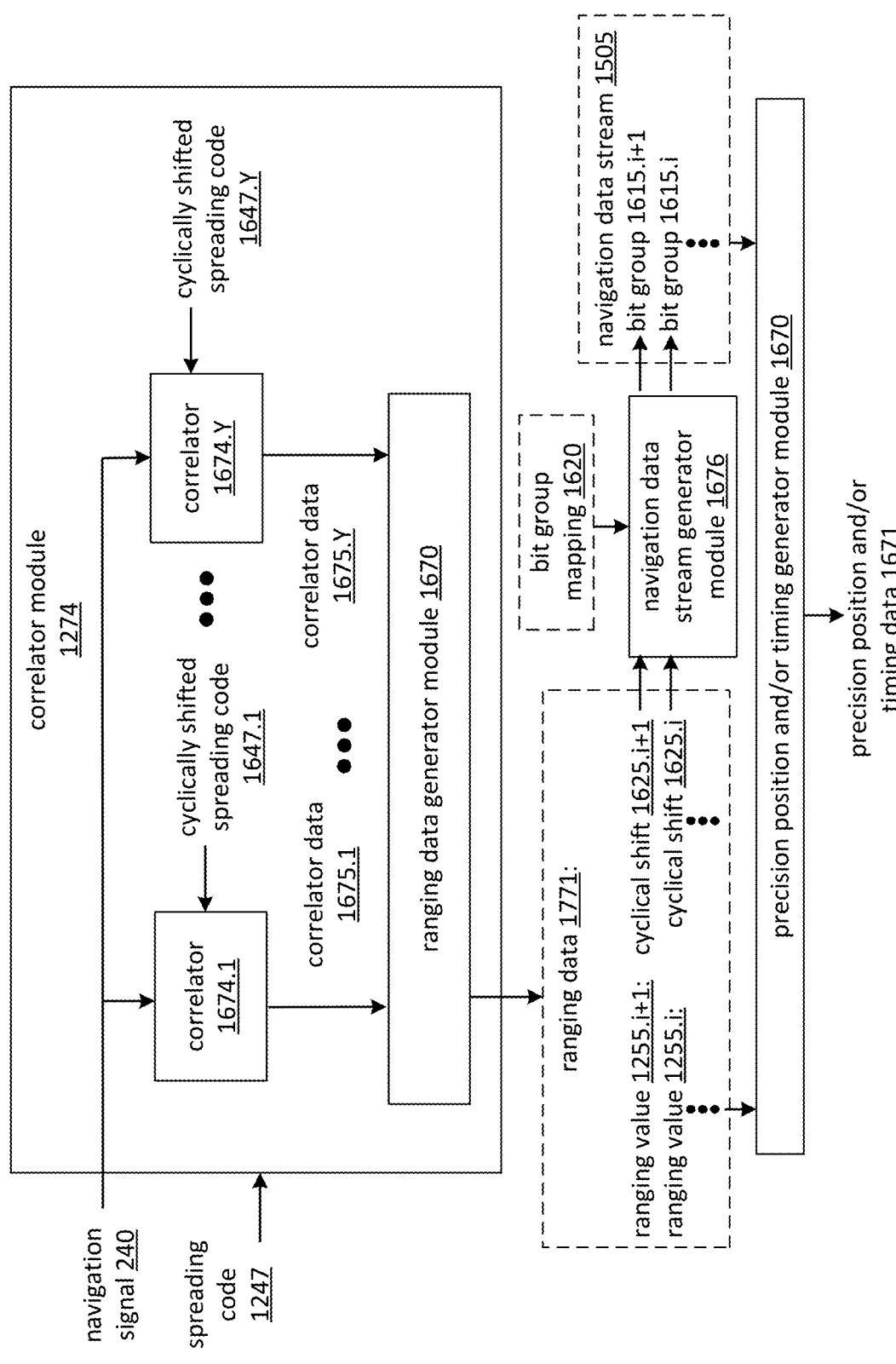

FIGS. 16K and 16L illustrate embodiments of processing system 1920 of client device 160. Some or all features and/or functionality of the processing system 1920 of client device 160 of FIG. 16H and/or FIG. 16L can be utilized to implement the client device 160 of FIG. 15P and/or any other embodiment of client device 160 described herein.

As illustrated in FIG. 16K, correlator module 1274 can optionally implement a plurality of correlators 1674.1-1674.Y for correlation with incoming navigation signals 240. Each correlator can apply a different one of the predetermined cyclical shifts of the spreading code 1647. Correlator data 1675, such as correlation peaks or other correlation measurements, can be processed by a ranging data generator module 1670 to generate ranging values 1255. The ranging values 1255 can be processed to generate precision position and/or timing data 1671 as discussed previously.

For example, for each repeated transmission of a given cyclically shifted spreading code 1647, the given cyclically shifted spreading code 1647 is identified from other possible cyclical shifts of the spreading code based on the correlator data 1675 of a corresponding one of the plurality of correlators 1674 indicating the most favorable correlation with the navigation data 420 at that particular time. The ranging value 1255 can be generated based on the correlator data for the identified cyclically shifted spreading code 1647.

In some embodiments, $2^m$ different correlators 1674 are applied in parallel to each correlate with one of the $2^m$ different cyclically shifted spreading code 1647, for example, via parallelized processing resources of the client device 160. Alternatively, one or more correlators 1674 can determine correlation with multiple ones of the pre-determined cyclical shifts of the spreading code, for example, based on applying Fast Fourier Transforms to determine phase shifts to identify which one of these multiple ones of the pre-determined cyclical shifts of the spreading code was transmitted.

As illustrated in FIG. 16L, the client device can further decode the navigation data stream 1505 as discussed previously. As each given cyclical shift is identified in correlating with the navigation signal when generating ranging data 1771 indicating various ranging values 1255 over time, these cyclical shifts can be processed by a navigation data stream generator module 1676 to recover the original bit groups 1615, which when concatenated, can render the original navigation data stream 1505. In cases where the navigation data stream 1505 was encoded via an error-coding scheme, the stream of bit groups 1615 can be further decoded in accordance with the error-coding scheme to render the navigation data stream 1505. The navigation data stream 1505 can be processed in conjunction with the ranging values 1255 to generate precision position and/or timing data 1671 as discussed previously.

In various embodiments, a satellite includes at least one processor configured to execute operational instructions that cause the at least one processor to perform operations that include: generating a navigation data stream; dividing the navigation data stream into a plurality of fixed-length groups of bits; for each one of the plurality of fixed-length groups of bits, selecting a selected one of a plurality of cyclical shifts of a spreading code based on the each one of the plurality of fixed-length groups of bits; and/or generating a navigation signal based on utilizing, for each one of the plurality of fixed-length groups of bits, the selected one of the plurality of cyclical shifts of the spreading code for the each one of the plurality of fixed-length groups of bits. The satellite can further include a navigation signal transmitter configured to broadcast the navigation signal for receipt by at least one client device. The navigation signal can facilitate the at least one client device to determine state data of the at least one client device, such as timing data and/or position data of the at least one client device.

In various embodiments, a navigation processing system includes at least one processor configured to execute operational instructions that cause the at least one processor to perform operations that include: generating a navigation data stream; dividing the navigation data stream into a plurality of fixed-length groups of bits; for each one of the plurality of fixed-length groups of bits, selecting a selected one of a plurality of cyclical shifts of a spreading code based on the each one of the plurality of fixed-length groups of bits; and/or generating a navigation signal based on utilizing, for each one of the plurality of fixed-length groups of bits, the selected one of the plurality of cyclical shifts of the spreading code for the each one of the plurality of fixed-length groups of bits. The navigation processing system can further include a navigation signal transmitter configured to broadcast the navigation signal for receipt by at least one client device. The navigation signal can facilitate the at least one client device to determine state data of the at least one client device, such as timing data and/or position data of the at least one client device.

In various embodiments, a client device includes at least one receiver configured to receive a navigation signal transmitted by a satellite, and/or at least one processor configured to execute operational instructions that cause the at least one processor to perform operation. The operations can include correlating the navigation signal with a spreading code to generate ranging data; determining each of a plurality of cyclical shifts applied to the spreading code based on correlating the navigation signal with the spreading code;

determining each of a plurality of fixed-length groups of bits based on each corresponding one of the plurality of cyclical shifts applied to the spreading code; generating navigation data based on the plurality of fixed-length groups of bits; and/or determining state data for the client device based on the ranging data and the navigation data.

Figure 16M:
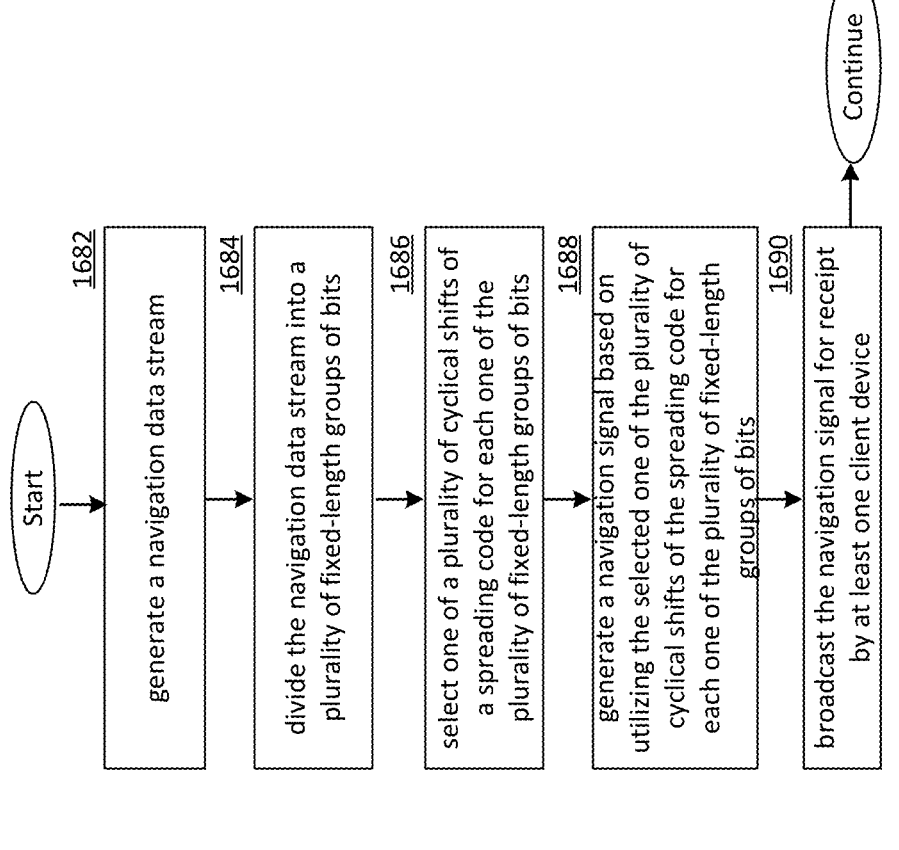
FIG. 16M is a logic diagram of an example of a method of generating a navigation signal in accordance with various embodiments.

FIG. 16M illustrates a method for execution. Some or all steps of FIG. 16M can be executed by at least one processor of a satellite, such as a satellite 110. Some or all steps of FIG. 16M can be performed via a navigation processing system 300 implemented by a satellite, a client device, a ground station, a backhaul satellite, stationary infrastructure, and/or any node of the satellite constellation system 100. Multiple different satellites 110 of the satellite constellation system 100 and/or any multiple different nodes of the satellite constellation system 100 can each implement their own navigation processing system 300 to perform some or all steps of FIG. 16M independently and/or simultaneously, with or without coordination. Some or all steps of FIG. 16M can be performed via a navigation processing system 300 implemented by a navigation system component and/or a computing device not associated with and/or not communicating with the satellite constellation system 100 and/or communicating with another satellite constellation system. Some or all steps of FIG. 16M can be performed in conjunction with implementing some or all features and/or functionality of the navigation processing system 300 and/or a satellite 110 as discussed in conjunction with some or all of FIGS. 16A-16H. Some or all steps of FIG. 16M can be performed in conjunction with performing some or all steps of FIG. 15Q.

FIG. 1682 includes generating a navigation data stream. For example, the navigation data stream is generated based on state data, such as timing data and/or orbital position data of a corresponding satellite 110 and/or other node of the satellite constellation system 100. The method can further include generating this state data, for example, based on implementing some or all functionality of the state estimator of FIG. 5A. The navigation data stream can include at least one navigation message 1235. The navigation data stream can be implemented as navigation data stream 1505 that includes an ordered stream of navigation messages 1235, and/or can be generated based on error-coding and/or processing navigation data stream 1505. For example, the navigation data stream is generated based on implementing some or all functionality of the state estimator flow of FIG. 5A and/or based on implementing some or all functionality of the navigation message generation flow of FIG. 5B.

Step 1684 includes dividing the navigation data stream into a plurality of fixed-length groups of bits. The plurality of fixed-length groups of bits can be implemented as an ordered plurality of bit groups 1615, for example, that each include m bits. For example, performing step 1684 can be based on implementing the bit grouping module 1610.

Step 1686 includes selecting one of a plurality of cyclical shifts of a spreading code for each one of the plurality of fixed-length groups of bits. Each selected one of the plurality of cyclical shifts can be implemented as one of the cyclical shifts 1625 of the bit group mapping 1620 that include the corresponding cyclically shifted spreading code 1647. For example, performing step 1686 can be based on implementing spreading code cyclical shifting module 1630.

Step 1688 includes generating a navigation signal based on utilizing, for each one of the plurality of fixed-length groups of bits, the selected one of the plurality of cyclical shifts of the spreading code for the each one of the plurality of fixed-length groups of bits. The navigation signal can be implemented as navigation signal 240.

Step 1690 includes broadcasting the navigation signal for receipt by at least one client device. The at least one client device can generate state data, such a precision timing and/or position data of the at least one client device, based on the navigation signal. Performing some or all of steps 1684-1690 can be based on implementing the broadcast flow of FIG. 5C. Performing step 1690 can be based on implementing at least one transmitter, such as navigation signal transmitter 330.

In various embodiments, a number of cyclical shift options of the plurality of cyclical shifts is based on a number of bits in each of the plurality of fixed-length groups of bits. In various embodiments, the number of cyclical shift options is equal to two to the power of the number of bits. In various embodiments, each of the plurality of fixed-length groups of bits includes exactly six bits. In various embodiments, the number of cyclical shift options is equal to sixty-four.

In various embodiments, an orthogonality of the plurality of cyclical shifts of the spreading code compares favorably to an orthogonality threshold. In various embodiments the orthogonality compares favorably to an orthogonality threshold based on a number of cyclical shift options of the plurality of cyclical shifts relative to a number of bits in the spreading code and/or or a pseudorandom sequence of bits of the spreading code.

In various embodiments, the method of FIG. 16M is implemented via a first satellite of a satellite constellation system utilizing a first spreading code. Some or all other satellites of the satellite constellation system can also implement the method of FIG. 16M utilizing their own respective spreading codes that are each different from the first spreading code and that are further different from each other. An orthogonality of the plurality of cyclical shifts of the first spreading code and of the plurality of cyclical shifts of the other spreading codes of the other satellites can compare favorably to an orthogonality threshold, for example, based on the number of cyclical shift options of the plurality of cyclical shifts relative to a number of bits in the each spreading code, and/or or a pseudorandom sequence of bits of the first spreading code relative to the pseudorandom sequence of bits of the other spreading codes of the other satellites.

In various embodiments, a first number of bits included in each of the plurality of fixed-length groups of bits is less than a second number of bits included in each of a plurality of navigation messages of the navigation data stream. For example, each navigation message includes over 128 bits, and/or the fixed-length groups of bits includes less than 10 bits.

In various embodiments, generating the navigation data stream includes performing an error correction scheme to at least one navigation message to generate an error-coded navigation stream, where this error-coded navigation stream is divided into the plurality of fixed-length groups of bits. In various embodiments, the error correction scheme is a Forward Error Correction (FEC) scheme.

In various embodiments, the at least one client device determines the state data of the at least one client device based on: correlating the navigation signal with the spreading code to generate ranging data, determining each selected one of the plurality of cyclical shifts based on correlating the navigation signal with the spreading code, determining the plurality of fixed-length groups of bits based on determining each selected one of the plurality of cyclical shifts, determining the navigation data stream based on the plurality of fixed-length groups of bits; and/or determining the state data based on the ranging data and at least one navigation message of the navigation data stream. In various embodiments, the at least one client device correlates the navigation signal via a plurality of correlators based on the plurality of cyclical shifts of the spreading code. For example, the plurality of correlators are implemented by the at least one client device in parallel via a plurality of parallelized processing resources of the at least one client device.

In various embodiments, generating the navigation signal is further based on utilizing a pilot stream generated based on utilizing unshifted spreading code corresponding to an unshifted one of the plurality of cyclical shifts of the spreading code. In various embodiments, generating the navigation signal includes correlating a selected one of the plurality of cyclical shifts of the spreading code with the spreading code included in the pilot stream in accordance with a bandwidth-efficient modulation scheme.

In various embodiments, the navigation signal is a high band navigation signal. The method can further include generating a low band navigation signal based on the navigation data stream and unshifted spreading code corresponding to an unshifted one of the plurality of cyclical shifts of the spreading code. In various embodiments, generating the low band navigation signal includes generating an error-coded navigation data stream from the navigation data stream and/or performing an exclusive-OR operation upon the error-coded navigation data stream and the unshifted spreading code.

In various embodiments, the satellite is one of a plurality of satellites of a Low Earth Orbit (LEO) satellite constellation. In various embodiments, the satellite includes at least one receiver configured to receive a Global Navigation Satellite System (GNSS) signal from at least one of a set of satellites of a GNSS constellation. Generating the navigation data stream can be based on generating orbital state data for the satellite based on the GNSS signal. The satellite can be included in a set of satellites of a satellite constellation system that is distinct from the GNSS constellation.

In various embodiments, a first given one of the plurality of cyclical shifts is selected for a first group of bits of the plurality of fixed-length groups of bits, and a second given one of the plurality of cyclical shifts is selected for a second group of bits of the plurality of fixed-length groups of bits. The second given one of the plurality of cyclical shifts can be different from the first given one of the plurality of cyclical shifts, for example, based on the second given one of the plurality of cyclical shifts corresponding to a different shift induced upon the spreading code than that induced to render the first given one of the plurality of cyclical shifts. The second given one of the plurality of cyclical shifts can be different from the first given one of the plurality of cyclical shifts based on the second group of bits being different from the first group of bits.

In various embodiments, a third given one of the plurality of cyclical shifts is selected for a third group of bits of the plurality of fixed-length groups of bits. The third given one of the plurality of cyclical shifts can be identical to the first given one of the plurality of cyclical shifts, for example, based on the third given one of the plurality of cyclical shifts corresponding to a same shift induced upon the spreading code than that induced to render the first given one of the plurality of cyclical shifts. The third given one of the plurality of cyclical shifts can be identical to the first given one of the plurality of cyclical shifts based on the third group of bits being identical to the first group of bits.

Figure 16N:
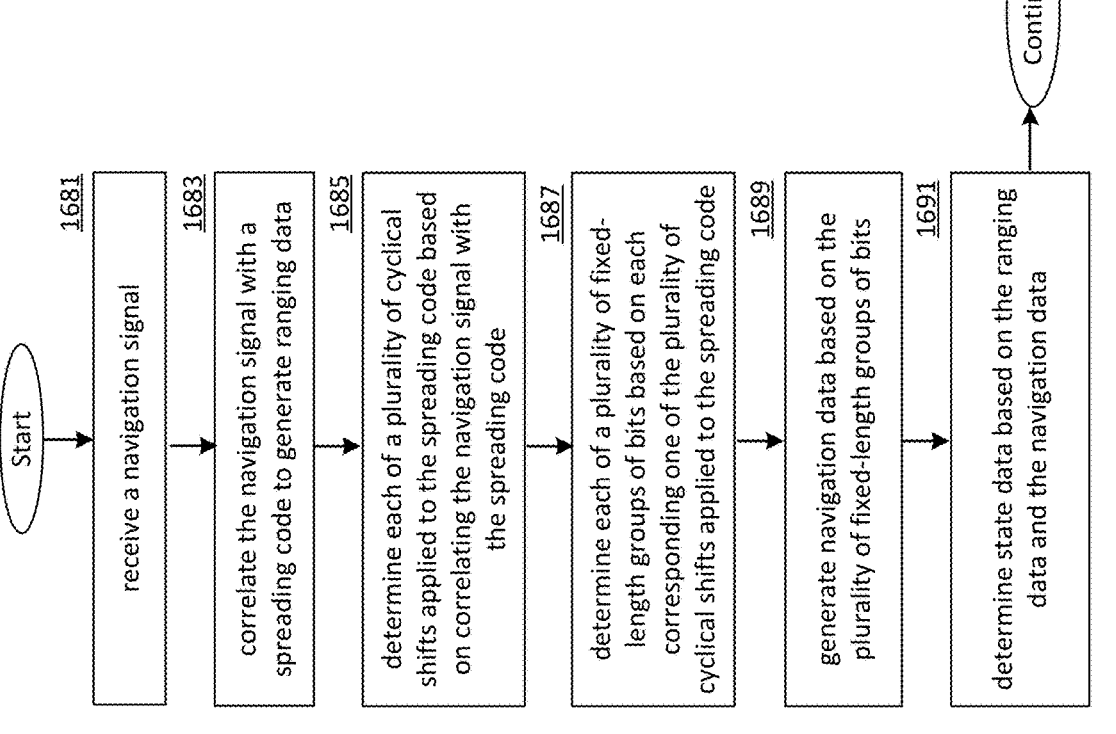
FIG. 16N is a logic diagram of an example of a method of determining state data from a received navigation signal in accordance with various embodiments.

FIG. 16N illustrates a method for execution. Some or all steps of FIG. 16N can be executed by at least one processor of a client device, such as a mobile device, infrastructure device, vehicle, a node of the satellite constellation 100, and/or any other client device 160 discussed herein. Some or all steps of FIG. 16N can be performed via a client device processing system 920 implemented by a client device 160. Multiple different client devices 160 can each implement their own client device processing system 920 to perform some or all steps of FIG. 16N independently and/or simultaneously, with or without coordination. Some or all steps of FIG. 16N can be performed in conjunction with implementing some or all features and/or functionality of the client device processing system 920 and/or a client device 160 as discussed in conjunction with FIGS. 16K and/or 16L.

Step 1681 includes receiving a navigation signal. Step 1683 includes correlating the navigation signal with a spreading code to generate ranging data. Step 1685 includes determining each of a plurality of cyclical shifts applied to the spreading code based on correlating the navigation signal with the spreading code. Step 1687 includes determining each of a plurality of fixed-length groups of bits based on each corresponding one of the plurality of cyclical shifts applied to the spreading code. Step 1689 includes generating navigation data based on the plurality of fixed-length groups of bits. Step 1691 includes determining state data, such as precision timing and/or position data, based on the ranging data and the navigation data.

In various embodiments, generating the ranging data includes utilizing a plurality of correlator modules based on the plurality of cyclical shifts of the spreading code. Determining each of the plurality of cyclical shifts applied to the spreading code can be based on a corresponding correlator module of the plurality of correlator modules rendering a favorable correlator peak when correlating the navigation signal with the spreading code. In various embodiments, the plurality of correlator modules, such as correlators 1674, correlate the navigation signal with a corresponding one of a set of cyclical shifts of the spreading code in parallel via a parallelized set of processing resources of the at least one processor. In various embodiments, a number of correlator modules in the plurality of correlator modules is equal to a number of cyclical shift options for the spreading code.

In various embodiments, generating the ranging data includes applying a Fast Fourier Transform (FFT) to generate phase data when correlating the navigation signal with the spreading code. At least one of the plurality of cyclical shifts is determined to have been applied to the spreading code based on the phase data. In various embodiments, a number of correlator modules applied to correlate the navigation signal is less than a number of cyclical shift options for the spreading code based on utilizing the phase data generated by applying the FFT.

FIGS. 17A-17H illustrate embodiments of a navigation processing system 300. The navigation processing system 300 of FIG. 17A-17H can be implemented onboard: a satellite 110, a client device 160, a ground station 200, a backhaul satellite 150, and/or any other node of the satellite constellation system 100 described herein. The navigation processing system 300 of FIGS. 17A-17H can alternatively or additionally be implemented by a navigation system component or another navigation system that is different from satellite constellation system 100 and/or can be implemented by any computing device, for example, not associated with and/or not communicating with satellite constellation system 100.

The navigation processing system 300 of FIGS. 17A-17H can be implemented utilizing some or all features and/or functionality of the navigation processing system of FIG. 3B. The navigation processing system 300 of FIGS. 17A-17H can be implemented to perform some or all steps of and/or some or all steps of FIG. 17L. Some or all features and/or functionality of the navigation processing system 300 of FIGS. 17A-17H can be utilized to implement any other embodiment of navigation processing system 300 described herein. Some or all features and/or functionality of the navigation processing system 300 of FIGS. 17A-17H can be utilized to implement functionality of one or more satellites 110 and/or other nodes of the satellite constellation system 100, and/or to implement functionality of a navigation system component and/or computing device of another navigation system.

Figure 17A:
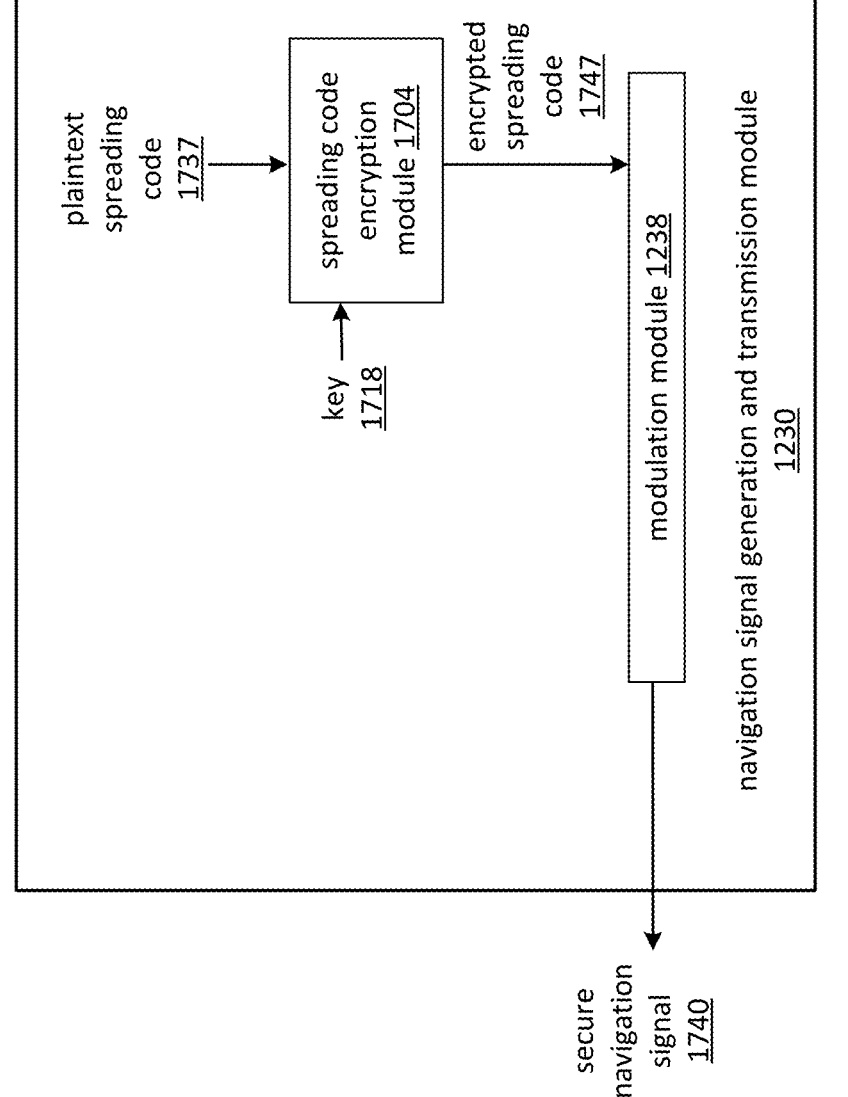
FIGS. 17A-17B are schematic block diagrams of a navigation processing system that generates secure navigation data in accordance with various embodiments.

FIG. 17A illustrates an embodiment of a navigation signal generation and transmission module 1230 of a navigation processing system 300. Some or all features and/or functionality of the navigation signal generation and transmission module 1230 of FIG. 17A can be utilized to implement the navigation signal generation and transmission module 1230 of FIG. 15A, of FIG. 16A, and/or any other embodiment of the navigation signal generation and transmission module 1230 described herein.

In some embodiments, the navigation signal 240 can be implemented as a secure navigation signal 1740, where a decryption key and/or use of a decryption scheme is required for client devices 160 to generate precise position and/or timing data 1671. This can be ideal in ensuring that only "registered" users of a navigation service, such as the navigation service facilitated for users of client devices 160 that receive and process navigation signals 240, are able to generate precise position and/or timing data 1671. Any embodiment of navigation signal 240 described herein can optionally be implemented as a secure navigation signal 1740.

As illustrated in FIG. 17A, the secure navigation signal 1740 can be secure based on including encrypted spreading code 1747 requiring decryption. For example, the encrypted spreading code 1747 is generated based on applying an encryption scheme to plaintext spreading code. For example, the plaintext spreading code is implemented as and/or based on a PRN of a corresponding satellite 110 and/or node of the satellite constellation system 100 and/or other spreading sequence utilized by client devices to generate ranging data.

The plaintext spreading code 1737 can optionally be implemented as and/or based on primary spreading code and/or secondary spreading code, where the encrypted spreading code is generated based on encrypting the primary spreading code and/or secondary spreading code. For example, the spreading code 1737 corresponds to primary spreading code and the overlay code 1539 corresponds to secondary spreading code. For example, the overlay code 1539 is implemented as secondary spreading code, and the plaintext spreading code 1737 includes overlay code 1539 alternatively or in addition to the spreading code 1237. Encrypted overlay code can otherwise be generated from overlay code 1539 in a same or similar fashion as generating encrypted spreading code 1747 from plaintext spreading code 1237. This encrypted overlay code can be separate from the encrypted spreading code, and can be modulated with the encrypted spreading code to generate the secure navigation signal 1740. Alternatively, the encrypted spreading code 1737 securely includes both overlay code 1539 and spreading code 1237.

A spreading code encryption module 1704 can determine and utilize a key 1718 to apply the encryption scheme to the plaintext spreading code 1737 to generate corresponding encrypted spreading code 1747. The spreading code encryption module 1704 can be implemented via processing and/or memory resources of the navigation processing system 300. Any embodiment of spreading code 1237 described herein can be implemented as plaintext spreading code 1737, such as open spreading code that is never encrypted, where client devices can generate ranging data without use of a key and/or without utilizing any encryption and/or decryption scheme. Any embodiment of spreading code 1237 described herein can alternatively be implemented as encrypted spreading code 1747, where client devices can only generate ranging data via use key and/or via utilizing an encryption and/or decryption scheme.

The key 1718 can be predetermined, can be accessed in memory of the navigation processing system 300, and/or can be securely received by the navigation processing system 300 via at least one receiver of the navigation processing system 300. The key 1718 utilized by different navigation processing systems 300 of different satellites and/or nodes can be the same and/or different. For example, the key 1718 utilized by different navigation processing systems 300 at a given time is the same, where users only need to apply one key 1718 at a given time. Alternatively, the key 1718 utilized by different navigation processing systems 300 at a given time is different, where users need to apply different keys for correlation with navigation signals transmitted by different navigation processing systems 300.

The key 1718 can change over time, for example, in pre-defined intervals. For example, key 1718 changes hourly and/or daily. The intervals at which the key 1718 changes can be configured as a function of the security of the encryption scheme, the length of the spreading code 1737, the number of different nodes in satellite constellation system 100 transmitting navigation signals, and/or the rate of transmission of the encrypted spreading code 1747.

Client devices 160 can be capable of generating ranging data based on reproducing the encrypted spreading code 1747 for correlation with the received secure navigation signal 1740. For example, the same key 1718 is securely distributed to client devices 160 for users registered to the navigation service and/or otherwise only to client devices 160 determined to be enabled to utilize secure navigation signal 1740 to generate precise position and/or timing data 1671, and these client devices utilize this key 1718 to on reproducing the encrypted spreading code 1747 for correlation with the received secure navigation signal 1740 to enable generation of ranging data. In such embodiments, the encrypted spreading code 1747 never requires decryption by the client device 160. Embodiments of client devices that process secure navigation signals are discussed further in conjunction with FIGS. 17I-17K.

The encryption scheme applied by spreading code encryption module 1704 can be configured to ensure that only client devices of registered users, such client devices that have been granted the key 1718, are able to correlate with the navigation signal to generate pseudorange data. In some embodiments, the encryption scheme applied by spreading code encryption module 1704 can be configured such that no discernable pattern can be detected, for example, to prevent a malicious user with a high gain antenna from discerning bit shifts in the signal being broadcast. This can require removing periodicity from the spreading code 1737 to render a non-periodic encrypted spreading code 1747 that is seemingly random. While plaintext spreading code 1737 can correspond to a periodic sequence of pseudorandom chips as discussed previously, such as a repeated set of 10,000 chips, where a cyclical shift is optionally applied to encode navigation data as discussed previously, the periodicity of the plaintext spreading code 1737 can be removed via encryption by spreading code encryption module 1704 to generating a non-periodic, encrypted spreading code 1747 that is effectively unusable by client devices that don't have access to key 1718.

The encryption scheme applied by spreading code encryption module 1704 can be configured to render an encrypted spreading code 1747 with ideal properties specific to the field of navigation. For example, the encryption scheme can be configured such that some or all properties of open spreading codes of navigation signals, such as high auto-correlation and/or low cross-correlation with other spreading codes of other satellites 110 and/or other nodes of the satellite constellation system 100, are ideally maintained. This can ensure that the encrypted spreading code, in addition to being encrypted such that non-registered users cannot utilize the secure navigation signal 1740 to generate their own precision position and/or timing data 1671, also enables the client devices 160 of registered users to be able to generate their own precision position and/or timing data 1671 properly. For example, the encryption scheme can be configured such that receivers having access to key 1718 can function "normally" via correlating with the received signal to generate a pseudorange, despite the received signal being encrypted, while not being able to also correlate with any false offsets.

In some embodiments, some or all these ideal properties of encrypted spreading code 1747 are implemented based on configuration of the spreading code encryption module 1704 to apply a block cipher encryption scheme, such as an Advanced Encryption Standard (AES) encryption scheme, for example, utilizing the counter (CTR) mode of operation. Such embodiments are discussed in further detail in conjunction with FIGS. 17C-17H.

The encrypted spreading code 1747 can be modulated via a modulation module 1738. Modulation module 1738 can optionally implement some or all features and/or functionality of one or more embodiments of the modulation module 1238 described herein. Modulation module 1738 can optionally implement some or all features and/or functionality of the broadcast flow of FIG. 5C. Modulation module 1738 can otherwise perform at least one modulation technique upon the encrypted spreading code 1747 to generate secure navigation signal 1740. This can include modulating the encrypted spreading code 1747 with overlay code 1537, which can optionally be encrypted as encrypted overlay code, for example, in a same or similar fashion as the encrypted spreading code 1747, and/or which can be open and not encrypted. This can alternatively or additionally include modulating the encrypted spreading code 1747 with a navigation data stream 1505, which can optionally be encrypted as an encrypted navigation message stream and/or which can be open and not encrypted. In some embodiments, overlay code and/or navigation messages are not modulated with the spreading code in generating the secure navigation signal 1740.

Figure 17B:
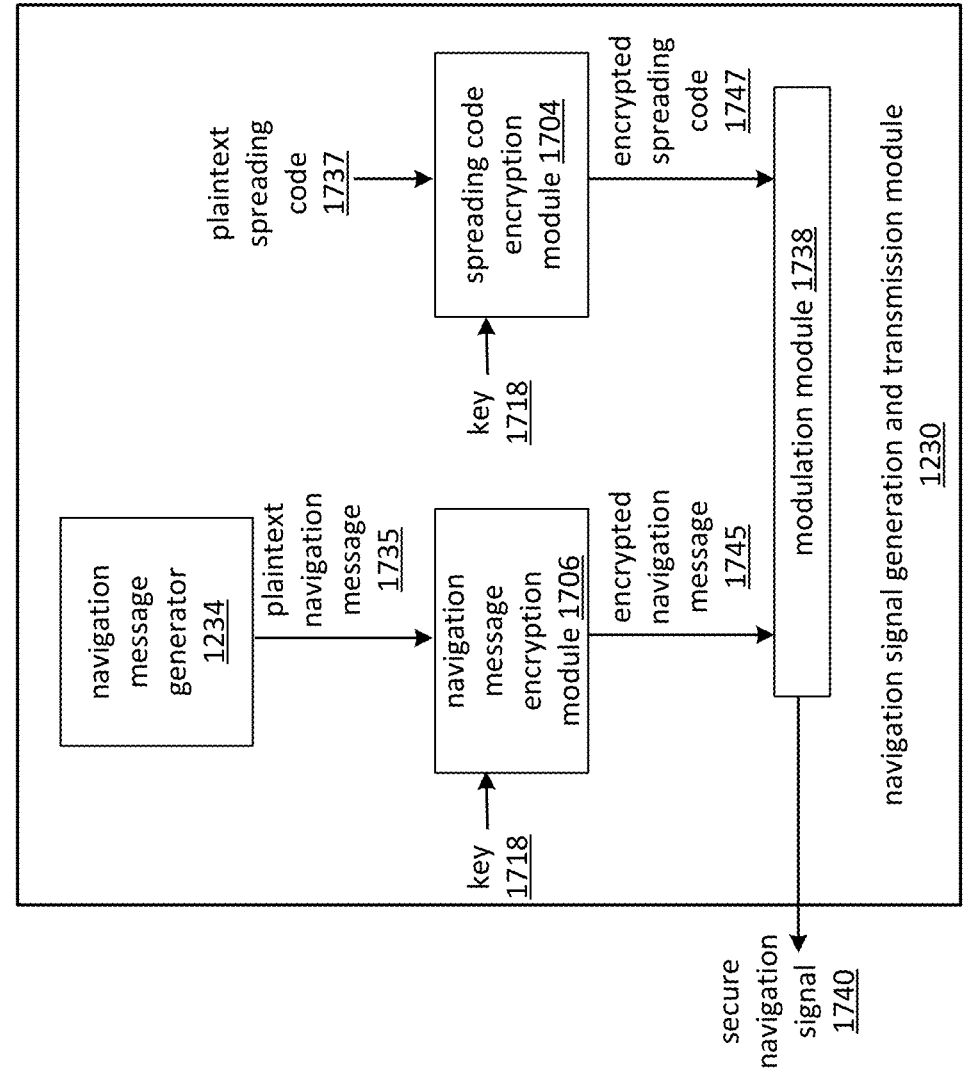

FIG. 17B illustrates an embodiment of a navigation signal generation and transmission module 1230 of a navigation processing system 300 that modulates the encrypted spreading code with encrypted navigation messages 1745. Some or all features and/or functionality of the navigation signal generation and transmission module 1230 of FIG. 17B can be utilized to implement the navigation signal generation and transmission module 1230 of FIG. 17A, and/or any other embodiment of the navigation signal generation and transmission module 1230 described herein.

In particular, alternatively or in addition to encrypting the spreading code, the navigation signal generation and transmission module 1230 can further encrypt the navigation messages modulated with the spreading code. In particular, the navigation messages can impose periodicity upon the navigation signal themselves, for example, via repeating header and/or known packet structure. The data modulated upon the ranging signal can therefore also be encrypted to eliminate any periodicity in the resulting navigation signal to further ensure that the resulting navigation signal is sufficiently secure and that unregistered users cannot leverage periodicity imposed by the navigation messages that are modulated with the encrypted spreading code to generate ranging data without being granted a key. This can improve the technology of navigation systems by enabling transmission of secure navigation signals that include navigation data, while not sacrificing the security in use of the spreading code of the navigation signal that could be imposed by periodicity of the navigation data.

A navigation message encryption module 1706 can determine and utilize a key 1718 to apply the encryption scheme to one or more plaintext navigation messages 1735 to generate one or more corresponding encrypted navigation messages 1745. For example, plaintext navigation messages 1735 in a navigation data stream 1505 are encrypted to render an encrypted navigation message stream for modulation with the encrypted spreading code and/or an encrypted or open overlay code 1539. The navigation message encryption module 1706 can be implemented via processing and/or memory resources of the navigation processing system 300. Any embodiment of a navigation message 1235 described herein can be implemented as a plaintext navigation message 1735, such as an open navigation message code that is never encrypted, where client devices can extract and utilize navigation data without use of a key and/or without utilizing any encryption and/or decryption scheme. Any embodiment of navigation message 1235 described herein can alternatively be implemented as an encrypted navigation message 1745, where client devices can only extract and utilize navigation data ranging data via use key and/or via utilizing an encryption and/or decryption scheme.

In some embodiments, the encrypted navigation messages 1745 are generated after error-coding the navigation data, where navigation messages 1735 are error-coded navigation messages, for example, generated via an error-coding module 1521. In other embodiments, the encrypted navigation messages 1745 are generated prior to error-coding the navigation data, where navigation messages 1735 uncoded navigation messages, and where encrypted navigation messages 1745 are subsequently error-coded, via an error-coding module 1521, prior to modulation with the spreading code.

The navigation message encryption module 1706 can apply a same or different encryption scheme as the encryption scheme applied by the spreading code encryption module 1704. The navigation message encryption module 1706 can utilize a same or different key 1718 as the spreading code encryption module 1704. In some embodiments, both the navigation message encryption module 1706 and the spreading code encryption module apply a same type of block cipher encryption scheme to plaintext navigation messages 1735 and spreading code 1737, respectively. In some embodiments, both the navigation message encryption module 1706 and the spreading code encryption module utilize a same key 1718 in applying the same type of block cipher encryption scheme to plaintext navigation messages 1735 and spreading code 1737, respectively.

Figure 17D:
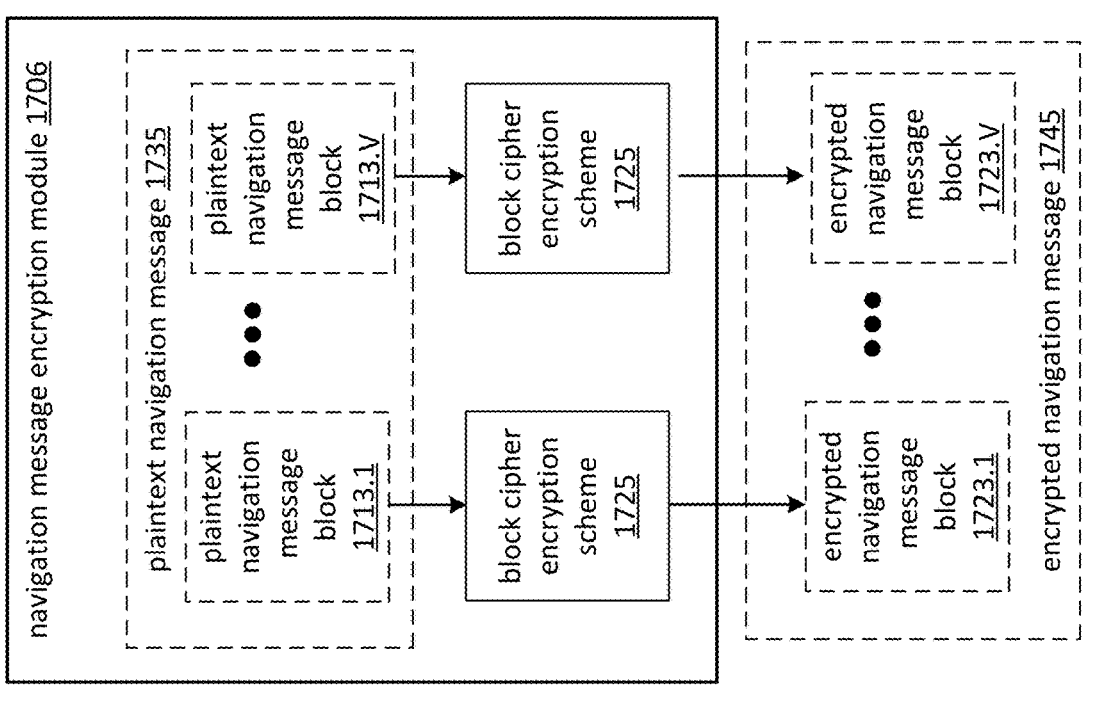
FIG. 17D illustrates an embodiment of a navigation message encryption module of a navigation processing system in accordance with various embodiments.
Figure 17C:
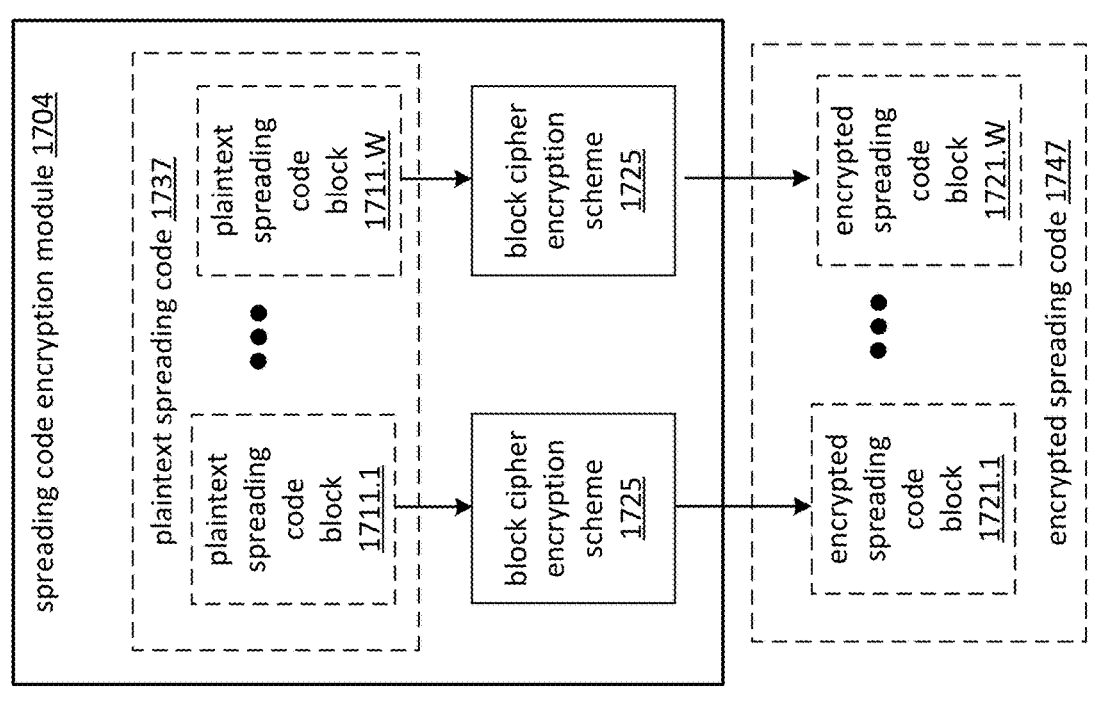
FIG. 17C illustrates an embodiment of a spreading code encryption module of a navigation processing system in accordance with various embodiments.

FIG. 17C illustrates an embodiment of the spreading code encryption module 1704 that applies a block cipher encryption scheme 1725. Some or all features and/or functionality of the spreading code encryption module 1704 of FIG. 17C can be utilized to implement the spreading code encryption module 1704 of FIG. 17A and/or FIG. 17B, and/or any other embodiment of the spreading code encryption module 1704 described herein.

The plaintext spreading code 1737 can be divided into a plurality of W plaintext spreading code blocks 1711.1-1711.W, for example, in accordance with a block size of the block cipher encryption scheme. The block cipher encryption scheme 1725 can be applied separately to each plaintext spreading code block 1711 to render a plurality of corresponding encrypted spreading code blocks 1721.1-1721.W. The block cipher encryption scheme 1725 can optionally be applied separately to each of the plurality of plaintext spreading code blocks 1711.1-1711.W in parallel, for example, via parallelized processing resources of the navigation processing system 300. A block size of encrypted spreading code blocks 1721 can be the same as the block size of plaintext spreading code blocks 1711.

FIG. 17D illustrates an embodiment of the navigation message encryption module 1706 that applies a block cipher encryption scheme 1725. Some or all features and/or functionality of the navigation message encryption module 1706 of FIG. 17C can be utilized to implement the navigation message encryption module 1706 of FIG. 17B, and/or any other embodiment of the navigation message encryption module 1706 described herein.

The plaintext navigation message 1735 can be divided into a plurality of V plaintext navigation message blocks 1713.1-1713.V, for example, in accordance with a block size of the block cipher encryption scheme. The block cipher encryption scheme 1725 can be applied separately to each plaintext navigation message block 1713 to render a plurality of corresponding encrypted navigation message blocks 1723.1-1723.V. The block cipher encryption scheme 1725 can optionally be applied separately to each of the plurality of plaintext navigation message blocks 1713.1-1713.V in parallel, for example, via parallelized processing resources of the navigation processing system 300. A block size of encrypted navigation message blocks 1723 can be the same as the block size of plaintext navigation message blocks 1713.

A block size of plaintext navigation message blocks 1713 can be the same as or different from a block size of plaintext spreading code blocks 1711. For example, the block size is the same for plaintext navigation message blocks 1713 and plaintext spreading code blocks 1711 based on applying the same block cipher encryption scheme with a same block size. A number of blocks W generated from a plaintext navigation message 1735 can be the same as or different from a number of blocks V generated from plaintext spreading code 1737. For example, the number of blocks W is different from the number of blocks V based on a bit length of the plaintext navigation message 1735 being different from a chip length of plaintext spreading code 1737.

As a particular example, a bit length of the plaintext navigation message is 250 bits, a chip length of the plaintext spreading code is 10,000 chips. A block length applied via block cipher encryption scheme 1725 can be 128, or any other number of bits and/or chips.

The number of blocks W generated from plaintext navigation message 1735 can include exactly 2 blocks. The second block can optionally be zero-padded to render two 128 bit blocks. Alternatively, the second plaintext navigation message block 1713 is truncated at 122 bits, where the second encrypted navigation message block 1723 includes only 122 bits, where the stream of plaintext navigation messages are processed such that no gaps are imposed in transmitting the navigation data stream based on the final block being truncated for each navigation message. Alternatively, the second plaintext navigation message block 1713 includes 122 bits of the given navigation message, as well as the first 6 bits of a next navigation message, where the stream of plaintext navigation messages are processed such that no gaps are imposed in transmitting the navigation data stream and where all blocks are the same fixed length. Continuously transmitting the stream of navigation messages across shared blocks and/or via blocks of differing sizes can be ideal in maintaining a high data rate. This can be ideal in aligning with frames of other streams and/or in rendering ideal data rates, for example, imposed by carrier frequency.

The number of blocks V generated from spreading code 1737 can include exactly 79 blocks. The final 79th block can optionally be zero-padded to render 79 128 chip blocks. Alternatively, the final block is truncated at 16 chips, where the final encrypted spreading code block 1721 includes only 16 chips, where the spreading code is processed such that no gaps are imposed in as the spreading code is repeated based on the final block being truncated for each navigation message. Alternatively, the final plaintext spreading code block 1711 includes the last 16 chips followed by the first 240 chips of the spreading code, where the stream of spreading code is processed such that no gaps are imposed in transmitting the spreading code and where all blocks are the same fixed length. Continuously transmitting the spreading code of navigation messages across shared blocks and/or via blocks of differing sizes can be ideal in maintaining the selected spreading code, even if not having a number of chips divisible by the block size. This can be ideal in aligning with frames of other streams and/or in rendering ideal data rates, for example, imposed by carrier frequency.

Other embodiments can impose different numbers of "leftover" bits and/or chips, where padding and/or truncation is facilitated accordingly, based on utilizing navigation messages and/or spreading codes with different number of bits and/or chips, respectively. For example, plaintext navigation message can optionally include 296 bits, for example, as discussed in conjunction with FIG. 15M and/or FIG. 16J. In some embodiments, dividing plaintext navigation messages into a plurality of blocks includes: dividing a full set of plaintext messages of an encrypted code word, such as a set of messages and/or corresponding RS parity of the RS(246,214) code word of FIG. 15M and/or FIG. 16J or the data and parity of another code word generated via another error-coding scheme, and/or additional information included within and/or transmitted in conjunction with these code words, such as the preamble bits, PRN bits, health and/or status bits, and/or clock and/or ephemeris correction bits of navigation data stream, for example, as illustrated in the example of FIG. 15M and/or FIG. 16J.

Figure 17E:
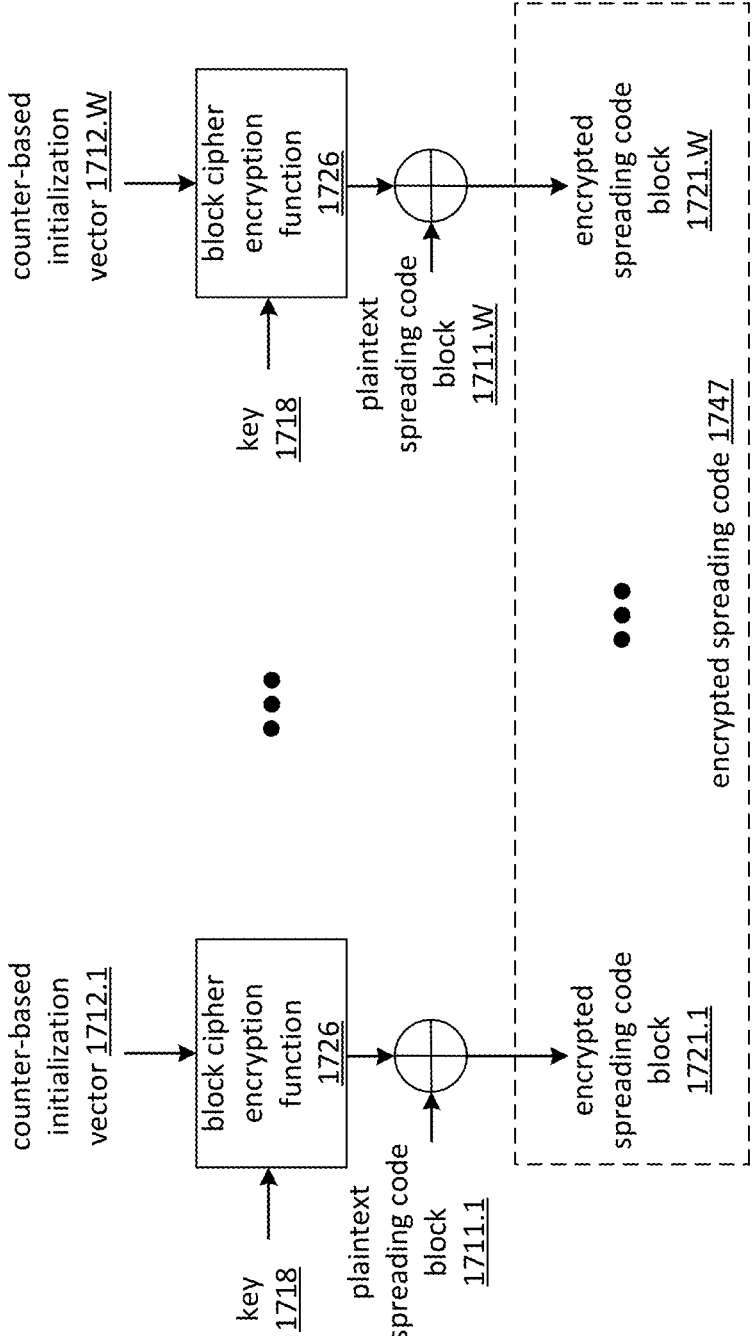
FIGS. 17E-17F illustrate example embodiments of a spreading code encryption module in accordance with various embodiments.

FIG. 17E illustrates a particular embodiment of spreading code encryption module 1704 that utilizes a counter-based initialization vector 1712 in accordance with the block-cipher encryption scheme 1725. Some or all features and/or functionality of the spreading code encryption module 1704 of FIG. 17E can be utilized to implement the spreading code encryption module 1704 of FIG. 17A, FIG. 17B, FIG. 17C and/or any other embodiment of the spreading code encryption module 1704 described herein.

For example, the counter-based initialization vector 1712 is applied in accordance with implementing the counter mode of AES encryption. This can be ideal in handling the stream-based nature of spreading code transmitted over time, while removing periodicity in spreading code that would otherwise be repeated over time. In particular, the spreading code and navigation messages can be continually transmitted despite having lengths that are not divisible by the block size of blocks generated via block cipher encryption function 1726. This can improve the technology of navigation systems by enabling transmission of secure navigation messages while maintaining high data rates and/or favorable frame alignments in modulation.

A block cipher encryption function 1726 can be applied to a given counter-based initialization vector 1712.1 and key 1718, for example, in accordance with the counter mode of AES encryption. The resulting output of the block cipher encryption function 1726 can be a fixed size block, such as a 128 bit block. An exclusive-OR can be applied to the resulting output of the block cipher encryption function 1726 and to a corresponding plaintext spreading code block of the same size, such as 128 chips, to render a corresponding encrypted spreading code block 1721.

Each final encrypted spreading code block 1721.W can optionally be truncated based on only performing an exclusive-OR (XOR) upon the final portion of plaintext spreading code block 1711.W, which can be smaller than the block generated via the block cipher encryption function 1726.

Each of these applications of the block cipher encryption function 1726 to render a corresponding encrypted spreading code block 1721 when applied to a to a corresponding plaintext spreading code block can implement a parallelized use of the block cipher encryption scheme 1725 as illustrated in FIG. 17D. For example, the block cipher encryption function 1726 can applied to different counter-based initialization vector 1712 in parallel by applying the same key 1718 via parallelized processing resources of the navigation processing system 300 and/or different outputs of different block cipher encryption function 1726 can be XORed with corresponding different plaintext spreading code blocks 1711 in parallel via parallelized processing resources of the navigation processing system 300.

Different instances of the block cipher encryption function 1726 render different 128 bit blocks based on a counter being incremented to render different counter-based initialization vectors 1712 utilized as input to block cipher encryption function 1726 for different plaintext spreading code blocks 1711. Furthermore, as subsequent sets of encrypted spreading code blocks are generated over time, the counter can further be incremented such that each set of W initialization vectors are different from prior sets of W initialization vectors.

Figure 17F:
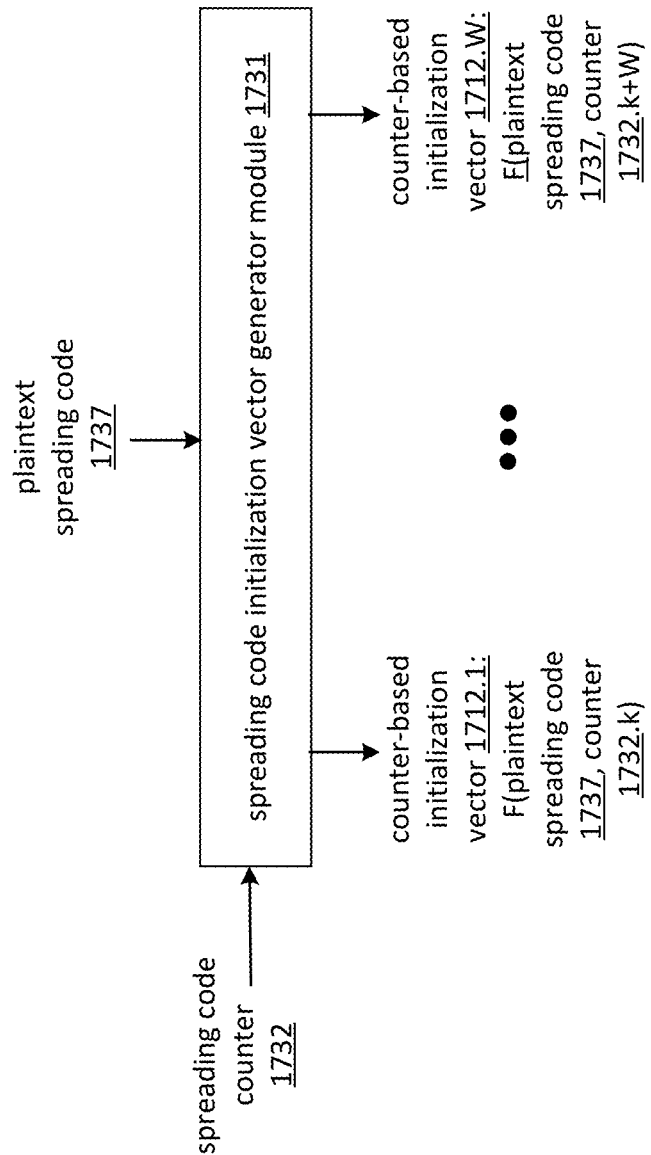

FIG. 17F illustrates a particular embodiment of spreading code encryption module 1704 that generates counter-based initialization vectors 1712 via a spreading code initialization vector generator module 1731. Some or all features and/or functionality of the spreading code encryption module 1704 of FIG. 17F can be utilized to implement the spreading code encryption module 1704 of FIG. 17A, FIG. 17B, FIG. 17E and/or any other embodiment of the spreading code encryption module 1704 described herein.

In some embodiments, each counter-based initialization vectors 1712 can be generated as a function of the some or all of the full plaintext spreading code 1737, such as some or all of the PRN of the corresponding satellite implementing the spreading code 1237, and the value of a counter 1732. In some embodiments, the bit values of spreading code 1737 is concatenated with a current value of counter 1732, which is incremented, for example, by one, with each block in the stream, to render counter-based initialization vectors 1712 that increment over time. In some embodiments, the counter-based initialization vectors 1712 can further be generated as a function of another fixed initialization vector. For example, each counter-based initialization vectors 1712 is generated by concatenating the spreading code 1737 with this fixed initialization vector and the plaintext spreading code.

As a particular example, a given counter-based initialization vector 1712.*i* is implemented as: PRN∥IV∥counter(k), where ∥ denotes concatenation, where PRN is some or all of the full plaintext spreading code 1737 of the given satellite and/or node, where IV is the fixed initialization vector, and where counter(k) is the current value of the counter. For example, the next counter-based initialization vector 1712.*i*+1 utilized for a next block in the stream is implemented as: PRN∥IV∥counter(k+1), where counter(k+1) is the incremented value of the counter, such as an integer value that is one more than counter (k).

The fixed initialization vector can be predetermined, can be accessed in memory of the navigation processing system 300, and/or can be securely received by the navigation processing system 300 via at least one receiver of the navigation processing system 300. The fixed initialization vector can change over time, for example, in pre-defined intervals. For example, fixed initialization vector changes hourly and/or daily. The intervals at which the fixed initialization vector changes can be configured as a function of the security of the encryption scheme, the length of the spreading code 1737, the number of different nodes in satellite constellation system 100 transmitting navigation signals, and/or the rate of transmission of the encrypted spreading code 1747. The fixed initialization vector can change at same or different intervals as key 1718. The fixed initialization vector can optionally be public, while key 1718 can be private.

Utilizing the spreading code as part of the counter-based initialization vectors 1712 can ensure that different satellites 110 and/or other nodes of satellite constellation system 100 utilize unique counter-based initialization vectors 1712 that are different from one another, in addition to being different from other ones of their own counter-based initialization vectors 1712 due to the counter, for example, based on the spreading code as of different satellites 110 and/or other nodes of satellite constellation system 100 being different from one another to uniquely identify different satellites 110 and/or other nodes. This further protects the integrity of the encryption scheme, for example, in cases where patterns could otherwise be tracked for navigation signals of different satellites using same initialization vectors. In such cases, different satellites can utilize same counter values and/or initialize their counter to the same value.

Figure 17G:
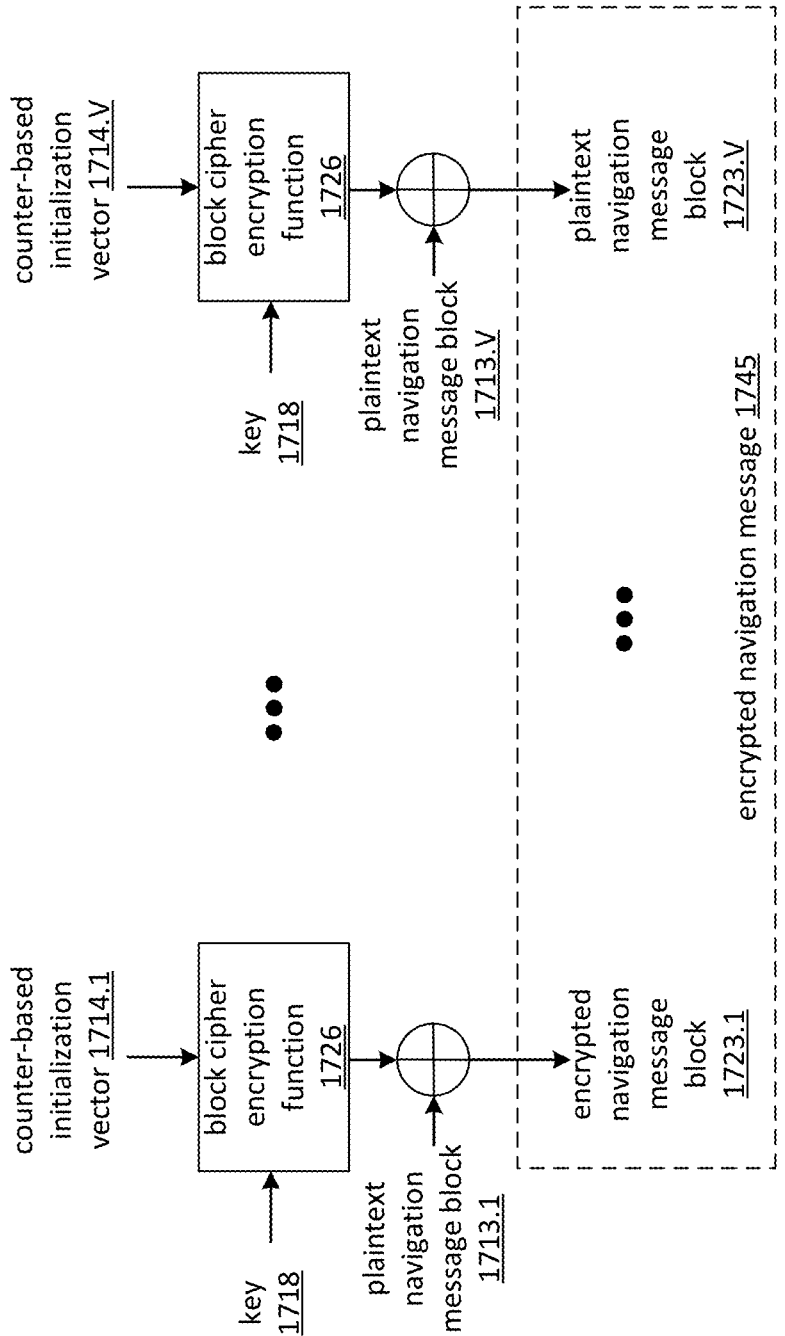
FIGS. 17G-17H illustrate example embodiments of a spreading code encryption module in accordance with various embodiments.

FIG. 17G illustrates a particular embodiment of navigation message encryption module 1706 that utilizes a counter-based initialization vector 1712 in accordance with the block-cipher encryption scheme 1725. Some or all features and/or functionality of the navigation message encryption module 1706 of FIG. 17G can be utilized to implement the navigation message encryption module 1706 of FIG. 17B, FIG. 17C and/or any other embodiment of the navigation message encryption module 1706 described herein.

The navigation message encryption module 1706 can be implemented in a same and/or similar fashion as the spreading code encryption module 1704 of FIG. 17E. This can include performing the same block cipher encryption function 1726 as applied by the spreading code encryption module 1704 of FIG. 17E by utilizing the same key. However, the counter-based initialization vectors 1714 of FIG. 17G can be different from the counter-based initialization vectors 1712 of FIG. 17E. For example, the corresponding counter can be initialized to a different value. In some embodiments, the initialization vectors 1712 utilized by the spreading code encryption module 1704, in addition to being guaranteed to be different from one another and different from those utilized by spreading code encryption modules 1704 of other satellites, can be further guaranteed to be different from all initialization vectors 1714 utilized by the navigation message encryption module 1706 of the same satellite and different satellites. The initialization vectors 1714 utilized by the navigation message encryption module 1706 can further be guaranteed to be different from one another and different from those utilized by navigation message encryption module 1706 of other satellites.

Figure 17H:
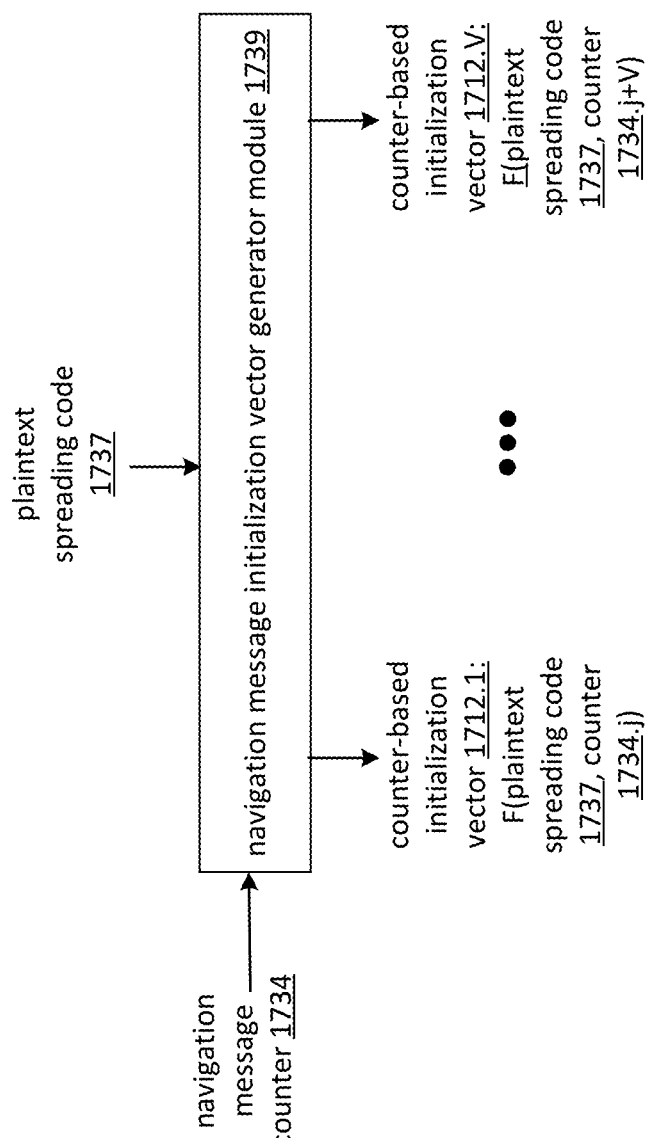
Figure 171:
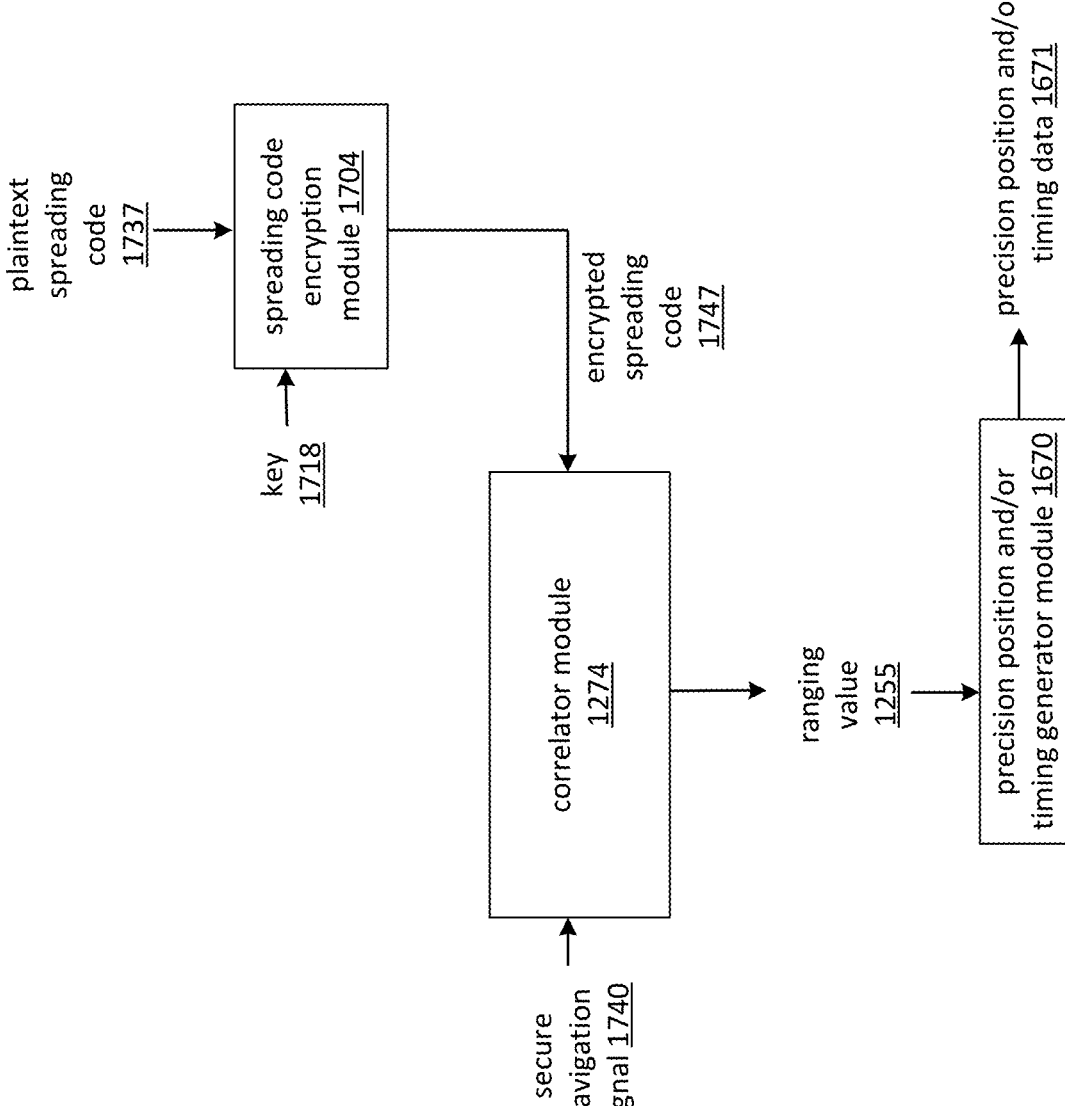

FIG. 17H illustrates a particular embodiment of navigation message encryption module 1706 that generates counter-based initialization vectors 1714 via a navigation message initialization vector generator module 1739. Some or all features and/or functionality of the navigation message encryption module 1706 of FIG. 17H can be utilized to implement the encryption module 1706 of FIG. 17B, FIG. 17G and/or any other embodiment of the navigation message encryption module 1706 described herein.

The navigation message initialization vector generator module 1739 can be implemented in a same and/or similar fashion as the spreading code initialization vector generator module 1733 of FIG. 17F. This can include concatenating the PRN with the value of counter 1734 and/or with a fixed initialization vector, which can be the same or different fixed initialization vector applied by the spreading code initialization vector generator module 1733.

However, the navigation message counter 1734 can be implemented to be non-overlapping with the spreading code counter 1732, for example, via a predefined offset between navigation message counter 1734 and spreading code counter 1732, and/or based on the fixed initialization vector and/or key 1718 being reset to new values prior to the value of navigation message counter 1734 reaching an initial value of the spreading code counter 1732, or vice versa. The offset between navigation message counter 1734 and spreading code counter 1732 can be based on a frequency at which the initialization vector and/or key 1718 are changed.

Figure 17J:
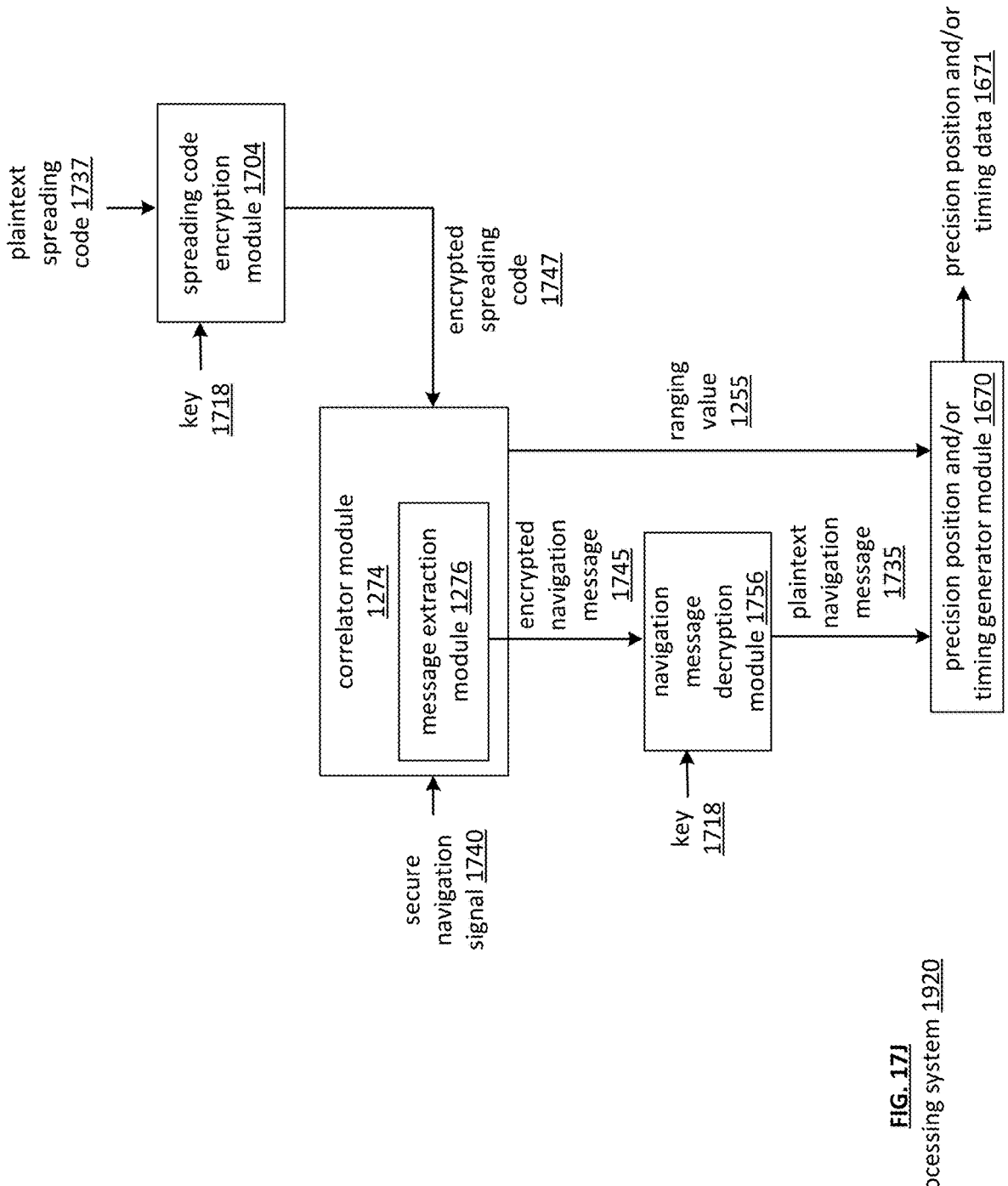
Figure 17K:
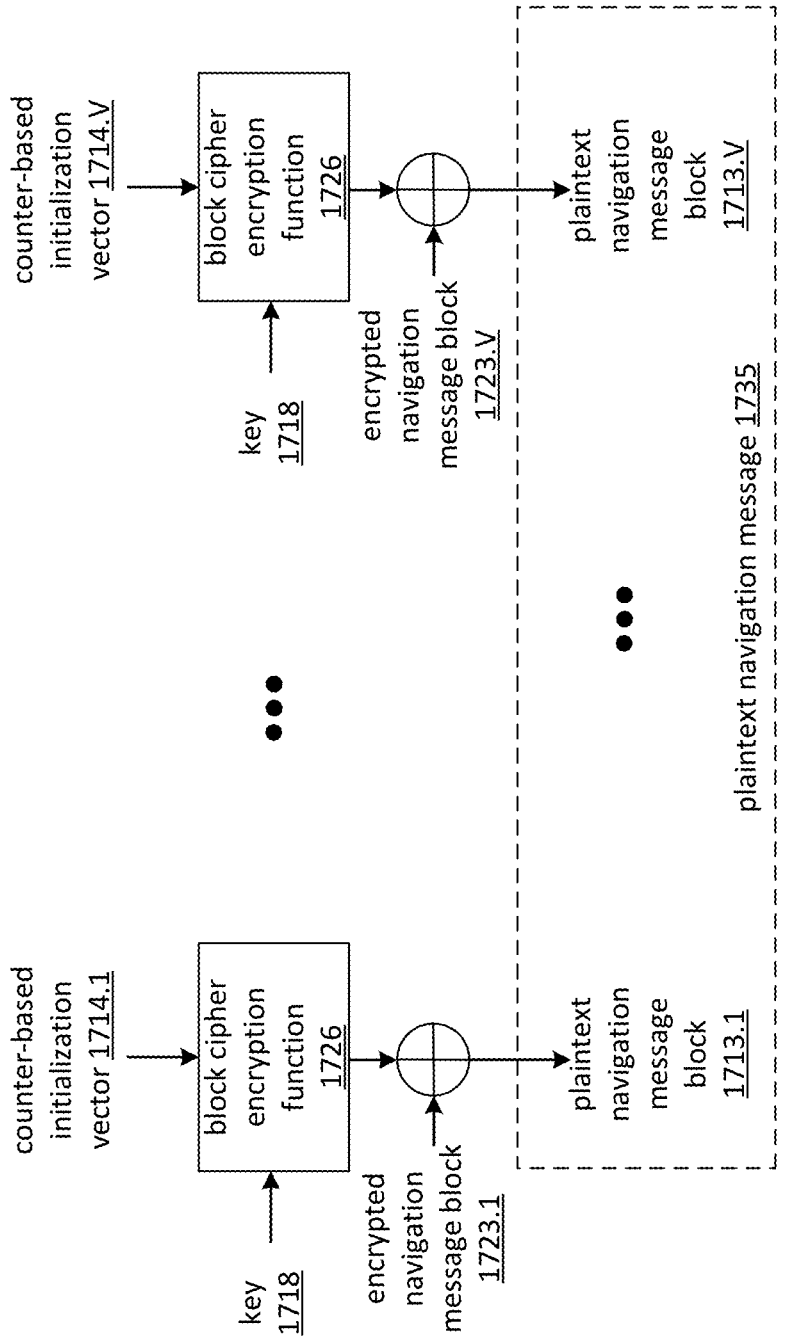
FIG. 17K illustrates an example embodiment of a navigation message decryption module of a processing system of a client device in accordance with various embodiments.

FIGS. 17I, 17J, and 17K illustrate embodiments of processing system 1920 of client device 160. Some or all features and/or functionality of the processing system 1920 of FIGS. 17I, 17J, and 17K can be utilized to implement the client device 160 of FIG. 15P, of FIG. 16H and/or 16L, and/or any other embodiment of client device 160 described herein.

FIG. 17I illustrates an embodiment of processing system 1920 of client device 160 operable to precision position and/or timing data 1671 based on encrypted spreading code 1747 of secure navigation signals 1740. Some or all features and/or functionality of the processing system 1920 of FIG. 17I can be utilized to implement any other embodiment of client device 160 described herein.

As illustrated in FIG. 17I, the correlator module 1274 can correlate received secure navigation signals 1740 with encrypted spreading code 1747, instead of plaintext spreading code, to generate ranging values 1255 utilized to generate precision position and/or timing data. The processing system 1920 of client device 160 can implement its own spreading code encryption module 1704 via processing and/or memory resources of the client device 160 to generate the encrypted spreading code 1747 from known plaintext spreading code 1737 that is received via at least one receiver and/or stored in memory.

The same encryption scheme utilized by navigation processing system 300 to generate encrypted spreading code can be employed by the spreading code encryption module 1704 implemented via the client device to generate a replica of the encrypted spreading code 1747 from known plaintext spreading code 1737 by utilizing the key 1718 in accordance with this encryption scheme.

In some embodiments, the navigation processing system 300 utilizes the appropriate counter-based initiation vector 1712 for each plaintext spreading code block 1711 generated over time to ensure the encrypted spreading code blocks 1721 correlated with the secure navigation signal 240 match those included in the secure navigation signal 240. For example, the navigation processing system 300 can synchronize the spreading code counter 1732 with that of the navigation processing system 300 transmitting the secure navigation signal 1740, for example, to ensure that the correct counter-based initiation vector 1712 are applied to generate the encrypted spreading code blocks 1721 correctly over time. Alternatively, the initial value of counter-based initiation vector 1712 is known and incremented correctly when applied to the spreading code over time, for example, based on clock 931 and/or based on the precision timing data 1671 generated over time, such as precision timing data 1271 generated, for example, as discussed in conjunction with FIGS. 12G and/or 12H.

This encrypted spreading code 1747 generated by the spreading code encryption module 1704 of processing system 1920 can implement the internal signals 1273, and/or the spreading code encryption module 1704 can be utilized to implement the internal signal generator 1272. As the encrypted spreading code 1747 is correlated with secure navigation signal 1740 to generate ranging data, the encrypted spreading code 1747 of secure navigation signal need not ever be decrypted by client device 160.

The key 1718 can be securely received by the client device, for example, from a node of the satellite constellation system 100 and/or from a server system associated with the navigation service, for example, via a secure communication channel. Thus, only client devices that have access to key 1718 are capable of generating encrypted spreading code for correlation with secure navigation signals 1740 to render pseudorange values or other ranging data.

FIG. 17J illustrates an embodiment of processing system 1920 of client device 160 operable to precision position and/or timing data 1671 further based on encrypted navigation messages 1745 of secure navigation signals 1740. Some or all features and/or functionality of the processing system 1920 of FIG. 17J can be utilized to implement the processing system 1920 of FIG. 17I and/or any other embodiment of client device 160 described herein.

A message extraction module 1276 of the correlator module 1274 can be implemented to extract encrypted navigation message 1745 from the secure navigation signal 1740, for example, based on demodulating the encrypted navigation message 1745 from secure navigation signal 1740. A navigation message decryption module 1756 can be implemented via processing and/or memory resources of the processing system 1920 to generate a plaintext navigation message 1735 by decrypting encrypted navigation message 1745, for example, by utilizing the key 1718 and applying a decryption function in accordance with the encryption scheme utilized to encrypt the navigation message. The precision position and/or timing generator module can process the plaintext navigation message 1735, such as correction data and/or orbital state data included in the plaintext navigation message 1735, to generate the precision position and/or timing data 1671 in conjunction with the ranging values 1255.

FIG. 17K illustrates an embodiment of a navigation message decryption module 1756. Some or all features and/or functionality of the navigation message decryption module 1756 of FIG. 17K can be utilized to implement the navigation message decryption module 1756 of the processing system 1920 of FIG. 17J and/or any other embodiment of client device 160 described herein.

The navigation message decryption module 1756 can be implemented in accordance with the counter mode of the AES encryption scheme. This can include performing the same block cipher encryption function 1726 to counter-based initiation vectors 1714, for example, in parallel via parallelized processing resources of the processing system 1920. The counter-based initiation vectors 1714 can be generated by a navigation message initialization vector generator module 1739 to render equivalent counter-based initiation vectors 1714 that were utilized to generate the encrypted navigation message blocks 1723 as discussed in conjunction with FIGS. 17G and/or 17H. The counter-based initiation vectors 1714 can be public, where the navigation message decryption module 1756 generates and/or stores the counter-based initiation vectors 1714 based on the structure of counter-based initiation vectors 1714 being publicly known.

In some embodiments, processing system 1920 can synchronize the navigation message counter 1734 with that of the navigation processing system 300 transmitting the secure navigation signal 1740, for example, to ensure that the correct counter-based initiation vector 1714 is applied to each incoming encrypted navigation message block 1723. For example, the processing system 1920 synchronizes the navigation message counter 1734 based on the precision timing data 1671, such as the precision timing data 1271 generated, for example, as discussed in conjunction with FIGS. 12G and/or 12H.

In some embodiments, this determination includes determining the counter-based initialization vector 1712 utilized to generate the replica portion of the encrypted spreading code modulated with the signal. This can further includes applying the known offset to the value of spreading code counter 1732 extracted from this determined counter-based initialization vector 1712 to render the appropriate value for the navigation message counter 1734 that was applied to generate the corresponding navigation message. In such cases, the spreading code counter 1732 and navigation message counter 1734 of the navigation processing system 300 can be synchronized in generating corresponding encrypted navigation message blocks 1723 and encrypted spreading code blocks 1721, for example, that are modulated in same frames to ensure that the appropriate navigation message counter 1734 can be derived from the counter-based initialization vector 1712 of the spreading code that rendered favorable correlation with the secure navigation signal 1740.

Performing the block cipher encryption function 1726 upon the correct counter-based initialization vector and key 1718 for a given encrypted navigation message block 1723 extracted by the processing system 1920 from secure navigation signal 1740 renders the same function output as generated by the navigation processing system 300 when generated the given encrypted navigation message block. An exclusive-OR can be applied to this output and the given encrypted navigation message block 1723, reversing the initial encryption due to the properties of the XOR to render the original plaintext navigation message block 1713.

In various embodiments, a satellite includes at least one processor configured to execute operational instructions that cause the at least one processor to perform operations that include: generating a navigation message; generating encrypted navigation message data from the navigation message by applying an encryption scheme to the navigation message; generating an encrypted ranging signal by applying the encryption scheme to a spreading code of the satellite; and/or generating a secure navigation signal based on modulating the encrypted navigation message data upon the encrypted ranging signal. The satellite can further include a navigation signal transmitter configured to broadcast the secure navigation signal for receipt by at least one client device. The secure navigation signal can facilitate the at least one client device to determine state data of the at least one client device, such as position data and/or timing data, by utilizing key data associated with the encryption scheme.

In various embodiments, a navigation processing system includes at least one processor configured to execute operational instructions that cause the at least one processor to perform operations that include: generating a navigation message; generating encrypted navigation message data from the navigation message by applying an encryption scheme to the navigation message; generating an encrypted ranging signal by applying the encryption scheme to a spreading code of the satellite; and/or generating a secure navigation signal based on modulating the encrypted navigation message data upon the encrypted ranging signal. The navigation processing system can further include a navigation signal transmitter configured to broadcast the secure navigation signal for receipt by at least one client device. The secure navigation signal can facilitate the at least one client device to determine state data of the at least one client device, such as position data and/or timing data, by utilizing key data associated with the encryption scheme.

In various embodiments, a client device includes at least one first receiver configured to receive a secure navigation signal transmitted by a satellite, wherein the secure navigation signal includes encrypted navigation message data modulated with an encrypted ranging signal. The client device can further include at least one second receiver configured to receive key data corresponding to the secure navigation signal. The at least one second receiver can be the same as and/or different from the at least one first receiver. The client device can further include at least one processor configured to execute operational instructions that cause the at least one processor to perform operations that include: generating an internal encrypted ranging signal by applying the key data to a spreading code of the satellite in accordance with an encryption scheme; generating ranging data based on correlating the internal encrypted ranging signal with the secure navigation signal; determining a navigation message by utilizing the key data to decrypt the encrypted navigation message data; and/or determining state data for the client device based on the ranging data and the navigation message.

Figure 17L:
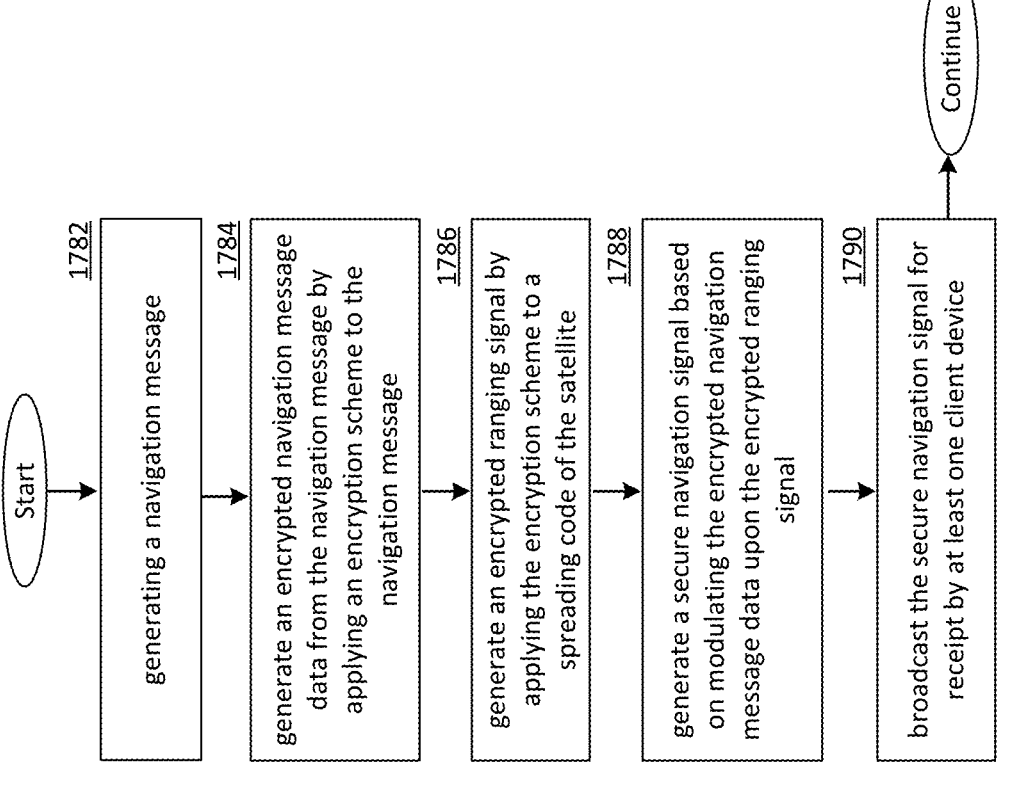
FIG. 17L is a logic diagram of an example of a method of generating a secure navigation signal in accordance with various embodiments.

FIG. 17L illustrates a method for execution. Some or all steps of FIG. 17L can be executed by at least one processor of a satellite, such as a satellite 110. Some or all steps of FIG. 16M can be performed via a navigation processing system 300 implemented by a satellite, a client device, a ground station, a backhaul satellite, stationary infrastructure, and/or any node of the satellite constellation system 100. Multiple different satellites 110 of the satellite constellation system 100 and/or any multiple different nodes of the satellite constellation system 100 can each implement their own navigation processing system 300 to perform some or all steps of FIG. 17L independently and/or simultaneously, with or without coordination. Some or all steps of FIG. 17L can be performed via a navigation processing system 300 implemented by a navigation system component and/or a computing device not associated with and/or not communicating with the satellite constellation system 100 and/or communicating with another satellite constellation system. Some or all steps of FIG. 17L can be performed in conjunction with implementing some or all features and/or functionality of the navigation processing system 300 and/or a satellite 110 as discussed in conjunction with some or all of FIGS. 17A-17K. Some or all steps of FIG. 17L can be performed in conjunction with performing some or all steps of FIG. 15Q and/or FIG. 16M.

Step 1782 includes generating a navigation message. For example, the navigation message is generated based on state data, such as timing data and/or orbital position data of a corresponding satellite 110 and/or other node of the satellite constellation system 100. The method can further include generating this state data, for example, based on implementing some or all functionality of the state estimator of FIG. 5A. The navigation message can be implemented as a navigation message 1235, such as plaintext navigation message 1735. The navigation message can be implemented as one of a plurality of navigation messages of a navigation data stream 1505 that includes an ordered stream of navigation messages 1235. For example, the navigation message is generated based on implementing some or all functionality of the state estimator flow of FIG. 5A and/or based on implementing some or all functionality of the navigation message generation flow of FIG. 5B.

Step 1784 includes generating an encrypted navigation message data from the navigation message by applying an encryption scheme to the navigation message. For example, the encrypted navigation message data is implemented as encrypted navigation message 1745. Performing step 1784 can be based on implementing navigation message encryption module 1706.

Step 1786 includes generating an encrypted ranging signal by applying the encryption scheme to a spreading code of the satellite. For example, the encrypted ranging signal is implemented as encrypted spreading code 1747, and/or the spreading code is implemented as plaintext spreading code 1737 and/or spreading code 1237. Performing step 1784 can be based on implementing navigation message encryption module 1706.

Step 1788 includes generating a secure navigation signal based on modulating the encrypted navigation message data upon the encrypted ranging signal. For example, performing step 1788 is performed based on implementing modulation module 1738. The secure navigation signal can be implemented as secure navigation signal 1720 and/or navigation signal 420.

Step 1790 includes broadcasting the secure navigation signal for receipt by at least one client device. The at least one client device can generate state data, such a precision timing and/or position data of the at least one client device, based on the navigation signal. Performing some or all of steps 1784-1790 can be based on implementing the navigation message generation flow of FIG. 5B and/or the broadcast flow of FIG. 5C. Performing step 1790 can be based on implementing at least one transmitter, such as navigation signal transmitter 330.

In various embodiments, the encrypted ranging signal is non-periodic based on the encryption scheme. In various embodiments, the at least one client device determines the state data based on the secure navigation signal having low cross-correlation properties and/or high auto-correlation properties. The low cross-correlation properties and/or high auto-correlation properties can be based on the encryption scheme.

In various embodiments, the encryption scheme is a block cipher encryption scheme. In various embodiments, the block cipher encryption scheme is an Advanced Encryption Standard (AES) scheme. In various embodiments, the block cipher encryption is the AES scheme utilizing a counter mode of operation.

In various embodiments, the navigation message has a first fixed-length. Each of a plurality of blocks generated via the block cipher encryption scheme can have a second fixed-length that is smaller than the first fixed-length. Generating the encrypted navigation message data can include dividing the navigation message into a plurality of sub-messages with the second fixed-length and/or can include performing an exclusive-OR operation upon each of the plurality of sub-messages with a corresponding one of the plurality of blocks. In various embodiments, a final one of the plurality of sub-messages has a length that is smaller than the second fixed-length. The exclusive-OR operation can be performed upon the final one the plurality of sub-messages and a truncated one of the plurality of blocks. In various embodiments, the plurality of block are generated in parallel via a set of parallelized processing resources of the at least one processor.

In various embodiments, generating the encrypted ranging signal includes utilizing the key data and further includes utilizing a first initialization vector. In various embodiments, generating the encrypted navigation message data includes utilizing the key data and further includes utilizing a second initialization vector that is different from the first initialization vector. In various embodiments, the first initialization vector and the second initialization vector are based on the spreading code. In various embodiments, the first initialization vector is based on concatenating a value of the spreading code with a first counter value of a first incrementing counter, and wherein the second initialization vector is based on concatenating the value of the spreading code with a second counter value of a second incrementing counter that is different from the first incrementing counter.

In various embodiments, the at least one client device determines the state data based on applying the key data to the spreading code to generate an internal encrypted ranging signal, and/or determining ranging data based on correlating the internal encrypted ranging signal with the secure navigation signal, where the state data is determined based on the ranging data. In various embodiments, the at least one client device determines the state data based on determining the navigation message by decrypting the encrypted navigation message data utilizing the key data, where determining the state data is further based on processing the navigation message.

Figure 17M:
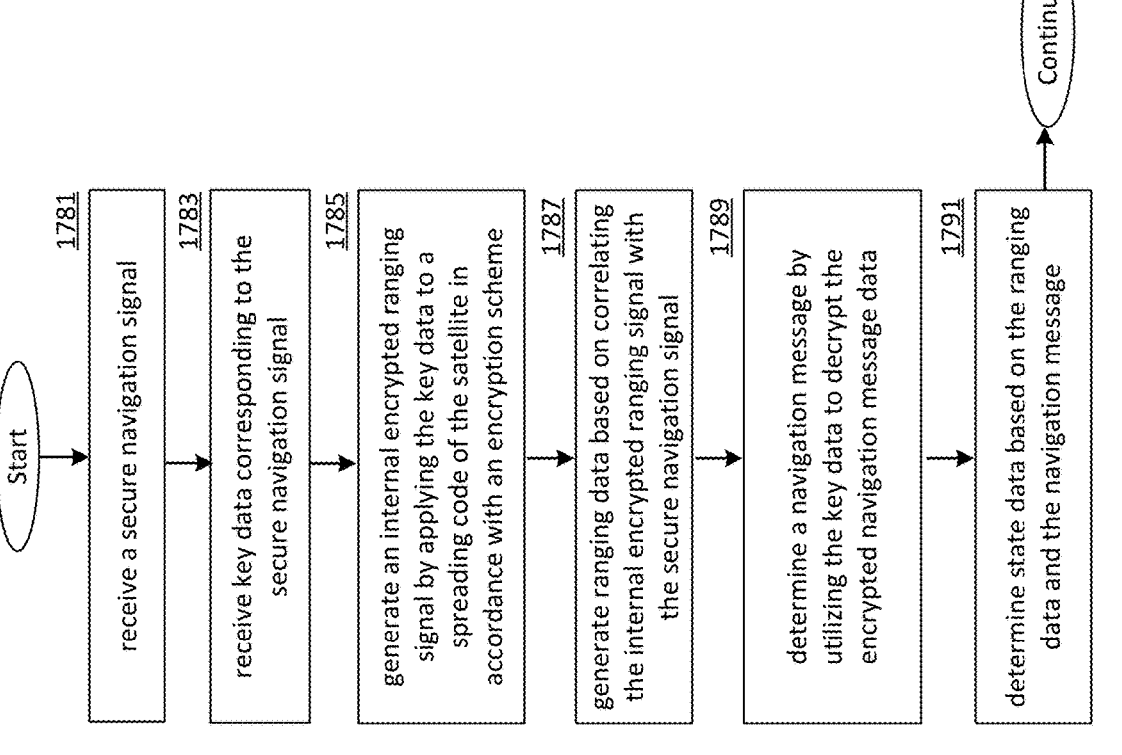
FIG. 17M is a is a logic diagram of an example of a method of generating state data from a secure navigation signal in accordance with various embodiments.

FIG. 17M illustrates a method for execution. Some or all steps of FIG. 17M can be executed by at least one processor of a client device, such as a mobile device, infrastructure device, vehicle, a node of the satellite constellation 100, and/or any other client device 160 discussed herein. Some or all steps of FIG. 17M can be performed via a client device processing system 920 implemented by a client device 160. Multiple different client devices 160 can each implement their own client device processing system 920 to perform some or all steps of FIG. 17M independently and/or simultaneously, with or without coordination. Some or all steps of FIG. 17M can be performed in conjunction with implementing some or all features and/or functionality of the client device processing system 920 and/or a client device 160 as discussed in conjunction with FIGS. 17I, 17J, and/or 17K.

Step 1781 includes receiving a secure navigation signal. Step 1783 includes receiving key data corresponding to the secure navigation signal. Step 1785 includes generating an internal encrypted ranging signal by applying the key data to a spreading code of the satellite in accordance with an encryption scheme. Step 1787 includes generating ranging data based on correlating the internal encrypted ranging signal with the secure navigation signal. Step 1789 includes determining a navigation message by utilizing the key data to decrypt the encrypted navigation message data. Step 1791 includes determining state data, such as position data and/or timing data, based on the ranging data and the navigation message.

In various embodiments, the encryption scheme is a block cipher encryption scheme, such as a scheme corresponding to the Advanced Encryption Standard utilizing a counter mode of operation. In various embodiments, determining the navigation message includes: generating each of a plurality of blocks having a first fixed-length via the block cipher encryption scheme; dividing the encrypted navigation message data into a plurality of sub-messages having the first fixed-length; and/or performing an exclusive-OR operation upon each of the plurality of sub-messages and a corresponding one of the plurality of blocks. In various embodiments, the plurality of blocks are generated in parallel via a set of parallelized processing resources of the at least one processor.

In various embodiments, generating the encrypted ranging signal includes utilizing the key data and further includes utilizing a first initialization vector. In various embodiments, decrypting the encrypted navigation message data utilizing the key data and/or includes utilizing a second initialization vector that is different from the first initialization vector. In various embodiments, the first initialization vector and the second initialization vector are based on the spreading code. In various embodiments, the first initialization vector is based on concatenating a value of the spreading code with a first counter value of a first incrementing counter, and/or the second initialization vector is based on concatenating the value of the spreading code with a second counter value of a second incrementing counter that is different from the first incrementing counter.

Figure 18A:
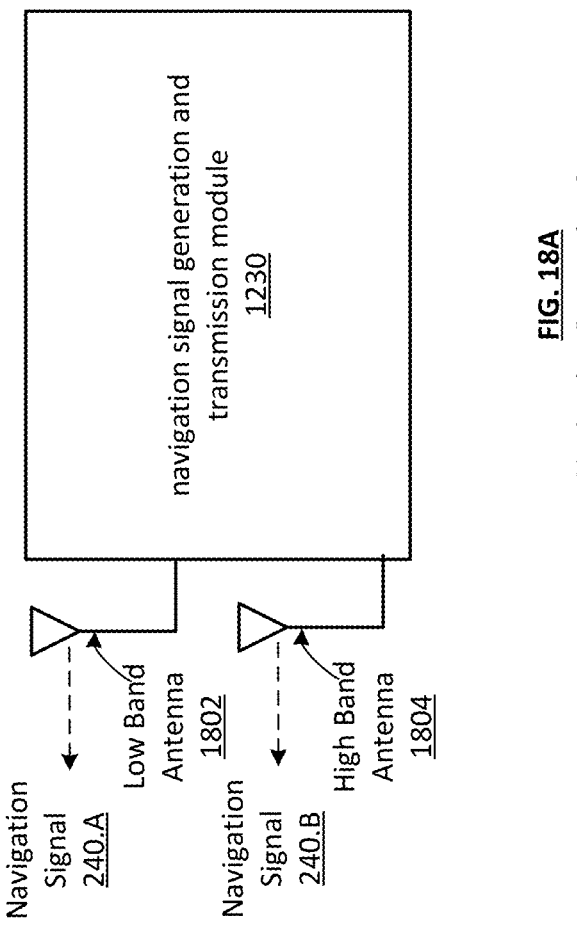
FIG. 18A is a schematic block diagram of a navigation processing system that includes a low band antenna and a high band antenna in accordance with various embodiments.
Figure 18B:
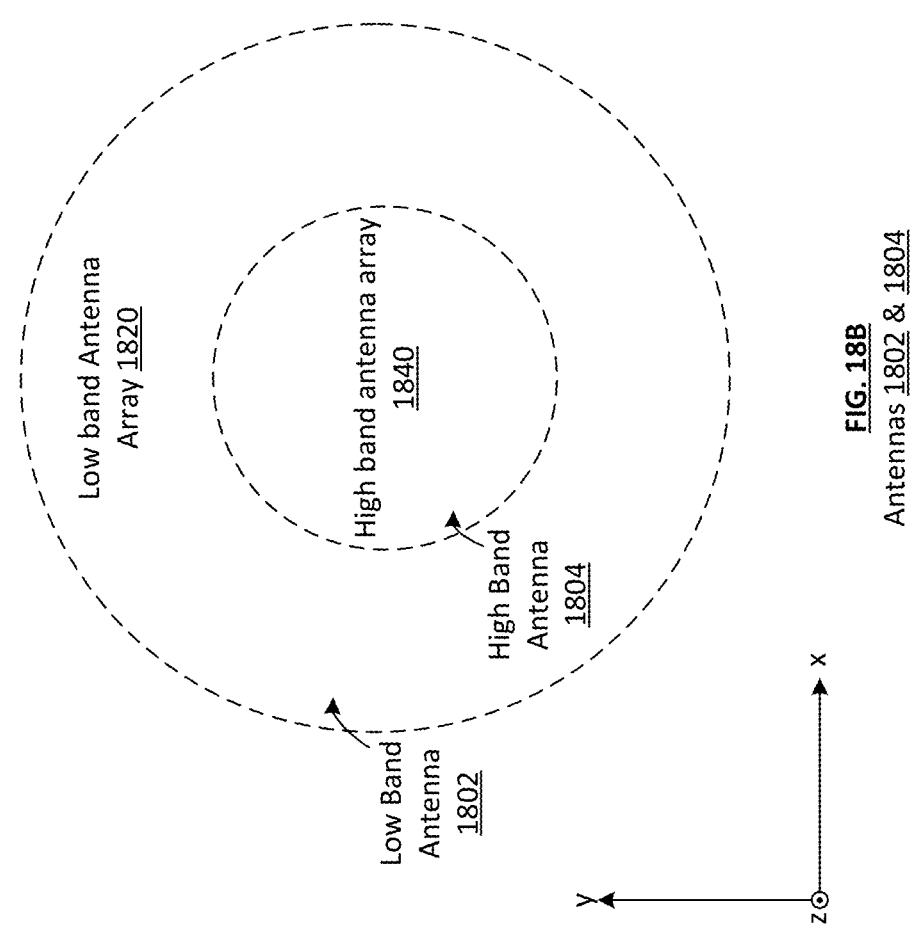
FIG. 18B illustrates an embodiment of a high band antenna array that is physically nested within a low band antenna array.
Figure 18C:
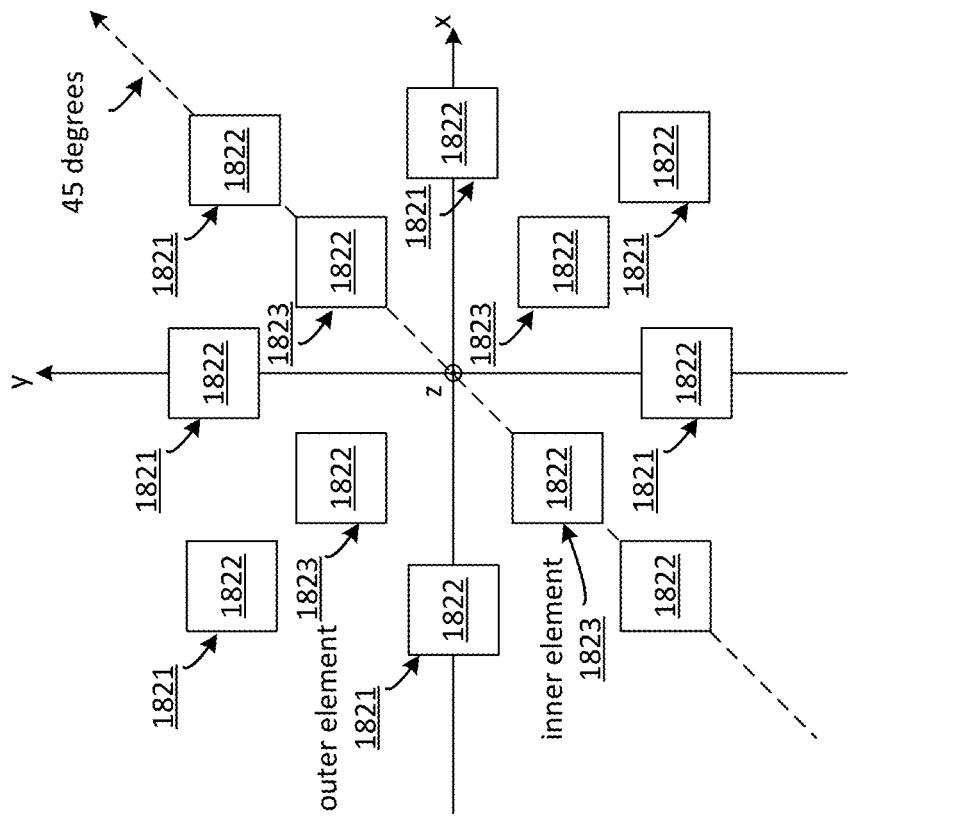
FIGS. 18C and 18D illustrate an example embodiment of a low band antenna array.
Figure 18D:
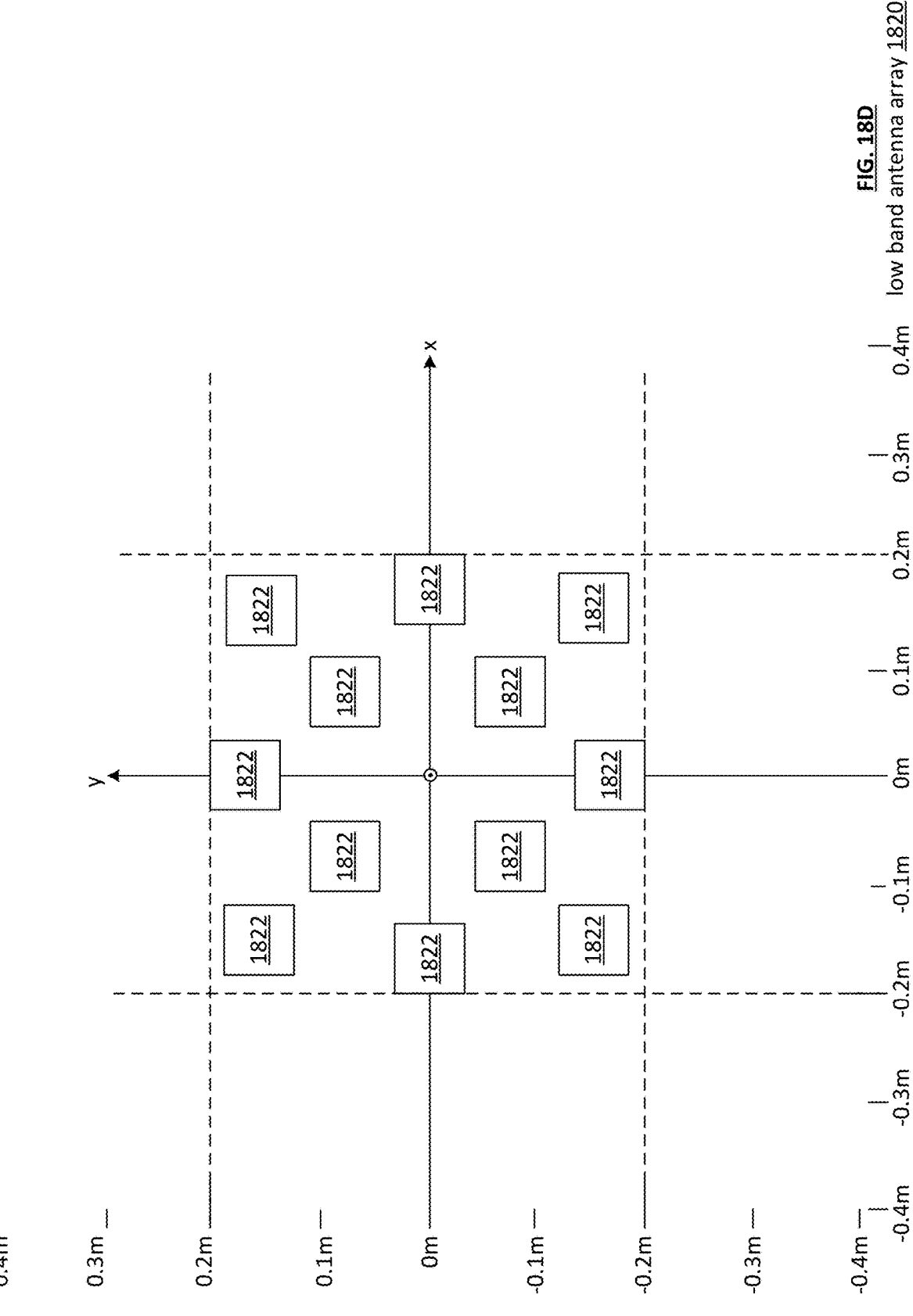
Figure 18E:
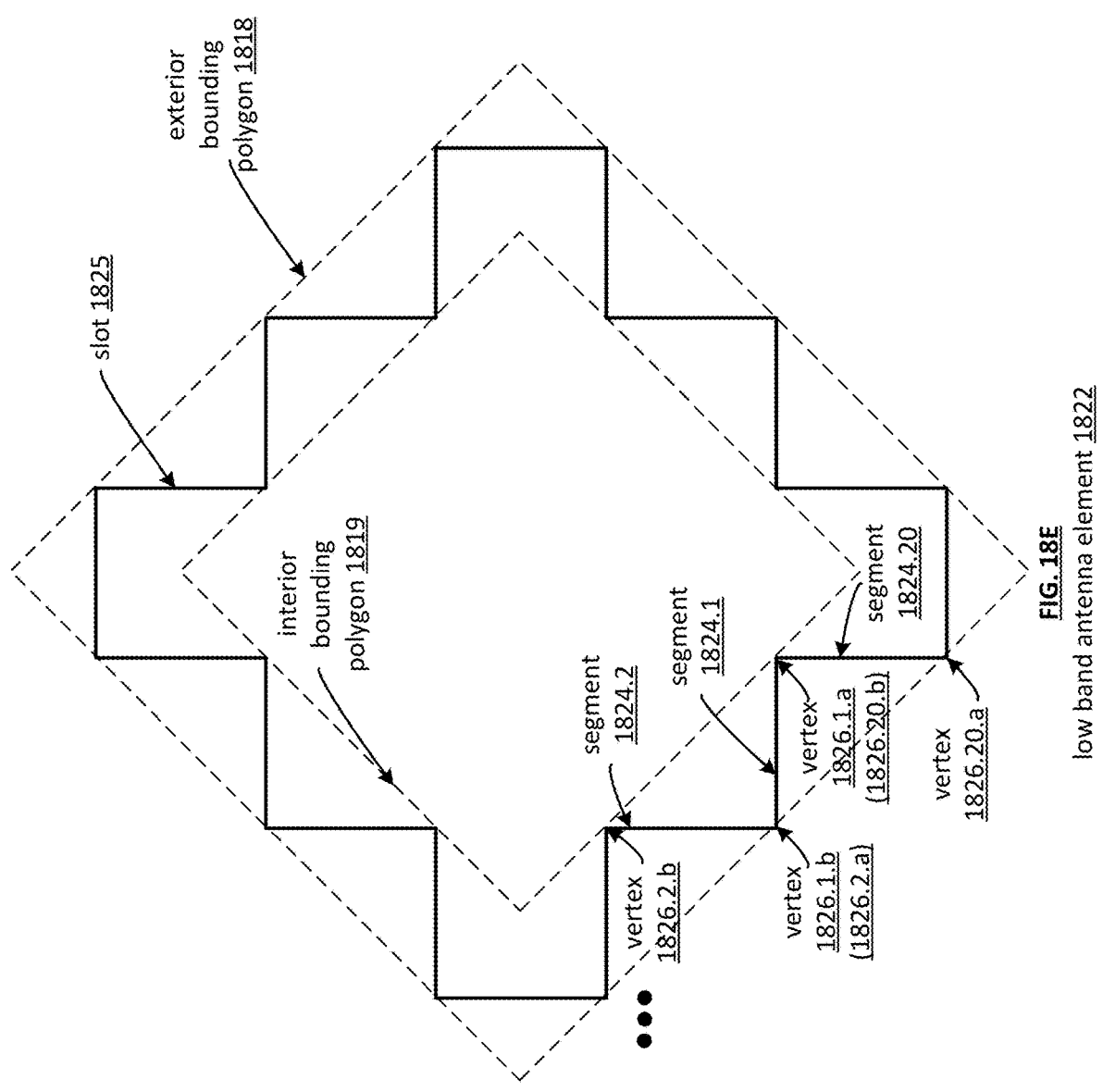
FIGS. 18E-18F illustrate example embodiments of a low band antenna element.
Figure 18F:
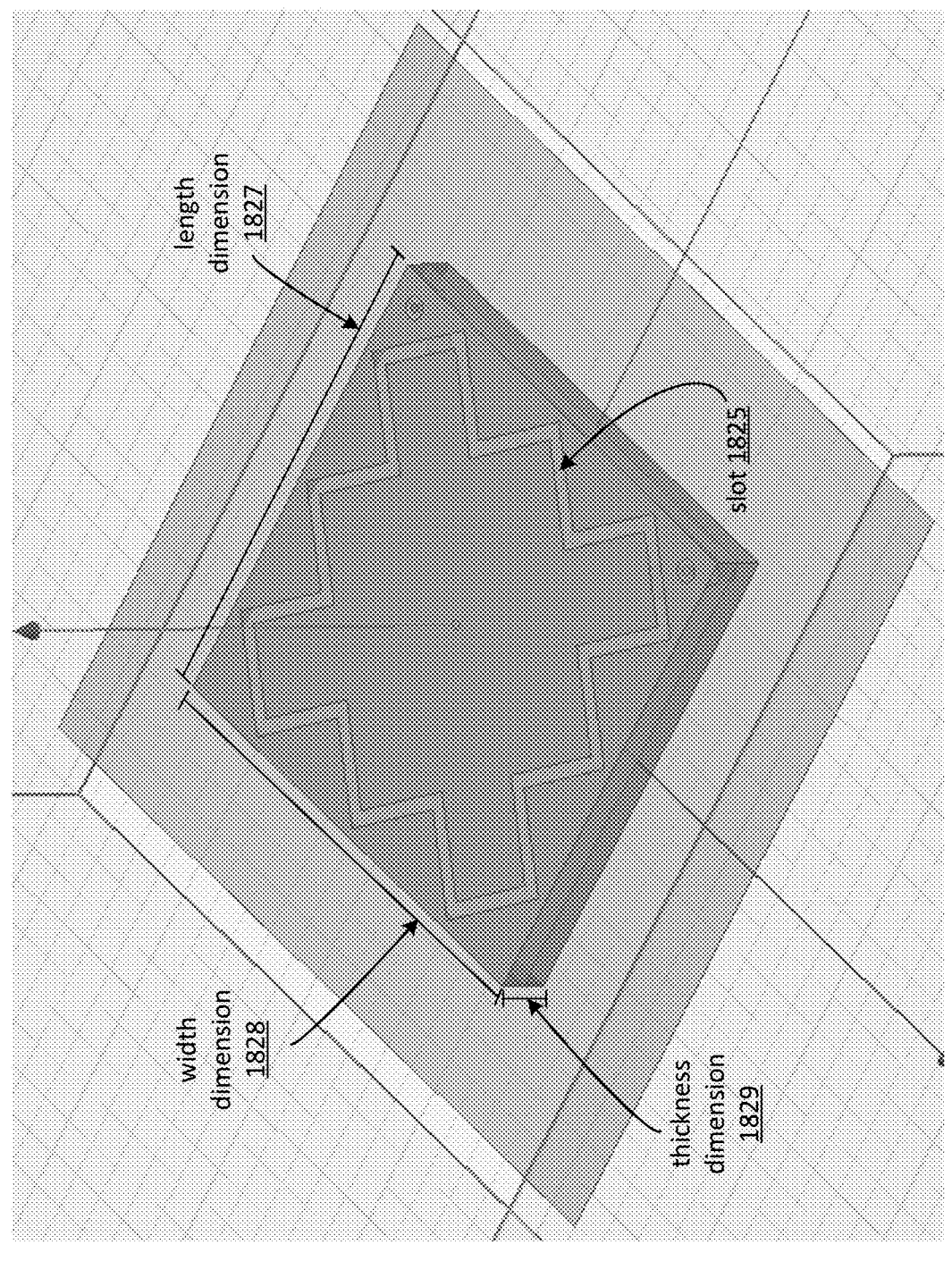
Figure 18G:
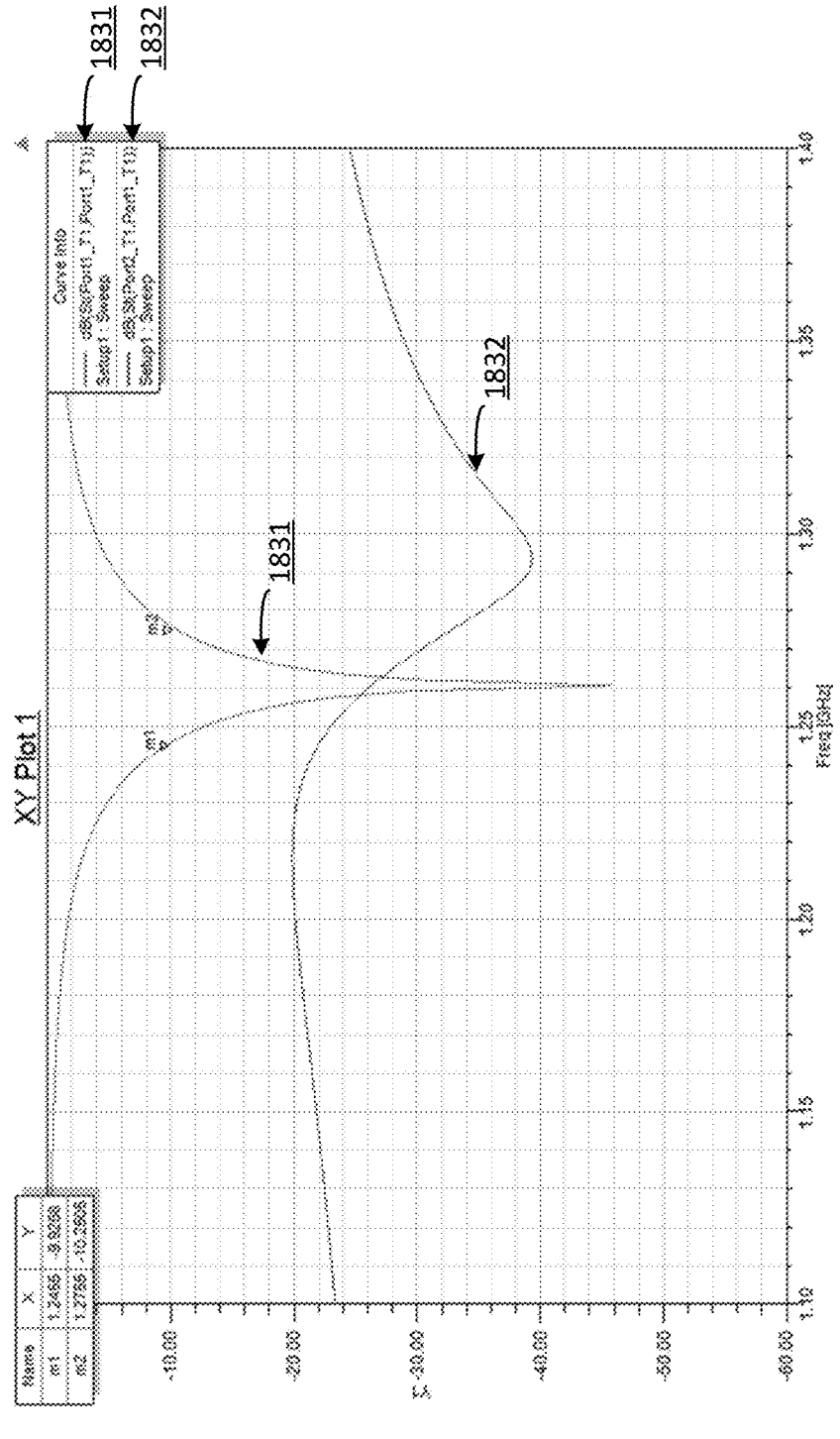
FIGS. 18G-18H illustrate example embodiments of the radiation pattern of a low band antenna element.
Figure 18H:
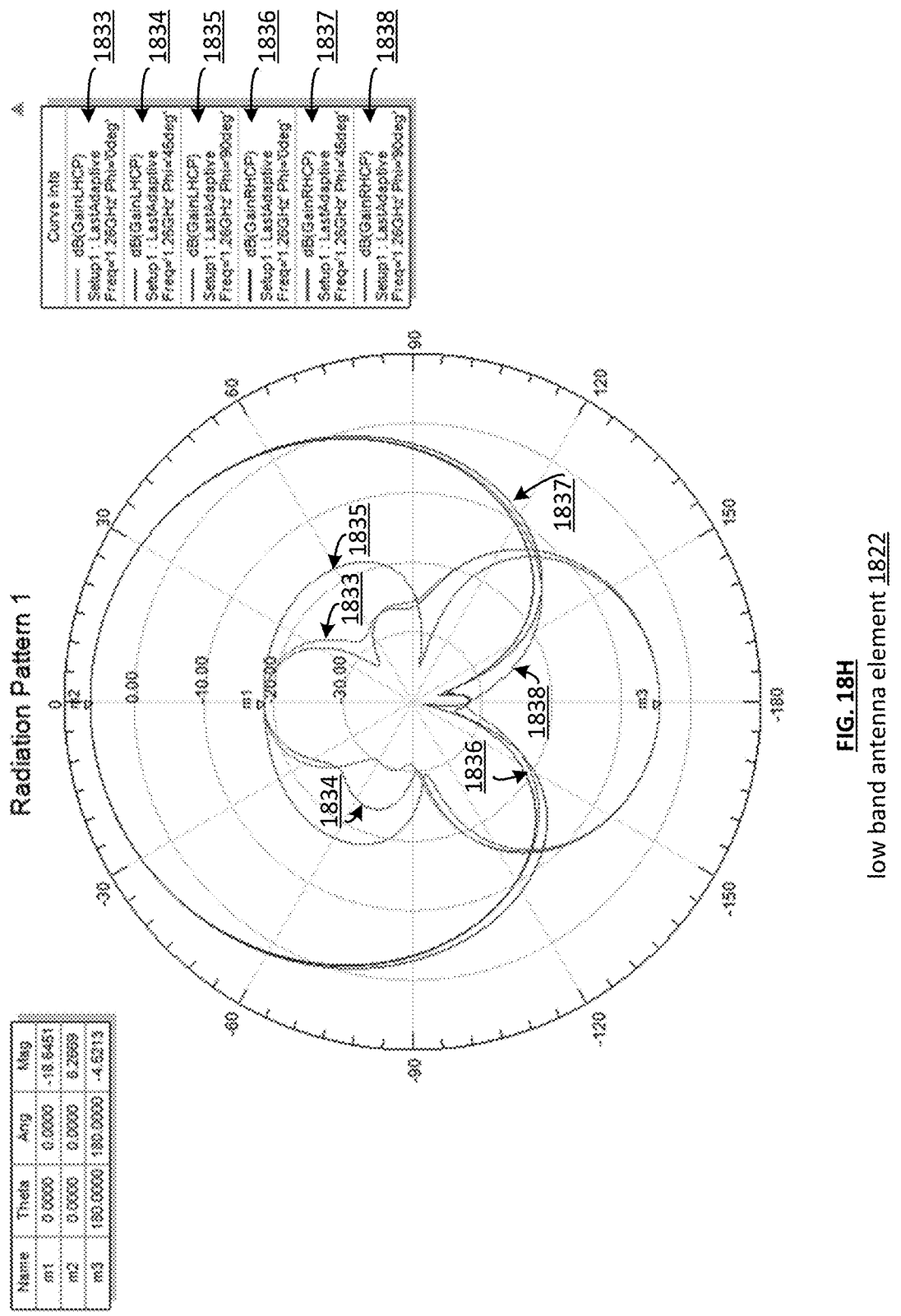
Figure 18I:
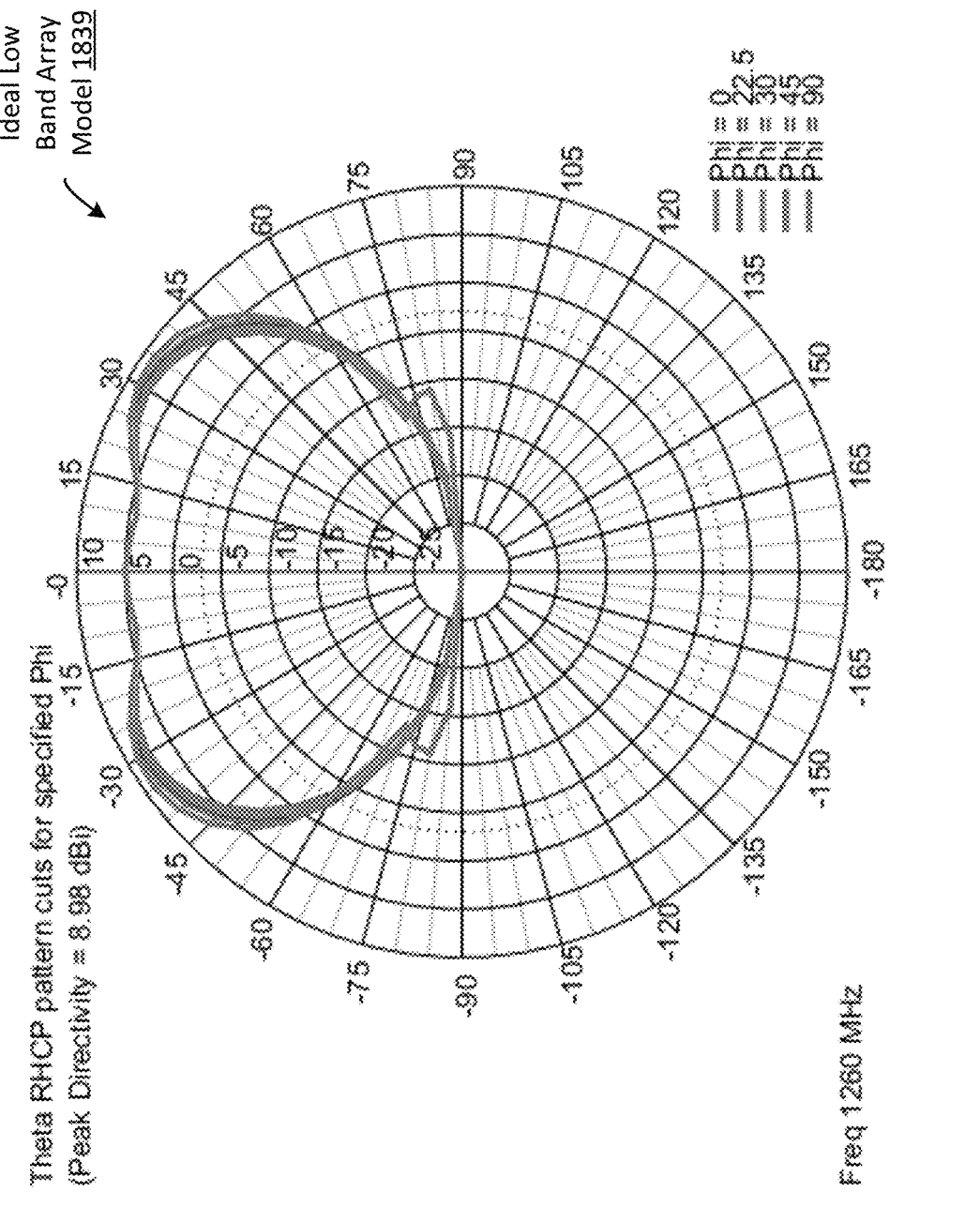
FIGS. 18I-18J illustrates example embodiments of the radiation pattern of a low band antenna array.
Figure 18J:
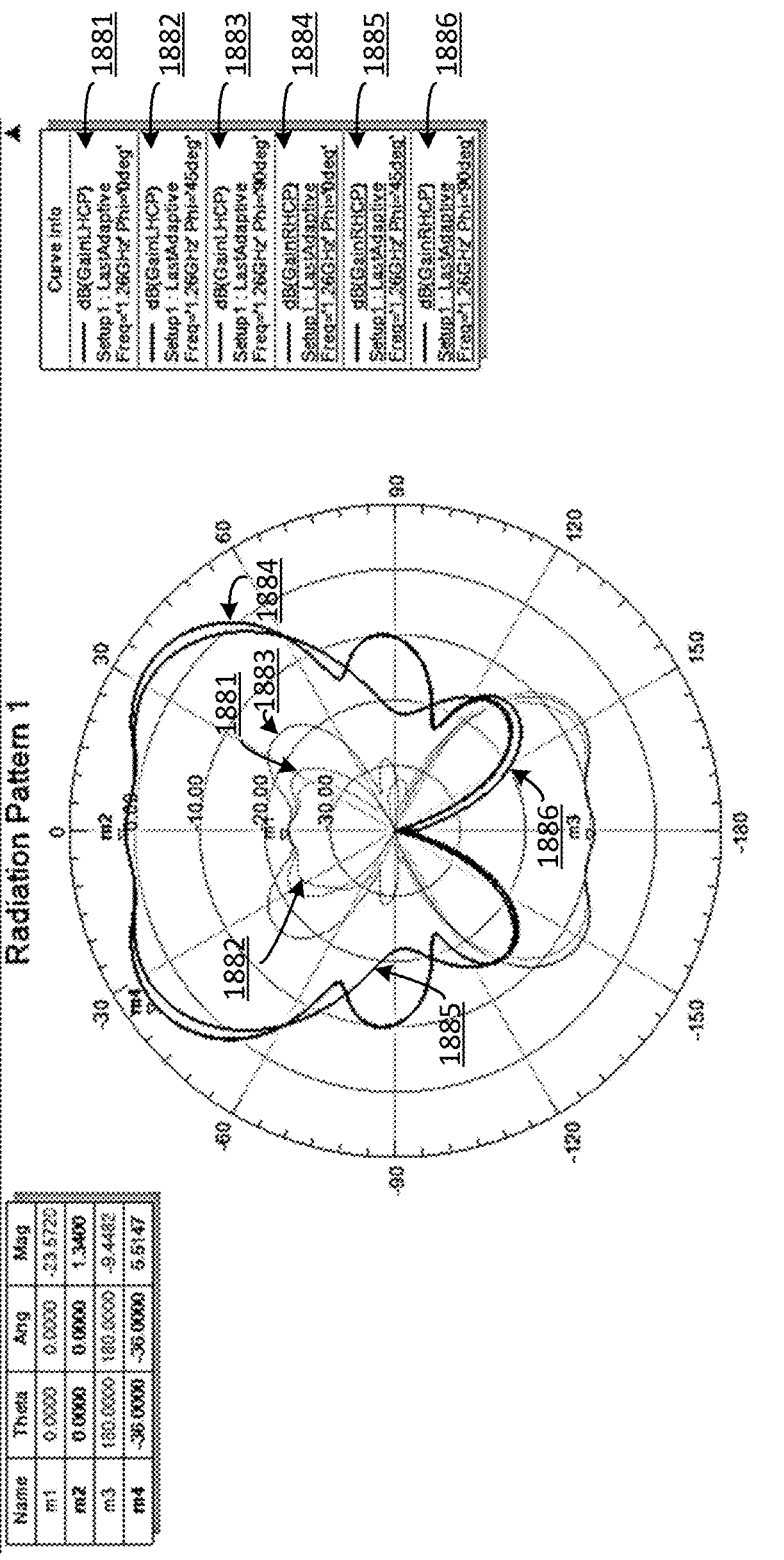
Figure 18K:
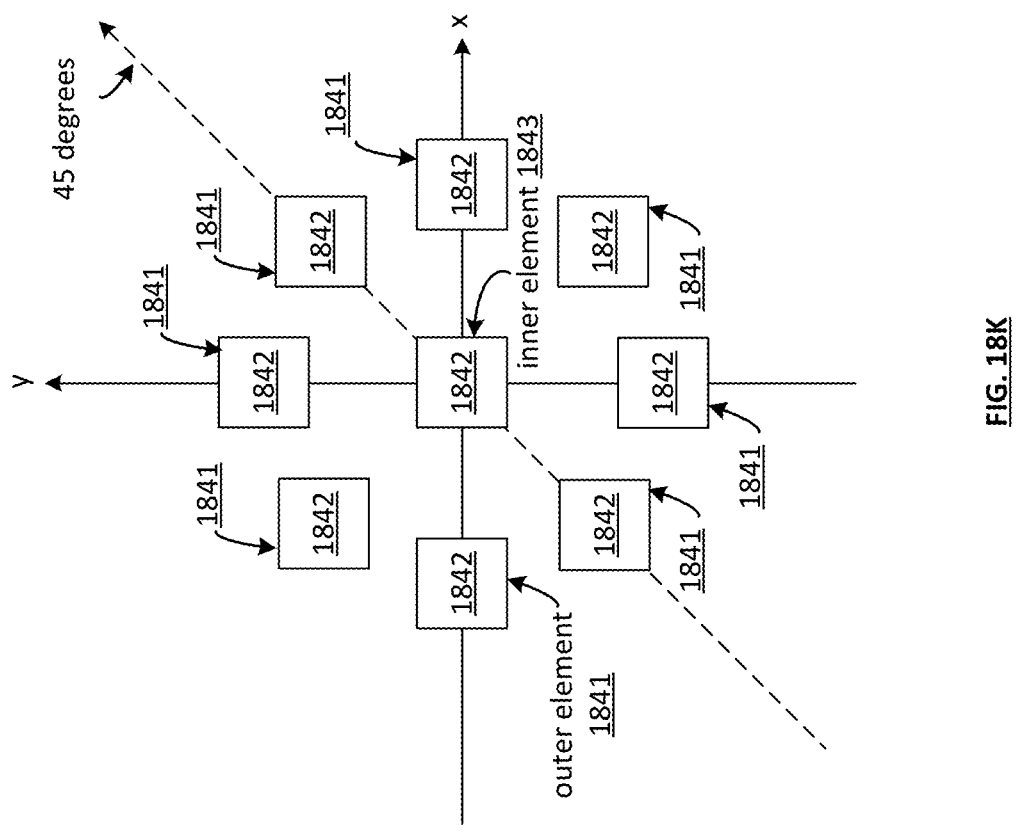
FIGS. 18K and 18L illustrate an example embodiment of a high band antenna array.
Figure 18L:
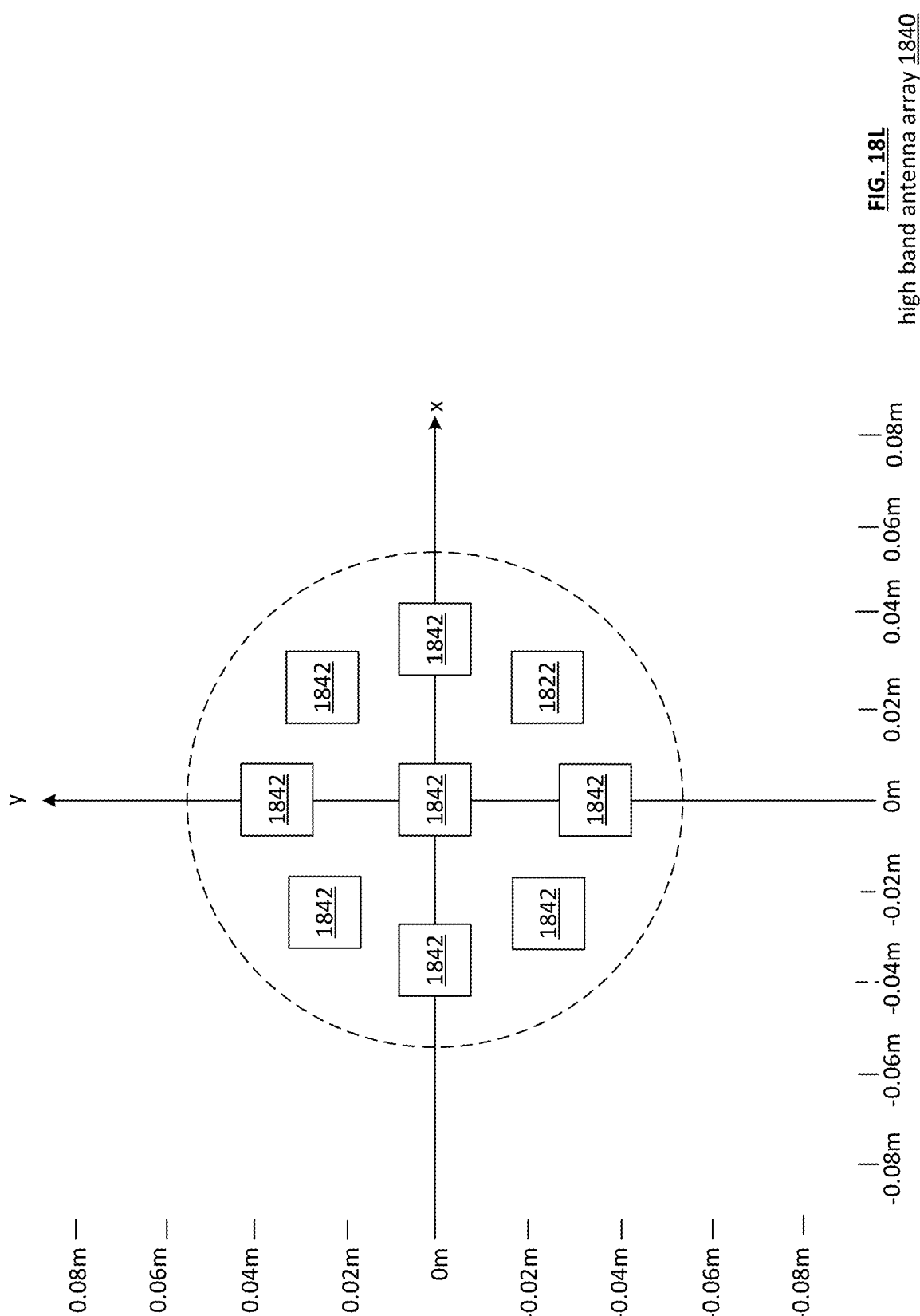
Figure 18M:
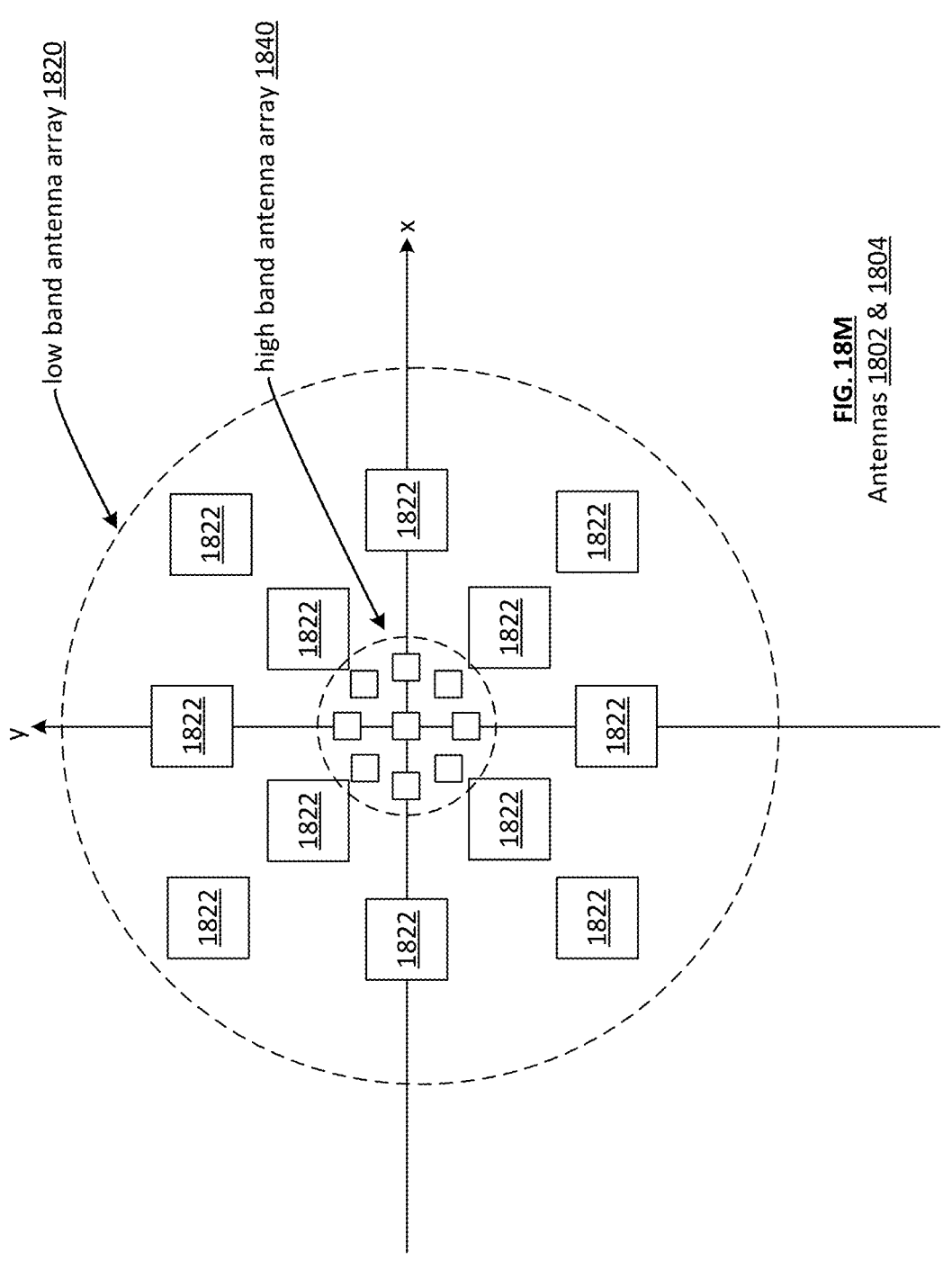
FIG. 18M illustrates an example embodiment of a high band antenna array physically nested within a low band antenna array.
Figure 18N:
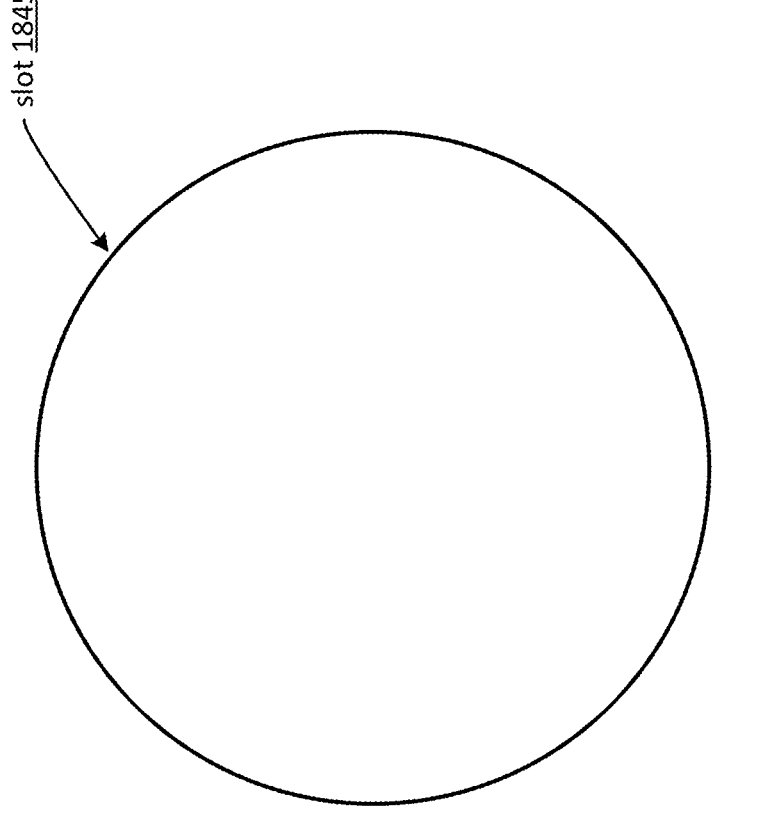
FIGS. 18N-18O illustrate example embodiments of a high band antenna element.
Figure 18O:
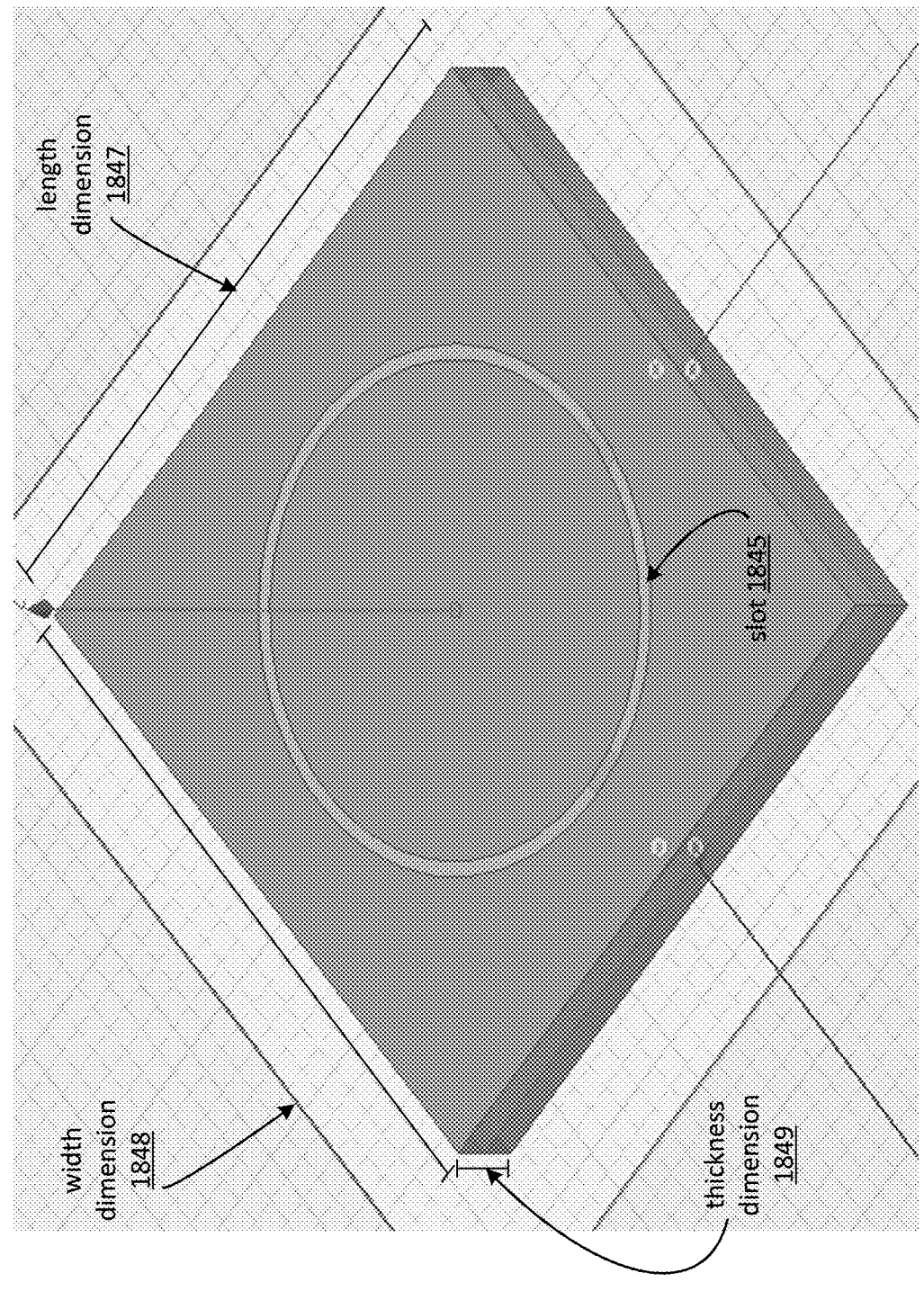
Figure 18P:
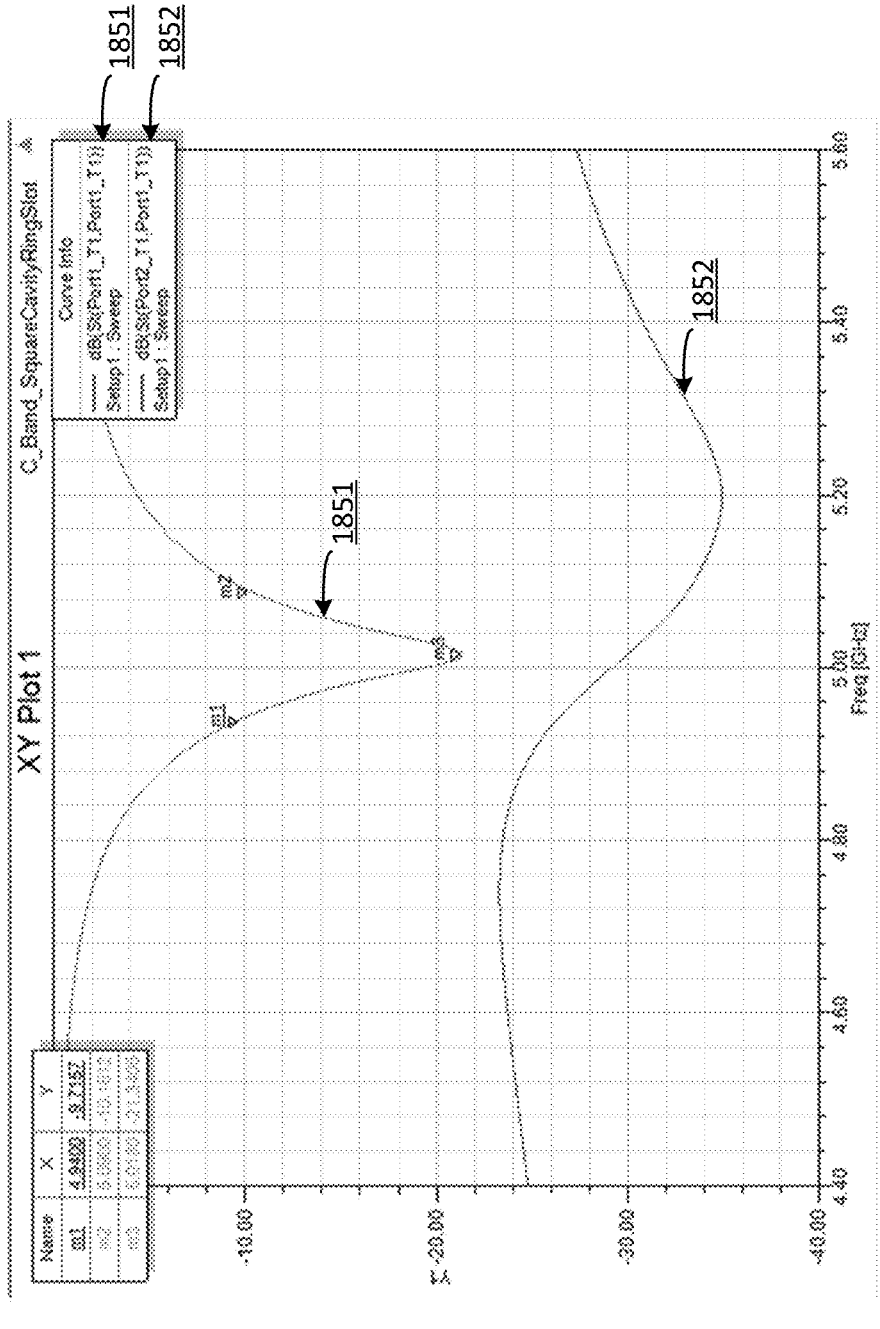
FIGS. 18P-18Q illustrates an example embodiments of the radiation pattern of a high band antenna element.
Figure 18Q:
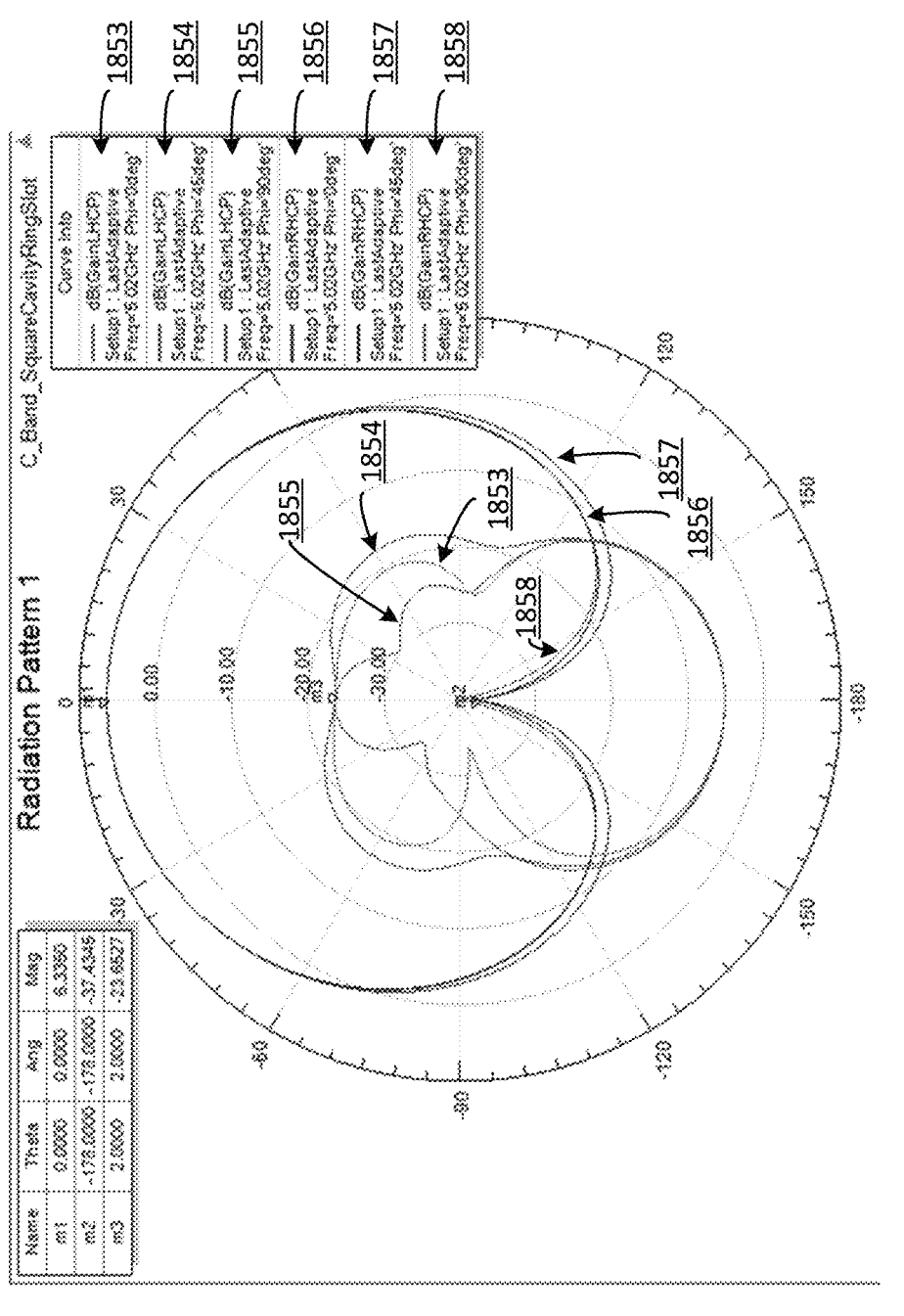
Figure 18R:
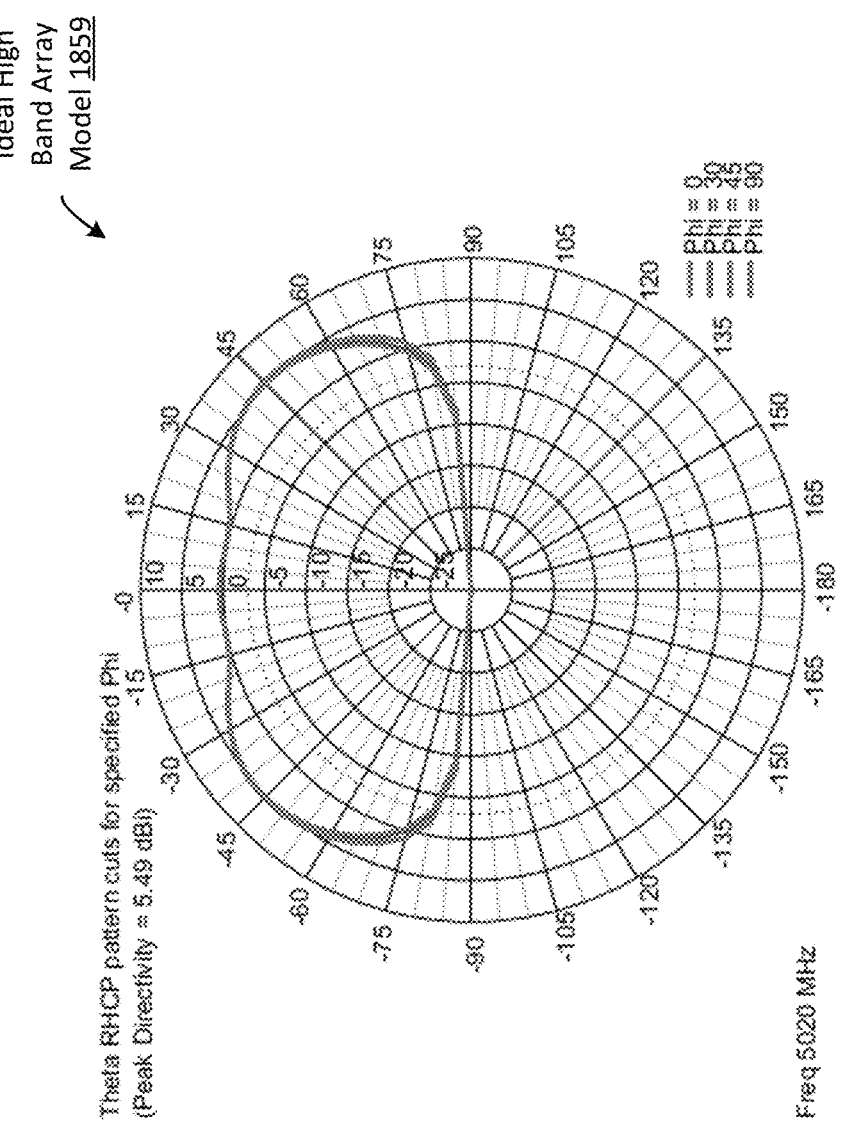
FIGS. 18R-18S illustrate example embodiments of the radiation pattern of a high band antenna array.
Figure 18S:
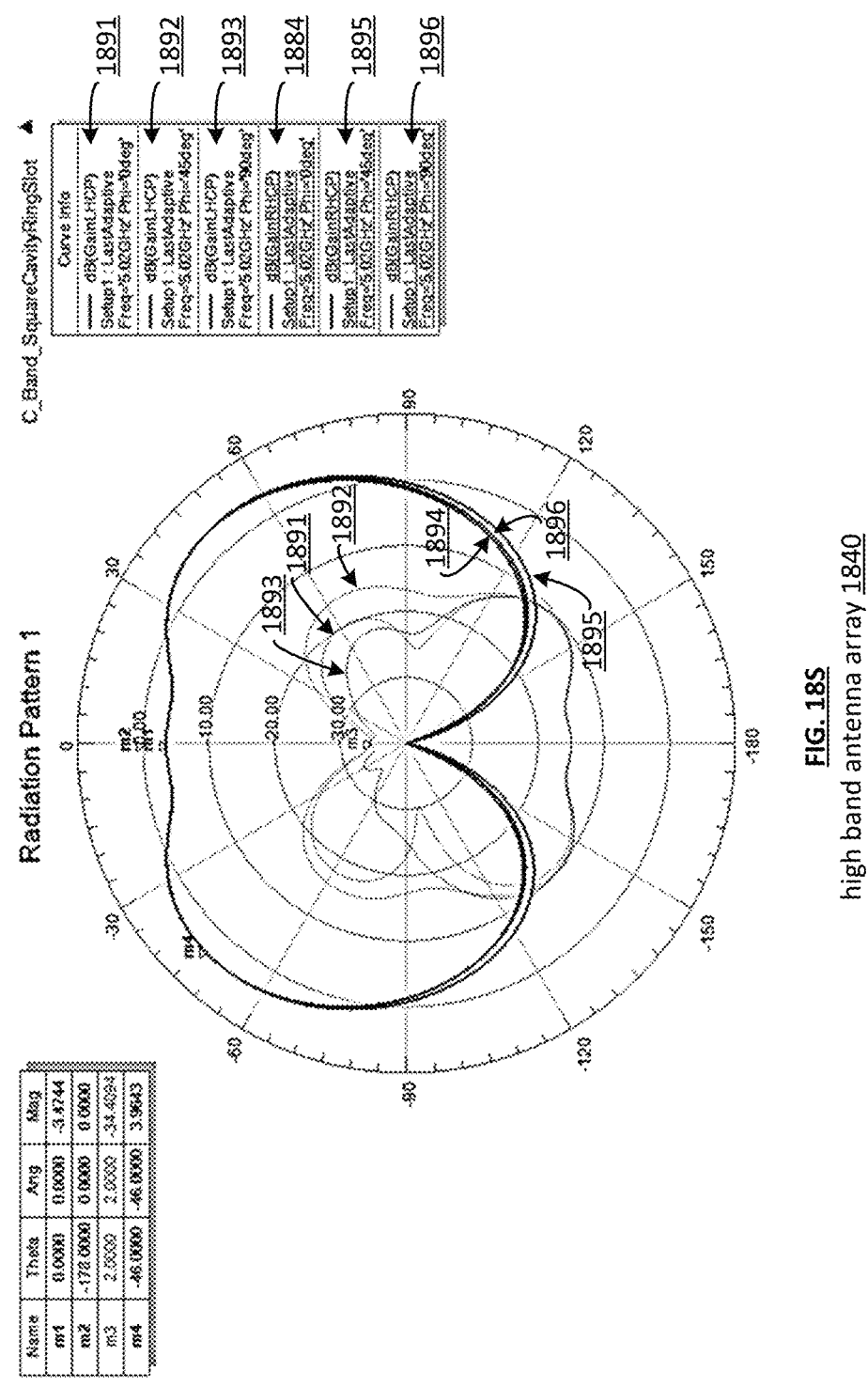
Figure 18T:
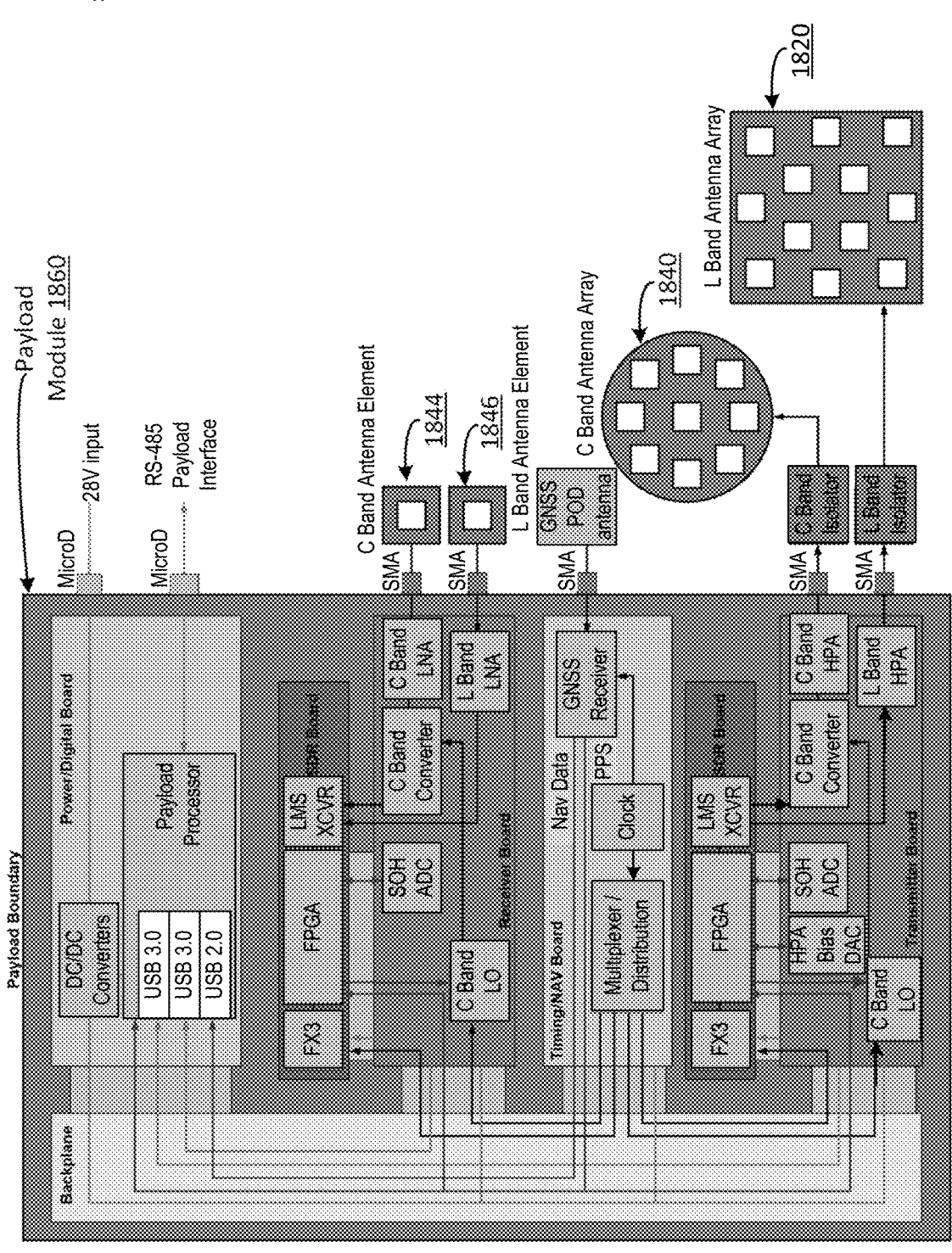
FIG. 18T is a schematic block diagram of an example embodiment of a navigation processing system that includes a low band antenna and a high band antenna.
Figure 18U:
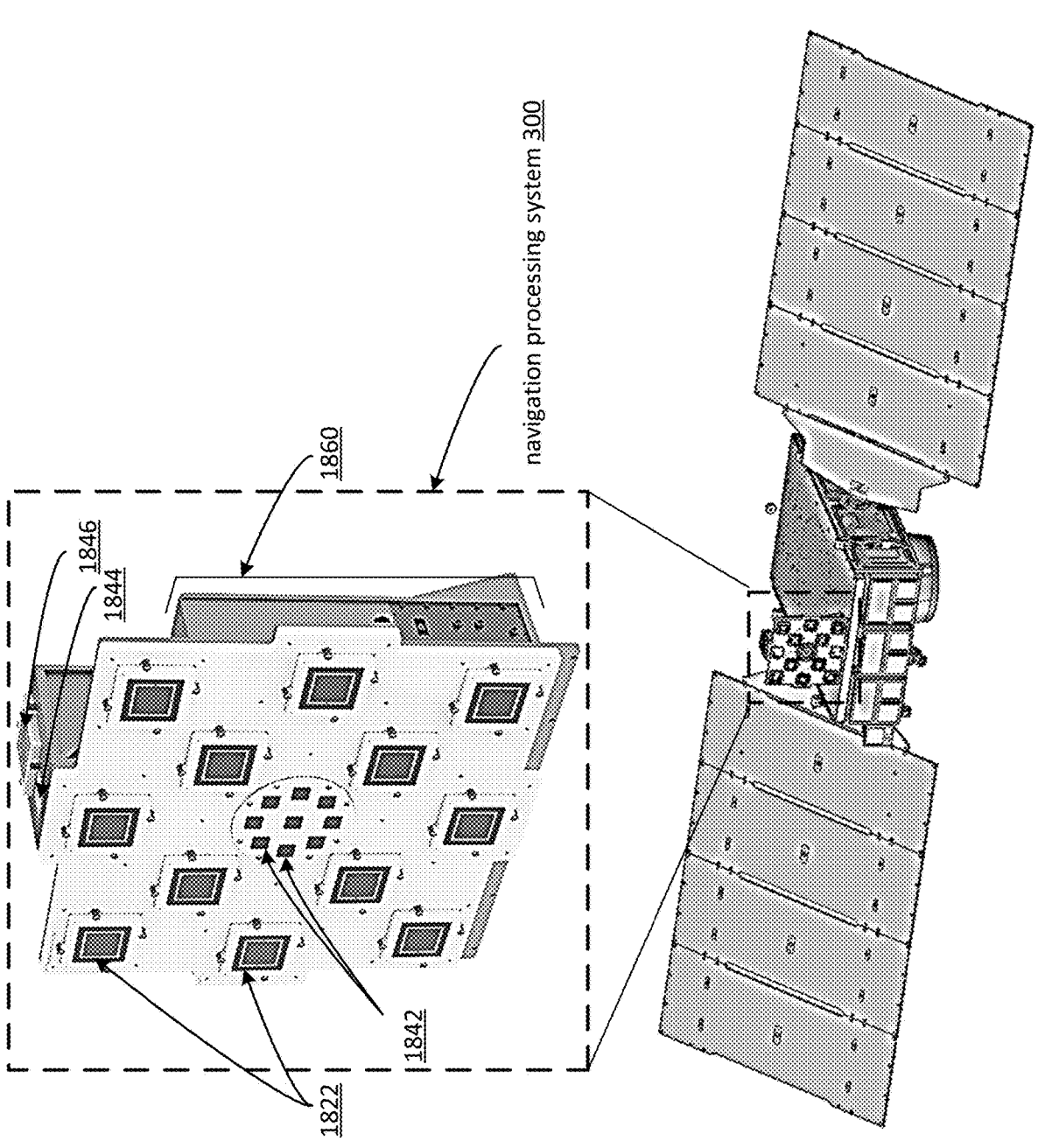
FIG. 18U illustrates an example embodiment of a satellite that includes a low band antenna and a high band antenna.

FIGS. 18A-18U illustrate example embodiments of antennas of navigation processing system 300 implemented to transmit navigation signal 240. In particular, a low band navigation signal 240.A can be transmitted via a low band antenna 1802, and a high band navigation signal 240.B can be transmitted via a high band antenna 1804. Some or all features and/or functionality described in conjunction with some or all of FIGS. 18A-18U can be utilized to implement one or more antennas of navigation signal transmitter 330, such as one or more antennas 1202.

The low band antenna 1802 and/or high band antenna 1804 can be implemented via a satellite 110 and/or any other node of satellite constellation system 100. The low band antenna 1802 and/or high band antenna 1804 can be implemented via a satellite of a GNSS constellation. The low band antenna 1802 and/or high band antenna 1804 can be implemented in conjunction with any other navigation system component and/or computing device operable to transmit navigation signals.

Some or all features and/or functionality of low band antenna 1802 and/or high band antenna of FIGS. 18A-18U can be implemented to transmit any embodiment of navigation signal 240 described herein. The navigation signal 240 radiated via of low band antenna 1802 and/or high band antenna can be an open navigation signal 240 and/or a secure navigation signal 240, such as a secure navigation signal 1740 of FIGS. 17A-17M in the low band and/or high band. The navigation signal 240 radiated via of low band antenna 1802 and/or high band antenna can be generated in accordance with some or all features and/or functionality described in conjunction with FIGS. 15A-16N. The navigation signal 240 radiated via of low band antenna 1802 and/or high band antenna can include some or all of the navigation data described herein, such as one or more navigation messages. For example, the navigation signal 240 radiated via of low band antenna 1802 and/or high band antenna can be generated based on implementing the state estimation flow of FIG. 5A, the navigation message generation flow of FIG. 5B, and/or the broadcast flow of FIG. 5C.

In some embodiments, some or all features and/or functionality of the low band antenna 1802 and/or high band antenna 1804 of FIGS. 18A-18U can optionally be implemented to receive signaling alternatively or in addition to transmission of signaling, such as navigations signals 240, GNSS signals, and/or inter-satellite communications. Alternatively or in addition, some or all features and/or functionality of the low band antenna 1802 and/or high band antenna 1804 of FIGS. 18A-18U can optionally be implemented to transmit and/or receive other signaling, such inter-satellite communications and/or other types of communication signals. For example, the low band antenna 1802 and/or high band antenna 1804 can be utilized to implement backhaul transceiver 340, inter-satellite link transceiver 345, satellite receiver 350, and/or GNSS receiver 360.

FIG. 18A illustrates an embodiment of navigation signal generation and transmission module 1230 that is operable to transmit navigation signal 240.A via low band antenna 1802 and navigation signal 240.B via high band antenna 1804. The navigation processing system 300 can otherwise be operable to generate navigation signals 240.A and 240.B for transmission via low band antenna 1802 and high band antenna 1804, respectively. Some or all features and/or functionality of the navigation processing system 300 of FIG. 18A can be utilized to implement any other embodiment of navigation processing system 300 described herein.

As a particular example, the navigation signal 240.A and/or navigation signal 240.B described herein can be in accordance with 1260 MHz and 5020 MHz frequencies, respectively. In such embodiments, the navigation signal 240.A and/or navigation signal 240.B can be optionally generated by the navigation signal generation and transmission module 1230 based on utilizing a reference frequency source of 10 MHz, or other integer factor of the frequencies of navigation signal 240.A and/or navigation signal 240.B. In such embodiments, the low band antenna 1802 can be configured to transmit a 1260 MHz navigation signal 240.A. In such embodiments, the high band antenna 1804 can be configured to transmit a 5020 MHz navigation signal 240.B. In other embodiments, the navigation signal 240.A and/or navigation signal 240.B can be in accordance with different frequencies, and the low band antenna 1802 and high band antenna 1804 can be configured to transmit signals with these different frequencies.

In other embodiments, the navigation signal 240.A is in accordance with a different frequency within the L band frequency band, and/or the navigation signal 240.B is in accordance with a different frequency within the C band frequency band. Alternatively, the navigation signal 240.A is in another frequency band that is different from the L band and/or the navigation signal 240.B is in another frequency band that is different from the C band. The navigation signal 240.A can otherwise have a lower frequency than navigation signal 240.B as discussed previously.

The navigation signal 240.A and/or navigation signal 240.B described herein can be right hand circularly polarized. In other embodiments, the navigation signal 240.A and/or navigation signal 240.B are left hand circularly polarized. The navigation signal 240.A and/or navigation signal 240.B described herein can be transmitted in accordance with a maximum angular offset from Nadir of plus or minus 13.8 degrees, or another maximum angular offset. The navigation signal 240.A and/or navigation signal 240.B described herein can be transmitted in accordance with a maximum ellipticity of 1.8 dB, or another predetermined maximum ellipticity. The navigation signal 240.A and/or navigation signal 240.B described herein can be configured in accordance with receiver reference bandwidths, for example, implemented by client devices 160 to receive and process the navigations signals 240.A and 240.B, of 20 MHz for navigations signal 240.A and/or of 10 MHz for navigations signal 240.B, or another predetermined receiver reference bandwidths.

Some or all features and/or functionality of low band antenna 1802 and/or high band antenna 1804 described herein can be selected and/or configured in accordance with transmission of a signal: at the given frequencies of the navigations signals 240.A and 240.B, in the given respective frequency bands such as the L band and the C band, with right hand circular polarization, with the predetermined maximum angular offset, with the predetermined the maximum ellipticity, and/or with the predetermined the receiver reference bandwidth. Differences in features and/or functionality of low band antenna 1802 and/or high band antenna 1804 as described herein can be based on the difference in frequency of navigations signals 240.A and 240.B and/or based on navigations signal 240.A having a lower frequency than navigation signal 240.B.

FIG. 18B illustrates an embodiment of a physical configuration of antennas 1802 and 1804, where low band antenna 1802 is implemented as a low band antenna array 1820, and where high band antenna 1804 is implemented as a high band antenna array 1840. As illustrated in FIG. 18B, the high band antenna array 1840 can be physically nested within and/or centered within the low band antenna array. Some or all features and/or functionality of the low band antenna 1802 of FIG. 18B and/or the high band antenna 1804 of FIG. 18B can be utilized to implement the low band antenna 1802 and/or the high band antenna 1804 of FIG. 18A, respectively, and/or any other embodiment of the low band antenna 1802 and/or high band antenna 1804 described herein. The low band antenna array 1820 and high band antenna array 1840 can be co-boresighted, for example, in accordance with different relative configurations. The low band antenna array 1820 and high band antenna array 1840 can otherwise be included within a given area of a same x-y plane, and/or within a given volume across different planes.

For example, the low band antenna array 1820 includes a first plurality of antenna elements on an x-y plane, denoted by the x axis and y axis, and the high band antenna array 1840 includes a second plurality of antenna elements on this plane, which are dispersed, for example, centrally, within the first plurality of antenna elements. A size and/or configuration of the first plurality of antenna elements of the low band antenna array 1820 on the x-y plane can be configured to accommodate the nesting of the second plurality of antenna elements on the x-y plane, for example, as discussed in conjunction with FIGS. 18C-18F. A size and/or configuration of the second plurality of antenna elements of the high band antenna array 1840 on the x-y plane can be configured to facilitate this nesting within the first plurality of antenna elements on the x-y plane, for example, as discussed in conjunction with FIGS. 18K-18O.

FIG. 18C illustrates an embodiment of the configuration of the plurality of antenna elements 1822 of the low band antenna array 1820 on the x-y plane. Some or all features and/or functionality of the low band antenna array 1820 of FIG. 18C can be utilized to implement the low band antenna 1802 of FIG. 18A, and/or any other embodiment of the low band antenna 1802 described herein.

The plurality of antenna elements 1822 can be planar and/or quasi planar. For example, as illustrated in FIG. 18C, the plurality of antenna elements 1822 of low band antenna array 1820 can all be flush with and/or contained upon a same plane, denoted by the x-y plane illustrated in FIG. 18C. The plurality of antenna elements 1822 can be in accordance with a same orientation and/or different orientations with respect to the x-y plane.

The plurality of antenna elements 1822 of low band antenna array 1820 can be configured in accordance with a "dual ring" array topology, such as the topology illustrated in FIG. 18C. The plurality of antenna elements 1822 of the low band antenna array 1820 can be in accordance with any other topology.

In some embodiments, the first plurality of antenna elements 1822 can include a set of outer elements 1821 and a set of inner elements 1823. For example, a first closed polygonal chain that intersects the centroid of each of the set of inner elements 1823 can be fully contained within a second closed polygonal chain that intersects the centroid of each of the set of outer elements 1821. A first polygon bounded by the first closed polygonal chain can have a same centroid as a second polygon bounded by the second closed polygonal chain.

The set of outer elements can include exactly eight outer elements 1821 as illustrated in the example of FIG. 18C, or any other number of antenna elements. The set of inner elements can include exactly four antenna elements 1823 as illustrated in the example of FIG. 18C, or any other number of antenna elements.

The configuration of antenna elements 1822 of the low band antenna array 1820 can be symmetrical about the y axis, the x axis, and/or each of two 45 degree axes, which are 45 degrees from the y axis and the x axis upon the x-y plane. In particular, the configuration illustrated in FIG. 18C exemplifies this symmetry.

The antenna elements 1822 of the low band antenna array 1820 can implement an isoflux pattern and/or power handling implied antenna array. The dual ring topology of FIG. 18C can be implemented in accordance with exact "power of two" power division. The dual ring topology of FIG. 18C can simplify a corresponding feeding network of the navigation processing system 300, for example, based on having the set of outer elements surrounding the set of inner elements.

A layout of the set of outer elements 1821 and/or the set of inner elements 1823 on the x-y plane can be configured based on allowing room for the nesting of the high band antenna array 1840. A layout of the set of outer elements 1821 and/or the set of inner elements 1823 the x-y plane can be configured based on optimizing location and/or phasing to achieve prescribed patterns, such as the radiation patterns of FIGS. 18I and/or 18J.

FIG. 18D illustrates example scale of the low band antenna array 1820. Some or all features and/or functionality of the low band antenna array 1820 of FIG. 18D can be utilized to implement the low band antenna 1802 of FIG. 18C, and/or any other embodiment of the low band antenna 1802 described herein.

As illustrated in FIG. 18D, the topology of the low band antenna array 1820 can be configured to contain all antenna elements 1822 within a specified square area on the x-y plane, such as a 400 mm by 400 mm area as illustrated in FIG. 18D, or another specified planar and/or quasi-planar area. Example scale of individual low band antenna elements 1822 is discussed in conjunction with FIG. 18E.

FIG. 18E illustrates an example of a low band antenna element 1822. Some or all features and/or functionality of the low band antenna element 1822 of FIG. 18E can be utilized to implement some or all antenna elements 1822 of any embodiment of the low band antenna 1802 described herein, such as some or all antenna elements 1822 in a same or similar topology as of the low band antenna array 1820 of FIG. 18C.

A low band antenna element 1822 can be implemented as a slotted antenna element having a slot 1825. Slot 1825 can be dual coaxial fed, stripline coupled, and/or cavity backed. The low band antenna element 1822 can be configured to include slot 1825 based on the corresponding cavity reducing dependence on ground plane size, reducing cross coupling between elements 1822, having favorably polarization purity, and/or having a high radiation efficiency. The slot 1825 can be either edge plated for discrete elements or formed from plated vias for an integrated array.

For example, the low band antenna element 1822 is implemented via a slot 1825 rather than a patch antenna based on a patch antenna inducing dimensions that compare unfavorably to dimension requirements of each low band antenna element 1822 and/or the antenna array 1820 as a whole. As a particular example, each low band antenna element 1822 can be configured to fit within a footprint, such as a 70 mm×70 mm footprint, that is based on the total footprint of the antenna array 1820 and the corresponding number of configuration of low band antenna elements 1822, such as the 400 mm×400 mm footprint of low band antenna array 1820 discussed in conjunction with FIG. 18D. However, an ideal patch antenna is half the free space wavelength, which is 119 mm for the example frequency of 1260 MHz of navigation signal 240.A, which can be too large for a 400 mm×400 mm low band antenna array 1820 that includes twelve antenna elements, for example, in a same and/or different configuration from FIG. 18C. Configuration of low band antenna elements 1822 as non-patch antenna elements and/or as having slots 1825 can be based on a determining that half the free space wavelength of the frequency of navigation signal 240.A compares unfavorably to an area requirement for the footprint of each low band antenna elements 1822, and/or compares unfavorably to a total footprint of antenna array 1820 having a threshold number and/or given configuration of antenna elements 1822.

The slot 1825 can have an annular "zig zag" slot shape, for example, as depicted in FIG. 18E. For example, the slot shape is selected based on a having a favorable ratio of perimeter of the annular shape to area of the annular shape, for example, that exceeds a corresponding perimeter to area ratio threshold. In some embodiments, the slot 1825 is implemented via the "zig zag" slot shape of FIG. 18E rather than a circular ring shape based on the "zig zag" slot shape having a more favorable perimeter to area ratio than the circular ring shape. This can be ideal to implement antenna elements 1822 via smaller physical dimensions, for example, as necessitated by a maximum size and/or weight of antenna 1802 for inclusion on a satellite 110, while inducing favorable radiation patterns. The low band antenna element 1822 can optionally have a slot 1825 in accordance with a circular ring and/or other different type of annular shape.

In various embodiments, the slot shape of slot 1825 can include a plurality of segments 1824 connected via a plurality of vertices 1826 as a closed polygonal chain bounding a simple concave polygon. As illustrated in FIG. 18E, the plurality of segments have equivalent lengths. In other embodiments, different segments 1824 can have different lengths.

As illustrated in FIG. 18E, the plurality of segments can include exactly 20 distinct segments connected at vertices with non-zero angles and/or non-180 degree angles. The plurality of segments can optionally include a different number of distinct segments connected at vertices with non-zero angles and/or non-180 degree angles.

In various embodiments, each of a plurality of interior angles of the concave polygon at the plurality of vertices 1826 can have either a first angle measure or a second angle measure. The first angle measure and the second angle measures can be exemplary angle measures. For example, as illustrated in FIG. 18E, the first angle measure can be 90 degrees and the second angle measure can be 270 degrees. In other embodiments, the two angle measures can be different from 90 and 270 degrees. In other embodiments, the plurality of interior angles of the concave polygon can include more than two different angle measures.

In various embodiments, a first subset of segments have endpoints at each of two vertices having the first angle measure, and a second subset of segments have one endpoints at one vertex having the first angle measure, and another endpoint at another vertex having the second angle measure. The first subset of segments and the second subset of segments can be mutually exclusive and/or collectively exhaustive with respect to the plurality of segments 1824 of the polygonal chain. As illustrated in the example of FIG. 18E, exactly four segments of the closed polygonal chain can be included in the first subset of segments. In other embodiments, different numbers of segments can be included in the first subset of segments and the second subset of segments.

The slot shape can be bounded by an exterior bounding polygon 1818 and/or an interior bounding polygon 1819. In various embodiments, a first subset of the plurality of vertices 1826 fall upon a perimeter of a first bounding polygon 1818, and a second subset of the plurality of vertices 1826 fall upon a perimeter of a second bounding polygon 1819. The second polygon 1819 can be within the first polygon 1818. The second polygon 1819 and the first polygon 1818 can optionally share a same centroid, for example, as illustrated in FIG. 18E. The first polygon 1818 and second polygon 1819 can be concentric regular polygons, such as concentric squares as illustrated in FIG. 18E.

FIG. 18F illustrates an embodiment of a low band antenna element 1822 that includes a slot element having the slot shape discussed in conjunction with FIG. 18E. Some or all features and/or functionality of the low band antenna element 1822 of FIG. 18F can be utilized to implement some or all antenna elements 1822 of any embodiment of the low band antenna 1802 described herein, such as some or all antenna elements 1822 in a same or similar topology as of the low band antenna array 1820 of FIG. 18C.

The low band antenna element 1822 can have a length dimension 1827 and width dimension 1828, for example, with respect to the x-axis and y-axis of the x-y plane of FIG. 18C and/or 18D. The length dimension 1827 can be the same as or different from the width dimension. In some embodiments, the length dimension 1827 and width dimension 1828 are each equivalent to and/or similar to 66 mm, and/or are less than 0.1 meters.

For example, the spacing of low band antenna elements 1822 at the scale illustrated in FIG. 18D is configured based on the length dimension 1827 and width dimension 1828 of each low band antenna element 1822. The total area spanned by the low band antenna array 1820, for example, as illustrated in FIG. 18D, can be configured based on a minimum length dimension 1827 and/or minimum width dimension 1828 of each low band antenna element 1822, for example, required to induce desired radiation patterns. The length dimension 1827 and width dimension 1828 can be configured based on a total maximum area spanned by the low band antenna array 1820 and/or minimum spacing between array elements, for example, required to induce desired radiation patterns and/or required to meet maximum weight requirements of a corresponding satellite payload.

Other embodiments of low band antenna element 1822 can have different length and/or width dimensions. Other embodiment of low band antenna element 1822 can be non-square and/or non-rectangular with respect to the x-y axis.

The low band antenna element 1822 can have a thickness dimension 1829, for example, with respect to a z-axis orthogonal to x-y plane. In some embodiments, the thickness dimension is equivalent to and/or similar to 7.62 mm, and/or is less than 10 mm. The thickness dimension 1829 can be configured to accommodate slot 1825. Other embodiments of low band antenna element 1822 can have different thickness.

The low band antenna element 1822 can be implemented via a single lamination and/or plating construction. The low band antenna element 1822 can be implemented via EPIG (electroless palladium immersion gold) plating, for example, to mitigate passive intermodulation (PIM) and/or loss based on eliminating nickel. Shorting of the low band antenna element 1822 can be implemented via in center to ground floating metal.

The low band antenna element 1822 can have a weight of roughly 60 grams, for example, based on the dimensions and/or selected materials. A total weight of the low band antenna array 1820 can compare favorably to a maximum weight requirement, such as a 750 g weight requirement for the low band antenna 1802 and the high band antenna 1804, for example, based on a configured weight of low band antenna element 1822 and/or based on a configured number of low band antenna elements 1822 in low band antenna array 1820.

In some embodiments, the low band antenna element 1822 can be dual quadrature fed, for example, to generate high quality RHCP with wide axial ratio bandwidth.

Some or all features of low band antenna element 1822 of FIGS. 18E-18F, such as the slot shape, dimensions, and/or plating, can be configured to induce bandwidth comparing favorably to a bandwidth requirement, to induce a favorable cross polarization, such as greater than 20 dB cross polarization, to induce favorable directivity, such as 6 dB directivity, to induce favorable radiation efficiency, such as 93% radiation efficiency, and/or to induce other favorable characteristics.

The low band antenna element 1822 can otherwise be implemented to induce favorable radiation patterns, such as the radiation patterns illustrated in FIGS. 18G and/or 18H. FIG. 18G illustrates a first S-parameter curve 1831 and second S-parameter curve 1832 of an example plot indicating radiation pattern induced by a low band antenna element 1822 having some or all of the features and/or functionality described in conjunction with FIGS. 18E and/or 18F. FIG. 18H illustrates curves 1833, 1834, and 1835 for Left Hand Circular Polarization (LHCP) at varying values of phi, and curves 1836, 1837, and 1838 for Right Hand Circular Polarization (RHCP) for varying values of phi, for example, as angles with respect to the x-axis of the x-y plot.

Some or all features of individual low band antenna elements 1822 such as the slot shape, dimensions, and/or plating discussed in conjunction with FIGS. 18E-18F, and/or some or all features the low band antenna array 1820 of these antenna elements, such as its number of antenna elements and/or layout of these antenna elements, can be configured to produce RHCP radiation, to have an impedance bandwidth comparing favorably to a threshold impedance bandwidth such as an impedance bandwidth of 20 MHz, and/or to induce an isoflux radiation pattern by low band antenna 1802 for a given altitude range, such as 500-600 km altitude or other LEO altitude, for example, based on being implemented by satellites 110 implementing low band antenna 1802 in LEO orbit.

The low band antenna array 1820 can otherwise be implemented to induce favorable radiation patterns for the low band antenna 1802, for example, based on a configured number of and/or configuration of antenna elements 1822 in low band antenna array 1820 as described in conjunction with FIG. 18C and/or 18D, and/or based on configured characteristics of each antenna element 1822 described in conjunction with FIGS. 18E and/or 18F. The radiation pattern of FIG. 18I can correspond to an ideal radiation pattern for transmission of navigation signals 240.A. The radiation pattern of FIG. 18J can correspond to a radiation pattern induced via implementing low band antenna 1802 via an array of multiple antenna elements 1822 of FIGS. 18E and/or 18F, for example in the topology of FIGS. 18C and/or 18D. FIG. 18J illustrates curves 1881, 1882, and 1883 for Left Hand Circular Polarization (LHCP) at varying values of phi, and curves 1884, 1885, and 1886 for Right Hand Circular Polarization (RHCP) for varying values of phi, for example, as angles with respect to the x-axis of the x-y plot.

FIG. 18K illustrates an embodiment of the configuration of the plurality of antenna elements 1842 of the high band antenna array 1840 on the x-y plane. Some or all features and/or functionality of the high band antenna array 1840 of FIG. 18K can be utilized to implement the high band antenna 1804 of FIG. 18A, and/or any other embodiment of the high band antenna 1804 described herein.

The plurality of antenna elements 1842 can be planar and/or quasi planar. For example, as illustrated in FIG. 18K, the plurality of antenna elements 1842 of high band antenna array 1840 can all be flush with and/or contained upon a same plane, denoted by the x-y plane illustrated in FIG. 18K. The plurality of antenna elements 1842 can be in accordance with a same orientation and/or different orientations with respect to the x-y plane.

The plurality of antenna elements 1842 of high band antenna array 1840 can be configured in accordance with a "center and ring" array topology, such as the topology illustrated in FIG. 18K. The plurality of antenna elements 1842 of the high band antenna array 1840 can be in accordance with any other topology.

In some embodiments, the second plurality of antenna elements 1842 can include a set of outer elements 1841 and a single inner element 1843. For example, centroid of inner elements 1843 can be fully contained within a closed polygonal chain that intersects the centroid of each of the set of outer elements 1822. A centroid of a polygon bounded by this closed polygonal chain can have a same centroid as the centroid of the inner element 1843, as illustrated in FIG. 18K.

The outer elements 1841 can be in accordance with a ring shape, for example, where a circle intersects the centroid of each of the outer elements 1841. The centroids of the set of outer elements 1841 can be equally spaced with respect to this circle.

The set of outer elements can include exactly eight outer elements 1841 as illustrated in the example of FIG. 18K, or any other number of antenna elements. The set of inner elements can include exactly one inner element 1843 as illustrated in the example of FIG. 18C, or any other number of antenna elements.

The configuration of antenna elements 1842 of the high band antenna array 1840 can be symmetrical about the y axis, the x axis, and/or each of two 45 degree axes, which are 45 degrees from the y axis and the x axis upon the x-y plane. In particular, the configuration illustrated in FIG. 18K exemplifies this symmetry.

The antenna elements 1822 of the low band antenna array 1820 can implement an isoflux pattern and/or power handling implied antenna array. The center and ring topology of FIG. 18C can be implemented in accordance with exact "power of two" power division.

A layout of the set of outer elements 1841 and/or the inner element 1843 on the x-y plane can be configured based on enabling nesting within the low band antenna array 1820. A layout of the set of outer elements 1841 and/or the element 1843 the x-y plane can be configured based on optimizing location and/or phasing to achieve prescribed patterns, such as the radiation patterns of FIGS. 18R and/or 18S.

FIG. 18L illustrates an example scale of the high band antenna array 1840. Some or all features and/or functionality of the high band antenna array 1840 of FIG. 18L can be utilized to implement the highband antenna 1804 of FIG. 18A, and/or any other embodiment of the high band antenna 1804 described herein.

As illustrated in FIG. 18L, the topology of the high band antenna array 1840 can be configured to contain all antenna elements 1842 within a specified circular area on the x-y plane, such as within a circle having a 110 mm diameter as illustrated in FIG. 18L, or another specified planar and/or quasi-planar area. Example scale of individual high band antenna elements 1842 is discussed in conjunction with FIG. 18O.

FIG. 18M illustrates example scale of high band antenna array 1840 and low band antenna array 1820. Some or all features and/or functionality of the high band antenna array 1840 and low band antenna array 1820 of FIG. 18M can be utilized to implement the high band antenna 1804 and low band antenna 1802, respectively, of FIG. 18A, and/or any other embodiment of the high band antenna 1804 and low band antenna 1802 described herein.

The layout and scale of the low band antenna array 1820 of FIG. 18D and the layout and scale of the high band antenna array 1840 with the of FIG. 18L enables nesting of the high band antenna array 1840 of FIG. 18L within the low band antenna array 1820, as illustrated in FIG. 18M. The low band antenna array 1820 can otherwise be co-boresight with and/or co-planar with the high band antenna array 1840. The configuration of low band antenna array and high band antenna array can be in accordance with a total area footprint requirement, such as a total footprint of 400 mm×400 mm.

A first centroid of the low band antenna array 1820 can correspond the center of the low band antenna array 1820, such as an x,y coordinate of x-y plane corresponding to the average and/or central x,y coordinate across all centroid x,y coordinates of the plurality of low band antenna elements 1822. A second centroid of the high band antenna array 1840 can correspond the center of the high band antenna array 1840, such as an x,y coordinate of x-y plane corresponding to the average and/or central x,y coordinate across all centroid x,y coordinates of the plurality of high band antenna elements 1842. The first centroid can be the same as the second centroid. The low band antenna array 1820 and high band antenna array can otherwise have common centroids, and/or the high band antenna array 1840 can be concentrically contained within a footprint of the low band antenna array 1820.

FIG. 18N illustrates an example of a high band antenna element 1842. Some or all features and/or functionality of the high band antenna element 1842 of FIG. 18N can be utilized to implement some or all antenna elements 1842 of any embodiment of the high band antenna 1804 described herein, such as some or all antenna elements 1842 in a same or similar topology as of the high band antenna array 1840 of FIG. 18K.

A high band antenna element 1842 can be implemented as a slotted antenna element having a slot 1845. Slot 1845 can be dual coaxial fed, stripline coupled, and/or cavity backed. The high band antenna element 1842 can be configured to include slot 1845 based on the corresponding cavity reducing dependence on ground plane size, reducing cross coupling between elements 1842, having favorably polarization purity, and/or having a high radiation efficiency. The slot 1845 can be either edge plated for discrete elements or formed from plated vias for an integrated array.

For example, the high band antenna element 1842 is implemented via a slot 1845 rather than a patch antenna based on a patch antenna inducing dimensions that compare unfavorably to dimension requirements of each high band antenna element 1842 and/or the antenna array 1840 as a whole. As a particular example, each high band antenna element 1842 can be configured to fit within a footprint, such as a 25 mm×25 mm footprint, that is based on the total footprint of the high band antenna array 1840, the corresponding number of configuration of high band antenna elements 1842, and/or the space within the low band antenna array 1820 to fit the high band antenna array as a nested antenna array. However, an ideal patch antenna is half the free space wavelength, which is 30 mm for the example frequency of 5020 MHz of navigation signal 240.B, which can be too large for a 110 mm diameter high band antenna array 1840 that includes nine antenna elements, for example, in a same and/or different configuration from FIG. 18K.

Configuration of high band antenna elements 1842 as non-patch antenna elements and/or as having slots 1845 can be based on a determining that half the free space wavelength of the frequency of navigation signal 240.B compares unfavorably to an area requirement for the footprint of each high band antenna element 1842, and/or compares unfavorably to a total footprint of high band antenna array 1840 having a threshold number and/or given configuration of antenna elements 1842.

The slot 1845 can have an annular ring slot shape, for example, as depicted in FIG. 18N. For example, the slot shape is selected based on a having a favorable ratio of perimeter of the annular shape to area of the annular shape, for example, that exceeds a corresponding perimeter to area ratio threshold. In some embodiments, the slot 1845 circular ring shape based on the circular ring slot shape having a sufficiently favorable perimeter to area ratio. In other embodiments, the annular shape of slot 1845 can be configured to have a more perimeter to area ratio, for example, by implementing a same or similar "zig-zag" annular pattern as slot 1825 of low band antenna element 1822. low band antenna elements 1822 and high band antenna elements 1842 can be implemented with slots 1825 and 1845 having same or different types of annular slot shapes from one another, for example, where low band antenna elements 1822 are implemented via a zig-zag annular shape and/or where high band antenna elements 1842 are implemented via a circular annular shape.

FIG. 18O illustrates an embodiment of a high band antenna element 1842 that includes a slot element having the slot shape discussed in conjunction with FIG. 18N. Some or all features and/or functionality of the high band antenna element 1842 of FIG. 18N can be utilized to implement some or all antenna elements 1842 of any embodiment of the high band antenna 1804 described herein, such as some or all antenna elements 1842 in a same or similar topology as of the high band antenna array 1840 of FIG. 18C.

The high band antenna element 1842 can have a length dimension 1847 and width dimension 1848, for example, with respect to the x-axis and y-axis of the x-y plane of FIG. 18K, 18L, and/or 18M. The length dimension 1847 can be the same as or different from the width dimension 1848. In some embodiments, the length dimension 1847 and width dimension 1848 are each equivalent to and/or similar to 25 mm, and/or are less than the length dimension 1827 and width dimension 1828 of the low band antenna element 1822.

For example, the spacing of high band antenna elements 1842 at the scale illustrated in FIG. 18L and FIG. 18M is configured based on the length dimension 1847 and width dimension 1848 of each high band antenna element 1842. The total area spanned by the high band antenna array 1840, for example, as illustrated in FIG. 18L, can be configured based on a minimum length dimension 1847 and/or minimum width dimension 1848 of each low band antenna element 1822, for example, required to induce desired radiation patterns. The length dimension 1847 and width dimension 1848 can be configured based on a total maximum area spanned by the high band antenna array 1840 and/or minimum spacing between array elements, for example, required to induce desired radiation patterns and/or required to meet maximum weight requirements of a corresponding satellite payload.

Other embodiments of high band antenna element 1842 can have different length and/or width dimensions. Other embodiment of high band antenna element 1842 can be non-square and/or non-rectangular with respect to the x-y axis.

The high band antenna element 1842 can have a thickness dimension 1849, for example, with respect to a z-axis orthogonal to x-y plane. In some embodiments, the thickness dimension 1849 is equivalent to and/or similar to 2.54 mm, and/or is less than the thickness dimension 1829 of the low band antenna element 1822. The thickness dimension 1849 can be configured to accommodate slot 1845. Other embodiments of high band antenna element 1842 can have different thickness.

The high band antenna element 1842 can be implemented via a single lamination and/or plating construction. The low band antenna element 1822 can be implemented via EPIG (electroless palladium immersion gold) plating, for example, to mitigate passive intermodulation (PIM) and/or loss based on eliminating nickel. Shorting of the high band antenna element 1842 can be implemented via in center to ground floating metal.

The high band antenna element 1842 can have a weight of roughly 3 grams, for example, based on the dimensions and/or selected materials. A total weight of the high band antenna array 1840 can compare favorably to a maximum weight requirement, such as a 750 g weight requirement for the low band antenna 1802 and the high band antenna 1804, for example, based on a configured weight of high band antenna element 1842 and/or based on a configured number of high band antenna elements 1842 in low band antenna array 1820. In particular, the total combined weight of the low band antenna array 1820 and the high band antenna array 1840 can be configured to compare favorably to the maximum weight requirement.

In some embodiments, the low band antenna element 1822 can be dual quadrature fed, for example, to generate high quality RHCP with wide axial ratio bandwidth.

Some or all features of low band antenna element 1822 of FIGS. 18N-18O, such as the slot shape, dimensions, and/or plating, can be configured to induce bandwidth comparing favorably to a bandwidth requirement, to induce a favorable cross polarization, such as greater than 20 dB cross polarization, to induce favorable directivity, such as 6 dB directivity, to induce favorable radiation efficiency, such as 95% radiation efficiency, and/or to induce other favorable characteristics.

The high band antenna element 1842 can otherwise be implemented to induce favorable radiation patterns, such as the radiation patterns illustrated in FIGS. 18P and/or 18Q. FIG. 18P illustrates a first S-parameter curve 1851 and second S-parameter curve 1852 of an example plot indicating radiation pattern induced by a high band antenna element 1842 having some or all of the features and/or functionality described in conjunction with FIGS. 18P and/or 18Q. FIG. 18H illustrates curves 1853, 1854, and 1855 for Left Hand Circular Polarization (LHCP) at varying values of phi, and curves 1856, 1857, and 1858 for Right Hand Circular Polarization (RHCP) for varying values of phi, for example, as angles with respect to the x-axis of the x-y plot.

Some or all features of individual high band antenna elements 1842 such as the slot shape, dimensions, and/or plating discussed in conjunction with FIGS. 18N-18O, and/or some or all features the high band antenna array 1840 of these antenna elements, such as its number of antenna elements and/or layout of these antenna elements, can be configured to produce RHCP radiation, to have an impedance bandwidth comparing favorably to a threshold impedance bandwidth such as an impedance bandwidth of 40

MHz, to have wide beam coverage limb to limb of a corresponding satellite 110 implementing high band antenna 1804, and/or to induce an isoflux radiation pattern by high band antenna 1804 for a given altitude range, such as 500-600 km altitude or other LEO altitude, for example, based on being implemented by satellites 110 implementing high band antenna 1804 in LEO orbit.

The high band antenna array 1840 can otherwise be implemented to induce favorable radiation patterns for the high band antenna 1804, for example, based on a configured number of and/or configuration of antenna elements 1842 in high band antenna array 1840 as described in conjunction with FIG. 18K and/or 18L, and/or based on configured characteristics of each antenna element 1842 described in conjunction with FIGS. 18N and/or 18O. The radiation pattern of FIG. 18R can correspond to an ideal radiation pattern for transmission of navigation signals 240.B. The radiation pattern of FIG. 18S can correspond to a radiation pattern induced via implementing high band antenna 1804 via an array of multiple antenna elements 1842 of FIGS. 18N and/or 18O, for example in the topology of FIGS. 18K and/or 18L. FIG. 18T illustrates curves 1891, 1892, and 1893 for Left Hand Circular Polarization (LHCP) at varying values of phi, and curves 1894, 1895, and 1896 for Right Hand Circular Polarization (RHCP) for varying values of phi, for example, as angles with respect to the x-axis of the x-y plot.

FIG. 18T illustrates an example embodiment of a payload module 1860 of navigation processing system 300. The payload module 1860 can be operable to implement some or all of processing module 320 and/or some or all functionality of navigation processing system 300 described herein. For example, the payload module 1860 includes hardware and/or software components implementing the navigation signal generation and transmission module 1230 to facilitate generation of navigation signal 240.A and 240.B as described herein. The payload module 1860 can be operable to generate navigation signals 240.A and 240.B for transmission via a low band antenna array 1820 and a high band antenna array 1840, respectively, as discussed previously. This can include implementing a respective low band isolator and/or high band isolator as illustrated in FIG. 18T. Some or all features and/or functionality of the navigation processing system 300 of FIG. 18T can implement the navigation processing system 300 of FIG. 3B, of FIG. 18A, and/or any other embodiment of navigation processing system 300 described herein.

In some embodiments, the payload module 1860 can be further operable to receive navigation signals 240.A and 240.B, for example, transmitted by other satellites 110 and/or nodes. This can include implementing one or more low band antenna elements 1822 as receiver antenna elements 1846, and/or implementing one or more high band antenna elements 1842 as receiver antenna elements 1844. For example, a single low band antenna element 1846 is implemented to receive navigation signals 240.A for processing as discussed herein, where this single low band antenna element 1846 has a same or different design from the low band antenna elements 1822 implementing the low band antenna array 1820 that transmits navigation signals 240.A. Similarly, a single high band antenna element 1844 can be implemented to receive navigation signals 240.B for processing as discussed herein, where this single high band antenna element 1844 has a same or different design from the high band antenna elements 1842 implementing the high band antenna array 1840 that transmits navigation signals 240.B.

The payload module 1860 can further be operable to process received signals, for example, for use in generating state data utilized to generate the navigation messages included in navigation signals 240.A and 240.B. For example, the payload module 1860 includes hardware and/or software components implementing the navigation signal receiving and processing module 1220 to facilitate processing of received navigation signals 240.A and 240.B, and/or other signaling, as described herein.

FIG. 18U illustrates an embodiment of satellite 110 that includes a low band antenna array 1820 and high band antenna array 1840 of navigation processing system 300 for transmission of its navigation signals 240.A and navigation signals 240.B. The antenna elements 1822 of the low band antenna array 1820 of FIG. 18U can be implemented as discussed in conjunction with FIGS. 18E and/or 18F and/or can be arranged as discussed in conjunction with FIGS. 18C and/or 18D. The antenna elements 1842 of high band antenna array 1840 of FIG. 18U can be implemented as discussed in conjunction with FIGS. 18N and/or 18O and/or can be arranged as discussed in conjunction with FIG. 18K and/or 18L. In particular, the high band antenna array 1840 can be nested within the low band antenna array 1820 as described in conjunction with FIG. 18M.

The satellite 110 can further include the low band antenna element 1846 and/or high band antenna element 1844 of FIG. 18T that are configured to receive navigation signals. The low band antenna element 1823 and/or high band antenna element 1843 can be included on a different plane, such as a plane perpendicular to the x-y plane that includes the low band antenna array 1820 and the high band antenna array 1840 as illustrated in FIG. 18U.

The processing of received signals from low band antenna element 1823 and/or high band antenna element 1843, and/or the generation of navigation signals transmitted via the antenna elements 1822 of the low band antenna array 1820 and/or the antenna elements 1842 of the high band antenna array 1840, can be implemented via payload module 1860. For example, all hardware and/or software operable to implement functionality of payload module 1860 of FIG. 18T, such as processing devices, memory devices, and/or other hardware operable to implement some or all functionality of navigation processing system 300 described herein, can be physically and/or operably connected to and/or otherwise coupled to low band antenna element 1823, high band antenna element 1843, low band antenna elements 1822, and/or high band antenna elements 1842, for example, via at least one bus and/or via at least one wired medium.

In various embodiments, a satellite 110 includes a payload module operable to generate a low band navigation signal and a high band navigation signal. The satellite 110 can otherwise include at least one processor operable to generate the low band navigation signal and the high band navigation signal satellite 110, for example, based on implementing some or all features and/or functionality of the navigation signal generation and transmission module 1230 described in conjunction with various embodiments herein.

The satellite can further include a low band antenna array that includes a plurality of low band antenna elements operable to radiate the low band navigation signal. The satellite further includes a high band antenna array that includes a plurality of high band antenna elements operable to radiate the high band navigation signal. The plurality of low band antenna elements can be co-planar with the plurality of high band antenna elements. The high band antenna array can be nested within the low band antenna array. For example, the low band antenna array and the high band antenna array can have a common centroid.

In various embodiments, the low band antenna elements are configured in a dual-ring configuration, for example, as illustrated in FIG. 18C. In various embodiments, the high band antenna elements are configured in a center and ring configuration, for example, as illustrated in FIG. 18K. In various embodiments, each low band antenna elements has a slot with an annular zig-zag shape, such as the annular zig-zag shape of FIG. 18E. In various embodiments, each high band antenna elements has a slot with a circular ring shape, such as the circular ring shape of FIG. 18N.

In various embodiments, a low band antenna is configured to radiate a low band navigation signal and includes a plurality of low band antenna elements. Each low band antenna element is implemented via a slot having an annular zig-zag shape, such as the annular zig-zag shape of FIG. 18E. In various embodiments, the low band antenna elements are configured in a dual-ring configuration, for example, as illustrated in FIG. 18C. The low band antenna can be implemented by and/or included upon a satellite, a node of satellite processing system 100, a navigation processing system 300, a client device 160, and/or any transmitter operable to transmit navigation signals.

In various embodiments, a high band antenna is configured to radiate a high band navigation signal and includes a plurality of high band antenna elements. Each high band antenna element is implemented via a slot having a circular ring shape. In various embodiments, the high band antenna elements are configured in a center and ring configuration, for example, as illustrated in FIG. 18C. In various embodiments, the high band antenna elements are nested within a low band antenna array that includes a plurality of low band antenna elements. The high band antenna can be implemented by and/or included upon a satellite, a node of satellite processing system 100, a navigation processing system 300, a client device 160, and/or any transmitter operable to transmit navigation signals.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a non-transitory computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A satellite comprising:
at least one processor configured to execute operational instructions that cause the at least one processor to perform operations that include:
generating a navigation message;
generating encrypted navigation message data from the navigation message by applying an encryption scheme to the navigation message;
generating an encrypted ranging signal by applying the encryption scheme to a spreading code of the satellite;
generating a secure navigation signal based on modulating the encrypted navigation message data upon the encrypted ranging signal, wherein the generating the secure navigation signal includes:
generating an encrypted low band data stream and an encrypted high band data stream based on the encrypted navigation message data;
generating a secure low band navigation signal from the encrypted low band data stream in accordance with a bandwidth-efficient modulation scheme; and
generating a secure high band navigation signal from the encrypted high band data stream in accordance with the bandwidth-efficient modulation scheme, wherein the secure navigation signal includes the secure low band navigation signal and the secure high band navigation signal; and a navigation signal transmitter configured to broadcast the secure navigation signal for receipt by at least one client device, the secure navigation signal facilitating the at least one client device to determine state data of the at least one client device by utilizing key data associated with the encryption scheme.

2. The satellite of claim 1, wherein the encryption scheme is a block cipher encryption scheme.

3. The satellite of claim 2, wherein the navigation message has a first fixed-length, wherein each of a plurality of blocks generated via the block cipher encryption scheme have a second fixed-length that is smaller than the first fixed-length, and wherein generating the encrypted navigation message data includes dividing the navigation message into a plurality of sub-messages with the second fixed-length and performing an exclusive-OR operation upon each of the plurality of sub-messages with a corresponding one of the plurality of blocks.

4. The satellite of claim 3, wherein a final one of the plurality of sub-messages has a length that is smaller than the second fixed-length, and wherein the exclusive-OR operation is performed upon the final one the plurality of sub-messages and a truncated one of the plurality of blocks.

5. The satellite of claim 1,
wherein generating the encrypted ranging signal includes utilizing the key data and further includes utilizing a first initialization vector;
and wherein generating the encrypted navigation message data includes utilizing the key data and further includes utilizing a second initialization vector that is different from the first initialization vector.

6. The satellite of claim 5, wherein the first initialization vector and the second initialization vector are based on the spreading code.

7. The satellite of claim 6, wherein the first initialization vector is based on concatenating a value of the spreading code with a first counter value of a first incrementing counter, and wherein the second initialization vector is based on concatenating the value of the spreading code with a second counter value of a second incrementing counter that is different from the first incrementing counter.

8. The satellite of claim 1, wherein the at least one client device determines the state data based on:
applying the key data to the spreading code to generate an internal encrypted ranging signal; and
determining ranging data based on correlating the internal encrypted ranging signal with the secure navigation signal, wherein the state data is determined based on the ranging data.

9. The satellite of claim 1, wherein the at least one client device determines the state data based on:
determining the navigation message by decrypting the encrypted navigation message data utilizing the key data, wherein determining the state data is further based on processing the navigation message.

10. The satellite of claim 1, wherein the navigation signal transmitter is implemented via:
a low band antenna array, having a dual-ring topology, that is configured to radiate the secure low band navigation signal; and
a high band antenna array, nested within the low band antenna array and having a center and ring topology, that is configured to radiate the secure high band navigation signal.

11. The satellite of claim 1, wherein at least one of:
the encrypted ranging signal is non-periodic based on the encryption scheme; or the at least one client device determines the state data based on the secure navigation signal having low cross-correlation properties and high auto-correlation properties, and wherein the low cross-correlation properties and the high auto-correlation properties are based on the encryption scheme.

12. A client device comprising:

at least one first receiver configured to receive a secure navigation signal transmitted by a satellite, wherein the secure navigation signal includes encrypted navigation message data modulated with an encrypted ranging signal;

at least one second receiver configured to receive key data corresponding to the secure navigation signal; and at least one processor configured to execute operational instructions that cause the at least one processor to perform operations that include:

generating an internal encrypted ranging signal by applying the key data to a spreading code of the satellite in accordance with an encryption scheme, wherein the encryption scheme is a block cipher encryption scheme;

generating ranging data based on correlating the internal encrypted ranging signal with the secure navigation signal;

determining a navigation message by utilizing the key data to decrypt the encrypted navigation message data, wherein determining the navigation message includes:

generating each of a plurality of blocks having a first fixed-length via the block cipher encryption scheme;

dividing the encrypted navigation message data into a plurality of sub-messages having the first fixed-length; and performing an exclusive-OR operation upon each of the plurality of sub-messages and a corresponding one of the plurality of blocks; and determining state data for the client device based on the ranging data and the navigation message.

13. The client device of claim 12, wherein the plurality of blocks are generated in parallel via a set of parallelized processing resources of the at least one processor.

14. The client device of claim 13, wherein generating the encrypted ranging signal includes utilizing the key data and further includes utilizing a first initialization vector;

and wherein decrypting the encrypted navigation message data utilizing the key data and further includes utilizing a second initialization vector that is different from the first initialization vector.

15. The client device of claim 14, wherein the first initialization vector and the second initialization vector are based on the spreading code.

16. The client device of claim 15, wherein the first initialization vector is based on concatenating a value of the spreading code with a first counter value of a first incrementing counter, and wherein the second initialization vector is based on concatenating the value of the spreading code with a second counter value of a second incrementing counter that is different from the first incrementing counter.

17. A method comprising:

generating a navigation message;

generating encrypted navigation message data from the navigation message by applying an encryption scheme to the navigation message;

generating an encrypted ranging signal by applying the encryption scheme to a spreading code; and generating a secure navigation signal based on modulating the encrypted navigation message data upon the encrypted ranging signal; and broadcasting the secure navigation signal for receipt by at least one client device, the secure navigation signal facilitating the at least one client device to determine state data of the at least one client device by utilizing key data associated with the encryption scheme, wherein the at least one client device determines the state data based on:

applying the key data to the spreading code to generate an internal encrypted ranging signal; and determining ranging data based on correlating the internal encrypted ranging signal with the secure navigation signal, wherein the state data is determined based on the ranging data.

* * * * *